(12) United States Patent
Matozaki et al.

(10) Patent No.: US 12,486,329 B2
(45) Date of Patent: Dec. 2, 2025

(54) ANTI-SIRPα ANTIBODY

(71) Applicants: NATIONAL UNIVERSITY CORPORATION KOBE UNIVERSITY, Kobe (JP); DAIICHI SANKYO COMPANY, LIMITED, Tokyo (JP)

(72) Inventors: Takashi Matozaki, Kobe (JP); Mayumi Sue, Tokyo (JP); Kensuke Nakamura, Tokyo (JP); Chigusa Yoshimura, Tokyo (JP)

(73) Assignees: NATIONAL UNIVERSITY CORPORATION KOBE UNIVERSITY, Kobe (JP); DAIICHI SANKYO COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/660,591

(22) Filed: May 10, 2024

(65) Prior Publication Data
US 2024/0294660 A1   Sep. 5, 2024

Related U.S. Application Data

(62) Division of application No. 17/258,115, filed as application No. PCT/JP2019/027114 on Jul. 9, 2019, now Pat. No. 12,024,566.

(30) Foreign Application Priority Data

Jul. 10, 2018 (JP) ................ 2018-131116

(51) Int. Cl.
 C07K 16/28 (2006.01)
 A61K 39/00 (2006.01)
 A61P 35/00 (2006.01)
 C07K 16/32 (2006.01)

(52) U.S. Cl.
 CPC .... C07K 16/2896 (2013.01); *A61K 2039/505* (2013.01); *A61P 35/00* (2018.01); *C07K 16/2863* (2013.01); *C07K 16/2887* (2013.01); *C07K 16/32* (2013.01); *C07K 2317/21* (2013.01); *C07K 2317/565* (2013.01); *C07K 2317/72* (2013.01); *C07K 2317/732* (2013.01); *C07K 2317/76* (2013.01)

(58) Field of Classification Search
 None
 See application file for complete search history.

(56) References Cited

U.S. PATENT DOCUMENTS

| | | | |
|---|---|---|---|
| 8,722,587 B2 | 5/2014 | Mason | |
| 9,518,277 B2 | 12/2016 | Franklin et al. | |
| 2004/0010124 A1 | 1/2004 | Johnson et al. | |
| 2010/0298542 A1 | 11/2010 | Igawa et al. | |
| 2013/0078234 A1 | 3/2013 | Takahashi et al. | |
| 2014/0141002 A1 | 5/2014 | Clemmons et al. | |
| 2014/0242095 A1* | 8/2014 | Wang | A61P 35/02 530/389.7 |
| 2015/0017130 A1 | 1/2015 | Yang et al. | |
| 2015/0152429 A1 | 6/2015 | Albertsen et al. | |
| 2015/0337053 A1 | 11/2015 | McCarthy et al. | |
| 2017/0073414 A1 | 3/2017 | Weiskopf et al. | |
| 2017/0342154 A1 | 11/2017 | Igawa et al. | |
| 2019/0153095 A1 | 5/2019 | Matozaki et al. | |
| 2019/0359707 A1 | 11/2019 | Pincetic et al. | |
| 2020/0140565 A1 | 5/2020 | Wang et al. | |

FOREIGN PATENT DOCUMENTS

| | | |
|---|---|---|
| CO | NC20180010855 | 10/2018 |
| CO | NC2019/0005033 | 5/2019 |
| CO | NC2020/0013871 | 11/2020 |
| JP | 2014-525940 A | 10/2014 |
| JP | 2016-169220 A | 9/2016 |
| JP | 2017-510251 A | 4/2017 |
| WO | WO-2009/041613 A1 | 4/2009 |
| WO | WO-2010/130053 A1 | 11/2010 |
| WO | WO-2011/076781 A1 | 6/2011 |
| WO | WO-2013/056352 A1 | 4/2013 |
| WO | WO-2013/109752 A1 | 7/2013 |
| WO | WO-2015/042557 A1 | 3/2015 |
| WO | WO-2017/068164 A1 | 4/2017 |
| WO | WO-2017/178653 A2 | 10/2017 |
| WO | WO-2018/008470 A1 | 1/2018 |
| WO | WO-2018/026600 A1 | 2/2018 |
| WO | WO-2018/057669 A1 | 3/2018 |
| WO | WO-2018/107058 A1 | 6/2018 |
| WO | WO-2018/190719 A2 | 10/2018 |

OTHER PUBLICATIONS

International Searching Authority, "International Search Report," issued in connection with International Patent Application No. PCT/JP2019/027114, dated Oct. 8, 2019.
International Searching Authority, "Written Opinion," issued in connection with International Patent Application No. PCT/JP2019/027114, dated Oct. 8, 2019.
Anonymous, "Engineered Fc Regions," Review InvivoGen, Retrieved from the Internet: URL: https://www.invivogen.com/sites/default/files/invivogen/resources/documents/reviews/review-Engineered-Fc-Regions-invivogen.pdf (2001) (Retrieved Mar. 3, 2020) (2 pages).
Crommelin, D.J.A., et al., Pharmaceutical Biotechnology Fundamentals and Applications, 4th ed., p. 153 (2013).
Diamond, et al., "Somatic mutation of the T15 heavy chain gives rise to an antibody with autoantibody specificity", Proc. Natl. Acad. Sci. USA, vol. 81, pp. 5841-5844, (1984).

(Continued)

*Primary Examiner* — Anne M. Gussow
*Assistant Examiner* — Brianna K Swartwout
(74) *Attorney, Agent, or Firm* — Foley & Lardner LLP

(57) ABSTRACT

An anti-SIRPα antibody that can be used as a tumor agent and an anti-tumor agent comprising the antibody as an active ingredient. An antibody that binds specifically to human SIRPα to inhibit binding of human SIRPα to CD47.

21 Claims, 41 Drawing Sheets

Specification includes a Sequence Listing.

(56) References Cited

OTHER PUBLICATIONS

Holodov, L.E., et al., "Clinical Pharmacokinetics Handbook", Medicine, pp. 83-98, 134-138, 160, 378-380, 1985.
Ladner, R. C., "Mapping the Epitopes of Antibodies," Biotechnology and Genetic Engineering Reviews, 24:1-30 (2007).
Lamminmaki, et al., "Crystal Structure of a Recombinant Anti-estradiol Fab Fragment in Complex with 17ß-Estradiol", The Journal of Biological Chemistry, vol. 276, No. 39, pp. 36687-36694, (2001).
Liu et al. "CD47 blockade triggers T cell-mediated destruction of immunogenic tumors," Nature Medicine, vol. 21, No. 10, Oct. 2015, pp. 1209-1215.
Liu et al., "Pre-Clinical Development of a Humanized Anti-CD47 Antibody with Anti-Cancer Therapeutic Potential," PLOS One, vol. 10, No. 9, Sep. 21, 2015, pp. 1-23.
Matozaki et al., "Functions and molecular mechanisms of the CD47-SIRPα signalling pathway," Trends in Cell Biology, vol. 19, No. 2, Jan. 12, 2009, pp. 72-80.
Office Action dated Nov. 23, 2021 issued in a corresponding Russian Patent Application No. 2021102983, (18 pages).
Office Action issued in corresponding Colombian Patent Application No. NC2020/0014727, dated Apr. 18, 2023.
Office Action issued in corresponding Russian Patent Application No. 2021102983 dated Mar. 23, 2022.
Office Action issued in corresponding Russian Patent Application No. 2021102983, dated Jul. 28, 2022.
Ohno, et al., "Antigen-binding specificities of antibodies are primarily determined by seven residues of VH", Proc. Natl. Acad. Sci. USA, vol. 82, pp. 2945-2949, (1985).
Pai-Scherf et al., "FDA Approval Summary: Pembrolizumab for Treatment of Metastatic Non-Small Cell Lung Cancer: First-Line Therapy and Beyond," The Oncologist, vol. 22, 2017, pp. 1392-1399.
Ratnikova, Development and testing of miniature single-domain antibodies against the CD47 tumor marker based on the alpaca immunoglobulin heavy chain and their application to the treatment of tumors: Dissertation, Candidate of biology: Ratnikova, Natalia Mikhailovna; [Venue of defense: Engelhardt Institute of Molecular Biology, Russian Academy of Sciences], Moscow 2017, chapter 1, 1.2, with English-language machine translation, (25 pages).
Ring et al., "Anti-SIRPα antibody immunotherapy enhances neutrophil and macrophage antitumor activity," PNAS, Nov. 20, 2017, pp. e10578-e10585.
Rudikoff, et al., "Single amino acid substitution of altering antigen-binding specificity", Proc. Natl. Acad. Sci. USA. Immunology, p. 1979-1983, (1982).
Saito et al., "Action mechanism of cancer immunotherapy targeting CD47/SIRPα signal", Journal of Molecular Targeted Therapy for Cancer, (2017), vol. 15, No. 4, 2017, pp. 414-419.
Saito, et al. "Regulation by SIRPα of dendritic cell homeostasis in lymphoid tissues," Blood vol. 116, No. 18, Nov. 4, 2010, pp. 3517-3525.
Sergeev, P.V., "A Short Course in Molecular Pharmacology", Ministry of Health of the Russian Soviet Federative Socialist Republic, p. 10, 1975.
Severin, E. S., et al., "Biological Chemistry," Medical Information Agency, Moscow, p. 86 (2008), https://www.iephb.ru/wp-content/uploads/Severin.-Biohimiya.pdf (English translation included).
Supplementary European Search Report issued in corresponding European Patent Application No. 19833586.1 dated Mar. 11, 2022.
Takenaka et al., "Polymorphism in Sirpa modulates engraftment of human hematopoietic stem cells," Nature Immunology, vol. 8, No. 12, Dec. 2007, pp. 1313-1323.
Weinstock et al., "U.S. Food and Drug Administration Approval Summary: Atezolizumab for Metastatic Non-Small Cell Lung Cancer," Clinical Cancer Research, vol. 23, No. 16, Aug. 15, 2017, pp. 4534-4539.
Yanagita et al., "Anti-SIRPα antibodies as a potential new tool for cancer immunotherapy," JCI Insight, vol. 2, No. 1, 2017, pp. 1-15.
Yarilin, "Basics of Immunology: Textbook", Moscow: Medicine, pp. 172-174, (1999), with English-language translation, (10 pages).
Zhao, X. W., et al., "CD47-signal regulatory protein-alpha (SIRPalpha) interactions form a barrier for antibody-mediated tumor cell destruction," PNAS, 108(45):18342-18347 (2011).
Office Action issued in corresponding Japanese Patent Application No. 2023-172481 dated Nov. 12, 2024.

* cited by examiner

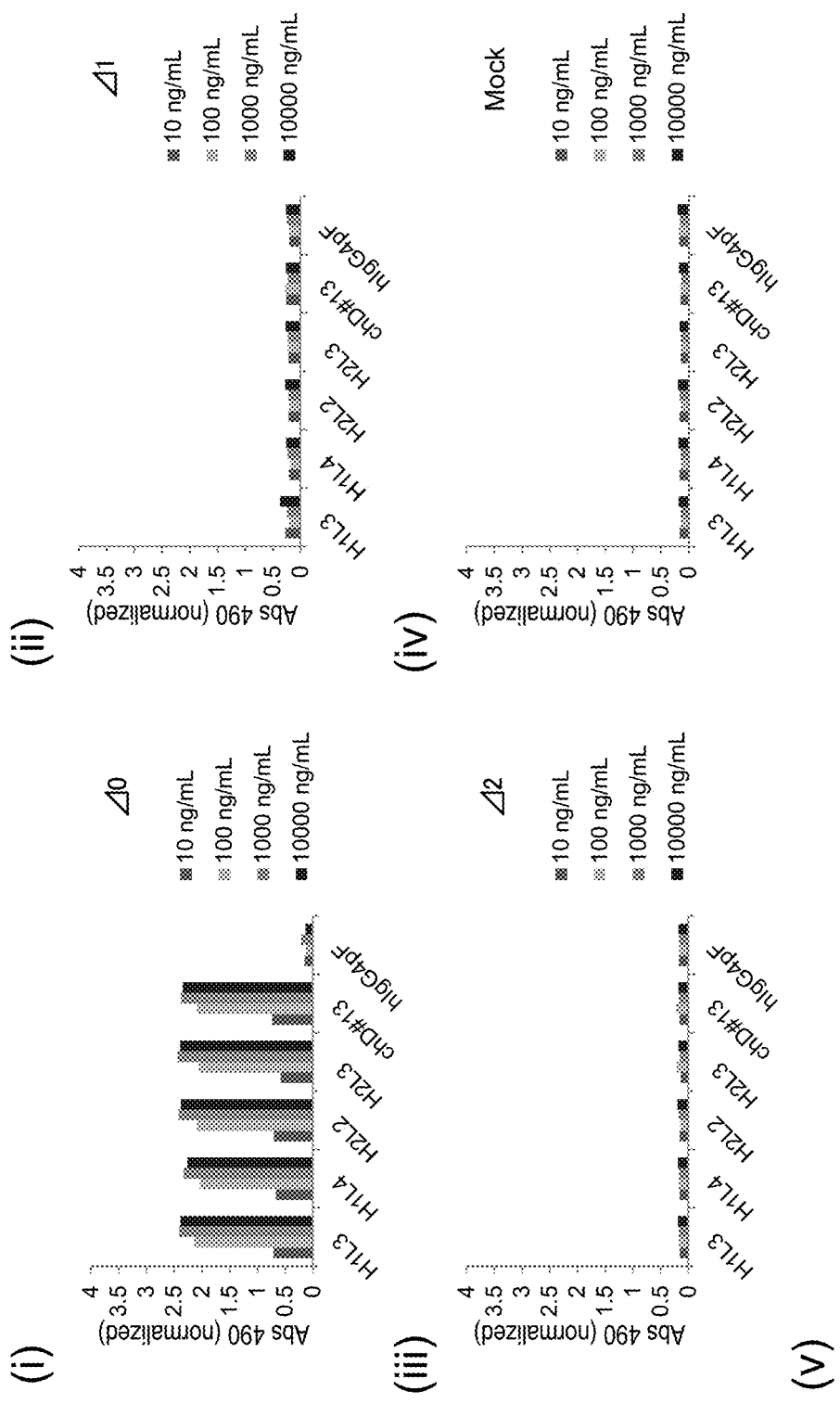

Fig. 4

```
       1   MEPAGPAPGRLGPLLCLLLAASCAWSGVAGEEELQVIQPDKSVLVAAGETATLRCTATSL   60
V1     1   ............................................................   60
V2     1   ...........................................S...S.I.H.V....   60
V3     1   ...........................................S...S.I.L.V....   60
V4     1   ...........................................S...S.I.L......   60
V5     1   .............................G.............S...S.I.H......   60
V6     1   ...................F........................................   60
V7     1   ...........................................S...S.I.H.V....   60
V8     1   ............................................................   60
V9     1   ............................................................   60
V10    1   ..........................R................S...S.I.H.V....   60

61  IPVGPIQWFRGAGPGRELIYNQKEGHFPRVTTVSDLTKRNNMDFSIRIGNITPADAGTYY  120
V1    61   ............................................................  120
V2    61   .....................A.............ES...E......S.S.........  120
V3    61   .....................A.............ES...E......S.S.........  120
V4    61   .....................A.............ES...E.................  120
V5    61   ....................................................S.S....  120
V6    61   ............................................................  120
V7    61   .....................A.............ES...E....P.S.S.........  120
V8    61   .....................A.............ES...E......S.S.........  120
V9    61   .....................A.............ES..........S...........  120
V10   61   .....................A.............ES...E......S.S.........  120

121 CVKFRKGSPDDVEFKSGAGTELSVRA                                     146
V1   121   ..........................                                    146
V2   121   .....T-                                                        145
V3   121   .....T-                                                        145
V4   121   ..........................                                    146
V5   121   ..........................                                    146
V6   121   ..........................                                    146
V7   121   .....T-               .G.                                      145
V8   121   .....T-                                                        145
V9   121   ..........................                                    146
V10  121   .....T-                                                        145
```

Fig. 9
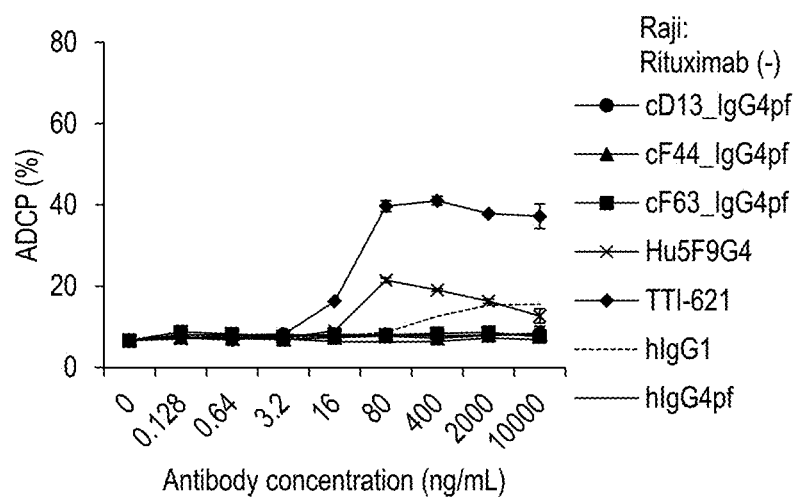
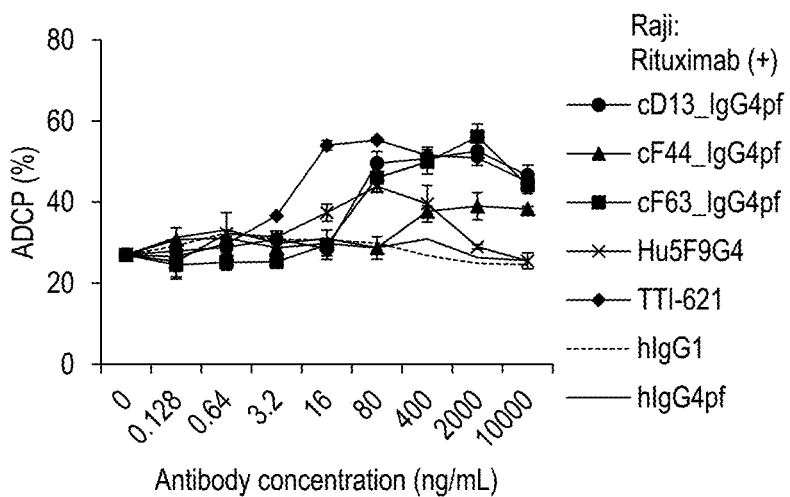

Fig. 11

```
cD13_H    1  MKHLWFFLLLVAAPRWVLSEVQLVESGGGLVQPGRSLKLSCLASGFTFSDYGMIWVRQAP   60
hH1       1  .........................Q..........V.......R...A..........   60
hH2       1  .....................................V.......R...A..........   60 cD13_H   61  GKGLEWVASISSSSSYIYYADTVKGRFTISRENAKNTLFLHMTSLRSEDTALYYCARRYY  120
hH1      61  ...................S.........D.S..R.Y.Q.N...A....V.........  120
hH2      61  ...................S.........D.S....Y.Q.N...A....V.........  120 cD13_H  121  GFNYPFDYWGQGVMVTVSS                                          139
hH1     121  ...............T...                                          139
hH2     121  ...............T...                                          139
```

Fig. 12

```
cD13_L   1 MVLQTQVFISLLLWISGAYGDTVLTQSP-ALAVSLGQRVTISCGASKSVRTYMHWYQQKS  59
hL2      1 ................AIQ......SS.SA.V......T..............P  60
hL3      1 ................Q.........SS.SA.V......T..............P  60
hL4      1 .............................DS......A..N.............P  60 cD13_L  60 GQQPKLLIYSASNLEAGVPSRFSGSGSGTDFTLTIDPVEADDIANYYCQQSNEPPYTFGA 119
hL2     61 .KA..........................................SSLQPE.F.T... Q 120
hL3     61 .K...........................................SSLQPE.F.T... Q 120
hL4     61 .............................................SSLQ.E.V.V... Q 120 cD13_L 120 GTKLELK 126
hL2    121 ......I. 127
hL3    121 ......I. 127
hL4    121 ...V.I. 127
```

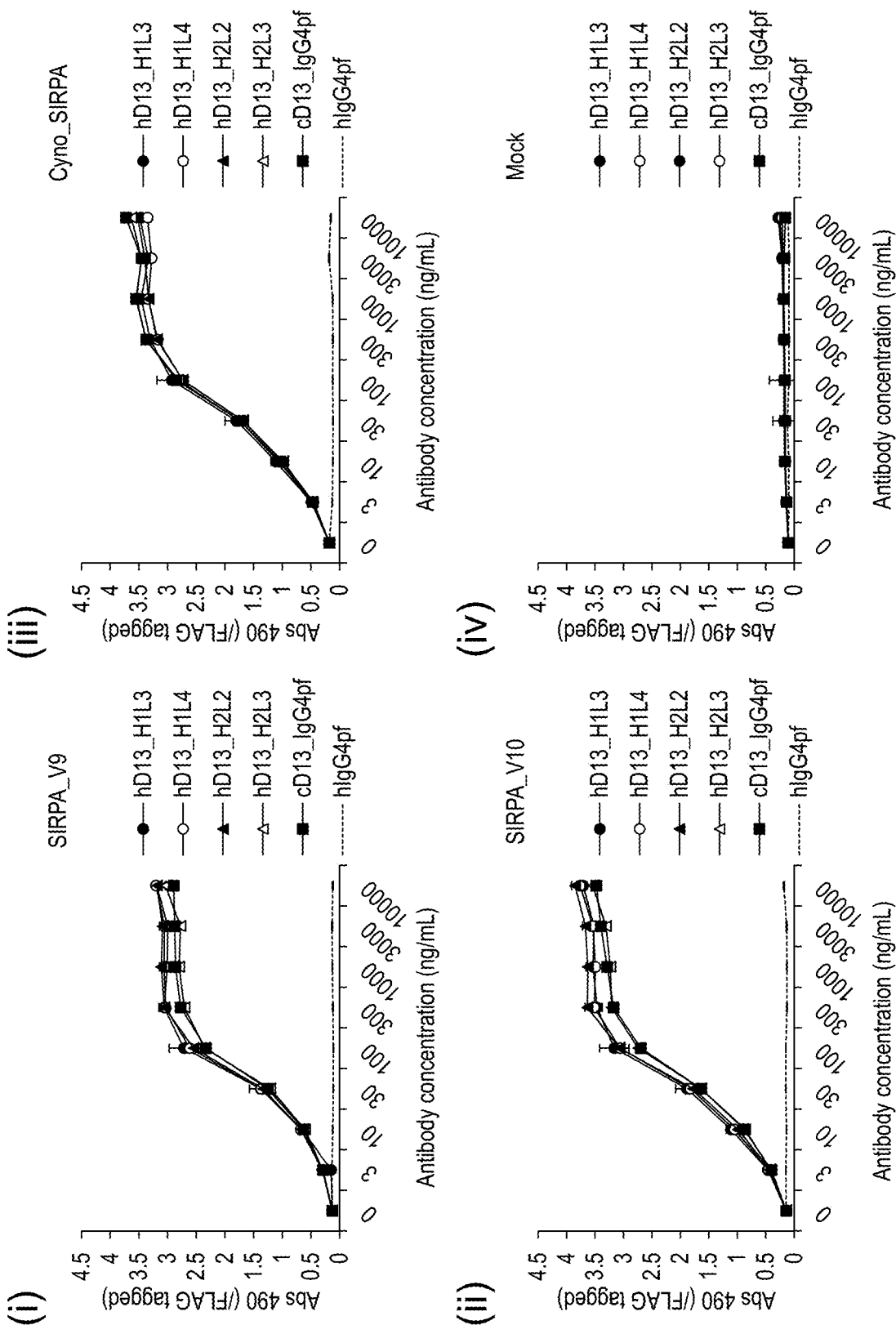

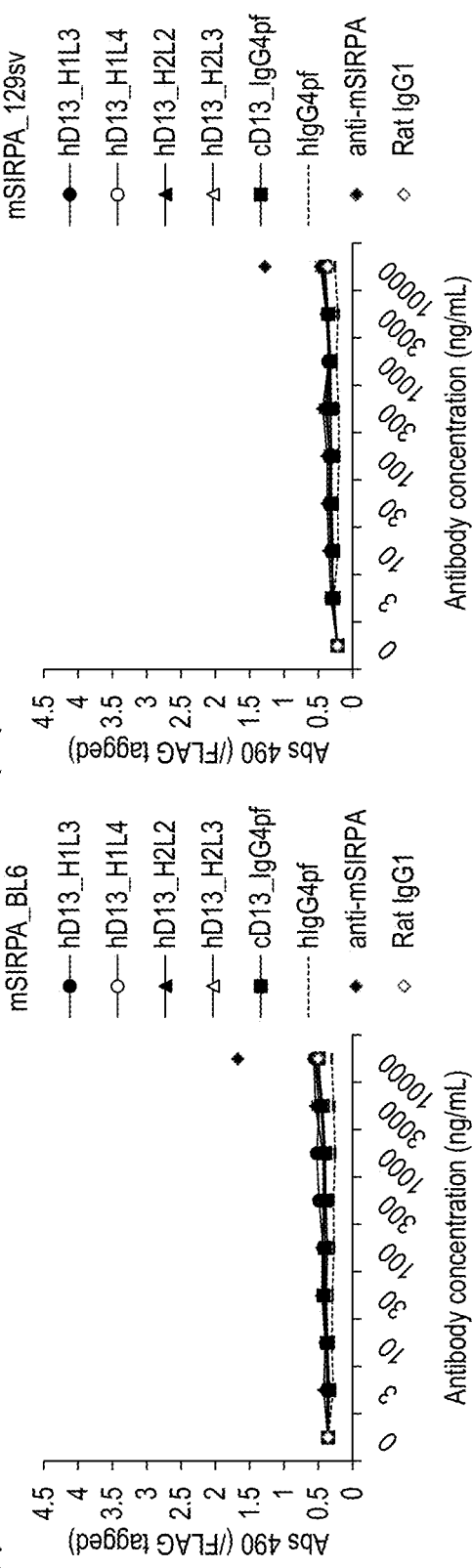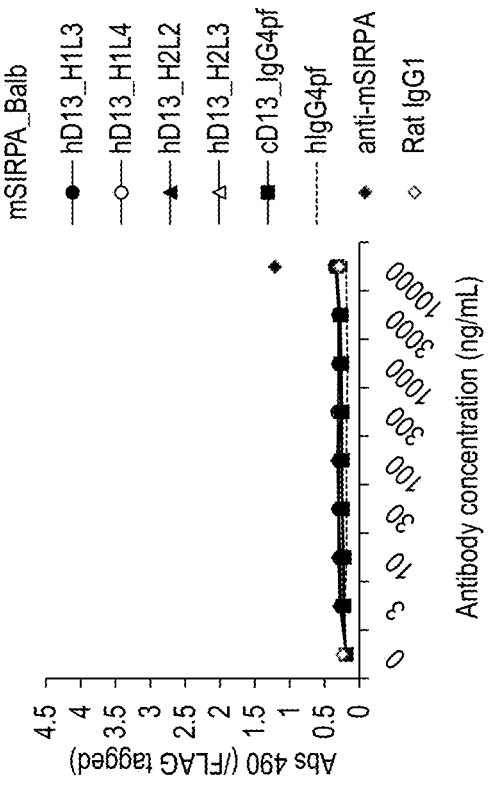
Fig. 14A

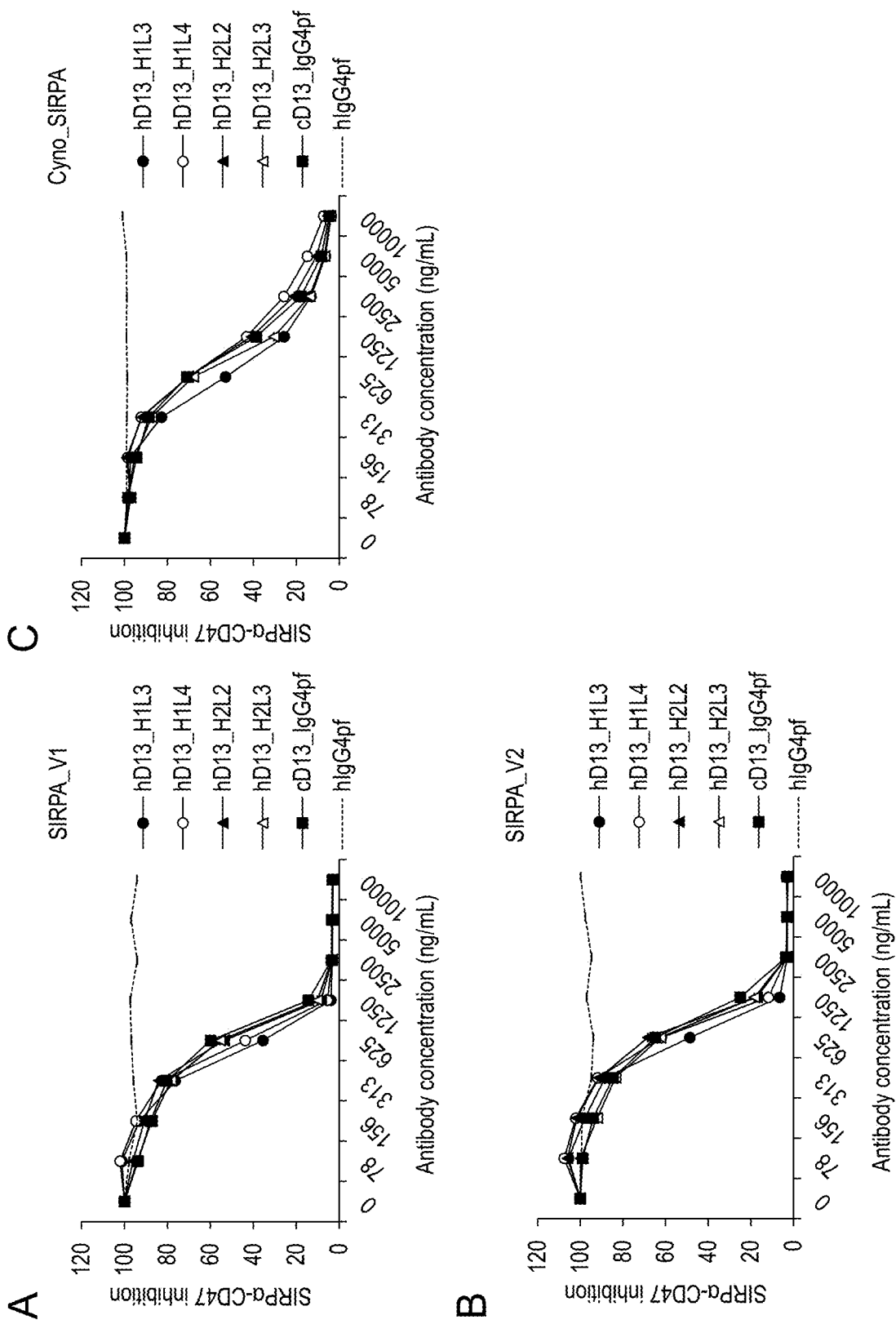

Fig. 17

SEQ ID NO: 22: Nucleotide sequence encoding cD13 light chain
ATGGTGCTGCAGACCCAGGTGTTCATCTCCCTGCTGCTGTGGATCTCCGGCGCGTA
CGGCGACACTGTGCTGACCCAGTCTCCTGCTTTGGCTGTGTCTCTAGGGCAGAGGG
TCACCATCTCTTGTGGGGCCAGCAAAAGTGTCCGTACATATATGCACTGGTACCAA
CAAAAATCGGGACAGCAACCCAAACTCCTGATCTATAGTGCATCCAACCTAGAGGC
TGGAGTCCCTTCCAGGTTCAGTGGGAGTGGGTCTGGGACAGACTTTACCCTCACCA
TAGATCCTGTGGAGGCTGATGACATTGCAAACTATTACTGTCAGCAGAGTAATGAA
CCTCCGTACACGTTTGGAGCTGGGACCAAGCTGGAACTGAAACGGACGGTGGCCGC
CCCCTCCGTGTTCATCTTCCCCCCTCCGACGAGCAGCTGAAGTCCGGCACCGCCT
CCGTGGTGTGCCTGCTGAATAACTTCTACCCCAGAGAGGCCAAGGTGCAGTGGAAG
GTGGACAACGCCCTGCAGTCCGGGAACTCCCAGGAGAGCGTGACCGAGCAGGACAG
CAAGGACAGCACCTACAGCCTGAGCAGCACCCTGACCCTGAGCAAAGCCGACTACG
AGAAGCACAAGGTGTACGCCTGCGAGGTGACCCACCAGGGCCTGAGCTCCCCCGTC
ACCAAGAGCTTCAACAGGGGGGAGTGT Signal sequence (1-60), variable region (61-378),
constant region (379-699)

SEQ ID NO: 23: Amino acid sequence of cD13 light chain
MVLQTQVFISLLLWISGAYGDTVLTQSPALAVSLGQRVTISCGASKSVRTYMHWYQ
QKSGQQPKLLIYSASNLEAGVPSRFSGSGSGTDFTLTIDPVEADDIANYYCQQSNE
PPYTFGAGTKLELKRTVAAPSVFIFPPSDEQLKSGTASVVCLLNNFYPREAKVQWK
VDNALQSGNSQESVTEQDSKDSTYSLSSTLTLSKADYEKHKVYACEVTHQGLSSPV
TKSFNRGEC Signal sequence (1-20), variable region (21-126),
constant region (127-233)

Fig. 18

SEQ ID NO: 24: Nucleotide sequence encoding cD13 heavy chain
ATGAAACACCTGTGGTTCTTCCTCCTGCTGGTGGCAGCTCCCAGATGGGTGCTGAG
CGAGGTACAGCTGGTGGAGTCTGGAGGAGGCTTAGTGCAGCCTGGAAGGTCCCTGA
AACTCTCCTGTTTAGCCTCTGGATTCACTTTCAGTGACTATGGAATGATCTGGGTT
CGCCAGGCTCCAGGGAAGGGGCTGGAGTGGGTTGCATCTATTAGTAGTAGTAGCAG
TTACATCTACTATGCAGACACAGTGAAGGGCCGATTCACCATCTCCAGAGAAATG
CCAAGAACACCCTGTTCCTGCACATGACCAGTCTGAGGTCTGAAGACACTGCCTTG
TATTACTGTGCAAGAAGATACTATGGGTTTAACTACCCTTTTGATTACTGGGGCCA
AGGAGTCATGGTCACAGTCAGCTCAGCCTCCACCAAGGGCCCTAGCGTGTTCCCTC
TGGCCCCTTGTAGCAGAAGCACCAGCGAGTCTACAGCCGCCCTGGGCTGCCTCGTG
AAGGACTACTTTCCCGAGCCCGTGACCGTGTCCTGGAACTCTGGCGCTCTGACAAG
CGGCGTGCACACCTTTCCAGCCGTGCTGCAGAGCAGCGGCCTGTACTCTCTGTCCA
GCGTCGTGACTGTGCCCAGCAGCTCTCTGGGCACCAAGACCTACACCTGTAACGTG
GACCACAAGCCCAGCAACACCAAGGTGGACAAGCGGGTGGAATCTAAGTACGGCCC
TCCCTGCCCTCCTTGCCCAGCCCCTGAAGCCGCGGGCGGACCCTCCGTGTTCCTGT
TCCCCCCAAAGCCCAAGGACACCCTGATGATCAGCCGGACCCCCGAAGTGACCTGC
GTGGTGGTGGATGTGTCCCAGGAAGATCCCGAGGTGCAGTTCAATTGGTACGTGGA
CGGCGTGGAAGTGCACAACGCCAAGACCAAGCCTAGAGAGGAACAGTTCAACAGCA
CCTACCGGGTGGTGTCCGTGCTGACAGTGCTGCACCAGGACTGGCTGAACGGCAAA
GAGTACAAGTGCAAGGTGTCCAACAAGGGCCTGCCCAGCTCCATCGAGAAAACCAT
CAGCAAGGCCAAGGGCCAGCCCCGCGAACCCCAGGTGTACACACTGCCTCCAAGCC
AGGAAGAGATGACCAAGAATCAGGTGTCCCTGACCTGTCTCGTGAAAGGCTTCTAC
CCCTCCGATATCGCCGTGGAATGGGAGAGCAACGGCCAGCCCGAGAACAACTACAA
GACCACCCCCCCTGTGCTGGACTCCGATGGCTCATTCTTCCTGTACAGCAGACTGA
CCGTGGACAAGAGCCGGTGGCAGGAAGGCAACGTGTTCAGCTGCTCCGTGATGCAC
GAGGCCCTGCACAACCACTACACCCAGAAGTCCCTGTCTCTGAGCCTGGGCAAA Signal sequence (1-57), variable region (58-417), constant region (418-1398)

SEQ ID NO: 25: Amino acid sequence of cD13 heavy chain
MKHLWFFLLLVAAPRWVLSEVQLVESGGGLVQPGRSLKLSCLASGFTFSDYGMIWV
RQAPGKGLEWVASISSSSSYIYYADTVKGRFTISRENAKNTLFLHMTSLRSEDTAL
YYCARRYYGFNYPFDYWGQVMVTVSSASTKGPSVFPLAPCSRSTSESTAALGCLV
KDYFPEPVTVSWNSGALTSGVHTFPAVLQSSGLYSLSSVVTVPSSSLGTKTYTCNV
DHKPSNTKVDKRVESKYGPPCPPCPAPEAAGGPSVFLFPPKPKDTLMISRTPEVTC
VVVDVSQEDPEVQFNWYVDGVEVHNAKTKPREEQFNSTYRVVSVLTVLHQDWLNGK
EYKCKVSNKGLPSSIEKTISKAKGQPREPQVYTLPPSQEEMTKNQVSLTCLVKGFY
PSDIAVEWESNGQPENNYKTTPPVLDSDGSFFLYSRLTVDKSRWQEGNVFSCSVMH
EALHNHYTQKSLSLSLGK Signal sequence (1-19), variable region (20-139), constant region (140-466)

Fig. 19

SEQ ID NO: 26: Nucleotide sequence encoding cF44 light chain
ATGGTGCTGCAGACCCAGGTGTTCATCTCCCTGCTGCTGTGGATCTCCGGCGCGTA
CGGCGATGTCCAGATGACCCAGTCTCCATCTAATCTTGCTGCCTCTCCTGGAGAAA
GTGTTTCCATCAATTGCAAGGCAAGTAAGAGCATTAGCAAGTATTTAGCCTGGTAT
CAACAGAAACCTGGGAAAGCAAATAAGCTTCTTATCTACTCTGGGTCAACTTTGCA
ATCTGGAACTCCATCGAGGTTCAGTGGCAGTGGATCTGGTACAGATTTCACTCTCA
CCATCAGAAACCTGGAGCCTGAAGATTTTGGACTCTATTACTGTCAACAGCATAAT
GAATACCCACCCACGTTTGGAGCTGGGACCAAGTTGGAACTGAAACGGACGGTGGC
CGCCCCCTCCGTGTTCATCTTCCCCCCCTCCGACGAGCAGCTGAAGTCCGGCACCG
CCTCCGTGGTGTGCCTGCTGAATAACTTCTACCCCAGAGAGGCCAAGGTGCAGTGG
AAGGTGGACAACGCCCTGCAGTCCGGGAACTCCCAGGAGAGCGTGACCGAGCAGGA
CAGCAAGGACAGCACCTACAGCCTGAGCAGCACCCTGACCCTGAGCAAAGCCGACT
ACGAGAAGCACAAGGTGTACGCCTGCGAGGTGACCCACCAGGGCCTGAGCTCCCCC
GTCACCAAGAGCTTCAACAGGGGGGAGTGT Signal sequence (1-60), variable region (61-381),
constant region (382-702)

SEQ ID NO: 27: Amino acid sequence of cF44 light chain
MVLQTQVFISLLLWISGAYGDVQMTQSPSNLAASPGESVSINCKASKSISKYLAWY
QQKPGKANKLLIYSGSTLQSGTPSRFSGSGSGTDFTLTIRNLEPEDFGLYYCQQHN
EYPPTFGAGTKLELKRTVAAPSVFIFPPSDEQLKSGTASVVCLLNNFYPREAKVQW
KVDNALQSGNSQESVTEQDSKDSTYSLSSTLTLSKADYEKHKVYACEVTHQGLSSP
VTKSFNRGEC Signal sequence (1-20), variable region (21-127),
constant region (128-234)

Fig. 20

SEQ ID NO: 28: Nucleotide sequence encoding cF44 heavy chain
ATGAAACACCTGTGGTTCTTCCTCCTGCTGGTGGCAGCTCCCAGATGGGTGCTGAG
CGAGGTGCAGCTGGTGGAATCTGGGGGAGGCTTAGTGCAGCCTGGAAGGTCCCTGA
AACTCTCCTGTGCAGCCTCAGGATTCACTTTCAGTAACTATTACATGGCCTGGGTC
CGCCAGGCTCCAACGAAGGGTCTGGAGTGGGTCACATACATTACTACTGGTGGTGG
TAGCACTTACTTTCGAGACTCCGTGAAGGGCCGATTCACTATCTCCAGAGATAATG
CAGAAAGCACCCTATACCTGCAAATGGACAGTCTGAGGTCTGAGGACACGGCCACT
TATTACTGTACAGCAGCTAACTACGGAGGGTCCTACTTTGATTACTGGGGCCAAGG
AGTCATGGTCACAGTCAGCTCAGCCTCCACCAAGGGCCCTAGCGTGTTCCCTCTGG
CCCCTTGTAGCAGAAGCACCAGCGAGTCTACAGCCGCCCTGGGCTGCCTCGTGAAG
GACTACTTTCCGAGCCCGTGACCGTGTCCTGGAACTCTGGCGCTCTGACAAGCGG
CGTGCACACCTTTCCAGCCGTGCTGCAGAGCAGCGGCCTGTACTCTCTGTCCAGCG
TCGTGACTGTGCCCAGCAGCTCTCTGGGCACCAAGACCTACACCTGTAACGTGGAC
CACAAGCCCAGCAACACCAAGGTGGACAAGCGGGTGGAATCTAAGTACGGCCCTCC
CTGCCCTCCTTGCCCAGCCCCTGAAGCCGCGGGCGGACCCTCCGTGTTCCTGTTCC
CCCCAAAGCCCAAGGACACCCTGATGATCAGCCGGACCCCCGAAGTGACCTGCGTG
GTGGTGGATGTGTCCCAGGAAGATCCCGAGGTGCAGTTCAATTGGTACGTGGACGG
CGTGGAAGTGCACAACGCCAAGACCAAGCCTAGAGAGGAACAGTTCAACAGCACCT
ACCGGGTGGTGTCCGTGCTGACAGTGCTGCACCAGGACTGGCTGAACGGCAAAGAG
TACAAGTGCAAGGTGTCCAACAAGGGCCTGCCCAGCTCCATCGAGAAAACCATCAG
CAAGGCCAAGGGCCAGCCCCGCGAACCCCAGGTGTACACACTGCCTCCAAGCCAGG
AAGAGATGACCAAGAATCAGGTGTCCCTGACCTGTCTCGTGAAAGGCTTCTACCCC
TCCGATATCGCCGTGGAATGGGAGAGCAACGGCCAGCCCGAGAACAACTACAAGAC
CACCCCCCCTGTGCTGGACTCCGATGGCTCATTCTTCCTGTACAGCAGACTGACCG
TGGACAAGAGCCGGTGGCAGGAAGGCAACGTGTTCAGCTGCTCCGTGATGCACGAG
GCCCTGCACAACCACTACACCCAGAAGTCCCTGTCTCTGAGCCTGGGCAAA Signal sequence (1-57), variable region (58-414),
constant region (415-1395)

SEQ ID NO: 29: Amino acid sequence of cF44 heavy chain
MKHLWFFLLLVAAPRWVLSEVQLVESGGGLVQPGRSLKLSCAASGFTFSNYYMAWV
RQAPTKGLEWVTYITTGGGSTYFRDSVKGRFTISRDNAESTLYLQMDSLRSEDTAT
YYCTAANYGGSYFDYWGQGVMVTVSSASTKGPSVFPLAPCSRSTSESTAALGCLVK
DYFPEPVTVSWNSGALTSGVHTFPAVLQSSGLYSLSSVVTVPSSSLGTKTYTCNVD
HKPSNTKVDKRVESKYGPPCPPCPAPEAAGGPSVFLFPPKPKDTLMISRTPEVTCV
VVDVSQEDPEVQFNWYVDGVEVHNAKTKPREEQFNSTYRVVSVLTVLHQDWLNGKE
YKCKVSNKGLPSSIEKTISKAKGQPREPQVYTLPPSQEEMTKNQVSLTCLVKGFYP
SDIAVEWESNGQPENNYKTTPPVLDSDGSFFLYSRLTVDKSRWQEGNVFSCSVMHE
ALHNHYTQKSLSLSLGK Signal sequence (1-19), variable region (20-138),
constant region (139-465)

Fig. 21

SEQ ID NO: 30: Nucleotide sequence encoding cF63 light chain
ATGGTGCTGCAGACCCAGGTGTTCATCTCCCTGCTGCTGTGGATCTCCGGCGCGTA
CGGCCAGTTCACGCTGACTCAACCAAAGTCCGTGTCAGGAGCTTTAAGAAGCACTA
TCACCATTCCCTGTGAGCGCAGCAGTGGTGACATTGGAGATAGCTATGTGAGCTGG
TACCAGCGACACTTGGGAAGACCCCCCATCAATGTGATCTATGCTGATGATCAAAG
ACCATCTGAAGTGTCTGATCGGTTCTCGGGCTCCATCGACAGCTCCTCTAACTCAG
CCTCACTGACCATCACTAATCTGCAGATGGATGATGAGGCCGACTACTTCTGTCAG
TCTTACGATAGTAAGATTGACATTTTCGGCGGTGGAACCAAGCTCACTGTCCTAGG
CCAGCCTAAGGCTGCCCCTAGCGTGACCCTGTTCCTCCTTCCAGCGAGGAGCTTC
AAGCTAACAAGGCCACCCTGGTGTGTCTTATCTCTGACTTCTACCCTGGCGCTGTG
ACCGTGGCCTGGAAGGCTGACAGCTCCCCTGTGAAGGCCGGAGTGGAGACCACCAC
ACCTAGCAAGCAGTCTAACAACAAGTACGCTGCCAGCTCCTACCTGAGCCTTACCC
CTGAGCAGTGGAAGTCTCACAGAAGCTACTCCTGTCAAGTGACCCACGAGGGCAGC
ACCGTGGAGAAGACCGTGGCTCCTACCGAGTGTTCC Signal sequence (1-60), variable region (61-390),
constant region (391-708)

SEQ ID NO: 31: Amino acid sequence of cF63 light chain
MVLQTQVFISLLLWISGAYGQFTLTQPKSVSGALRSTITIPCERSSGDIGDSYVSW
YQRHLGRPPINVIYADDQRPSEVSDRFSGSIDSSSNSASLTITNLQMDDEADYFCQ
SYDSKIDIFGGGTKLTVLGQPKAAPSVTLFPPSSEELQANKATLVCLISDFYPGAV
TVAWKADSSPVKAGVETTTPSKQSNNKYAASSYLSLTPEQWKSHRSYSCQVTHEGS
TVEKTVAPTECS Signal sequence (1-20), variable region (21-130),
constant region (131-236)

Fig. 22

SEQ ID NO: 32: Nucleotide sequence encoding cF63 heavy chain
ATGAAACACCTGTGGTTCTTCCTCCTGCTGGTGGCAGCTCCCAGATGGGTGCTGAG
CCAGGTGCAGCTGAAGGAGTCAGGACCTGGTCTGGTGCAGCCCTCAGAGACCCTGT
CCCTCACCTGCACTGTCTCTGGGTTCTCACTAGCCAGCTATAGTTTAAGTTGGGTT
CGCCAGCCTTCAGGAAAAGGTCCTGAGTGGATGGGAAGAATGTACTATGATGGAGA
CACAGCATATAATTCAGCTCTCAAATCCCGACTGAGCATCAGCAGGGACACCTCCA
AGAACCAAGTTTTCTTAAAAATGAACAGTCTGCAAACTGATGACACAGGCACTTAC
TACTGTACCAGAGATAGGAGTATGTTTGGTACGGATTATCCCCACTGGTACTTTGA
CTTCTGGGGCCCAGGAACCATGGTCACCGTGAGCTCAGCCTCCACCAAGGGCCCTA
GCGTGTTCCCTCTGGCCCCTTGTAGCAGAAGCACCAGCGAGTCTACAGCCGCCCTG
GGCTGCCTCGTGAAGGACTACTTTCCCGAGCCCGTGACCGTGTCCTGGAACTCTGG
CGCTCTGACAAGCGGCGTGCACACCTTCCAGCCGTGCTGCAGAGCAGCGGCCTGT
ACTCTCTGTCCAGCGTCGTGACTGTGCCCAGCAGCTCTCTGGGCACCAAGACCTAC
ACCTGTAACGTGGACCACAAGCCCAGCAACACCAAGGTGGACAAGCGGGTGGAATC
TAAGTACGGCCCTCCCTGCCCTCCTTGCCCAGCCCTGAAGCCGCGGGCGGACCCT
CCGTGTTCCTGTTCCCCCCAAAGCCCAAGGACACCCTGATGATCAGCCGGACCCCC
GAAGTGACCTGCGTGGTGGTGGATGTGTCCCAGGAAGATCCCGAGGTGCAGTTCAA
TTGGTACGTGGACGGCGTGGAAGTGCACAACGCCAAGACCAAGCCTAGAGAGGAAC
AGTTCAACAGCACCTACCGGGTGGTGTCCGTGCTGACAGTGCTGCACCAGGACTGG
CTGAACGGCAAAGAGTACAAGTGCAAGGTGTCCAACAAGGGCCTGCCCAGCTCCAT
CGAGAAAACCATCAGCAAGGCCAAGGGCCAGCCCCGCGAACCCCAGGTGTACACAC
TGCCTCCAAGCCAGGAAGAGATGACCAAGAATCAGGTGTCCCTGACCTGTCTCGTG
AAAGGCTTCTACCCCTCCGATATCGCCGTGGAATGGGAGAGCAACGGCCAGCCCGA
GAACAACTACAAGACCACCCCCCTGTGCTGGACTCCGATGGCTCATTCTTCCTGT
ACAGCAGACTGACCGTGGACAAGAGCCGGTGGCAGGAAGGCAACGTGTTCAGCTGC
TCCGTGATGCACGAGGCCCTGCACAACCACTACACCCAGAAGTCCCTGTCTCTGAG
CCTGGGCAAA Signal sequence (1-57), variable region (58-429),
constant region (430-1410)

SEQ ID NO: 33: Amino acid sequence of cF63 heavy chain
MKHLWFFLLLVAAPRWVLSQVQLKESGPGLVQPSETLSLTCTVSGFSLASYSLSWV
RQPSGKGPEWMGRMYYDGDTAYNSALKSRLSISRDTSKNQVFLKMNSLQTDDTGTY
YCTRDRSMFGTDYPHWYFDFWGPGTMVTVSSASTKGPSVFPLAPCSRSTSESTAAL
GCLVKDYFPEPVTVSWNSGALTSGVHTFPAVLQSSGLYSLSSVVTVPSSSLGTKTY
TCNVDHKPSNTKVDKRVESKYGPPCPPCPAPEAAGGPSVFLFPPKPKDTLMISRTP
EVTCVVVDVSQEDPEVQFNWYVDGVEVHNAKTKPREEQFNSTYRVVSVLTVLHQDW
LNGKEYKCKVSNKGLPSSIEKTISKAKGQPREPQVYTLPPSQEEMTKNQVSLTCLV
KGFYPSDIAVEWESNGQPENNYKTTPPVLDSDGSFFLYSRLTVDKSRWQEGNVFSC
SVMHEALHNHYTQKSLSLSLGK Signal sequence (1-19), variable region (20-143),
constant region (144-470)

Fig. 23

SEQ ID NO: 34: Nucleotide sequence encoding hL2
ATGGTGCTGCAGACCCAGGTGTTCATCTCCCTGCTGCTGTGGATCTCCGGCGCGTA
CGGCGCCATTCAGCTGACACAGAGCCCTAGCAGCCTGAGCGCCTCTGTGGGCCAGA
GAGTGACCATTACCTGCGGCGCCAGCAAGAGCGTGCGGACCTACATGCACTGGTAT
CAGCAGAAGCCCGGCAAGGCCCCCAAGCTGCTGATCTACAGCGCCTCCAATCTGGA
AGCCGGCGTGCCCAGCAGATTTTCCGGCTCTGGCAGCGGCACCGACTTCACCCTGA
CAATCAGCAGCCTGCAGCCCGAGGACTTCGCCACCTACTACTGCCAGCAGAGCAAC
GAGCCCCCCTACACCTTTGGCCAGGGCACCAAGCTGGAAATCAAGCGTACGGTGGC
CGCCCCCTCCGTGTTCATCTTCCCCCCCTCCGACGAGCAGCTGAAGTCCGGCACCG
CCTCCGTGGTGTGCCTGCTGAATAACTTCTACCCCAGAGAGGCCAAGGTGCAGTGG
AAGGTGGACAACGCCCTGCAGTCCGGGAACTCCCAGGAGAGCGTGACCGAGCAGGA
CAGCAAGGACAGCACCTACAGCCTGAGCAGCACCCTGACCCTGAGCAAAGCCGACT
ACGAGAAGCACAAGGTGTACGCCTGCGAGGTGACCCACCAGGGCCTGAGCTCCCCC
GTCACCAAGAGCTTCAACAGGGGGGAGTGT Signal sequence (1-60), variable region (61-381),
constant region (382-702)

SEQ ID NO: 35: Amino acid sequence of hL2
MVLQTQVFISLLLWISGAYGAIQLTQSPSSLSASVGQRVTITCGASKSVRTYMHWY
QQKPGKAPKLLIYSASNLEAGVPSRFSGSGSGTDFTLTISSLQPEDFATYYCQQSN
EPPYTFGQGTKLEIKRTVAAPSVFIFPPSDEQLKSGTASVVCLLNNFYPREAKVQW
KVDNALQSGNSQESVTEQDSKDSTYSLSSTLTLSKADYEKHKVYACEVTHQGLSSP
VTKSFNRGEC Signal sequence (1-20), variable region (21-127),
constant region (128-234)

Fig. 24

SEQ ID NO: 36: Nucleotide sequence encoding hL3
ATGGTGCTGCAGACCCAGGTGTTCATCTCCCTGCTGCTGTGGATCTCCGGCGCGTA
CGGCGATACCCAGCTGACACAGAGCCCTAGCAGCCTGTCTGCCAGCGTGGGCCAGA
GAGTGACCATTACCTGCGGCGCCAGCAAGAGCGTGCGGACCTACATGCACTGGTAT
CAGCAGAAGCCCGGCAAGCAGCCCAAGCTGCTGATCTACAGCGCCTCCAACCTGGA
AGCCGGCGTGCCCAGCAGATTTTCTGGCAGCGGCTCCGGCACCGACTTCACCCTGA
CAATCAGCAGCCTGCAGCCCGAGGACTTCGCCACCTACTACTGCCAGCAGAGCAAC
GAGCCCCCCTACACCTTTGGCCAGGGCACCAAGCTGGAAATCAAGCGTACGGTGGC
CGCCCCCTCCGTGTTCATCTTCCCCCCCTCCGACGAGCAGCTGAAGTCCGGCACCG
CCTCCGTGGTGTGCCTGCTGAATAACTTCTACCCCAGAGAGGCCAAGGTGCAGTGG
AAGGTGGACAACGCCCTGCAGTCCGGGAACTCCCAGGAGAGCGTGACCGAGCAGGA
CAGCAAGGACAGCACCTACAGCCTGAGCAGCACCCTGACCCTGAGCAAAGCCGACT
ACGAGAAGCACAAGGTGTACGCCTGCGAGGTGACCCACCAGGGCCTGAGCTCCCCC
GTCACCAAGAGCTTCAACAGGGGGGAGTGT Signal sequence (1-60), variable region (61-381),
constant region (382-702)

SEQ ID NO: 37: Amino acid sequence of hL3
MVLQTQVFISLLLWISGAYGDTQLTQSPSSLSASVGQRVTITCGASKSVRTYMHWY
QQKPGKQPKLLIYSASNLEAGVPSRFSGSGSGTDFTLTISSLQPEDFATYYCQQSN
EPPYTFGQGTKLEIKRTVAAPSVFIFPPSDEQLKSGTASVVCLLNNFYPREAKVQW
KVDNALQSGNSQESVTEQDSKDSTYSLSSTLTLSKADYEKHKVYACEVTHQGLSSP
VTKSFNRGEC Signal sequence (1-20), variable region (21-127),
constant region (128-234)

Fig. 25

SEQ ID NO: 38: Nucleotide sequence encoding hL4
ATGGTGCTGCAGACCCAGGTGTTCATCTCCCTGCTGCTGTGGATCTCCGGCGCGTA
CGGCGATACCGTGCTGACCCAGAGCCCTGATAGCCTGGCCGTGTCCCTGGGACAGA
GAGCCACCATCAATTGCGGCGCCAGCAAGAGCGTGCGGACCTACATGCACTGGTAT
CAGCAGAAGCCCGGCCAGCAGCCCAAGCTGCTGATCTACAGCGCCTCCAACCTGGA
AGCCGGCGTGCCCAGCAGATTTTCTGGCAGCGGCTCCGGCACCGACTTCACCCTGA
CAATCAGCTCCCTGCAGGCCGAGGACGTGGCCGTGTACTACTGCCAGCAGAGCAAC
GAGCCCCCCTACACCTTTGGCCAGGGCACCAAGGTGGAAATCAAGCGTACGGTGGC
CGCCCCCTCCGTGTTCATCTTCCCCCCCTCCGACGAGCAGCTGAAGTCCGGCACCG
CCTCCGTGGTGTGCCTGCTGAATAACTTCTACCCCAGAGAGGCCAAGGTGCAGTGG
AAGGTGGACAACGCCCTGCAGTCCGGGAACTCCCAGGAGAGCGTGACCGAGCAGGA
CAGCAAGGACAGCACCTACAGCCTGAGCAGCACCCTGACCCTGAGCAAAGCCGACT
ACGAGAAGCACAAGGTGTACGCCTGCGAGGTGACCCACCAGGGCCTGAGCTCCCCC
GTCACCAAGAGCTTCAACAGGGGGGAGTGT Signal sequence (1-60), variable region (61-381),
constant region (382-702)

SEQ ID NO: 39: Amino acid sequence of hL4
MVLQTQVFISLLLWISGAYGDTVLTQSPDSLAVSLGQRATINCGASKSVRTYMHWY
QQKPGQQPKLLIYSASNLEAGVPSRFSGSGSGTDFTLTISSLQAEDVAVYYCQQSN
EPPYTFGQGTKVEIKRTVAAPSVFIFPPSDEQLKSGTASVVCLLNNFYPREAKVQW
KVDNALQSGNSQESVTEQDSKDSTYSLSSTLTLSKADYEKHKVYACEVTHQGLSSP
VTKSFNRGEC Signal sequence (1-20), variable region (21-127),
constant region (128-234)

Fig. 26

SEQ ID NO: 40: Nucleotide sequence encoding hH1
ATGAAACACCTGTGGTTCTTCCTCCTGCTGGTGGCAGCTCCCAGATGGGTGCTGAG
CCAGGTGCAGCTGGTGGAATCTGGCGGCGGAGTGGTGCAGCCTGGCAGAAGCCTGA
GACTGAGCTGTGCCGCCAGCGGCTTCACCTTCAGCGACTACGGCATGATCTGGGTG
CGCCAGGCCCCTGGCAAAGGCCTGGAATGGGTGGCCAGCATCAGCAGCAGCTCCAG
CTACATCTACTACGCCGACAGCGTGAAGGGCCGGTTCACCATCAGCCGGGACAACA
GCAAGAACCGGCTGTACCTGCAGATGAACAGCCTGCGGGCCGAGGACACCGCCGTG
TACTATTGCGCCAGACGGTACTACGGCTTCAACTACCCCTTCGACTACTGGGGCCA
GGGCACAATGGTCACCGTCAGCTCAGCCTCCACCAAGGGCCCTAGCGTGTTCCCTC
TGGCCCCTTGTAGCAGAAGCACCAGCGAGTCTACAGCCGCCCTGGGCTGCCTCGTG
AAGGACTACTTTCCCGAGCCCGTGACCGTGTCCTGGAACTCTGGCGCTCTGACAAG
CGGCGTGCACACCTTTCCAGCCGTGCTGCAGAGCAGCGGCCTGTACTCTCTGTCCA
GCGTCGTGACTGTGCCCAGCAGCTCTCTGGGCACCAAGACCTACACCTGTAACGTG
GACCACAAGCCCAGCAACACCAAGGTGGACAAGCGGGTGGAATCTAAGTACGGCCC
TCCCTGCCCTCCTTGCCCAGCCCCTGAAGCCGCGGGCGGACCCTCCGTGTTCCTGT
TCCCCCCAAAGCCCAAGGACACCCTGATGATCAGCCGGACCCCCGAAGTGACCTGC
GTGGTGGTGGATGTGTCCCAGGAAGATCCCGAGGTGCAGTTCAATTGGTACGTGGA
CGGCGTGGAAGTGCACAACGCCAAGACCAAGCCTAGAGAGGAACAGTTCAACAGCA
CCTACCGGGTGGTGTCCGTGCTGACAGTGCTGCACCAGGACTGGCTGAACGGCAAA
GAGTACAAGTGCAAGGTGTCCAACAAGGGCCTGCCCAGCTCCATCGAGAAAACCAT
CAGCAAGGCCAAGGGCCAGCCCCGCGAACCCCAGGTGTACACACTGCCTCCAAGCC
AGGAAGAGATGACCAAGAATCAGGTGTCCCTGACCTGTCTCGTGAAAGGCTTCTAC
CCCTCCGATATCGCCGTGGAATGGGAGAGCAACGGCCAGCCCGAGAACAACTACAA
GACCACCCCCCCTGTGCTGGACTCCGATGGCTCATTCTTCCTGTACAGCAGACTGA
CCGTGGACAAGAGCCGGTGGCAGGAAGGCAACGTGTTCAGCTGCTCCGTGATGCAC
GAGGCCCTGCACAACCACTACACCCAGAAGTCCCTGTCTCTGAGCCTGGGCAAA Signal sequence (1-57), variable region (58-417),
constant region (418-1398)

SEQ ID NO: 41: Amino acid sequence of hH1
MKHLWFFLLLVAAPRWVLSQVQLVESGGGVVQPGRSLRLSCAASGFTFSDYGMIWV
RQAPGKGLEWVASISSSSSYIYYADSVKGRFTISRDNSKNRLYLQMNSLRAEDTAV
YYCARRYYGFNYPFDYWGQGTMVTVSSASTKGPSVFPLAPCSRSTSESTAALGCLV
KDYFPEPVTVSWNSGALTSGVHTFPAVLQSSGLYSLSSVVTVPSSSLGTKTYTCNV
DHKPSNTKVDKRVESKYGPPCPPCPAPEAAGGPSVFLFPPKPKDTLMISRTPEVTC
VVVDVSQEDPEVQFNWYVDGVEVHNAKTKPREEQFNSTYRVVSVLTVLHQDWLNGK
EYKCKVSNKGLPSSIEKTISKAKGQPREPQVYTLPPSQEEMTKNQVSLTCLVKGFY
PSDIAVEWESNGQPENNYKTTPPVLDSDGSFFLYSRLTVDKSRWQEGNVFSCSVMH
EALHNHYTQKSLSLSLGK Signal sequence (1-19), variable region (20-139),
constant region (140-466)

Fig. 27

SEQ ID NO: 42: Nucleotide sequence encoding hH2
ATGAAACACCTGTGGTTCTTCCTCCTGCTGGTGGCAGCTCCCAGATGGGTGCTGAG
CGAAGTGCAGCTGGTGGAATCTGGCGGCGGAGTGGTGCAGCCTGGCAGAAGCCTGA
GACTGAGCTGTGCCGCCAGCGGCTTCACCTTCAGCGACTACGGCATGATCTGGGTG
CGCCAGGCCCCTGGCAAAGGCCTGGAATGGGTGGCCAGCATCAGCAGCAGCTCCAG
CTACATCTACTACGCCGACAGCGTGAAGGGCCGGTTCACCATCAGCCGGGACAACA
GCAAGAACACCCTGTACCTGCAGATGAACAGCCTGCGGGCCGAGGACACCGCCGTG
TACTATTGCGCCAGACGGTACTACGGCTTCAACTACCCCTTCGACTACTGGGGCCA
GGGCACAATGGTCACCGTCAGCTCAGCCTCCACCAAGGGCCCTAGCGTGTTCCCTC
TGGCCCCTTGTAGCAGAAGCACCAGCGAGTCTACAGCCGCCCTGGGCTGCCTCGTG
AAGGACTACTTTCCCGAGCCCGTGACCGTGTCCTGGAACTCTGGCGCTCTGACAAG
CGGCGTGCACACCTTTCCAGCCGTGCTGCAGAGCAGCGGCCTGTACTCTCTGTCCA
GCGTCGTGACTGTGCCCAGCAGCTCTCTGGGCACCAAGACCTACACCTGTAACGTG
GACCACAAGCCCAGCAACACCAAGGTGGACAAGCGGGTGGAATCTAAGTACGGCCC
TCCCTGCCCTCCTTGCCCAGCCCCTGAAGCCGCGGGCGGACCCTCCGTGTTCCTGT
TCCCCCCAAAGCCCAAGGACACCCTGATGATCAGCCGGACCCCCGAAGTGACCTGC
GTGGTGGTGGATGTGTCCCAGGAAGATCCCGAGGTGCAGTTCAATTGGTACGTGGA
CGGCGTGGAAGTGCACAACGCCAAGACCAAGCCTAGAGAGGAACAGTTCAACAGCA
CCTACCGGGTGGTGTCCGTGCTGACAGTGCTGCACCAGGACTGGCTGAACGGCAAA
GAGTACAAGTGCAAGGTGTCCAACAAGGGCCTGCCCAGCTCCATCGAGAAAACCAT
CAGCAAGGCCAAGGGCCAGCCCCGCGAACCCCAGGTGTACACACTGCCTCCAAGCC
AGGAAGAGATGACCAAGAATCAGGTGTCCCTGACCTGTCTCGTGAAAGGCTTCTAC
CCCTCCGATATCGCCGTGGAATGGGAGAGCAACGGCCAGCCCGAGAACAACTACAA
GACCACCCCCCCTGTGCTGGACTCCGATGGCTCATTCTTCCTGTACAGCAGACTGA
CCGTGGACAAGAGCCGGTGGCAGGAAGGCAACGTGTTCAGCTGCTCCGTGATGCAC
GAGGCCCTGCACAACCACTACACCCAGAAGTCCCTGTCTCTGAGCCTGGGCAAA Signal sequence (1-57), variable region (58-417),
constant region (418-1398)

SEQ ID NO: 43: Amino acid sequence of hH2
MKHLWFFLLLVAAPRWVLSEVQLVESGGGVVQPGRSLRLSCAASGFTFSDYGMIWV
RQAPGKGLEWVASISSSSSYIYYADSVKGRFTISRDNSKNTLYLQMNSLRAEDTAV
YYCARRYYGFNYPFDYWGQGTMVTVSSASTKGPSVFPLAPCSRSTSESTAALGCLV
KDYFPEPVTVSWNSGALTSGVHTFPAVLQSSGLYSLSSVVTVPSSSLGTKTYTCNV
DHKPSNTKVDKRVESKYGPPCPPCPAPEAAGGPSVFLFPPKPKDTLMISRTPEVTC
VVVDVSQEDPEVQFNWYVDGVEVHNAKTKPREEQFNSTYRVVSVLTVLHQDWLNGK
EYKCKVSNKGLPSSIEKTISKAKGQPREPQVYTLPPSQEEMTKNQVSLTCLVKGFY
PSDIAVEWESNGQPENNYKTTPPVLDSDGSFFLYSRLTVDKSRWQEGNVFSCSVMH
EALHNHYTQKSLSLSLGK Signal sequence (1-19), variable region (20-139),
constant region (140-466)

Fig. 28

SEQ ID NO: 1: D13 CDRL1
GASKSVRTYMH

SEQ ID NO: 2: D13 CDRL2
SASNLEA

SEQ ID NO: 3: D13 CDRL3
QQSNEPPYT

SEQ ID NO: 4: D13 CDRH1
GFTFSDYGMI

SEQ ID NO: 5: D13 CDRH2
SISSSSSYIY

SEQ ID NO: 6: D13 CDRH3
RYYGFNYPFDY

Fig. 29

SEQ ID NO: 7: F44 CDRL1
KASKSISKYLA

SEQ ID NO: 8: F44 CDRL2
SGSTLQS

SEQ ID NO: 9: F44 CDRL3
QQHNEYPPT

SEQ ID NO: 10: F44 CDRH1
GFTFSNYYMA

SEQ ID NO: 11: F44 CDRH2
YITTGGGSTY

SEQ ID NO: 12: F44 CDRH3
ANYGGSYFDY

Fig. 30

SEQ ID NO: 13: F63 CDRL1
ERSSGDIGDSYVS

SEQ ID NO: 14: F63 CDRL2
ADDQRPS

SEQ ID NO: 15: F63 CDRL3
QSYDSKIDI

SEQ ID NO: 16: F63 CDRH1
GFSLASYSLS

SEQ ID NO: 17: F63 CDRH2
RMYYDGDTA

SEQ ID NO: 18: F63 CDRH3
DRSMFGTDYPHWYFDF

Fig. 34

SEQ ID NO: 81: Amino acid sequence of OSE-172 antibody heavy chain (OSE-172_hG4Pro)
MKHLWFFLLLVAAPRWVLSEVQLVQSGAEVKKPGESLRISCKASGYSFTSYWVHWV
RQMPGKGLEWMGNIDPSDSDTHYSPSFQGHVTLSVDKSISTAYLQLSSLKASDTAM
YYCVRGGTGTLAYFAYWGQGTLVTVSSASTKGPSVFPLAPCSRSTSESTAALGCLV
KDYFPEPVTVSWNSGALTSGVHTFPAVLQSSGLYSLSSVVTVPSSSLGTKTYTCNV
DHKPSNTKVDKRVESKYGPPCPPCPAPEFLGGPSVFLFPPKPKDTLMISRTPEVTC
VVVDVSQEDPEVQFNWYVDGVEVHNAKTKPREEQFNSTYRVVSVLTVLHQDWLNGK
EYKCKVSNKGLPSSIEKTISKAKGQPREPQVYTLPPSQEEMTKNQVSLTCLVKGFY
PSDIAVEWESNGQPENNYKTTPPVLDSDGSFFLYSRLTVDKSRWQEGNVFSCSVMH
EALHNHYTQKSLSLSPGK*

SEQ ID NO: 82: Amino acid sequence of OSE-172 antibody light chain (OSE-172_hK)
MVLQTQVFISLLLWISGAYGDVVMTQSPLSLPVTLGQPASISCRSSQSLVHSYGNT
YLYWFQQRPGQSPRLLIYRVSNRFSGVPDRFSGSGSGTDFTLKISRVEAEDVGVYY
CFQGTHVPYTFGGGTKVEIKRTVAAPSVFIFPPSDEQLKSGTASVVCLLNNFYPRE
AKVQWKVDNALQSGNSQESVTEQDSKDSTYSLSSTLTLSKADYEKHKVYACEVTHQ
GLSSPVTKSFNRGEC*

Fig. 35

SEQ ID NO: 83: Amino acid sequence of KWAR23 antibody
heavy chain (KWAR23_hG4Pro)
MKHLWFFLLLVAAPRWVLSEVQLQQSGAELVKPGASVKLSCTASGFNIKDYYIHWV
QQRTEQGLEWIGRIDPEDGETKYAPKFQDKATITADTSSNTAYLHLSSLTSEDTAV
YYCARWGAYWGQGTLVTVSAASTKGPSVFPLAPCSRSTSESTAALGCLVKDYFPEP
VTVSWNSGALTSGVHTFPAVLQSSGLYSLSSVVTVPSSSLGTKTYTCNVDHKPSNT
KVDKRVESKYGPPCPPCPAPEFLGGPSVFLFPPKPKDTLMISRTPEVTCVVVDVSQ
EDPEVQFNWYVDGVEVHNAKTKPREEQFNSTYRVVSVLTVLHQDWLNGKEYKCKVS
NKGLPSSIEKTISKAKGQPREPQVYTLPPSQEEMTKNQVSLTCLVKGFYPSDIAVE
WESNGQPENNYKTTPPVLDSDGSFFLYSRLTVDKSRWQEGNVFSCSVMHEALHNHY
TQKSLSLSLGK*

SEQ ID NO: 84 Amino acid sequence of KWAR23 antibody
light chain (KWAR23_hK)
MVLQTQVFISLLLWISGAYGQIVLTQSPAIMSASPGEKVTLTCSASSSVSSSYLYW
YQQKPGSSPKLWIYSTSNLASGVPARFSGSGSGTSYSLTISSMEAEDAASYFCHQW
SSYPRTFGAGTKLELKRTVAAPSVFIFPPSDEQLKSGTASVVCLLNNFYPREAKVQ
WKVDNALQSGNSQESVTEQDSKDSTYSLSSTLTLSKADYEKHKVYACEVTHQGLSS
PVTKSFNRGEC*

Fig. 36

SEQ ID NO: 85: Amino acid sequence of ADU-1805 antibody heavy chain (ADU-1805_hG2)
MKHLWFFLLLVAAPRWVLSEVQLVQSGAEVVKPGASVKLSCKASGSTFTSYWMHWV
KQAPGQGLEWIGAIYPVNSDTTYNQKFKGKATLTVDKSASTAYMELSSLRSEDTAV
YYCTRSFYYSLDAAWFVYWGQGTLVTVSSASTKGPSVFPLAPCSRSTSESTAALGC
LVKDYFPEPVTVSWNSGALTSGVHTFPAVLQSSGLYSLSSVVTVPSSNFGTQTYTC
NVDHKPSNTKVDKTVERKCCVECPPCPAPPVAGPSVFLFPPKPKDTLMISRTPEVT
CVVVDVSHEDPEVQFNWYVDGVEVHNAKTKPREEQFNSTFRVVSVLTVVHQDWLNG
KEYKCKVSNKGLPAPIEKTISKTKGQPREPQVYTLPPSREEMTKNQVSLTCLVKGF
YPSDIAVEWESNGQPENNYKTTPPMLDSDGSFFLYSKLTVDKSRWQQGNVFSCSVM
HEALHNHYTQKSLSLSPGK*

SEQ ID NO: 86: Amino acid sequence of ADU-1805 antibody light chain (ADU-1805_hK)
MVLQTQVFISLLLWISGAYGDIQMTQSPSSLSASVGDRVTITCRASQDIGSRLNWL
QQKPGKAPKRLIYATSSLDSGVPSRFSGSGSGTEFTLTISSLQPEDFATYYCLQYA
SSPFTFGGGTKVEIKRTVAAPSVFIFPPSDEQLKSGTASVVCLLNNFYPREAKVQW
KVDNALQSGNSQESVTEQDSKDSTYSLSSTLTLSKADYEKHKVYACEVTHQGLSSP
VTKSFNRGEC*

# ANTI-SIRPα ANTIBODY

CROSS-REFERENCE TO RELATED APPLICATIONS

The present application is a Divisional of U.S. patent application Ser. No. 17/258,115, filed on Jan. 5, 2021, which is a U.S. National Phase Application of International Patent Application No. PCT/JP2019/027114, filed Jul. 9, 2019, which claims priority to and the benefit of Japanese Patent Application No. 2018-131116, filed on Jul. 10, 2018. The contents of these applications are hereby incorporated by reference in their entireties.

SEQUENCE LISTING

The instant application contains a Sequence Listing which has been submitted via Patent Center and is hereby incorporated by reference in its entirety. Said copy, is named 127565-0107_SL.txt and is 142 kb in size.

TECHNICAL FIELD

The present invention relates to an anti-SIRPα antibody useful for the treatment of tumors and an anti-tumor agent comprising the antibody.

BACKGROUND ART

SIRPα (SHPS-1) is a single-pass transmembrane molecule belonging to the Ig superfamily, which is present in myeloid cells such as macrophages, dendritic cells, and neutrophils as well as glia cells (Non Patent Literature 1). The extracellular region thereof consists of one IgV domain and two IgC domains, and 10 different variants have been reported for the IgV domain, which is a site for binding to CD47, in humans (Non Patent Literature 2). The intracellular region contains an immunoreceptor tyrosine-based inhibition motif (ITIM), and the binding to CD47 induces the binding to tyrosine phosphatases SHP-1 and SHP-2, leading to transmission of an inhibitory signal.

An example of physiological phenomena resulting from the SIRPα-CD47 interaction that have been shown is that, when CD47 on an erythrocyte binds to SIRPα on a macrophage, a "Don't-eat-me" signal is transmitted to prevent unnecessary phagocytosis of the erythrocyte (Non Patent Literature 3). It has also been suggested that the binding of SIRPα present on macrophages and dendritic cells to CD47 highly expressed in tumor cells inhibits the phagocytic activity against the tumor cells in the tumor microenvironment. Inhibition of the phagocytic activity is expected to lead to subsequent inhibition of tumor antigen-presentation to T cells and further to inhibition of immune responses to tumor. Thus, the immune phenomenon of tumor cell phagocytosis is considered to serve as a checkpoint of tumor antigen uptake (entry).

So far, it has been reported that the phagocytic activity against tumor cells is enhanced when the SIRPα-CD47 interaction is inhibited by an antibody against CD47, which is a ligand for SIRPα (Non Patent Literature 4), and similar phenomena have been reported in the use of an anti-SIRPα antibody in combination with an anti-cancer antibody that has an effector activity of attracting tumor cells to immune cells (Non Patent Literatures 5 and 6). Additionally, it has been suggested that not only anti-tumor effects, but also tumor immunity is induced when an anti-CD47 antibody is used in an allogenic tumor-bearing mouse model (Non Patent Literature 7), and the anti-SIRPα antibody can therefore be expected to have similar effects when it is used in combination with an anti-cancer antibody.

Meanwhile, as immune checkpoint inhibitors, multiple antibodies against immunoinhibitory molecules on T cells, such as PD-1/PD-L1, have been developed and proved to be clinically effective (Non Patent Literatures 8 and 9). Currently, SIRPα-CD47 is the only identified molecule that inhibits phagocytosis, and an antibody that inhibits this molecule is expected as a potential novel checkpoint inhibitor against targets other than T cells and may also be broadly effective in patients who do not respond to conventional immune checkpoint inhibitors.

So far, a study using an anti-mouse SIRPα antibody (MY-1) in a model in which human Burkitt's lymphoma was subcutaneously transplanted has shown that anti-tumor effects are exhibited when the antibody is used in combination with rituximab. In a mouse colon cancer model, anti-tumor effects have been shown in the use in combination with a PD-1 antibody (Non Patent Literature 5). In addition, a study using an anti-mSIRPα antibody (P84) from different clones has shown that the use in combination with an anti-PD-L1 antibody or an anti-4-1BB antibody also exhibits anti-tumor effects and life-prolonging effects in a mouse liver cancer model. Given that further anti-tumor effects and complete remission effects were achieved when the same tumor cells were re-transplanted in mice showing complete remission effects, potent tumor immune responses may be induced by inhibiting different immune checkpoints (Patent Literature 1). These results are examples of effects exhibited by the use of the anti-mouse SIRPα antibody in combination with not only conventional anti-cancer antibodies expected to have the effector activity but also immune checkpoint inhibitors targeting T cells, and an anti-human SIRPα antibody can be expected to have similar effects.

In recent years, patents on anti-SIRPα antibodies have been reported in succession by various companies (Patent Literatures 1, 2, and 3). For example, OSE-172 is an IgG4Pro antibody that binds to SIRPα V1 and SIRPβ1 but does not bind to SIRPα V2 or SIRPγ. KWAR23 is an IgG1N279A antibody that binds to 10 different SIRPα variants, SIRPβ1, and SIRPγ. ADU-1805 is an IgG2 antibody that binds to 10 different SIRPα variants and SIRPγ. The antibody which is most suitable as a medicament among these antibodies remains unknown, and efforts continue to be made to obtain an excellent antibody.

Further, a study using an anti-CD47 antibody has reported that sufficient anti-tumor effects and complete remission effects are also exhibited by the use in combination with chemotherapeutic agents and radiation therapy, which have been used as standard of care (SOC), in addition to the antibody drugs described above. Particularly in cases of the use in combination with chemotherapeutic agents, more potent anti-tumor effects and complete remission effects are exhibited by administering a chemotherapeutic agent prior to an anti-CD47 antibody than by simultaneously administering the chemotherapeutic agent with the anti-CD47 antibody (Non Patent Literature 7). This finding indicates that antigen uptake (immuno-activation) effects by inhibition of the SIRPα-CD47 interaction can be enhanced by pre-administering a chemotherapeutic agent to prepare an environment in which tumor antigens can be easily taken up.

From the above, it can be inferred that an anti-SIRPα antibody is a drug that can induce a more potent tumor immune response when used in combination with various anti-tumor agents.

CITATION LIST

Patent Literature

Patent Literature 1: International Publication No. WO 2017/178653
Patent Literature 2: International Publication No. WO 2018/026600
Patent Literature 3: International Publication No. WO 2018/190719

Non Patent Literature

Non Patent Literature 1: Matozaki et al. Trends Cell Biol. 2009; 19(2), 72-80
Non Patent Literature 2: Takenaka et al. Nat. Immunol. 2007; 8(12), 1313-1323
Non Patent Literature 3: Matozaki et al. Trends in Cell Biol. 2009; 19(2), 72-80
Non Patent Literature 4: Liu et al. PLOS ONE. 2015; 10(9)
Non Patent Literature 5: Yanagita et al. JCI Insight. 2017; 2(1), 1-15
Non Patent Literature 6: Ring et al. PNAS. 2017; 114(49), E10578-E10585
Non Patent Literature 7: Liu et al. Nat. Med. 2015; 21(10), 1209-1215
Non Patent Literature 8: Lee et al. The Oncologist. 2017; 22(11), 1392-1399
Non Patent Literature 9: Weinstock et al. Clin. Can. Res. 2017; 23(16), 4534-4539

SUMMARY OF INVENTION

Technical Problem

The object of the present invention is to provide an anti-SIRPα antibody that can be used as an anti-tumor agent and an anti-tumor agent comprising the antibody as an active ingredient.

Solution to Problem

The present inventors examined a method for enhancing the phagocytic activity of phagocytes against tumor cells by inhibiting the interaction between SIRPα expressed in a phagocyte having the phagocytic activity and CD47 expressed on a tumor cell by an anti-SIRPα antibody to inhibit the transmission of a "Don't-eat-me" signal from the tumor cell to the phagocyte. The present inventors attempted to prepare an antibody having a high affinity for SIRPα and a high effect of inhibiting the interaction between SIRPα and CD47, and they also considered the preparation of an anti-SIRPα antibody not having effector functions, considering a possibility that an anti-SIRPα antibody that has effector functions, such as ADCC and ADCP, may attack immune cells of the self. To reduce the effector functions, a mutation for reducing the effector functions was introduced into the Fc region of an antibody, and the antibody subclass was designated as IgG4. As a result, an anti-SIRPα antibody that inhibits potently the interaction between SIRPα and CD47 but has reduced effector functions could be prepared. This antibody does not have sufficient anti-tumor effects on its own because it does not bind to the Fc receptor of an effector cell and therefore does not have effector functions. Accordingly, the antibody was used in combination with other antibody drugs having effector functions or other antibody drugs having an immune checkpoint inhibitory action. It was demonstrated that the antibody exhibited favorable anti-tumor effects, and thus the present invention was accomplished.

That is, the present invention provides the followings.

[1] An antibody that binds specifically to human SIRPα to inhibit binding of human SIRPα to CD47, the antibody comprising:
(a) a light chain CDRL1 consisting of an amino acid sequence set forth in SEQ ID NO: 1;
(b) a light chain CDRL2 consisting of an amino acid sequence set forth in SEQ ID NO: 2;
(c) a light chain CDRL3 consisting of an amino acid sequence set forth in SEQ ID NO: 3;
(d) a heavy chain CDRH1 consisting of an amino acid sequence set forth in SEQ ID NO: 4;
(e) a heavy chain CDRH2 consisting of an amino acid sequence set forth in SEQ ID NO: 5; and
(f) a heavy chain CDRH3 consisting of an amino acid sequence set forth in SEQ ID NO: 6.

[2] The antibody according to [1], wherein a heavy chain constant region is a heavy chain constant region of human IgG4, and has a mutation that reduces an ADCC and/or ADCP activity.

[3] The antibody according to [1] or [2], wherein the heavy chain constant region is a heavy chain constant region of human IgG4, and phenylalanine at position 234, as numbered according to the EU index as in Kabat et al., is substituted by alanine, leucine at position 235 is substituted by alanine, and serine at position 228 is substituted by proline.

[4] The antibody according to [3], wherein an amino acid sequence of the heavy chain constant region is an amino acid sequence consisting of amino acid residues 140 to 466 in SEQ ID NO: 25.

[5] An antibody that binds specifically to human SIRPα to inhibit binding of human SIRPα to CD47, the antibody comprising:
(ai) a light chain variable region consisting of an amino acid sequence consisting of amino acid residues 21 to 126 in SEQ ID NO: 23; or
(aii) a light chain variable region consisting of an amino acid sequence having at least 95% sequence identity with the amino acid sequence consisting of amino acid residues 21 to 126 in SEQ ID NO: 23 and having a binding activity to human SIRPα; and
(bi) a heavy chain variable region consisting of an amino acid sequence consisting of amino acid residues 20 to 139 in SEQ ID NO: 25; or
(bii) a heavy chain variable region consisting of an amino acid sequence having at least 95% sequence identity with the amino acid sequence consisting of amino acid residues 20 to 139 in SEQ ID NO: 25 and having a binding activity to human SIRPα, wherein a heavy chain constant region is a heavy chain constant region of human IgG4, and has a mutation that reduces an ADCC and/or ADCP activity.

[6] The antibody according to [5], wherein the heavy chain constant region is the heavy chain constant region of human IgG4, and phenylalanine at position 234, as numbered according to the EU index as in Kabat et al., is substituted by alanine, leucine at position 235 is substituted by alanine, and serine at position 228 is substituted by proline.

[7] The antibody according to [6], wherein an amino acid sequence of the heavy chain constant region is an amino acid sequence consisting of amino acid residues 140 to 466 in SEQ ID NO: 25.

[8] An antibody that binds specifically to human SIRPα to inhibit binding of human SIRPα to CD47, the antibody comprising:
 (a) a light chain CDRL1 consisting of an amino acid sequence set forth in SEQ ID NO: 7;
 (b) a light chain CDRL2 consisting of an amino acid sequence set forth in SEQ ID NO: 8;
 (c) a light chain CDRL3 consisting of an amino acid sequence set forth in SEQ ID NO: 9;
 (d) a heavy chain CDRH1 consisting of an amino acid sequence set forth in SEQ ID NO: 10;
 (e) a heavy chain CDRH2 consisting of an amino acid sequence set forth in SEQ ID NO: 11; and
 (f) a heavy chain CDRH3 consisting of an amino acid sequence set forth in SEQ ID NO: 12.

[9] The antibody according to [8], wherein a heavy chain constant region is a heavy chain constant region of human IgG4, and has a mutation that reduces an ADCC and/or ADCP activity.

[10] The antibody that binds specifically to human SIRPα to inhibit binding of human SIRPα to CD47 according to [8] or [9], wherein a heavy chain constant region is a heavy chain constant region of human IgG4, and phenylalanine at position 234, as numbered according to the EU index as in Kabat et al., is substituted by alanine, leucine at position 235 is substituted by alanine, and serine at position 228 is substituted by proline.

[11] The antibody according to [10], wherein an amino acid sequence of the heavy chain constant region is an amino acid sequence consisting of amino acid residues 139 to 465 in SEQ ID NO: 29.

[12] An antibody that binds specifically to human SIRPα to inhibit binding of human SIRPα to CD47, the antibody comprising:
 (ai) a light chain variable region consisting of an amino acid sequence consisting of amino acid residues 21 to 127 in SEQ ID NO: 27; or
 (aii) a light chain variable region consisting of an amino acid sequence having at least 95% sequence identity with the amino acid sequence consisting of amino acid residues 21 to 127 in SEQ ID NO: 27 and having a binding activity to human SIRPα; and
 (bi) a heavy chain variable region consisting of an amino acid sequence consisting of amino acid residues 20 to 138 in SEQ ID NO: 29; or
 (bii) a heavy chain variable region consisting of an amino acid sequence having at least 95% sequence identity with the amino acid sequence consisting of amino acid residues 20 to 138 in SEQ ID NO: 29 and having a binding activity to human SIRPα,
 wherein a heavy chain constant region is a heavy chain constant region of human IgG4, and has a mutation that reduces an ADCC and/or ADCP activity.

[13] The antibody that binds specifically to human SIRPα to inhibit binding of human SIRPα to CD47 according to [12], wherein the heavy chain constant region is the heavy chain constant region of human IgG4, and phenylalanine at position 234, as numbered according to the EU index as in Kabat et al., is substituted by alanine, leucine at position 235 is substituted by alanine, and serine at position 228 is substituted by proline.

[14] The antibody according to [13], wherein an amino acid sequence of the heavy chain constant region is an amino acid sequence consisting of amino acid residues 139 to 465 in SEQ ID NO: 29.

[15] An antibody that binds specifically to human SIRPα to inhibit binding of human SIRPα to CD47, the antibody comprising:
 (a) a light chain CDRL1 consisting of an amino acid sequence set forth in SEQ ID NO: 13;
 (b) a light chain CDRL2 consisting of an amino acid sequence set forth in SEQ ID NO: 14;
 (c) a light chain CDRL3 consisting of an amino acid sequence set forth in SEQ ID NO: 15;
 (d) a heavy chain CDRH1 consisting of an amino acid sequence set forth in SEQ ID NO: 16;
 (e) a heavy chain CDRH2 consisting of an amino acid sequence set forth in SEQ ID NO: 17; and
 (f) a heavy chain CDRH3 consisting of an amino acid sequence set forth in SEQ ID NO: 18.

[16] The antibody according to [15], wherein a heavy chain constant region is a heavy chain constant region of human IgG4, and has a mutation that reduces an ADCC and/or ADCP activity.

[17] The antibody that binds specifically to human SIRPα to inhibit binding of human SIRPα to CD47 according to or [16], wherein a heavy chain constant region is a heavy chain constant region of human IgG4, and phenylalanine at position 234, as numbered according to the EU index as in Kabat et al., is substituted by alanine, leucine at position 235 is substituted by alanine, and serine at position 228 is substituted by proline.

[18] The antibody according to [17], wherein an amino acid sequence of the heavy chain constant region is an amino acid sequence consisting of amino acid residues 144 to 470 in SEQ ID NO: 33.

[19] An antibody that binds specifically to human SIRPα to inhibit binding of human SIRPα to CD47 comprising
 (ai) a light chain variable region consisting of an amino acid sequence consisting of amino acid residues 21 to 130 in SEQ ID NO: 31 or
 (aii) a light chain variable region consisting of an amino acid sequence having at least 95% sequence identity with the amino acid sequence consisting of amino acid residues 21 to 130 in SEQ ID NO: 31 and having a binding activity to human SIRPα and
 (bi) a heavy chain variable region consisting of an amino acid sequence consisting of amino acid residues 20 to 143 in SEQ ID NO: 33 or
 (bii) a heavy chain variable region consisting of an amino acid sequence having at least 95% sequence identity with the amino acid sequence consisting of amino acid residues 20 to 143 in SEQ ID NO: 33 and having a binding activity to human SIRPα,
 wherein a heavy chain constant region is a heavy chain constant region of human IgG4, and has a mutation that reduces an ADCC and/or ADCP activity.

[20] The antibody that binds specifically to human SIRPα to inhibit binding of human SIRPα to CD47 according to [19], wherein the heavy chain constant region is the heavy chain constant region of human IgG4, and phenylalanine at position 234, as numbered according to the EU index as in Kabat et al., is substituted by alanine, leucine at position 235 is substituted by alanine, and serine at position 228 is substituted by proline.

[21] The antibody according to [20], wherein an amino acid sequence of the heavy chain constant region is an amino acid sequence consisting of amino acid residues 144 to 470 in SEQ ID NO: 33.

[22] The antibody according to any one of [1] to [4], which is any of the following (1) to (8):
 (1) an antibody that binds specifically to human SIRPα to inhibit binding of human SIRPα to CD47, the antibody consisting of: a heavy chain consisting of an amino acid sequence consisting of amino acid residues 20 to 466 in SEQ ID NO: 41; and a light chain consisting of an amino acid sequence consisting of amino acid residues 21 to 234 in SEQ ID NO: 37;

(2) an antibody that binds specifically to human SIRPα to inhibit binding of human SIRPα to CD47, the antibody consisting of: a heavy chain consisting of an amino acid sequence having at least 95% sequence identity with the amino acid sequence consisting of amino acid residues 20 to 466 in SEQ ID NO: 41 and having a binding activity to human SIRPα; and a light chain consisting of an amino acid sequence having at least 95% sequence identity with amino acid residues 21 to 234 in SEQ ID NO: 37 and having a binding activity to human SIRPα;

(3) an antibody that binds specifically to human SIRPα to inhibit binding of human SIRPα to CD47, the antibody consisting of: a heavy chain consisting of an amino acid sequence consisting of amino acid residues 20 to 466 in SEQ ID NO: 41; and a light chain consisting of an amino acid sequence consisting of amino acid residues 21 to 234 in SEQ ID NO: 39;

(4) an antibody that binds specifically to human SIRPα to inhibit binding of human SIRPα to CD47, the antibody consisting of: a heavy chain consisting of an amino acid sequence having at least 95% sequence identity with the amino acid sequence consisting of amino acid residues 20 to 466 in SEQ ID NO: 41 and having a binding activity to human SIRPα; and a light chain consisting of an amino acid sequence having at least 95% sequence identity with the amino acid sequence consisting of amino acid residues 21 to 234 in SEQ ID NO: 39 and having a binding activity to human SIRPα;

(5) an antibody that binds specifically to human SIRPα to inhibit binding of human SIRPα to CD47, the antibody consisting of: a heavy chain consisting of an amino acid sequence consisting of amino acid residues 20 to 466 in SEQ ID NO: 43; and a light chain consisting of an amino acid sequence consisting of amino acid residues 21 to 234 in SEQ ID NO: 35;

(6) an antibody that binds specifically to human SIRPα to inhibit binding of human SIRPα to CD47, the antibody consisting of: a heavy chain consisting of an amino acid sequence having at least 95% sequence identity with the amino acid sequence consisting of amino acid residues 20 to 466 in SEQ ID NO: 43 and having a binding activity to human SIRPα; and a light chain consisting of an amino acid sequence having at least 95% sequence identity with the amino acid sequence consisting of amino acid residues 21 to 234 in SEQ ID NO: 35 and having a binding activity to human SIRPα;

(7) an antibody that binds specifically to human SIRPα to inhibit binding of human SIRPα to CD47, the antibody consisting of: a heavy chain consisting of an amino acid sequence consisting of amino acid residues 20 to 466 in SEQ ID NO: 43; and a light chain consisting of an amino acid sequence consisting of amino acid residues 21 to 234 in SEQ ID NO: 37; and (8) an antibody that binds specifically to human SIRPα to inhibit binding of human SIRPα to CD47, the antibody consisting of: a heavy chain consisting of an amino acid sequence having at least 95% sequence identity with the amino acid sequence consisting of amino acid residues 20 to 466 in SEQ ID NO: 43 and having a binding activity to human SIRPα; and a light chain consisting of an amino acid sequence having at least 95% sequence identity with the amino acid sequence consisting of amino acid residues 21 to 234 in SEQ ID NO: 37 and having a binding activity to human SIRPα.

[23] The antibody according to [22], wherein the ADCC and/or ADCP activity is reduced.

[24] An antibody that binds specifically to human SIRPα to inhibit binding of human SIRPα to CD47, wherein the antibody binds to an epitope comprising Gln at position 82, Lys at position 83, Glu at position 84, and Gly at position 85 in human SIRPα set forth in SEQ ID NO: 57.

[25] The antibody according to [24], wherein a heavy chain constant region is a heavy chain constant region of human IgG4, and has a mutation that reduces an ADCC and/or ADCP activity.

[26] The antibody according to or [25], wherein a heavy chain constant region is a heavy chain constant region of human IgG4, and phenylalanine at position 234, as numbered according to the EU index as in Kabat et al., is substituted by alanine, leucine at position 235 is substituted by alanine, and serine at position 228 is substituted by proline.

[27] The antibody according to [26], wherein an amino acid sequence of the heavy chain constant region is an amino acid sequence consisting of amino acid residues 140 to 466 in SEQ ID NO: 25.

[28] The antibody according to any of [1] to [27], which enhances a phagocytic activity of a macrophage.

[29] The antibody according to any of [1] to [28], wherein a lysine residue at the carboxyl terminus of the heavy chain is deleted.

[30] An antigen-binding fragment of the antibody according to any of [1] to [29].

[31] The antigen-binding fragment of the antibody according to [30], which is selected from the group consisting of Fab, F(ab')2, Fab', and scFv.

[32] A pharmaceutical composition comprising the antibody according to any of [1] to or the antigen-binding fragment of the antibody according to or as an active ingredient.

[33] The pharmaceutical composition according to [32], which is an anti-tumor agent.

[34] The pharmaceutical composition according to [33], which further comprises an immune checkpoint inhibitor and/or an antibody drug that specifically responds to a cancer antigen to have the ADCC and/or ADCP activity as an active ingredient of the anti-tumor agent.

[35] A pharmaceutical composition, which is used in combination with an immune checkpoint inhibitor and/or an antibody drug that specifically responds to a cancer antigen to have the ADCC and/or ADCP activity, wherein the pharmaceutical composition comprises the antibody according to any of [1] to [29] or the antigen-binding fragment of the antibody according to [30] or [31] or as an active ingredient.

[36] The pharmaceutical composition according to [34] or [35], wherein the immune checkpoint inhibitor is an inhibitor of binding of PD-L1 and PD-1 or a CTLA4 inhibitor.

[37] The pharmaceutical composition according to [34] or [35], wherein the antibody drug that specifically responds to a cancer antigen to have the ADCC and/or ADCP activity is selected from the group consisting of an anti-CD20 antibody, an anti-HER2 antibody, and an anti-EGFR antibody.

[38] The pharmaceutical composition according to any of [33] to [37], wherein the tumor is one type or two or more types of tumors selected from the group consisting of carcinoma, sarcoma, lymphoma, leukemia, myeloma, germinoma, brain tumor, carcinoid, neuroblastoma, retinoblastoma, and nephroblastoma.

[39] The pharmaceutical composition according to [38], wherein the tumor is one type or two or more types of tumors selected from the group consisting of kidney cancer, melanoma, squamous cell cancer, basal cell cancer, conjunctival cancer, oral cancer, laryngeal cancer, pharyngeal cancer, thyroid cancer, lung cancer, breast cancer, esophageal cancer, gastric cancer, duodenal cancer, small intestinal cancer, colon cancer, rectal cancer, appendix cancer, anal cancer, liver cancer, gallbladder cancer, biliary cancer, pancreatic cancer, adrenal cancer, bladder cancer, prostate cancer, uterine cancer, vaginal cancer, liposarcoma, angiosarcoma, chondrosarcoma, rhabdomyosarcoma, Ewing's sarcoma, osteosarcoma, undifferentiated pleomorphic sarcoma, myxofibrosarcoma, malignant peripheral neurilemmoma, retroperitoneal sarcoma, synoviosarcoma, uterine sarcoma, gastrointestinal stromal tumor, leiomyosarcoma, epithelioid sarcoma, B-cell lymphoma, NK/T-cell lymphoma, Hodgkin's lymphoma, myeloid leukemia, lymphatic leukemia, myeloproliferative disease, myelodysplastic syndrome, multiple myeloma, testicular cancer, ovarian cancer, neuroglioma, and meningioma.

[40] A polynucleotide consisting of nucleotide sequences encoding amino acid sequences of a heavy chain and a light chain of the antibody according to any of [1] to [29].

[41] A vector comprising the polynucleotide according to [40].

[42] A host cell comprising the polynucleotide according to [40] or the vector according to [41].

[43] A method for producing the antibody according to any of [1] to [29], comprising culturing the host cell according to and purifying an antibody from the culture.

[44] An antibody produced by the method according to [43].

The present specification encompasses the contents disclosed in Japanese Patent Application No. 2018-131116, to which the present application claims a priority.

Advantageous Effects of Invention

The anti-SIRPα antibody of the present invention potently inhibits an interaction between SIRPα expressed in a phagocyte and CD47 expressed on a tumor cell and inhibits transmission of a "Don't-eat-me" signal from the tumor cell to the phagocyte, while the antibody is safe because it does not have effector functions and therefore does not attack immune cells of the self.

The anti-SIRPα antibody of the present invention can exhibit excellent anti-tumor effects when it is used in combination with other antibody drugs having effector functions or other antibody drugs having an immune checkpoint inhibitory action.

BRIEF DESCRIPTION OF DRAWINGS

FIG. 1B shows the reactivity of humanized anti-human SIRPA antibodies to hmSIRPA constructs used for an epitope analysis of anti-SIRPA antibodies (i) to (iv) and the amino acid sequences of SIRPA constructs used for the epitope analysis of anti-SIRPA antibodies (v).

FIG. 4 shows a comparison of amino acid sequences of variants for the beta 5-6 loop portion of human SIRPA.

FIG. 9 shows ADCP activity against a Burkitt's lymphoma cell line when the anti-SIRPA antibody is used as a single agent (A) and when the anti-SIRPA antibody is used in combination with rituximab (B).

FIG. 11 shows a comparison of amino acid sequences of the heavy chain variable region of the D13 antibody, the variable region of a humanized antibody heavy chain hH1, and the variable region of a humanized antibody heavy chain hH2.

FIG. 12 shows a comparison of amino acid sequences of the light chain variable region of the D13 antibody, the variable region of a humanized antibody light chain hL2, the variable region of a humanized antibody heavy chain hL3, and the variable region of a humanized antibody light chain hL4.

FIG. 13C is graphs showing a binding activity of a humanized anti-SIRPA antibody to human SIRPA variants [(i) V9, (ii) V10, (iii) monkey SIRPA, and (iv) mock].

FIG. 14A is graphs showing a binding activity of a humanized anti-SIRPA antibody to mouse SIRPA [(i) C57BL/6, (ii) BALB/c, and (iii) 129sv].

FIG. 15 is graphs showing the results of an evaluation of an inhibitory activity of a humanized anti-SIRPA antibody against binding of human (A and B) or monkey (C) SIRPA and CD47.

FIG. 17 shows a nucleotide sequence encoding the cD13 light chain and an amino acid sequence of the cD13 light chain.

FIG. 18 shows a nucleotide sequence encoding the cD13 heavy chain and an amino acid sequence of the cD13 heavy chain.

FIG. 19 shows a nucleotide sequence encoding the cF44 light chain and an amino acid sequence of the cF44 light chain.

FIG. 20 shows a nucleotide sequence encoding the cF44 heavy chain and an amino acid sequence of the cF44 heavy chain.

FIG. 21 shows a nucleotide sequence encoding the cF63 light chain and an amino acid sequence of the cF63 light chain.

FIG. 22 shows a nucleotide sequence encoding the cF63 heavy chain and an amino acid sequence of the cF63 heavy chain.

FIG. 23 shows a nucleotide sequence encoding hL2 and an amino acid sequence of hL2.

FIG. 24 shows a nucleotide sequence encoding hL3 and an amino acid sequence of hL3.

FIG. 25 shows a nucleotide sequence encoding hL4 and an amino acid sequence of hL4.

FIG. 26 shows a nucleotide sequence encoding hH1 and an amino acid sequence of hH1.

FIG. 27 shows a nucleotide sequence encoding hH2 and an amino acid sequence of hH2.

FIG. 28 shows sequences of the D13 antibody CDRs.

FIG. 29 shows sequences of the F44 antibody CDRs.

FIG. 30 shows sequences of the F63 antibody CDRs.

FIG. 34 shows amino acid sequences of the OSE-172 antibody heavy chain (OSE-172_hG4Pro) and light chain (OSE-172_hK).

FIG. 35 shows amino acid sequences of the KWAR23 antibody heavy chain (KWAR23_hG4Pro) and light chain (KWAR23_hK).

FIG. 36 shows amino acid sequences of the ADU-1805 antibody heavy chain (ADU-1805_hG2) and light chain (ADU-1805_hK).

DESCRIPTION OF EMBODIMENTS

Figure 1A:
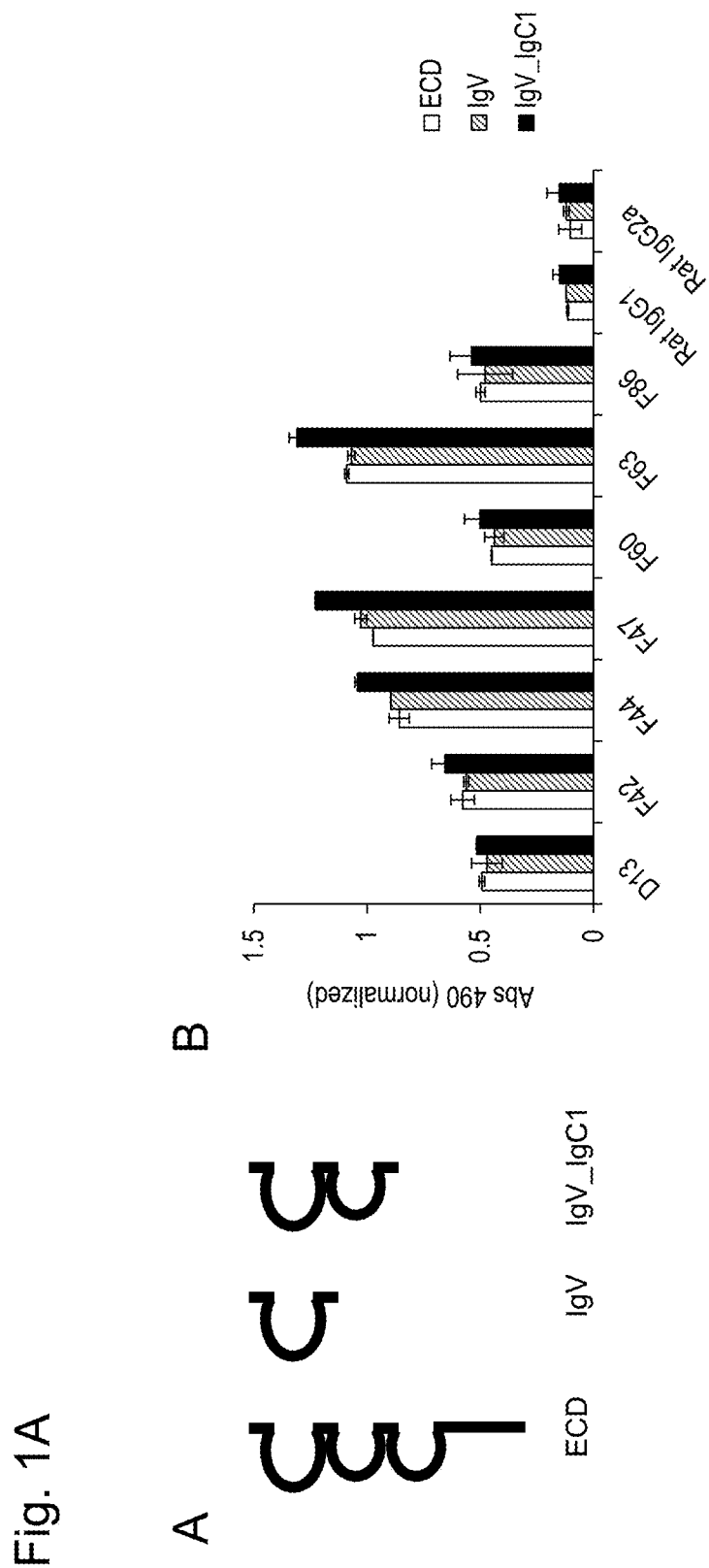
FIG. 1A illustrates structures of SIRPA constructs used for an epitope analysis of an anti-SIRPA antibody (A) and shows the reactivity of rat anti-human SIRPA antibodies to each construct (B).

The present invention is described in detail below.

Characteristics of Anti-SIRPα Antibody

The present invention is an anti-SIRPα antibody that recognizes and binds to the extracellular IgV domain of an SIRPα protein.

A signal regulatory protein α (SIRPα) is a single-pass transmembrane molecule belonging to the Ig superfamily that is present in myeloid cells such as macrophages, dendritic cells, and neutrophils as well as glia cells. The extracellular region thereof consists of one IgV domain and two IgC domains, and 10 different variants V1 to V10 have been reported for the IgV domain, which is a CD47 binding site, in humans. The extracellular IgV domain of the SIRPα protein is an IgV domain which is one of three extracellular Ig-like domains constituting the SIRPα protein. Of the variants, V1 and V2 are major variants, and the anti-SIRPα antibody of the present invention binds to all variants including the major variants V1 and V2. In the present invention, "SIRPα" may be referred to as "SIRPA."

The amino acid sequence of the human SIRPα protein is disclosed as GenBank accession number NP_001035111.

A monoclonal antibody used in the present invention can be obtained as an antibody produced and secreted by a hybridoma prepared by immunizing a mammal such as mouse, rat, rabbit, hamster, guinea pig, equine, monkey, dog, swine, bovine, goat, and sheep with SIRPα or a fragment thereof as an immunogen and fusing a spleen cell or the like from the animal and myeloma. A hybridoma can be prepared by a known method.

SIRPα can also be chemically synthesized as an immunogen on the basis of sequence information and can also be obtained as a recombinant protein by a known method based on the sequence information of a DNA encoding the protein.

Screening for an antibody can be performed by an arbitrary method, but it is sufficient to perform screening preferably by cell-based ELISA using animal cells transfected with a DNA encoding SIRPα. An amino acid sequence of the V1 protein of human SIRPα is set forth in SEQ ID NO: 56 in the sequence listing, and an amino acid sequence of the V2 protein of human SIRPα is set forth in SEQ ID NO: 57 in the sequence listing.

The anti-SIRPα antibody of the present invention inhibits binding of SIRPα and CD47.

A tumor cell highly expresses CD47 and escapes from phagocytosis by a phagocyte when SIRPα expressed in the phagocyte having a phagocytic activity and CD47 bind and interact with each other to transmit a "Don't-eat-me" signal to the phagocyte. The anti-SIRPα antibody inhibits the binding of SIRPα and CD47 to inhibit the transmission of a "Don't-eat-me" signal from the tumor cell to the phagocyte and thereby enhances the phagocytic activity of the phagocyte against the tumor cell. As a result, anti-tumor effects can be induced. Examples of phagocytes having the phagocytic activity include macrophages, such as M1 and M2 macrophages, and dendritic cells such as immature dendritic cells (imDC).

At this time, the anti-SIRPα antibody has effector functions, and when it binds to an Fc receptor, such as the Fcγ receptor of a phagocyte, such as a macrophage, or an effector cell, such as a natural killer cell and a T cell, it attacks the effector cell, such as a peripheral blood mononuclear cell (PBMC) and a macrophage, of the self through antibody dependent cellular cytotoxicity (ADCC) or antibody dependent cellular phagocytosis (ADCP).

To prevent attacking cells of the self, the anti-SIRPα antibody of the present invention has reduced effector functions. As a result, the anti-SIRPα antibody of the present invention has only an effect of inhibiting the binding of SIRPα and CD47 and does not exhibit effector functions because it does not bind to the Fc receptor of an effector cell.

The anti-SIRPα antibody of the present invention can be used safely as a medicament without causing adverse drug reactions because it does not attack immune cells of the self.

However, the anti-SIRPα antibody of the present invention does not exhibit sufficient anti-tumor effects solely because the effector functions thereof are reduced. Therefore, it is used in combination with other anti-tumor agents as described later.

To reduce the effector functions, the Fc portion of the anti-SIRPα antibody needs to be prevented from binding to the Fc receptor of a macrophage or a T cell. Therefore, the anti-SIRPα antibody of the present invention has been replaced with an antibody derived from IgG4 as a subclass. In general, among human IgG subclasses, IgG4 is known as a subclass with low effector functions, such as an ADCC activity, CDC activity, and/or ADCP activity (Bruggemann et al., J. Exp. Med. 1987; 1351-1361). It is used as an IgG format to prevent cytotoxicity through the effector functions when a therapeutic antibody targets a molecule expressed in a normal organ (e.g., Opdivo). However, the low effector functions of the IgG4 subclass do not mean that it has no effector functions at all. Accordingly, the anti-SIRPα antibody of the present invention has a mutation introduced into the heavy chain constant region thereof, so that the effector functions are further reduced, that is, a substitution of one or more amino acids that reduces the ADCC and/or ADCP activity or the like. Examples of such a mutation include a substitution of phenylalanine at position 234, as shown in the EU index in Kabat et al. (Kabat et al., Sequences of proteins of immunological interest Fifth edition [1991]), by alanine (F234A) and a substitution of leucine at position 235 by alanine (L235A) (Parekh et al., mAbs. 2012; 310-318). Such a mutation in an antibody is called FALA mutation. Phenylalanine at position 234, as numbered according to the EU index as in Kabat et al., may be referred to as phenylalanine of EU numbering 234.

Furthermore, because formation of the SS bond between the antibody heavy chains of IgG4 is not stable, a mutation that promotes the formation of the SS bond between antibody heavy chains is introduced to increase stability thereof. Examples of such a mutation include a substitution of serine at position 228, as numbered according to the EU index as in Kabat et al. (Angal et al., Molecular Immunology. 1993; 105-108), by proline (S228P). This antibody mutation is called PRO mutation.

The above-mentioned FALA mutation and PRO mutation may be simultaneously introduced into the constant regions of the antibody of the present invention (Vafa et al., Methods. 2014; 65, 114-126). An IgG4 heavy chain having both the FALA mutation and the PRO mutation is called an "IgG4proFALA" type heavy chain, "IgG4PFALA" type heavy chain, or "IgG4pf" type heavy chain.

The antibody heavy chain constant region consists of CH1, hinge, CH2, and CH3 regions. CH1 is defined as EU index 118 to 215, the hinge is defined as EU index 216 to 230, CH2 is defined as EU index 231 to 340, and CH3 is defined as EU index 341 to 446. Alanine by which phenylalanine at position 234, as numbered according to the EU index as in Kabat et al., is substituted corresponds to alanine at position 253 in SEQ ID NO: 25, which represents an amino acid sequence of the D13 antibody heavy chain, alanine at position 252 in SEQ ID NO: 29, which represents an amino acid sequence of the F44 antibody heavy chain, and alanine at position-257 in SEQ ID NO: 33, which represents an amino acid sequence of the F63 antibody heavy chain; and alanine by which leucine at position 235 is substituted corresponds to alanine at position 254 in SEQ ID NO: 25, alanine at position 253 in SEQ ID NO: 29, and alanine at position 258 in SEQ ID NO: 33. Further, proline by which serine at position 228, as numbered according to the EU index as in Kabat et al., is substituted corresponds to proline at position 247 in SEQ ID NO: 25, proline at position 246 in SEQ ID NO: 29, and proline at position 251 in SEQ ID NO: 33.

Amino acid sequences of the "IgG4proFALA" type heavy chain constant region are an amino acid sequence consisting of amino acid residues 140 to 466 in SEQ ID NO: 25, an amino acid sequence consisting of amino acid residues 139 to 465 in SEQ ID NO: 29, and an amino acid sequence consisting of amino acid residues 144 to 470 in SEQ ID NO: 33.

Among the human IgG subclasses, human IgG1 has very potent effector functions including a CDC activity through complement binding and an antibody-dependent cytotoxic activity (Bruggemann et al., J. Exp. Med. 1987; 1351-1361) and is utilized as an IgG format that exhibits therapeutic effects by inducing cancer cell death due to cell injury through effector functions when a therapeutic antibody is used to target a molecule highly expressed in cancer (e.g., trastuzumab, rituximab). When IgG1 is used as an isotype of the antibody of the present invention, effector functions can be regulated by substituting part of amino acid residues in the constant region (refer to International Publication Nos. WO 88/007089, WO 94/28027, and WO 94/29351). Examples of IgG1 mutants having attenuated effector functions include IgG1 LALA (IgG1-L234A, IgG1-L235A) and IgG1 LAGA (IgG1-L235A, IgG1-G237A). The IgG1 heavy chain constant regions into which these mutations are introduced can also be used as a constant region of the antibody of the present invention.

Among the human IgG subclasses, human IgG2 has very weak effector functions including a CDC activity through complement binding and an antibody-dependent cytotoxic activity (Bruggemann et al., J. Exp. Med. 1987; 1351-1361) and is utilized as one of IgG formats to prevent cytotoxicity through effector functions when a therapeutic antibody is used to target a molecule expressed in a normal organ (e.g., denosumab, evolocumab, brodalumab). The IgG2 heavy chain constant region can also be used as the constant region of the antibody of the present invention.

The anti-SIRPα antibody of the present invention has species cross-reactivity, such that it binds to human and monkey (cynomolgus monkey) SIRPα but not to mouse SIRPα.

Human Chimeric Antibodies and Humanized Antibodies

The anti-SIRPα antibody of the present invention includes a human chimeric antibody and a humanized antibody modified to reduce heterogeneous antigenicity against humans. The humanized antibody is also referred to as a CDR transplanted antibody.

Human Chimeric Antibodies

A human chimeric antibody refers to an antibody consisting of a light chain variable region and a heavy chain variable region of an antibody of an animal other than humans and a light chain constant region and a heavy chain constant region of a human antibody. The human chimeric antibody can be prepared by collecting a cDNA encoding the light chain variable region and a cDNA encoding the heavy chain variable region from a hybridoma producing the anti-SIRPα antibody, inserting the cDNAs into an expression vector having cDNAs encoding the light chain constant region and the heavy chain constant region of the human antibody to construct a human chimeric antibody expression vector, and introducing the expression vector into a host cell for expression.

The heavy chain constant region consists of three domains $C_H1$, $C_H2$, and $C_H3$. In the present invention, as described above, the human heavy chain constant region of a chimeric antibody is IgG4proFALA, which is the heavy chain constant region of the IgG4 subclass and has the PRO mutation and the FALA mutation. Further, it is sufficient that the light chain constant region belongs to the human Ig family, and the light chain constant region is a κ or λ constant region.

Examples of a human chimeric antibody of the anti-SIRPα antibody of the present invention include antibodies cD13, cF44, and cF63, which are human chimeric antibodies having the variable region of rat anti-human SIRPα monoclonal antibodies D13, F44, and F63. These three antibodies are antibodies having a high binding property to human SIRPα and having a high inhibitory activity against binding of SIRPα and CD47. Among these, the cD13 and cF63 antibodies having a high activity are preferred.

cD13 Antibodies

The nucleotide sequence of the cDNA encoding the light chain variable region of the cD13 antibody is a nucleotide sequence consisting of nucleotides 61 to 378 in SEQ ID NO: 22 in the sequence listing (FIG. 17), and the amino acid sequence of the light chain variable region of the cD13 antibody is an amino acid sequence consisting of amino acid residues 21 to 126 in SEQ ID NO: 23 in the sequence listing (FIG. 17).

Further, the nucleotide sequence of the cDNA encoding the heavy chain variable region of the cD13 antibody is a nucleotide sequence consisting of nucleotides 58 to 417 in SEQ ID NO: 24 in the sequence listing (FIG. 18), and the amino acid sequence of the heavy chain variable region of the cD13 antibody is an amino acid sequence consisting of amino acid residues 20 to 139 in SEQ ID NO: 25 in the sequence listing (FIG. 18).

That is, the anti-SIRPα antibody of the present invention is an anti-human SIRPα antibody that binds to human SIRPα, comprising: the light chain variable region comprising the amino acid sequence consisting of amino acid residues 21 to 126 in SEQ ID NO: 23; and the heavy chain variable region comprising the amino acid sequence consisting of amino acid residues 20 to 139 in SEQ ID NO: 25.

Further, DNAs consisting of a nucleotide sequence having a sequence identity of at least 85%, preferably at least 90%, more preferably at least 95%, particularly preferably at least 97%, at least 98%, or at least 99% calculated using the above-mentioned nucleotide sequence consisting of nucleotides 61 to 378 in SEQ ID NO: 22 or nucleotide sequence consisting of nucleotides 58 to 417 in SEQ ID NO: 24 and CLUSTAL W (an alignment tool) or the like (using, for example, default, i.e., initially set parameters) and encoding proteins having an activity of a light chain variable region or a heavy chain variable region of an antibody, that is, having a binding activity to human SIRPα are also included in DNAs encoding the light chain variable region or the heavy chain variable region of the antibody of the present invention.

Furthermore, DNAs that can be hybridized with a DNA consisting of a sequence complementary to the above-mentioned nucleotide sequence consisting of nucleotides 61 to 378 in SEQ ID NO: 22 or nucleotide sequence consisting of nucleotides 58 to 417 in SEQ ID NO: 24 under stringent conditions and encoding a protein having an activity of a light chain variable region or a heavy chain variable region of an antibody, that is, having a binding activity to human SIRPα are also included in DNAs encoding the light chain variable region or the heavy chain variable region of the present invention.

Furthermore, the above-mentioned light chain variable region or heavy chain variable region includes not only the light chain variable region or the heavy chain variable region consisting of the amino acid sequence consisting of amino acid residues 21 to 126 in SEQ ID NO: 23 or the amino acid sequence consisting of amino acid residues 20 to 139 in SEQ ID NO: 25, but also a light chain variable region or a heavy chain variable region comprising a protein comprising an amino acid sequence derived from the above amino acid sequence by deletion, substitution, or addition of one or several, for example, one to 10, preferably one to five, more preferably one or two, more preferably one amino acid and having an activity of a heavy chain variable region or a light chain variable region of an antibody, that is, having a binding activity to the human SIRPα.

Examples of such an amino acid sequence derived from the amino acid sequence consisting of amino acid residues 21 to 126 in SEQ ID NO: 23 or the amino acid sequence consisting of amino acid residues 20 to 139 in SEQ ID NO: 25 by deletion, substitution, or addition of one or several amino acids include amino acid sequences having a sequence identity of at least 85%, preferably at least 90%, more preferably at least 95%, particularly preferably at least 97%, 98%, or 99% calculated using the amino acid sequence consisting of amino acid residues 21 to 126 in SEQ ID NO: 23 or the amino acid sequence consisting of amino acid residues 20 to 139 in SEQ ID NO: 25 and CLUSTAL W (an alignment tool) or the like (using, for example, default, i.e., initially set parameters).

Such a protein having an amino acid sequence derived from the amino acid sequence consisting of amino acid residues 21 to 126 in SEQ ID NO: 23 or the amino acid sequence consisting of amino acid residues 20 to 139 in SEQ ID NO: 25 by deletion, substitution, or addition of one or several amino acids is substantially identical to the protein having the amino acid sequence consisting of amino acid residues 21 to 126 in SEQ ID NO: 23 or the amino acid sequence consisting of amino acid residues 20 to 139 in SEQ ID NO: 25.

Further, the cD13 antibody comprises CDRL1 consisting of an amino acid sequence set forth in SEQ ID NO: 1 (GASKSVRTYMH), CDRL2 consisting of an amino acid sequence set forth in SEQ ID NO: 2 (SASNLEA), and CDRL3 consisting of an amino acid sequence set forth in SEQ ID NO: 3 (QQSNEPPYT) as complementarity determining regions (CDRs) of the light chain variable region and further comprises CDRH1 consisting of an amino acid sequence set forth in SEQ ID NO: 4 (GFTFSDYGMI), CDRH2 consisting of an amino acid sequence set forth in SEQ ID NO: 5 (SISSSSSYIY), and CDRH3 consisting of an amino acid sequence set forth in SEQ ID NO: 6 (RYYGFNYPFDY) as CDRs of the heavy chain variable region (FIG. 28).

That is, the anti-SIRPα antibody of the present invention is an antibody that comprises CDRL1 consisting of the amino acid sequence set forth in SEQ ID NO: 1, CDRL2 consisting of the amino acid sequence set forth in SEQ ID NO: 2, and CDRL3 consisting of the amino acid sequence set forth in SEQ ID NO: 3 and further comprises CDRH1 consisting of the amino acid sequence set forth in SEQ ID NO: 4, CDRH2 consisting of the amino acid sequence set forth in SEQ ID NO: 5, and CDRH3 consisting of the amino acid sequence set forth in SEQ ID NO: 6 as CDRs of the heavy chain variable region.

The above-mentioned CDRs include CDRs consisting of an amino acid sequence derived from the amino acid sequence representing each CDR by deletion, substitution, or addition of one or several, preferably one or two, more preferably one amino acid.

The chimeric or humanized D13 antibody binds to a SIRPα variants consisting of an amino acid sequence set forth in SEQ ID NO: 73 but does not bind to a SIRPα variant consisting of an amino acid sequence set forth in SEQ ID NO: 74 or 75. Since the NQKEG sequence (SEQ ID NO: 76) in the amino acid sequence set forth in SEQ ID NO: 73 is substituted by the NQKEE sequence (SEQ ID NO: 77) in SEQ ID NO: 74 and the SFTEG sequence (SEQ ID NO: 80) in SEQ ID NO: 75, it was found that binding of the chimeric or humanized antibody D13 and SIRPα requires the NQKEG sequence (SEQ ID NO: 76). X-ray crystallography has suggested that the cD13 antibody binds to SIRPα via amino acid residues Gln82, Lys83, Glu84, Gly85, His86, and Phe87 (the position of each amino acid residue corresponds to that in SEQ ID NO: 57 in the sequence listing) in SEQ ID NO: 57 representing human SIRPα Variant 2, and a sequence comprising Gln82, Lys83, Glu84, and Gly85 corresponds to the QKEG portion in the above-mentioned NQKEG sequence. Therefore, the NQKEG sequence is an epitope essential for binding of the D13 antibody and human SIRPα. An antibody having an epitope identical to that of the D13 antibody can be selected by selecting an antibody that binds to an antibody that specifically recognizes the NQKEG sequence (SEQ ID NO: 76), that is, an antibody that binds to a SIRPα variant consisting of the amino acid sequence set forth in SEQ ID NO: 73, which has the NQKEG sequence (SEQ ID NO: 76), but does not bind to a SIRPα variant consisting of the amino acid sequence set forth in SEQ ID NO: 74 or 75 and not having the NQKEG sequence.

cF44 Antibodies

The nucleotide sequence of the cDNA encoding the light chain variable region of the cF44 antibody is a nucleotide sequence consisting of nucleotides 61 to 381 in SEQ ID NO: 26 in the sequence listing (FIG. 19), and the amino acid sequence of the light chain variable region of the cF44 antibody is an amino acid sequence consisting of amino acid residues 21 to 127 in SEQ ID NO: 27 in the sequence listing (FIG. 19).

Further, the nucleotide sequence of the cDNA encoding the heavy chain variable region of the cF44 antibody is a nucleotide sequence consisting of nucleotides 58 to 414 in SEQ ID NO: 28 in the sequence listing (FIG. 20), and the amino acid sequence of the heavy chain variable region of the cF44 antibody is an amino acid sequence consisting of amino acid residues 20 to 138 in SEQ ID NO: 29 in the sequence listing (FIG. 20).

That is, the anti-SIRPα antibody of the present invention is an anti-human SIRPα antibody that binds to human SIRPα, comprising: the light chain variable region comprising the amino acid sequence consisting of amino acid residues 21 to 127 in SEQ ID NO: 27; and the heavy chain variable region comprising the amino acid sequence consisting of amino acid residues 20 to 138 in SEQ ID NO: 29.

Further, DNAs consisting of a nucleotide sequence having a sequence identity of at least 85%, preferably at least 90%, more preferably at least 95%, particularly preferably at least 97%, at least 98%, or at least 99% calculated using the above-mentioned nucleotide sequence consisting of nucleotides 61 to 381 in SEQ ID NO: 26 or nucleotide sequence consisting of nucleotides 58 to 414 in SEQ ID NO: 28 and CLUSTAL W (an alignment tool) or the like (using, for example, default, i.e., initially set parameters) and encoding proteins having an activity of a light chain variable region or a heavy chain variable region of an antibody, that is, having a binding activity to human SIRPα are also included in DNAs encoding the light chain variable region or the heavy chain variable region of the antibody of the present invention.

Furthermore, DNAs that can be hybridized with a DNA consisting of a sequence complementary to the above-mentioned nucleotide sequence consisting of nucleotides 61 to 381 in SEQ ID NO: 26 or nucleotide sequence consisting of nucleotides 58 to 414 in SEQ ID NO: 28 under stringent conditions and encoding a protein having an activity of a light chain variable region or a heavy chain variable region of an antibody, that is, having a binding activity to human SIRPα are also included in DNAs encoding the light chain variable region or the heavy chain variable region of the present invention.

Furthermore, the above-mentioned light chain variable region or heavy chain variable region includes not only the light chain variable region or the heavy chain variable region consisting of the amino acid sequence consisting of amino acid residues 21 to 127 in SEQ ID NO: 27 or the amino acid sequence consisting of amino acid residues 20 to 138 in SEQ ID NO: 29, but also a light chain variable region or a heavy chain variable region comprising a protein comprising an amino acid sequence derived from the above amino acid sequence by deletion, substitution, or addition of one or several, for example, one to 10, preferably one to five, more preferably one or two, more preferably one amino acid and having an activity of a heavy chain variable region or a light chain variable region of an antibody, that is, having a binding activity to the human SIRPα.

Examples of such an amino acid sequence derived from the amino acid sequence consisting of amino acid residues 21 to 127 in SEQ ID NO: 27 or the amino acid sequence consisting of amino acid residues 20 to 138 in SEQ ID NO: 29 by deletion, substitution, or addition of one or several amino acids include amino acid sequences having a sequence identity of at least 85%, preferably at least 90%, more preferably at least 95%, particularly preferably at least 97%, at least 98%, or at least 99% calculated using the amino acid sequence consisting of amino acid residues 21 to 127 in SEQ ID NO: 27 or the amino acid sequence consisting of amino acid residues 20 to 138 in SEQ ID NO: 29 and CLUSTAL W (an alignment tool) or the like (using, for example, default, i.e., initially set parameters).

Such a protein having an amino acid sequence derived from the amino acid sequence consisting of amino acid residues 21 to 127 in SEQ ID NO: 27 or the amino acid sequence consisting of amino acid residues 20 to 138 in SEQ ID NO: 29 by deletion, substitution, or addition of one or several amino acids is substantially identical to the protein having the amino acid sequence consisting of amino acid residues 21 to 127 in SEQ ID NO: 27 or the amino acid sequence consisting of amino acid residues 20 to 138 in SEQ ID NO: 29.

Further, the cF44 antibody comprises CDRL1 consisting of an amino acid sequence set forth in SEQ ID NO: 7 (KASKSISKYLA), CDRL2 consisting of an amino acid sequence set forth in SEQ ID NO: 8 (SGSTLQS), and CDRL3 consisting of an amino acid sequence set forth in SEQ ID NO: 9 (QQHNEYPPT) as complementarity determining regions (CDRs) of the light chain variable region and further comprises CDRH1 consisting of an amino acid sequence set forth in SEQ ID NO: 10 (GFTFSNYYMA), CDRH2 consisting of an amino acid sequence set forth in SEQ ID NO: 11 (YITTGGGSTY), and CDRH3 consisting of an amino acid sequence set forth in SEQ ID NO: 12 (ANYGGSYFDY) as CDRs of the heavy chain variable region (FIG. 29).

That is, the anti-SIRPα antibody of the present invention is an antibody that comprises CDRL1 consisting of the amino acid sequence set forth in SEQ ID NO: 7, CDRL2 consisting of the amino acid sequence set forth in SEQ ID NO: 8, and CDRL3 consisting of the amino acid sequence set forth in SEQ ID NO: 9 and further comprises CDRH1 consisting of the amino acid sequence set forth in SEQ ID NO: 10, CDRH2 consisting of the amino acid sequence set forth in SEQ ID NO: 11, and CDRH3 consisting of the amino acid sequence set forth in SEQ ID NO: 12 as CDRs of the heavy chain variable region.

The above-mentioned CDRs include CDRs consisting of an amino acid sequence derived from the amino acid sequence representing each CDR by deletion, substitution, or addition of one or several, preferably one or two, more preferably one amino acid.

cF63 Antibodies

The nucleotide sequence of the cDNA encoding the light chain variable region of the cF63 antibody is a nucleotide sequence consisting of nucleotides 61 to 390 in SEQ ID NO: 30 in the sequence listing (FIG. 21), and the amino acid sequence of the light chain variable region of the cF63 antibody is an amino acid sequence consisting of amino acid residues 21 to 130 in SEQ ID NO: 31 in the sequence listing (FIG. 21).

Further, the nucleotide sequence of the cDNA encoding the heavy chain variable region of the cF63 antibody is a nucleotide sequence consisting of nucleotides 58 to 429 in SEQ ID NO: 32 in the sequence listing (FIG. 22), and the amino acid sequence of the heavy chain variable region of the cF63 antibody is an amino acid sequence consisting of amino acid residues 20 to 143 in SEQ ID NO: 33 in the sequence listing (FIG. 22).

That is, the anti-SIRPα antibody of the present invention is an anti-human SIRPα antibody that binds to human SIRPα, comprising: the light chain variable region comprising the amino acid sequence consisting of amino acid residues 21 to 130 in SEQ ID NO: 31; and the heavy chain variable region comprising the amino acid sequence consisting of amino acid residues 20 to 143 in SEQ ID NO: 33.

Further, DNAs consisting of a nucleotide sequence having a sequence identity of at least 85%, preferably at least 90%, more preferably at least 95%, particularly preferably at least 97%, at least 98%, or at least 99% calculated using the above-mentioned nucleotide sequence consisting of nucleotides 61 to 390 in SEQ ID NO: 30 or nucleotide sequence consisting of nucleotides 58 to 429 in SEQ ID NO: 32 and CLUSTAL W (an alignment tool) or the like (using, for example, default, i.e., initially set parameters) and encoding proteins having an activity of a light chain variable region or a heavy chain variable region of an antibody, that is, having a binding activity to human SIRPα are also included in DNAs encoding the light chain variable region or the heavy chain variable region of the antibody of the present invention.

Furthermore, DNAs that can be hybridized with a DNA consisting of a sequence complementary to the above-mentioned nucleotide sequence consisting of nucleotides 61 to 390 in SEQ ID NO: 30 or nucleotide sequence consisting of nucleotides 58 to 429 in SEQ ID NO: 32 under stringent conditions and encoding a protein having an activity of a light chain variable region or a heavy chain variable region of an antibody, that is, having a binding activity to human SIRPα are also included in DNAs encoding the light chain variable region or the heavy chain variable region of the present invention.

Furthermore, the above-mentioned light chain variable region or heavy chain variable region includes not only the light chain variable region or the heavy chain variable region consisting of the amino acid sequence consisting of amino acid residues 21 to 130 in SEQ ID NO: 31 or the amino acid sequence consisting of amino acid residues 20 to 143 in SEQ ID NO: 33, but also a light chain variable region or a heavy chain variable region comprising a protein comprising an amino acid sequence derived from the above amino acid sequence by deletion, substitution, or addition of one or several, for example, one to 10, preferably one to five, more preferably one or two, more preferably one amino acid and having an activity of a heavy chain variable region or a light chain variable region of an antibody, that is, having a binding activity to the human SIRPα.

Examples of such an amino acid sequence derived from the amino acid sequence consisting of amino acid residues 21 to 130 in SEQ ID NO: 31 or the amino acid sequence consisting of amino acid residues 20 to 143 in SEQ ID NO: 33 by deletion, substitution, or addition of one or several amino acids include amino acid sequences having a sequence identity of at least 85%, preferably at least 90%, more preferably at least 95%, particularly preferably at least 97%, at least 98%, or at least 99% calculated using the amino acid sequence consisting of amino acid residues 21 to 130 in SEQ ID NO: 31 or the amino acid sequence consisting of amino acid residues 20 to 143 in SEQ ID NO: 33 and CLUSTAL W (an alignment tool) or the like (using, for example, default, i.e., initially set parameters).

Such a protein having an amino acid sequence derived from the amino acid sequence consisting of amino acid residues 21 to 130 in SEQ ID NO: 31 or the amino acid sequence consisting of amino acid residues 20 to 143 in SEQ ID NO: 33 by deletion, substitution, or addition of one or several amino acids is substantially identical to the protein having the amino acid sequence consisting of amino acid residues 21 to 130 in SEQ ID NO: 31 or the amino acid sequence consisting of amino acid residues 20 to 143 in SEQ ID NO: 33.

Further, the cF63 antibody comprises CDRL1 consisting of an amino acid sequence set forth in SEQ ID NO: 13 (ERSSGDIGDSYVS), CDRL2 consisting of an amino acid sequence set forth in SEQ ID NO: 14 (ADDQRPS), and CDRL3 consisting of an amino acid sequence set forth in SEQ ID NO: 15 (QSYDSKIDI) as complementarity determining regions (CDRs) of the light chain variable region and further comprises CDRH1 consisting of an amino acid sequence set forth in SEQ ID NO: 16 (GFSLASYSLS), CDRH2 consisting of an amino acid sequence set forth in SEQ ID NO: 17 (RMYYDGDTA), and CDRH3 consisting of an amino acid sequence set forth in SEQ ID NO: 18 (DRSMFGTDYPHWYFDF) as CDRs of the heavy chain variable region (FIG. 30).

That is, the anti-SIRPα antibody of the present invention is an antibody that comprises CDRL1 consisting of the amino acid sequence set forth in SEQ ID NO: 13, CDRL2 consisting of the amino acid sequence set forth in SEQ ID NO: 14, and CDRL3 consisting of the amino acid sequence set forth in SEQ ID NO: 15 and further comprises CDRH1 consisting of the amino acid sequence set forth in SEQ ID NO: 16, CDRH2 consisting of the amino acid sequence set forth in SEQ ID NO: 17, and CDRH3 consisting of the amino acid sequence set forth in SEQ ID NO: 18 as CDRs of the heavy chain variable region.

The above-mentioned CDRs include CDRs consisting of an amino acid sequence derived from the amino acid sequence representing each CDR by deletion, substitution, or addition of one or several, preferably one or two, more preferably one amino acid.

Humanized Antibodies

A humanized antibody (CDR-transplanted antibody) refers to an antibody obtained by transplanting amino acid sequences of CDRs of a light chain variable region and a heavy chain variable region of an antibody of an animal other than humans to a light chain variable region and a heavy chain variable region of a human antibody at appropriate positions.

The humanized anti-SIRPα antibody of the present invention can be produced by constructing cDNAs encoding variable regions obtained by transplanting amino acid sequences of CDRs of the light chain variable region and the heavy chain variable region of an antibody of an animal other than humans produced from a hybridoma producing a monoclonal antibody that enhances the phagocytic activity of a macrophage by binding to human SIRPα to inhibit the binding of SIRPα and CD47 into a framework (FR) region of the light chain variable region and the heavy chain variable region of an arbitrary human antibody, inserting them into an animal cell expression vector carrying genes encoding the light chain constant region and the heavy chain constant region of the human antibody to construct a humanized antibody expression vector, and introducing the expression vector into an animal cell to make expressed.

Specifically, it is sufficient to synthesize a DNA sequence designed so that CDRs of the D13, F44, or F63 antibody and a framework region of a human antibody are joined. The framework region of a human antibody joined through CDRs is selected so that the CDRs form a favorable antigen binding site. Further, if necessary, amino acids in the framework region in the antibody variable region may be substituted so that a CDR of a humanized antibody forms an appropriate antigen binding site. A humanized antibody to which CDRs are transplanted can be prepared by a known CDR grafting technique.

Examples of a heavy chain of a humanized antibody having CDRs in the heavy chain variable region of the D13 antibody (six CDRs consisting of amino acids set forth in SEQ ID NOS: 1 to 6), in which part of amino acids in the framework region in the variable region are substituted by the above-mentioned method, include a humanized antibody heavy chain hH1 and a humanized antibody heavy chain hH2. Further, examples of a light chain of a humanized antibody having CDRs in the light chain variable region of the D13 antibody, in which part of amino acids of the framework region in the variable region are substituted, include a humanized antibody light chain hL2, a humanized antibody light chain hL3, and a humanized antibody light chain hL4.

The full-length nucleotide sequence of the humanized antibody heavy chain hH1 is set forth in SEQ ID NO: 40, and the amino acid sequence thereof is set forth in SEQ ID NO: 41. Further, the full-length nucleotide sequence of the humanized antibody heavy chain hH2 is set forth in SEQ ID NO: 42, and the amino acid sequence thereof is set forth in SEQ ID NO: 43. In SEQ ID NOS: 40 and 42, a nucleotide sequence consisting of nucleotides 1 to 57 encodes the signal sequence, a nucleotide sequence consisting of nucleotides 58 to 417 encodes the variable region, and a nucleotide sequence consisting of nucleotides 418 to 1398 encodes the constant region. Further, in SEQ ID NOS: 41 and 43, an amino acid sequence consisting of amino acid residues 1 to 19 is an amino acid sequence of the signal sequence, an amino acid sequence consisting of amino acid residues 20 to 139 is an amino acid sequence of the variable region, and an amino acid sequence consisting of amino acid residues 140 to 466 is an amino acid sequence of the constant region. FIG. 11 shows a comparison of the amino acid sequences (including the signal sequences) of the variable region of the D13 antibody heavy chain, the variable region of the humanized antibody heavy chain hH1, and the variable region of the humanized antibody heavy chain hH2.

The anti-SIRPα antibody of the present invention includes antibodies having a heavy chain variable region consisting of amino acid residues 20 to 139 and a heavy chain constant region consisting of amino acid residues 140 to 466 in SEQ ID NO: 41 or 43.

The full-length nucleotide sequence of the humanized antibody light chain hL2 is set forth in SEQ ID NO: 34, and the amino acid sequence thereof is set forth in SEQ ID NO: 35. Further, the full-length nucleotide sequence of the humanized antibody light chain hL3 is set forth in SEQ ID NO: 36, and the amino acid sequence thereof is set forth in SEQ ID NO: 37. Further, the full-length nucleotide sequence of the humanized antibody light chain hL4 is set forth in SEQ ID NO: 38, and the amino acid sequence thereof is set forth in SEQ ID NO: 39. In SEQ ID NOS: 34, 36, and, 38, a nucleotide sequence consisting of nucleotides 1 to 60 encodes the signal sequence, a nucleotide sequence consisting of nucleotides 61 to 381 encodes the variable region, and a nucleotide sequence consisting of nucleotides 382 to 702 encodes the constant region. In SEQ ID NOS: 35, 37, and 39, an amino acid sequence consisting of amino acid residues 1 to 20 is an amino acid sequence of the signal sequence, an amino acid sequence consisting of amino acid residues 21 to 127 is an amino acid sequence of the variable region, and an amino acid sequence consisting of amino acid residues 128 to 234 is an amino acid sequence of the constant region. FIG. 12 shows a comparison of amino acid sequences (including the signal sequences) of the variable region of the D13 antibody light chain, the variable region of the humanized antibody light chain hL2, the variable region of the humanized antibody heavy chain hL3, and the variable region of the humanized antibody light chain hL4.

The anti-SIRPα antibody of the present invention includes antibodies comprising: a variable region consisting of amino acid residues 21 to 127; and a light chain constant region consisting of amino acid residues 128 to 234 in SEQ ID NO: 35, 37, or 39.

The heavy chain constant region of the humanized antibody is the heavy chain constant region IgG4proFALA, which is a heavy chain constant region of an IgG4 subclass and has the PRO mutation and the FALA mutation.

Examples of an antibody having a high binding property to human SIRPα and a high inhibitory activity against binding of SIRPα and CD47 include an antibody consisting of the humanized antibody heavy chain hH1 and the humanized antibody light chain hL3 (hD13_H1L3 antibody), an antibody consisting of the humanized antibody heavy chain hH1 and the humanized antibody light chain hL4 (hD13_H1L4 antibody), an antibody consisting of the humanized antibody heavy chain hH2 and the humanized antibody light chain hL2 (hD13_H2L2 antibody), and an antibody consisting of the humanized antibody heavy chain hH2 and humanized antibody light chain hL3 (hD13_H2L3 antibody).

The hD13_H1L3 antibody is an antibody having a heavy chain consisting of amino acid residues 20 to 466 in SEQ ID NO: 41 and a light chain consisting of amino acid residues 21 to 234 in SEQ ID NO: 37.

The hD13_H1L4 antibody is an antibody having a heavy chain consisting of amino acid residues 20 to 466 in SEQ ID NO: 41 and a light chain consisting of amino acid residues 21 to 234 in SEQ ID NO: 39.

The hD13_H2L2 antibody is an antibody having a heavy chain consisting of amino acid residues 20 to 466 in SEQ ID NO: 43 and a light chain consisting of amino acid residues 21 to 234 in SEQ ID NO: 35.

The hD13_H2L3 antibody is an antibody having a heavy chain consisting of amino acid residues 20 to 466 in SEQ ID NO: 43 and a light chain consisting of amino acid residues 21 to 234 in SEQ ID NO: 37.

It is known that a lysine residue at the carboxyl terminus of the heavy chain of an antibody produced in a cultured mammal cell is deleted (Tsubaki et al., Int. J. Biol. Macromol. 2013; 139-147). However, this deletion in the heavy chain sequence does not affect an ability to bind to an antigen or the effector functions (e.g., activation of complements and antibody dependent cytotoxic action) of an antibody. Therefore, the present invention also includes an antibody in which a lysine residue at the carboxyl terminus of the heavy chain is deleted.

Other Antibodies

The antibody of the present invention may be an antigen-binding fragment of an antibody having an antigen binding site of an antibody or a modified fragment thereof. The antibody fragment can be obtained by treating an antibody with a proteolytic enzyme, such as papain or pepsin, or modifying an antibody gene using a genetic engineering technique and expressing the gene in a suitable cultured cell. Among such antibody fragments, a fragment carrying all or part of functions of a full-length antibody molecule can be called an antigen-binding fragment of an antibody. Common examples of functions of an antibody include an antigen-binding activity, an activity to neutralize the antigen activity, an activity to enhance the antigen activity, an antibody-dependent cytotoxic activity, a complement-dependent cytotoxic activity, and a complement-dependent cell-mediated cytotoxic activity. The function of an antigen-binding fragment of an antibody in the present invention is a SIRPα binding activity.

Examples of antibody fragments include Fab, F(ab')2, variable region (Fv), a single chain Fv (scFv) which has Fv of the heavy chain and the light chain joined with a suitable linker, a diabody (diabodies), and a linear antibody, and a polyspecific antibody formed with antibody fragments. Further, Fab' which is a monovalent fragment of the variable region of an antibody obtained by treating F(ab')2 in a reducing condition is also included in the antibody fragments.

Further, the antibody of the present invention may be a polyspecific antibody having specificity to at least two different antigens. Usually, such a molecule binds to two different antigens (i.e., bispecific antibody), and the "polyspecific antibody" in the present invention encompasses an antibody having specificity to more (e.g., three different) antigens.

The polyspecific antibody of the present invention can be a full-length antibody or a fragment of such an antibody [e.g., F(ab')2 of a bispecific antibody]. A bispecific antibody can be produced by binding the heavy chains and the light chains (HL pairs) of two different antibodies or fusing a hybridoma producing different monoclonal antibodies to prepare a bispecific antibody-producing fusion cell (Millstein et al., Nature. 1983; 305, 537-539).

The antibody of the present invention may be a single-chain antibody (also referred to as scFv). The single-chain antibody is obtained by joining the heavy chain variable region and the light chain variable region of an antibody with a polypeptide linker [Pluckthun, The Pharmacology of Monoclonal Antibodies, 113 [Rosenberg and Moore Ed., Springer Verlag, New York, 269-315 (1994)], Nature Biotechnology. 2005; 23, 1126-1136]. Further, a BiscFv fragment prepared by connecting two scFvs with a polypeptide linker can also be used as a bispecific antibody.

Methods for preparing a single-chain antibody are well known in the technical field (for example, refer to U.S. Pat. Nos. 4,946,778, 5,260,203, 5,091,513, 5,455,030, and the like). In this scFv, the heavy chain variable region and the light chain variable region are joined with a linker that does not form a conjugate, preferably a polypeptide linker (Huston, J. S. et al., Proc. Natl. Acad. Sci. U.S.A. 1988; 85, 5879-5883). The heavy chain variable region and the light chain variable region in the scFv may be derived from the same antibody or separate antibodies. As a polypeptide linker that joins variable regions, for example, an arbitrary single-chain peptide consisting of 12 to 19 residues is used.

A DNA encoding scFv is obtained by amplifying a DNA by PCR using the whole sequence or a DNA portion encoding an intended amino acid sequence of a DNA encoding a heavy chain or a heavy chain variable region of the antibody and a DNA encoding a light chain or a light chain variable region as a template and a primer pair that defines both ends and subsequently amplifying the DNA by combining a DNA encoding a polypeptide linker portion and primer pairs that define both ends so that each thereof is joined with the heavy chain or the light chain.

Further, once the DNA encoding scFv is prepared, an expression vector containing the DNA and a host transformed with the expression vector can be obtained according to a usual method, and scFv can be obtained by using the host according to a usual method. These antibody fragments can be produced by the host by obtaining the gene thereof and expressing them in the same manner as described above.

The antibody of the present invention may have an antigen affinity that is increased by polymerization. The antibody to be polymerized may be one kind of antibody or a plurality of antibodies that recognize a plurality of epitopes of the same antigen. Examples of a method for polymerizing an antibody include binding of the IgG CH3 domain and two scFv, binding to streptavidin, and introduction of a helix-turn-helix motif.

The antibody of the present invention may be a polyclonal antibody, which is a mixture of two or more different anti-SIRPα antibodies comprising different amino acid sequences. One example of the polyclonal antibody is a mixture of two or more different antibodies having different CDRs. When a mixture of cells producing different antibodies is cultured, an antibody purified from the culture can be used as such a polyclonal antibody (refer to International Publication WO 2004/061104).

As a modified antibody, an antibody connected to various molecules such as polyethylene glycol (PEG) can be used.

The antibody of the present invention may be an antibody conjugated with another drug (immunoconjugate). Examples of such antibodies include antibodies conjugated to a radioactive substance or a compound having a pharmacological action (Nature Biotechnology. 2005; 23, 1137-1146).

Further, a method of obtaining a single-chain immunoglobulin by joining the full-length sequences of the heavy chain and the light chain of an antibody using an appropriate linker is also known (Lee, H-S. et al., Molecular Immunology. 1999; 36, 61-71; Schirrmann, T. et al., mAbs. 2010; 2(1), 1-4). When dimerized, a single-chain immunoglobulin can have a structure and an activity similar to those of an antibody which is essentially a tetramer. Further, the antibody of the present invention may be an antibody that has a single heavy chain variable region and does not have a light chain sequence. Such an antibody is called a single-domain antibody (sdAb) or a nanobody, and, in fact, it has been reported that such an antibody is observed in camels or llamas, with a maintained ability to bind to an antigen [Muyldemans S. et al., Protein Eng. 1994; 7(9), 1129-35; Hamers-Casterman C. et al., Nature. 1993; 363(6428), 446-8]. The above-mentioned antibody can also be interpreted as one type of the antigen-binding fragment of antibody in the present invention.

Method for Producing Antibody

The antibody of the present invention can be produced in a cell as a recombinant antibody by inserting a DNA encoding a heavy chain variable region or a DNA encoding a light chain variable region into an expression vector, transforming a host cell for expression with the vector, and culturing the host cell.

As a DNA encoding an antibody, a DNA encoding the heavy chain is obtained by ligating a DNA encoding the heavy chain variable region and a DNA encoding the heavy chain constant region, and a DNA encoding the light chain is further obtained by ligating a DNA encoding the light chain variable region and a DNA encoding the light chain constant region.

The anti-SIRPα antibody of the present invention can be produced by inserting the above-mentioned DNA encoding the heavy chain and DNA encoding the light chain into an expression vector, transforming a host cell with the vector, and culturing the host cell. At this time, the above-mentioned DNA encoding the heavy chain and DNA encoding the light chain may be introduced into the same expression vector and the host cell may be transformed with the vector, or the DNA encoding the heavy chain and DNA encoding the light chain may be inserted into separate vectors and the host cell may be transformed with the two vectors. At this time, DNAs encoding the heavy chain variable region and the light chain variable region may be introduced into a vector into which a DNA encoding the heavy chain constant region and the DNA encoding a light chain constant region have been introduced beforehand. Further, the vector may contain a DNA encoding a signal peptide, which promotes secretion of an antibody from a host cell. In this case, the DNA encoding the signal peptide and the DNA encoding the antibody are ligated in-frame beforehand. An antibody can be obtained as a mature protein by removing the signal peptide after an antibody is produced.

At this time, the DNA encoding the heavy chain variable region, the DNA encoding the light chain variable region, the DNA obtained by ligating the DNA encoding the heavy chain variable region and the DNA encoding the heavy chain constant region, or the DNA obtained by ligating the DNA encoding the light chain variable region and the DNA encoding the light chain constant region may be functionally joined with elements such as a promoter, an enhancer, and a polyadenylation signal. The expression "functionally joined" used herein means joining elements so that they perform their functions.

Examples of an expression vector are not particularly limited as long as it can be replicated in a host, such as an animal cell, bacterium, and yeast, and include known plasmids and phages. Examples of a vector used to construct an expression vector include pcDNA (trade name) (Thermo Fisher Scientific Inc.), Flexi (registered trade name) vector (Promega), pUC19, pUEX2 (Amersham Pharmacia Biotech), pGEX-4T, pKK233-2 (Pharmacia), and pMAMneo (Clontech Laboratories, Inc.). As host cells, prokaryotic cells such as *Escherichia coli* and *Bacillus subtilis* and eukaryotic cells such as yeasts and animal cells can be used, but eukaryotic cells are preferably used. Examples of animal cells include HEK293 cell, which is a human embryonic kidney cell line, and Chinese hamster ovary (CHO) cell. It is sufficient to introduce an expression vector into a host cell by a known method to transform the host cell. Examples of the method include an electroporation method, a calcium phosphate precipitation method, and a DEAE-dextran transfection method. The produced antibody can be purified by usual protein isolation or purification methods. For example, affinity chromatography or other chromatography techniques, filtration, ultrafiltration, salting out, dialysis, and the like can be suitably selected and combined.

Anti-Tumor Agents

The present invention encompasses an anti-tumor agent comprising the anti-SIRPα antibody of the present invention as an active ingredient. However, the heavy chain constant region of the anti-SIRPα antibody of the present invention is a heavy chain constant region of the IgG4 subclass, which is the IgG4proFALA heavy chain constant region that has the PRO mutation and the FALA mutation, does not have effector functions, and has only a function of inhibiting transmission of a "Don't-eat-me" signal by inhibiting binding of SIRPα and CD47. Therefore, the anti-SIRPα antibody of the present invention alone cannot damage tumor cells sufficiently. Accordingly, the present invention is used in combination with other anti-tumor agents that have effector functions and can attack and damage tumor cells or with other anti-tumor agents that inhibit an immune checkpoint in an immune cell induced by tumor cells. Other anti-tumor agents for combination use bind to a tumor cell and can bring the tumor cell into contact with a phagocyte, such as macrophage. At this time, the anti-SIRPα antibody of the present invention inhibits binding of CD47 on the tumor cell and SIRPα in the phagocyte, thereby enhancing the phagocytic activity of the phagocyte against the tumor cell, resulting in tumor cell injury. That is, synergistic anti-tumor effects can be exhibited by using the anti-SIRPα antibody of the present invention and other anti-tumor agents in combination.

Examples of the anti-tumor agent to be used in combination with the anti-SIRPα antibody of the present invention include immune checkpoint inhibitors and antibody drugs that binds specifically to a cancer antigen to have the ADCC and/or ADCP activity. Examples of the immune checkpoint inhibitors include inhibitors of binding of PD-1 and PD-L1, a ligand thereof, and CTLA4 inhibitors, and specific examples thereof include anti-PD-1 antibodies (nivolumab, pembrolizumab, cemiplimab, spartalizumab, PDR-001, BI 754091), anti-PD-L1 antibodies (atezolizumab, avelumab, durvalumab), and anti-CTLA4 antibodies (ipilimumab, tremelimumab). Further, examples of antibody drugs that responds specifically to a cancer antigen to have the ADCC and/or ADCP activity include an anti-CD20 antibody (rituximab), an anti-HER2 antibody (trastuzumab), an anti-EGFR antibody (cetuximab), and an anti-CD52 antibody (alemtuzumab).

ADCC refers to a cell-mediated reaction that an Fcγ receptor-expressing nonspecific cytotoxic cell (e.g., NK cell, neutrophil, and macrophage) recognizes an antibody binding onto a target cell and then induces lysis of the target cell. FcγRIIC and FcγRIIIA are expressed in an NK cell, which is the primary cell responsible for ADCC, and FcγRI, FcγRIIA, FcγRIIC, and FcγRIIIA are expressed in a monocyte. Meanwhile, ADCP refers to an Fc receptor-expressing cell-mediated reaction that a phagocyte (e.g., macrophage, neutrophil) recognizes an antibody binding onto the target cell and then induces phagocytosis of the target cell into the cell. FcγRI, FcγRIIA, FcγRIIC, and FcγRIIIA are expressed in a monocyte, which is the primary cell responsible for ADCP.

The present invention includes an anti-tumor agent comprising an anti-SIRPα antibody as an active ingredient, which is used in combination with the above-mentioned other anti-tumor agents.

Further, the present invention includes an anti-tumor agent or a kit containing both an anti-tumor agent comprising an anti-SIRPα antibody as an active ingredient and the above-mentioned other anti-tumor agents.

An anti-tumor agent comprising the anti-SIRPα antibody of the present invention as an active ingredient and the above-mentioned other anti-tumor agents may be administered simultaneously or sequentially. Further, the administration sequence is not limited, and other anti-tumor agents may be administered after an anti-tumor agent comprising the anti-SIRPα antibody of the present invention as an active ingredient has been administered, or an anti-tumor agent comprising the anti-SIRPα antibody of the present invention as an active ingredient may be administered after other anti-tumor agents have been administered.

The anti-tumor agent of the present invention can be used for one type or two or more types of tumors selected from carcinoma, sarcoma, lymphoma, leukemia, myeloma, germinoma, brain tumor, carcinoid, neuroblastoma, retinoblastoma, and nephroblastoma. Specific examples of carcinoma include kidney cancer, melanoma, squamous cell cancer, basal cell cancer, conjunctival cancer, oral cancer, laryngeal cancer, pharyngeal cancer, thyroid cancer, lung cancer, breast cancer, esophageal cancer, gastric cancer, duodenal cancer, small intestinal cancer, colon cancer, rectal cancer, appendix cancer, anal cancer, liver cancer, gallbladder cancer, biliary cancer, pancreatic cancer, adrenal cancer, bladder cancer, prostate cancer, uterine cancer, and vaginal cancer. Specific examples of sarcoma include liposarcoma, angiosarcoma, chondrosarcoma, rhabdomyosarcoma, Ewing's sarcoma, osteosarcoma, undifferentiated pleomorphic sarcoma, myxofibrosarcoma, malignant peripheral neurilemmoma, retroperitoneal sarcoma, synoviosarcoma, uterine sarcoma, gastrointestinal stromal tumor, leiomyosarcoma, and epithelioid sarcoma. Specific examples of lymphoma include B-cell lymphoma, NK/T-cell lymphoma, and Hodgkin's lymphoma. Specific examples of leukemia include myeloid leukemia, lymphatic leukemia, myeloproliferative disease, and myelodysplastic syndrome. Specific examples of myeloma include multiple myeloma. Specific examples of germinoma include testicular cancer and ovarian cancer. Specific examples of brain tumor include neuroglioma and meningioma.

The anti-SIRPα antibody of the present invention enhances cell-mediated immunity when it is used in combination with other anti-tumor agents. The present invention also encompasses a cell-mediated immunity enhancer comprising the anti-SIRPα antibody as an active ingredient. In the cell-mediated immunity enhancer, cell-mediated immunity is enhanced along with enhancement of the functions of natural killer cells and/or T cells.

The anti-tumor agent of the present invention can contain an anti-SIRPα antibody in an amount effective for treatment, as well as pharmaceutically acceptable carriers, diluents, solubilizers, emulsifiers, preservatives, aids, and the like. The "pharmaceutically acceptable carriers" and the like can be suitably selected from a broad range according to the type of a target disease and the dosage form of a drug. An administration method for the anti-tumor agent of the present invention can be suitably selected. For example, the anti-tumor agent can be injected, and local injection, intraperitoneal injection, selective intravenous infusion, intravenous injection, subcutaneous injection, organ perfusate infusion, and the like can be employed. Further, an injection solution can be formulated using a carrier comprising a salt solution, a glucose solution, or a mixture of salt water and a glucose solution, various types of buffer solutions, or the like. Further, a powder may be formulated and mixed with a liquid carrier to prepare an injection solution before use.

Other administration methods can be suitably selected along with development of a formulation. For example, oral solutions, powders, pills, capsules, tablets, and the like can be applied for oral administration. For oral solutions, oral liquid preparations such as suspensions and syrups can be produced using water, saccharides such as sucrose, sorbitol, and fructose, glycols such as polyethylene glycol, oils such as sesame oil and soybean oil, preservatives such as alkyl parahydroxybenzoates, flavors such as strawberry flavor and peppermint, and the like. Powders, pills, capsules, and tablets can be formulated using excipients such as lactose, glucose, sucrose, and mannitol, disintegrating agents such as starch and alginate soda, lubricants such as magnesium stearate and talc, binders such as polyvinyl alcohol, hydroxypropyl cellulose, and gelatin, surfactants such as fatty acid esters, plasticizers such as glycerin, and the like. Tablets and capsules are preferred unit dosage forms for the composition of the present invention in that they are easily administered. Solid production carriers are used to produce tablets and capsules.

The effective dose of an antibody used for treatment can be changed according to characteristics of symptoms to be treated and the patient's age and condition and can be finally determined by a physician. For example, one dose is 0.0001 mg to 100 mg per kg of body weight. The predetermined dose may be administered once every one to 180 days, or the dose may be divided into two doses, three doses, four doses, or more doses per day at appropriate intervals.

EXAMPLES

The present invention is specifically described by the following examples, but these examples are not intended to limit the scope of the present invention.

Example 1. Preparation of Rat Anti-SIRPA Antibody

1)-1 Preparation of Expression Construct
1)-1-1 Construction of SIRPA_V1_ECD Expression Vector A DNA encoding a polypeptide obtained by linking HHHHHH to amino acids 1 to 373 on the C terminal side of the amino acid sequence of human SIRPA_V1 (NCBI Protein Database accession number NP_001035111) and a vector obtained by digesting pcDNA3.3-TOPO/LaxZ (Thermo Fisher Scientific Inc.) with restriction enzymes XbaI and PmeI were bound using In-Fusion HD Cloning Kit (Clontech Laboratories Inc.) to prepare a SIRPA_V1_ECD expression vector. The amino acid sequence of SIRPA_V1_ECD is set forth in SEQ ID NO: 45 in the sequence listing, and the nucleotide sequence encoding SIRPA_V1_ECD is set forth in SEQ ID NO: 44 in the sequence listing.

1)-1-2 Construction of SIRPA_V1_IgV Expression Vector

A SIRPA_V1_IgV expression vector was prepared in the same manner as in 1)-1-1 using a DNA encoding a polypeptide obtained by linking HHHHHH to amino acids 1 to 149 on the C terminal side of the amino acid sequence of SIRPA_V1 (NCBI Protein Database accession number NP_001035111). The amino acid sequence of SIRPA_V1_IgV is set forth in SEQ ID NO: 47 in the sequence listing, and the nucleotide sequence encoding SIRPA_V1_IgV is set forth in SEQ ID NO: 46 in the sequence listing.

1)-1-3 Construction of SIRPA_V2_ECD Expression Vector

A SIRPA_V2_ECD expression vector was prepared in the same manner as in 1)-1-1 using a DNA encoding a polypeptide obtained by linking HHHHHH to amino acids 1 to 372 on the C terminal side of the amino acid sequence of SIRPA_V2 [obtained by modifying the V1 sequence shown in JBC. 2014; 289(14), 10024]. The amino acid sequence of SIRPA_V2_ECD is set forth in SEQ ID NO: 49 in the sequence listing, and the nucleotide sequence encoding SIRPA_V2_ECD is set forth in SEQ ID NO: 48 in the sequence listing.

1)-1-4 Construction of SIRPA_V2_IgV Expression Vector

A SIRPA_V2_IgV expression vector was prepared in the same manner as in 1)-1-1 using a DNA encoding a polypeptide obtained by linking HHHHHH to amino acids 1 to 148 on the C terminal side of the amino acid sequence of SIRPA_V2. The amino acid sequence of SIRPA_V2_IgV is set forth in SEQ ID NO: 51 in the sequence listing, and the nucleotide sequence encoding SIRPA_V2_IgV is set forth in SEQ ID NO: 50 in the sequence listing.

1)-1-5 Construction of cSIRPA_ECD Expression Vector

A cSIRPA_ECD expression vector was prepared in the same manner as in 1)-1-1 using a DNA encoding a polypeptide obtained by linking HHHHHH to amino acids 1 to 372 on the C terminal side of the amino acid sequence of cSIRPA (NCBI Protein Database accession number NP_001271679). The amino acid sequence of cSIRPA_ECD is set forth in SEQ ID NO: 53 in the sequence listing, and the nucleotide sequence encoding cSIRPA_ECD is set forth in SEQ ID NO: 52 in the sequence listing.

1)-1-6 Construction of CD47-Fc Expression Vector

A CD47-Fc expression vector was prepared in the same manner as in 1)-1-1 using a DNA encoding a polypeptide of human CD47 (NCBI Protein Database accession number NP_001768). The amino acid sequence of CD47-Fc is set forth in SEQ ID NO: 55 in the sequence listing, and the nucleotide sequence encoding SIRPA_V1_ECD is set forth in SEQ ID NO: 54 in the sequence listing.

1)-2 Preparation of Recombinant Proteins
1)-2-1 Preparation of SIRPA_V1_ECD

SIRPA_V1_ECD was expressed transiently by transfecting FreeStyle 293F Cells (Thermo Fisher Scientific Inc.) with the SIRPA_V1_ECD expression vector prepared in 1)-1-1. The culture supernatant was added to a HisTrap excel (GE Healthcare Japan) equilibrated with 3×PBS, and the column was washed with 3×PBS. Subsequently, fractions were eluted with 3×PBS containing 500 mM imidazole (pH 7.5). SIRPA_V1_ECD was purified from the collected SIRPA_V1_ECD fractions using HiLoad 26/600 Superdex 75 pg (GE Healthcare Japan).

1)-2-2 Preparation of SIRPA_V1_IgV

SIRPA_V1_IgV was expressed transiently by transfecting FreeStyle 293F Cells (Thermo Fisher Scientific Inc.) with the SIRPA_V1_IgV expression vector prepared in 1)-1-2. The culture supernatant was added to a HisTrap excel (GE Healthcare Japan) equilibrated with 3×PBS, and the column was washed with 3×PBS. Subsequently, fractions were eluted with 3×PBS containing 500 mM imidazole (pH 7.5). SIRPA_V1_IgV was purified from the collected SIRPA_V1_IgV fractions using HiLoad 26/600 Superdex 75 pg (GE Healthcare Japan).

1)-2-3 Preparation of SIRPA_V2_ECD

SIRPA_V2_ECD was purified in the same manner as in 1)-2-1 using the SIRPA_V2_ECD expression vector prepared in 1)-1-3.

1)-2-4 Preparation of SIRPA_V2_IgV

SIRPA_V2_ECD was purified in the same manner as in 1)-2-2 using the SIRPA_V2_ECD expression vector prepared in 1)-1-4.

1)-2-5 Preparation of cSIRPA_ECD cSIRPA_ECD was purified in the same manner as in 1)-2-1 using the cSIRPA_ECD expression vector prepared in 1)-1-5.

1)-2-6 Preparation of CD47-Fc

CD47-Fc was expressed transiently by transfecting FreeStyle 293F Cells (Thermo Fisher Scientific Inc.) with the CD47-Fc expression vector. All the culture supernatant was added to MabSelect SuRe (GE Healthcare Japan) equilibrated with PBS, and then the column was washed with PBS. Subsequently, fractions were eluted with a 2 M arginine hydrochloride solution (pH 4.0) to collect a fraction containing CD47-Fc. CD47-Fc was purified from the collected CD47-Fc fraction using HiLoad 26/600 Superdex 200 pg (GE Healthcare Japan).

1)-3 Immunization

For immunization, female WKY/Izm rats (Japan SLC, Inc.) were used and given a mixture of each of the antigen proteins SIRPA_V1_ECD, SIRPA_V1_IgV, SIRPA_V2_ECD, and SIRPA_V2_IgV prepared in 1)-2 and Freund's Complete Adjuvant (Wako Pure Chemical Industries, Ltd.) to the base of the tail. The lymph nodes and the spleen were collected from the rats and used to prepare a hybridoma.

1)-4 Preparation of Hybridoma

Lymph node cells or spleen cells were electrofused with mouse myeloma SP2/0-ag14 cells (ATCC, CRL-1581) using LF301-Cell Fusion Unit (BEX), and the fused cells were diluted and cultured in ClonaCell-HY Selection Medium D (Stem Cell Technologies Inc.). A monoclonal hybridoma was prepared by collecting emerging hybridoma colonies. The collected hybridoma colonies were each cultured, and the obtained hybridoma culture supernatants were used to screen for an anti-SIRPA antibody-producing hybridoma.

1)-5 Construction of Expression Vector for Screening for Antigen-Binding Antibody 1)-5-1 Construction of Vector Expressing Human SIRPA_V1 and V2 (pcDNA3.2 V5-DEST-SIRPA_V1_ECD and SIRPA_V2_ECD)

The cDNAs encoding a human SIRPA_V1 protein (NP_001035111) or a human SIRPA_V2 protein [obtained by modifying NP_001035111 on the basis of JBC. 2014; 289(14), were cloned in a vector pcDNA3.2 V5-DEST vector to construct pcDNA3.2 V5-DEST-SIRPA_V1_ECD and V2_ECD (or pcDNA3.2 V5-DEST-SIRPA_V1 and V2), which expressed the respective proteins. The amino acid sequence of the human SIRPA_V1 protein is set forth in SEQ ID NO: 56 in the sequence listing, and the amino acid sequence of the human SIRPA_V2 protein is set forth in SEQ ID NO: 57 in the sequence listing.

1)-5-2 Construction of Vectors Expressing Monkey SIRPA and Mouse SIRPA (pcDNA3.2 V5-DEST-Monkey SIRPA, pFLAG V5-DEST-Monkey SIRPA, and pFLAG V5-DEST-Mouse SIRPA)

The cDNAs encoding a monkey SIRPA protein (NP_001271679) or mouse SIRPA proteins (C57BL/6, NP_031573; BALB/c, BAA20376; 129, P97797; NOD, modified SCID in Immunology. 2014; 143, 61-67) were cloned in a pcDNA3.2 V5-DEST vector or a pFLAG V5-DEST vector to construct vectors pcDNA3.2 V5-DEST-monkey SIRPA, pFLAG V5-DEST-monkey SIRPA, and pFLAG V5-DEST-mouse SIRPA (C57BL/6, BALB/c, 129, NOD), which expressed the respective proteins. The amino acid sequence of monkey SIRPA is set forth in SEQ ID NO: 58 in the sequence listing, the amino acid sequence of mouse SIRPA_C57BL/6 is set forth in SEQ ID NO: 59 in the sequence listing, the amino acid sequence of mouse SIRPA_BALB/c is set forth in SEQ ID NO: 60 in the sequence listing, the amino acid sequence of mouse SIRPA_129 is set forth in SEQ ID NO: 61 in the sequence listing, and the amino acid sequence of mouse SIRPA_NOD is set forth in SEQ ID NO: 62 in the sequence listing.

1)-6 Hybridoma Screening

1)-6-1 Preparation of Antigen Gene Expressing Cells for Cell-Based ELISA

HEK293α cells (a stably expressing cell line derived from HEK293, which expresses integrin αv and integrin β3) were prepared in a 10% FBS-containing DMEM medium at $7.5 \times 10^5$ cells/mL. According to a transfection procedure using Lipofectamine 2000 (Thermo Fisher Scientific Inc.), pcDNA3.2 V5-DEST-SIRPA_V1 or pcDNA3.2 V5-DEST-SIRPA_V2, or pcDNA3.2 V5-DEST as a control was introduced into the cells, and 50 µL per well was aliquoted into a 96-half area well plate (Corning Incorporated) or 100 µL per well was aliquoted into a 96-well plate (Corning Incorporated), and cells were cultured in a 10% FBS-containing DMEM medium at 37° C. under a 5% $CO_2$ condition for 24 to 27 hours. The obtained introduced cells were used for cell-based ELISA in a state that cells adhered to each other.

1)-6-2 Evaluation of Binding to Human SIRPA (Cell-Based ELISA)

After the culture supernatant of the expression vector-introduced 293α cells prepared in Example 1)-6-1 was removed, the hybridoma culture supernatant was added to each of pcDNA3.2 V5-DEST-SIRPA_V1, pcDNA3.2 V5-DEST-SIRPA_V2, or pcDNA3.2 V5-DEST-introduced 293α cells, and the mixture was allowed to stand at 4° C. for one hour. Cells in the wells were washed twice with 5% FBS-containing PBS, followed by addition of Anti-Rat IgG Peroxidase antibody produced in rabbit (SIGMA) diluted 500-fold with 5% FBS-containing PBS, and the mixture was allowed to stand at 4° C. for one hour. Cells in the wells were washed twice with 5% FBS-containing PBS, followed by addition of 50 µL per well of an OPD coloration solution [o-phenylenediamine dihydrochloride (Wako Pure Chemical Industries, Ltd.) and $H_2O_2$ were dissolved in an OPD solution (0.05 M trisodium citrate, 0.1 M disodium hydrogen phosphate dodecahydrate, pH 4.5) at 0.4 mg/mL and 0.6% (v/v), respectively]. A coloration reaction was performed with stirring occasionally, 50 µL per well of 1 M HCL was added to terminate the coloration reaction, and then absorbance at 490 nm was measured with a plate reader (En Vision: PerkinElmer Inc.). To select a hybridoma producing an antibody that specifically binds to SIRPA expressed on the cell membrane surface, a hybridoma producing a culture supernatant with a higher absorbance with the pcDNA3.2 V5-DEST-SIRPA_V1 or pcDNA3.2 V5-DEST-SIRPA_V2 expression vector-introduced 293α cells than with the control pcDNA3.2 V5-DEST-introduced 293α cells was selected as being positive for production of an anti-SIRPA antibody.

1)-6-3 Evaluation of SIRPA-CD47 Binding Inhibitory Activity

After the culture supernatant of the expression vector-introduced 293α cells prepared in Example 1)-6-1 was removed, the hybridoma culture supernatant was added to each of pcDNA3.2 V5-DEST-SIRPA_V1, pcDNA3.2 V5-DEST-SIRPA_V2, or pcDNA3.2 V5-DEST-introduced 293α cells, immediately followed by addition of 50 µL per well of peroxidase-labeled CD47-Fc prepared with 5% FBS-containing PBS at a final concentration of 10,000 ng/mL, and the mixture was allowed to stand at 4° C. for one hour. The cells in the well were washed twice with 5% FBS-containing PBS, followed by addition of 100 µL per well of an OPD coloration solution [o-phenylenediamine dihydrochloride (Wako Pure Chemical Industries, Ltd.) and $H_2O_2$ were dissolved in an OPD solution (0.05 M trisodium citrate, 0.1 M disodium hydrogen phosphate dodecahydrate, pH 4.5) at 0.4 mg/mL and 0.6% (v/v), respectively]. A coloration reaction was performed with stirring occasionally, 100 µL per well of 1 M HCl was added to terminate the coloration reaction, and then absorbance at 490 nm was measured with a plate reader (SpectraMax: Molecular Devices, LLC). To select a hybridoma producing an antibody that specifically inhibits binding of SIRPA expressed on the cell membrane surface and CD47-Fc, a hybridoma producing a culture supernatant having a lower absorbance with the pcDNA3.2 V5-DEST-SIRPA_V1 or pcDNA3.2 V5-DEST-SIRPA_V2 expression vector-introduced 293α cells than with a group prepared by adding the control medium was selected as being positive for production of an anti-SIRPA antibody that had a ligand-binding inhibitory activity.

1)-6-4 Analysis of Species Cross-Reactivity With Mouse or Monkey SIRPA

After the culture supernatant of the pcDNA3.2 V5-DEST-monkey SIRPA or pcDNA3.2 V5-DEST-mouse SIRPA expression vector-introduced 293α cells or the pcDNA3.2

V5-DEST-introduced 293α cells prepared in Example 1)-5-2 was removed, the binding to monkey or mouse SIRPA was evaluated in the same manner as the method for evaluating the human SIRPA binding activity. A total of seven clones of antibodies D13, F42, F44, F47, F60, F63, and F86 were selected on the basis of the above-mentioned binding activity to SIRPA of humans and other animal species and the SIRPA-CD47 binding inhibitory activity.

1)-7 Isotype Determination of Antibodies

From the obtained rat anti-SIRPA antibody-producing hybridomas, hybridomas producing the D13, F42, F44, F47, F60, F63, and F86 antibodies, which showed a highly specific binding to human SIRPA_V1 and SIRPA_V2 and monkey SIRPA and were therefore suggested to have a high SIRPA-CD47 binding inhibitory activity, were selected, and antibody isotypes thereof were identified. The isotypes were determined using Rat Immunoglobulin Isotyping ELISA Kit (BD Pharmingen). The results demonstrated that the isotype of rat anti-SIRPA monoclonal antibodies D13, F42, F60, and F86 was IgG1/κ chain, the isotype of F44 and F47 was IgG2a/κ chain, and the isotype of F63 was IgG2a/λ chain.

1)-8 Preparation of Monoclonal Antibodies

1)-8-1 Preparation of Culture Supernatants

Seven different rat anti-SIRPA monoclonal antibodies were purified from the hybridoma culture supernatants. First, each antibody-producing hybridoma was proliferated to a sufficient amount using ClonaCell-HY Selection Medium E (STEMCELL Technologies Inc.), and then the medium was exchanged with 5 µg/mL gentamicin (Thermo Fisher Scientific Inc.)—containing Hybridoma SFM (Thermo Fisher Scientific Inc.) to which 20% Ultra Low IgG FBS (Thermo Fisher Scientific Inc.) was added, and hybridoma was cultured for 7 days. The culture supernatant was collected and sterilized through a 0.22-µm filter (Corning Incorporated).

1)-8-2 Purification of Antibodies

Antibodies were purified from the hybridoma culture supernatants prepared in Example 1)-8-1 by protein G affinity chromatography. An antibody was adsorbed in Protein G Column (GE Healthcare Bioscience Corp.), the column was washed with PBS, and then the antibody was eluted with 0.1 M glycine/hydrochloric acid aqueous solution (pH 2.7). The eluate was adjusted to pH 7.0 to 7.5 by adding 1 M Tris-HCl (pH 9.0), the buffer was replaced with PBS using Centrifugal UF Filter Device VIVASPIN20 (molecular weight cutoff for ultrafiltration, 30 kDa: Sartorius AG), and the antibody solution was concentrated to an antibody concentration of 2 mg/mL or higher. Finally, the solution was filtered with a Minisart-Plus filter (Sartorius AG) to obtain a purified sample.

Example 2. In Vitro Evaluation of Seven Different Rat Anti-Human SIRPA Antibodies 2)-1 Construction of Expression Vectors for Screening for Antigen-Binding Antibody 2)-1-1 Construction of FLAG-Human SIRPA Expression Vector (pFLAG V5-DEST-SIRPA_V1-V10)

cDNAs encoding 10 different human SIRPA variant proteins (excerpt from Nature Immunology. 2007; 8, 1313-1323) were cloned in a pFLAG V5-DEST vector to construct pFLAG V5-DEST-SIRPA_V1-V10, a vector expressing these variant proteins.

The amino acid sequence of human SIRPA_V3 is set forth in SEQ ID NO: 63 in the sequence listing, the amino acid sequence of human SIRPA_V4 is set forth in SEQ ID NO: 64 in the sequence listing, the amino acid sequence of human SIRPA_V5 is set forth in SEQ ID NO: 65 in the sequence listing, the amino acid sequence of human SIRPA_V6 is set forth in SEQ ID NO: 66 in the sequence listing, the amino acid sequence of human SIRPA_V7 is set forth in SEQ ID NO: 67 in the sequence listing, the amino acid sequence of human SIRPA_V8 is set forth in SEQ ID NO: 68 in the sequence listing, the amino acid sequence of human SIRPA_V9 is set forth in SEQ ID NO: 69 in the sequence listing, and the amino acid sequence of human SIRPA_V10 is set forth in SEQ ID NO: 70 in the sequence listing.

2)-1-2-1 Construction of Vector Expressing Human SIRPA_ECD, IgV, and IgV_IgC1 (pFLAG V5-DEST-SIRPA_ECD and IgVIgV_IgC1)

cDNAs encoding amino acids 1 to 504 of the full-length human SIRPA_V2, a variant deficient in a region of amino acids 165 to 371 (hereinafter referred to as "IgV variant"), and a variant deficient in a region of amino acids 225 to 371 (hereinafter referred to as "IgV_IgC variant") were cloned in a pFLAG V5-DEST vector to construct a vector expressing the respective variant proteins.

The amino acid sequence of the human SIRPA_V2_IgV variant is set forth in SEQ ID NO: 71 in the sequence listing, and the amino acids of the human SIRPA_V2_IgV_IgC1 variant are set forth in SEQ ID NO: 72 in the sequence listing.

2)-1-2-2 Construction of Vector Expressing hmSIRPA_Δ0, Δ1, and Δ2_Mouse SIRPA (pFLAG V5-DEST-hmSIRPA_Δ0, Δ1, and Δ2)

A SIRPA variant in which the SFTGE sequence (SEQ ID NO: 78) consisting of amino acid residues 81 to 85 set forth in SEQ ID NO: 60 of the mouse SIRPA was substituted by the NQKEG sequence (SEQ ID NO: 76), and the RGSSE sequence consisting of amino acid residues 126 to 130 (SEQ ID NO: 79) was substituted by the KGS sequence was designated as hmSIRPA_Δ0. A SIRPA variant in which the SFTGE sequence (SEQ ID NO: 78) consisting of amino acid residues 81 to 85 set forth in SEQ ID NO: 60 of the mouse SIRPA was substituted by the NQKEE sequence (SEQ ID NO: 77) was designated as hmSIRPA_Δ1. Further, a SIRPA variant in which the SFTGE sequence (SEQ ID NO: 78) consisting of amino acid residues 81 to 85 set forth in SEQ ID NO: 60 of the mouse SIRPA was substituted by the SFTEG sequence (SEQ ID NO: 80) was designated as hmSIRPA_Δ2. The cDNAs encoding these SIRPA variants were cloned in a pFLAG V5-DEST vector to construct a vector expressing the respective SIRPA variants.

The amino acid sequence of hmSIRPA_Δ0 is set forth in SEQ ID NO: 73 in the sequence listing, the amino acids of hmSIRPA_Δ1 are set forth in SEQ ID NO: 74 in the sequence listing, and the amino acids of hmSIRPA_Δ2 are set forth in SEQ ID NO: 75 in the sequence listing.

2)-2 Evaluation of Binding to Human SIRPA Variants V1 to V10

After the culture supernatant of 293α cells into which the vector expressing 10 different variant proteins prepared in Example 2)-1-1 was introduced was removed, 50 µL per well of a purified rat anti-human SIRPA antibody diluted with 5% FBS-containing PBS to a final concentration of 10,000 ng/mL was added to each of pFLAG V5-DEST-SIRPA_V1-V10 and pFLAG V5-DEST-introduced 293α cells, and the mixture was allowed to stand at 4° C. for one hour. Further, 50 µL per well of an anti-FLAG M2 antibody (SIGMA) diluted with 5% FBS-containing PBS to a final concentration of 10,000 ng/mL was added to a well for detecting expression of each SIRPA variant, and the mixture was allowed to stand at 4° C. for one hour. Thereafter, binding to 10 different human SIRPA variants was evaluated in the same manner as in the evaluation of the binding activity of the human SIRPA described in 1)-6-2. Binding of the rat anti-human SIRPA antibodies to each variant was standardized by expression of the FLAG tag.

As shown in Table 1, all the clones showed binding to all the variants.

TABLE 1

Binding of rat anti-human SIPRA antibodies to human SIPRA variants V1 to V10 hSIRPA-binding activity (variants)

| Clone ID | V1 | V2 | V3 | V4 | V5 | V6 | V7 | V8 | V9 | V10 |
|---|---|---|---|---|---|---|---|---|---|---|
| D13 | ++ | ++ | ++ | ++ | ++ | ++ | ++ | ++ | ++ | ++ |
| F42 | ++ | ++ | + | ++ | ++ | ++ | +++ | ++ | + | ++ |
| F44 | +++ | +++ | +++ | +++ | +++ | +++ | ++ | +++ | ++ | +++ |
| F47 | +++ | +++ | +++ | +++ | ++ | +++ | +++ | +++ | +++ | +++ |
| F60 | ++ | ++ | ++ | ++ | + | + | + | + | ++ | ++ |
| F63 | +++ | +++ | +++ | +++ | +++ | +++ | +++ | +++ | +++ | +++ |
| F86 | + | ++ | ++ | ++ | + | + | + | + | ++ | ++ |

2)-3 Analysis of Species Cross-Reactivity With Mouse or Monkey SIRPA

After the culture supernatant of 293α cells into which the pFLAG V5-DEST-monkey SIRPA or pFLAG V5-DEST-mouse SIRPA expression vector was introduced and the pFLAG V5-DEST-introduced 293α cells prepared in Example 1)-5-2 was removed, binding to monkey or mouse SIRPA was evaluated in the same manner as for the binding activity of human SIRPA.

As shown in Table 2, all the rat anti-human SIRPA antibodies showed binding to monkey SIRPA but did not show binding to mouse SIRPA.

TABLE 2

Species cross-reactivity of rat anti-human SIPRA antibodies SIRPA-binding activity (animal species)

| Clone ID | Cynomolgus monkey | BALB/c | C57BL/6 | 129 | NOD SCID |
|---|---|---|---|---|---|
| D13 | ++ | − | − | − | − |
| F42 | ++ | − | − | − | − |
| F44 | +++ | − | − | − | − |
| F47 | ++ | − | − | − | − |
| F60 | ++ | − | − | − | − |
| F63 | +++ | − | − | − | − |
| F86 | ++ | − | − | − | − |

2)-4 Epitope Analysis

2)-4-1-1 Epitope Analysis by Cell-Based ELISA (1)

After the culture supernatant of 293α cells into which the pFLAG V5-DEST-ECD variant, IgV variant, and IgV_IgC1 variant expression vector prepared in 2)-1-2-1 was introduced or the pFLAG V5-DEST-introduced 293α cells was removed, 50 μL of well of purified rat anti-human SIRPA antibodies diluted with 5% FBS-containing PBS to a final concentration of 10,000 ng/mL were added to the respective cells, and the mixture was allowed to stand at 4° C. for one hour. Further, 50 μL per well of an anti-FLAG M2 antibody (SIGMA) diluted with 5% FBS-containing PBS to a final concentration of 10,000 ng/ml was added to a well for detecting expression of each SIRPA construct, and the mixture was allowed to stand at 4° C. for one hour. Thereafter, binding of the seven purified antibody clones to each domain was evaluated in the same manner as in the evaluation of the binding activity of the human SIRPA. Binding of the rat anti-human SIRPA antibodies to each construct was standardized by expression of the FLAG tag.

Given that the rat anti-human SIRPA antibodies showed binding to all the constructs as shown in FIG. 1A, it was suggested that these antibodies recognized the IgV domain.

2)-4-1-2 Epitope Analysis by Cell-Based ELISA (2)

After the culture supernatant of 293α cells into which the pFLAG V5-DEST-hmSIRPA_Δ0, Δ1, and Δ2 expression vector prepared in 2)-1-2-2 was introduced and the pFLAG V5-DEST-introduced 293α cells was removed, 50 μL per well of four different D13 humanized anti-human SIRPA antibodies and a chimeric anti-human SIRPA antibody diluted with 5% FBS-containing PBS to a final concentration of 10,000 ng/mL were added to these cells, and the mixture was allowed to stand at 4° C. for one hour. Further, 50 μL per well of an anti-FLAG M2 antibody (SIGMA) diluted with 5% FBS-containing PBS to a final concentration of 10,000 ng/mL was added to a well for detecting expression of each SIRPA construct, and the mixture was allowed to stand at 4° C. for one hour. Thereafter, binding to each construct was evaluated in the same manner as in the evaluation of the binding activity of the human SIRPA. Binding of anti-human SIRPA antibodies to each construct was standardized by expression of the FLAG tag.

As shown in FIG. 1B, hD13_H1L3, hD13_H1L4h, hD13_H2L2, hD13_H2L3, and cD13 exhibited a concentration-dependent binding to the added hmSIRPA_Δ0 antibody having the NQKEG sequence but did not exhibit binding to hmSIRPA_Δ1 or hmSIRPA_Δ2 at any concentration.

The above findings indicated that binding of hD13 and cD13 required the NQKEG sequence.

2)-4-2 Epitope Analysis by X-Ray Crystallography

2)-4-2-1 Crystallization of Complex

A full-length cD13 antibody was cleaved with Lysyl Endopeptidase (Wako Pure Chemical Industries, Ltd.) to a limited extent under a weak acidic condition, and the Fab fragment of the cD13 antibody was isolated using BioAssist S Cation Exchange Column (Tosoh Corporation). The SIRPA_V2_IgV obtained in Example 1)-2 and the cD13 Fab fragment were mixed in a molar ratio of 1:1, a complex fraction was isolated using a Superdex 75, 10/300 GL gel filtration column (GE Healthcare), followed by buffer replacement with 10 mM Tris HCl (pH 8.2) by ultrafiltration, and the complex was concentrated to 3 g/L. The complex solution was crystallized by a steam diffusion method. A solution obtained by adding an equal volume of a precipitant solution [0.2 M potassium phosphate dibasic, 20% (w/v) Polyethylene Glycol 3350, pH 9.2] to 0.5 μL of the protein solution was placed in a sealed container containing 0.05 mL of a precipitant solution, so that these solutions would not be brought into contact with each other, and the solutions were allowed to stand at 25° C. After one week, 0.2 mm×0.2 mm×0.05 mm rod-like crystals were obtained. The obtained crystals were immersed in a solution obtained by diluting the precipitant solution approximately 1.4-fold with glycol, and subsequently the mixture was frozen with liquid nitrogen. X-ray diffraction data were collected with beam line PF BL-17A of a light source facility Photon Factory (Tsukuba). The diffraction intensity was quantified from the obtained diffraction image using software XDS (Max Plank Institute for Medical Research) to obtain the crystal structure factor. The crystal had a hexagonal crystal system, with the R32 space group and a unit cell of the crystal of a=b=149.61 Å, c=155.61 Å, α=β=90°, and γ=120°.

2)-4-2-2 Structural Analysis of Complex

The phase was determined by performing molecular replacement using a three-dimensional structure coordinate of a homology model of the obtained structure factor and the Fab fragment and a known structure (PDBID: 2JJS) of the human SIRPA IgV domain. A software phaser (CCP4: Collaborative Computational Project No. 4) was used for calculation. The crystal contained one complex in an asymmetric unit. The structure was refined using a software Refmac5 (CCP4: Collaborative Computational Project No. 4), and the model was corrected using a software Coot. This operation was repeated to obtain a final R value of 22% and a free R value of 25% at 2.4 Å resolution. The final model contained amino acid residues 1 to 213 of the L chain and amino acid residues 1 to 225 of the H chain of the cD13 Fab fragment and amino acid residues 33 to 143 of the human SIRPA Variant 2.

2)-4-2-3 Structural Analysis of Complex and Identification of Epitope of D13

Figure 2:
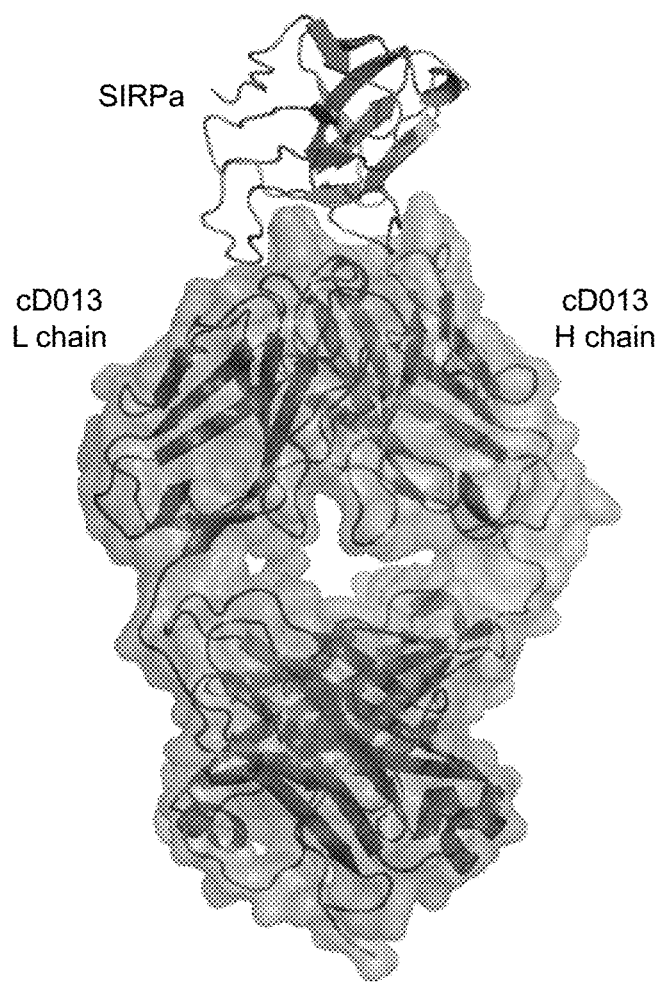
FIG. 2 illustrates a ribbon model of a whole composite of the Fab fragment of an anti-SIRPA antibody and SIRPA_V2_IgV.
Figure 3:
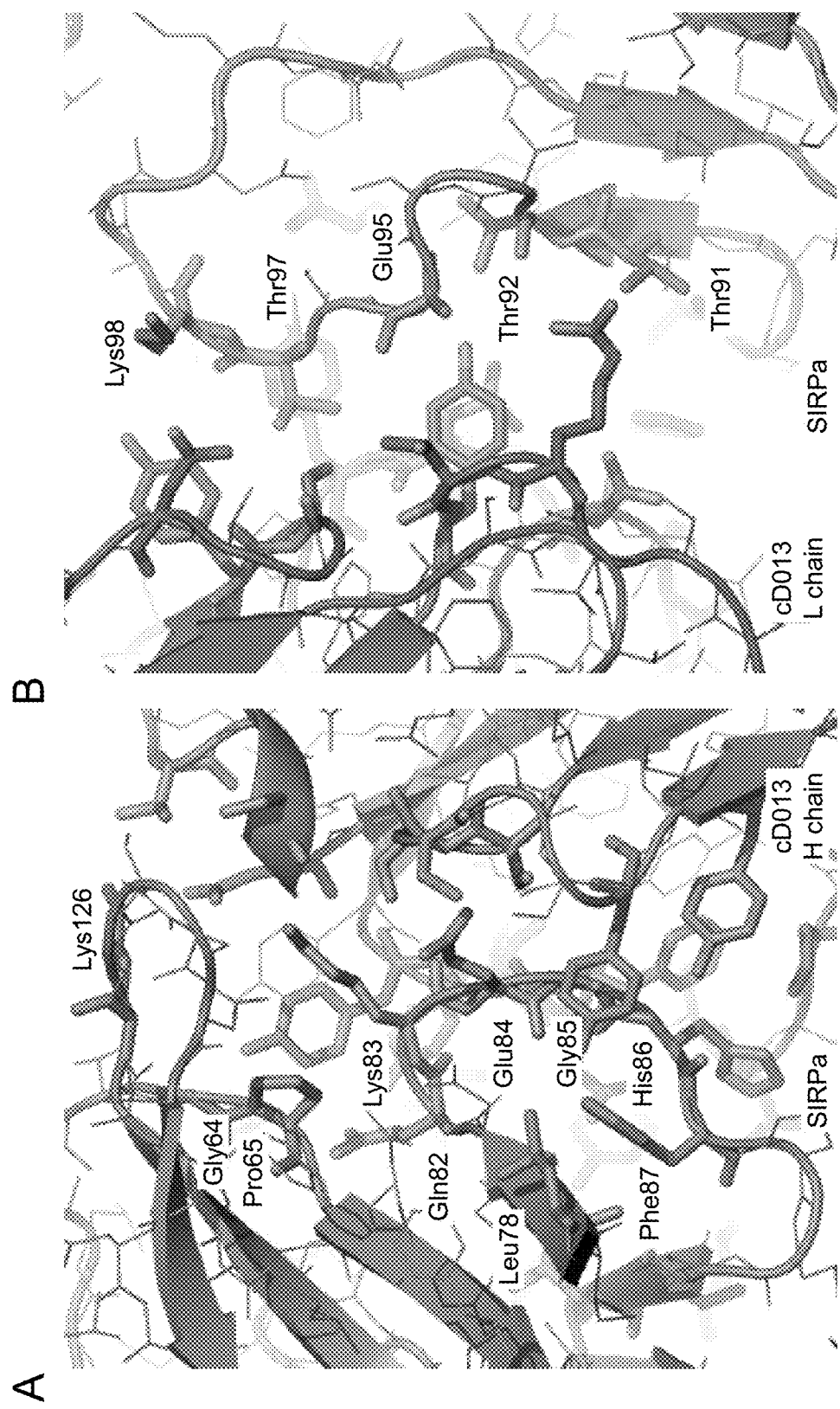
FIG. 3 illustrates interactions between the regions before beta 5 (A) and after beta 5 (B) of human SIRPA and an anti-SIRPA antibody (antibody D13).

The amino acid residues of the human SIRPA within 4 Å from the cD13 Fab fragment (the position of each amino acid residue corresponds to that in SEQ ID NO: 57 in the sequence listing) are as follows: Gly64, Pro65, Leu78, Gln82, Lys83, Glu84, Gly85, His86, Phe87, Thr91, Thr92, Glu95, Thr97, Lys98, and Lys126. FIG. 2 shows a ribbon model of the whole complex and the surface thereof, and FIG. 3 illustrates interactions between the regions before beta 5 (A) and after beta 5 (B) of human SIRPA and cD13. It was indicated that cD13 strongly recognized the beta 4-5 loop, i.e., residue numbers 82 to 87, which has a small sequence variety in human SIRPA, and it enabled a strong binding to various variants (FIG. 4). In contrast, interactions are weak in the beta 5-6 loop, i.e., a region of residue numbers 92 to 105. For example, Glu95, which is substituted by aspartic acid instead of glutamic acid in some variants, is present near Fab, but the electron density of a side chain is not observed, which indicates that Glu95 does not greatly contribute to interactions. Among the sequences in FIG. 4, a black dot "•" indicates that the amino acid residue is identical to the one in SIRPA_V1, and an amino acid residue shown at a site indicates that the amino acid residue is different.

2)-5 Evaluation of Human SIRPA-CD47 Binding Inhibitory Activity

After the culture supernatant of 293α cells into which the human SIRPA expression vector prepared in 1)-5-1 was introduced was removed, 50 μL per well of the purified rat anti-human SIRPA antibodies diluted with 5% FBS-containing PBS to final concentrations of 0 to 10,000 ng/ml were added to each of pcDNA3.2 V5-DEST-SIRPA_V1, pcDNA3.2 V5-DEST-SIRPA_V2, or pcDNA3.2 V5-DEST-introduced 293α cells, immediately followed by addition of 50 μL per well of peroxidase-labeled CD47-Fc prepared in 5% FBS-containing PBS at a final concentration of 10,000 ng/mL, and the mixture was allowed to stand at 4° C. for one hour. Thereafter, the binding inhibitory activity was evaluated in the same manner as in 1)-6-3.

As shown in Table 3, all the rat anti-human SIRPA antibodies showed the binding inhibitory activity against human SIRPA-CD47.

TABLE 3

SIRPA-CD47 binding inhibitory activity of rat anti-human SIRPA antibodies SIRPA-CD47 binding inhibitory activity

| Clone ID | V1-CD47 | V2-CD47 |
| --- | --- | --- |
| D13 | +++ | +++ |
| F42 | +++ | ++ |
| F44 | ++ | ++ |
| F47 | ++ | ++ |
| F60 | ++ | ++ |
| F63 | ++ | ++ |
| F86 | ++ | + |

2)-6 ADCP Activity of Rat Anti-Human SIRPA Antibodies Against Cancer Cell Line

2)-6-1 Preparation of Target Cells

TrypLE Express (Life Technology) was added to human gastric cancer cell line AGS cells, the mixture was allowed to react at 37° C. for five minutes, and then cells were dissociated. A 10% FBS-containing RPMI 1640 medium (Life Technology) was added, cells were washed twice, then cells were washed twice with PBS, and then the viable cell count was obtained by a trypan blue dye exclusion test. A solution of 4×10$^7$ cells was collected and centrifuged, and then the cells were suspended in 2 mL of Diluent C provided in PKH26 Red Fluorescent Cell Linker Kit for General Cell Membrane Labeling (Sigma). After 1 mM PKH26 Linker was diluted with Diluent C to 10 μM as a labeling solution, immediately followed by mixing of the cell suspension and an equal volume of a PKH26 Linker solution, and the mixture was allowed to stand at room temperature for five minutes. A volume of 25 mL of a 10% FBS-containing RPMI 1640 medium (Life Technology) was added, cells were washed twice, then the cells were re-suspended to 2×10$^6$ cells/mL and used as target cells.

2)-6-2 Preparation of PBMCs

After 25 mL of blood from a normal subject was slowly overlaid on 20 mL of Ficoll-Paque Plus (GE Healthcare), the mixture was centrifuged at 1500 rpm at room temperature for 30 minutes. A cell layer positioned between plasma and Ficoll-Paque Plus was collected with a dropper and suspended in 20 mL of a 10% FBS-containing RPMI 1640 medium (Life Technology). The suspension was centrifuged at 1500 rpm for five minutes, the supernatant was removed, 20 mL of a 10% FBS-containing RPMI 1640 medium was added, and cells were washed twice. After cells were suspended in 1 mL of RoboSep Buffer (STEMCELL Technologies Inc.), the viable cell count was measured by a trypan blue dye exclusion test, and the cells were used as effector cells.

2)-6-3 Preparation of Effector Cells

The PBMCs prepared in Example 2)-6-2 were suspended in RoboSep Buffer (STEMCELL Technologies Inc.) at 5×10$^7$ cells/mL. A volume of 50 μL of EasySep Human Monocyte Enrichment Cocktail provided in Human Monocyte Enrichment Kit without CD16 Depletion (STEMCELL Technologies Inc.) was added to 1 mL of the PBMC suspension. After the mixture was allowed to react at 4° C. for 10 minutes, 50 µL of EasySep Magnetic Particles was added to each mL of the PBMC suspension. After the mixture was allowed to react at 4° C. for five minutes, RoboSep Buffer (STEMCELL Technologies Inc.) was added to make 2.5 mL, and the mixture was set in EasySep Magnet. After 2 minutes and 30 seconds, the supernatant was collected and centrifuged at 1200 rpm for five minutes, and monocyte fractions were collected. A 10% FBS-containing RPMI 1640 medium (Life Technology) was added, cells were washed once, followed by addition of a 10% FBS-containing RPMI 1640 medium (Life Technology) containing 10 ng/ml M-CSF (PEPROTEC), and the mixture was seeded in a Suspension Culture Flask 225 (Sumitomo Bakelite Co., Ltd.). The suspension was cultured at 37° C. under a 5% $CO_2$ condition for 10 days. The culture supernatant was removed, followed by addition of a 10% FBS-containing RPMI 1640 medium (Life Technology) containing 10 ng/ml IL-10 and 10 ng/ml M-CSF (PeproTech, Inc.), and the suspension was cultured for further 2 days. After 12 days, TrypLE Express (Life Technology) was added to differentiation-induced macrophages, and the mixture was allowed to react at 37° C. for 40 minutes to dissociate cells. A 10% FBS-containing RPMI 1640 medium (Life Technology) was added, cells were washed twice, and then cells were re-suspended in a 10% FBS-containing RPMI 1640 medium (Life Technology) at $5 \times 10^5$ cells/mL and used as effector cells.

2)-6-4 Evaluation of ADCP Activity

A volume of 50 µL per well of the target cells prepared by the method of Example 2)-6-1 was added to Ultra-Low Attachment 96-Well U-Shaped Bottom Microplate (Sumitomo Bakelite Co., Ltd.). To the wells, 50 µL per well of seven rat anti-human SIRPA antibody clones, Hu5F9G4 (prepared using an anti-human CD47 antibody: PLOS ONE 10[9]:e0137345, US2015183874), TTI-621 (prepared using a human SIRPA-Fc: International Publication WO 2014/094122), and various control IgG diluted with a 10% FBS-containing RPMI 1640 medium (Life Technology) to final concentrations of 0 to 10,000 ng/ml were added. A volume of 50 µL per well of a 10% FBS-containing RPMI 1640 medium (Life Technology) was added for the single agent group, and 50 µL per well of trastuzumab (Roche) diluted with a 10% FBS-containing RPMI 1640 medium (Life Technology) to a final concentration of 250 ng/ml was added for the combination use group. A volume of 50 µL per well ($1 \times 10^6$ cells/mL) of the effector cells prepared in Example 2)-6-3 were added, and then the mixture was allowed to stand at 37° C. under a 5% $CO_2$ condition for 16 hours. The mixture was centrifuged at 1200 rpm at 4° C. for five minutes, the supernatant was removed, and cells were washed with 200 µL per well of 5% FBS-containing PBS. A volume of 45 µL per well of 5% FBS-containing PBS and 5 µL per well of APC Mouse Anti-Human CD11b (Becton Dickinson) were added to cells, and the mixture was allowed to stand at 4° C. for 15 minutes. Cells were washed twice with 200 µL per well of 5% FBS-containing PBS. Cells were suspended in 100 µL per well of 1×BD Stabilizing Fixative (Becton Dickinson), and the mixture was allowed to stand overnight at 4° C. On the following day, cells were measured by flow cytometry (FACS Canto II: Becton Dickinson). FlowJo (TreeStar) was used for data analysis. Cells were characterized by detecting forward scattered (FSC) light and side-scattered (SSC) light, and then the numbers of cells positive for PE (A) and cells positive for both APC and PE (B) were obtained. Cells positive for both APC and PE (B) were deemed to be target cells that had been phagocytized by macrophages. The percent cellular phagocytosis by the ADCP activity was calculated by the following equation:

$$\text{Percent cellular phagocytosis (\%)} = B/(A + B) \times 100$$

Figure 5:
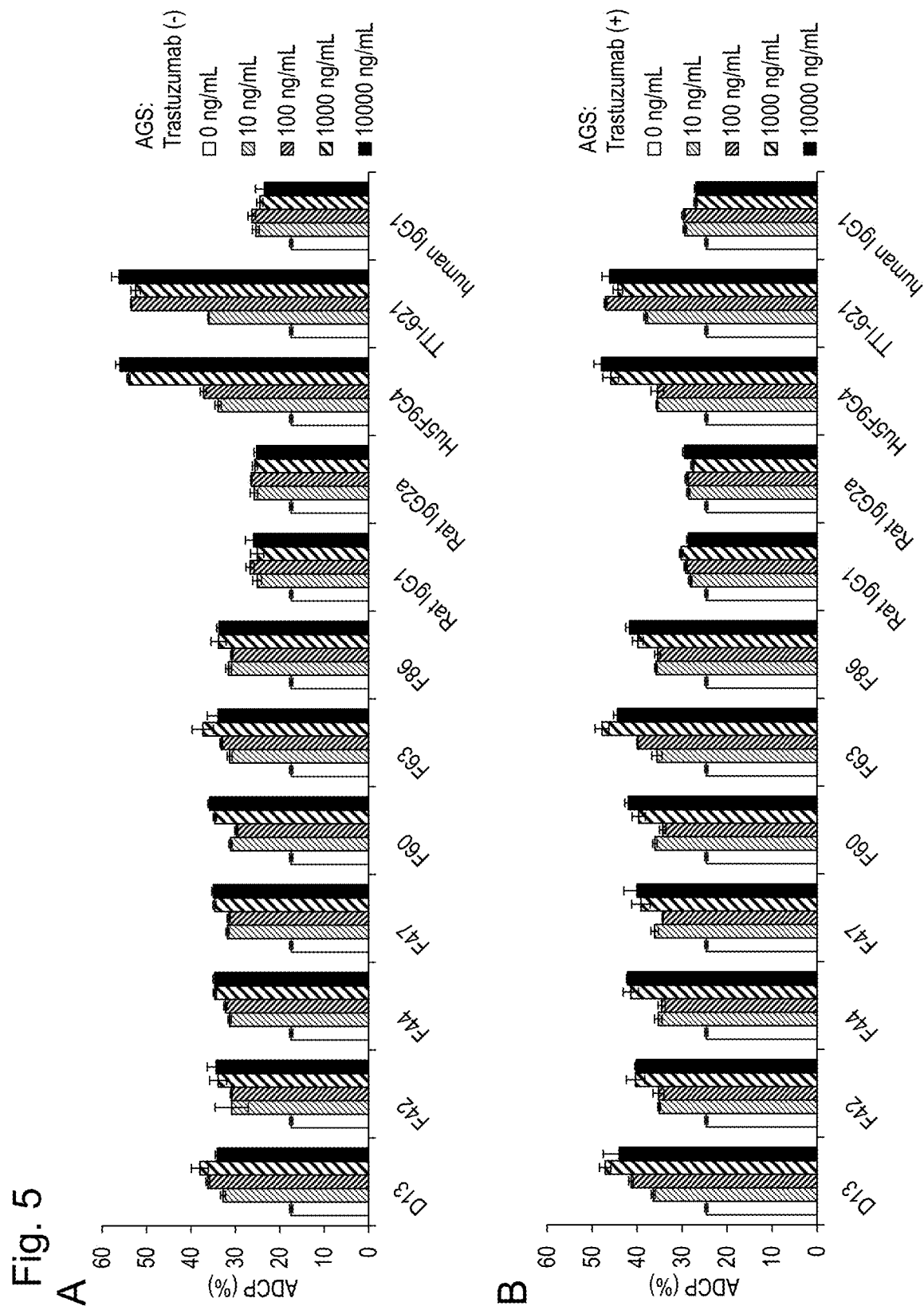
FIG. 5 shows ADCP activity against a gastric cancer cell line when the anti-SIRPA antibody was used as a single agent (A) and when the anti-SIRPA antibody was used in combination with trastuzumab (B).

As shown in FIG. 5, the rat anti-human SIRPA antibodies used alone exhibited a lower ADCP activity against CD47-positive human gastric cancer cell line AGS compared with Hu5F9G4 (anti-human CD47 antibody) and TTI-621 (human SIRPA-Fc) (FIG. 5A). In contrast, the anti-SIRPA antibodies used in combination with trastuzumab exhibited an ADCP activity similar to those of Hu5F9-G4 and TTI-621 (FIG. 5B). These results indicated that inhibition of the SIRPA-CD47 binding by the anti-SIRPA antibodies enhanced the phagocytic activity of macrophages.

Example 3. Nucleotide Sequence Analysis of cDNAs of Variable Regions of Rat Anti-SIRPA Antibodies (D13, F44, and F63) and Determination of Amino Acid Sequences Thereof 3)-1 Nucleotide Sequence Analysis of cDNA of D13 Variable Region and Determination of Amino Acid Sequence Thereof 3)-1-1 Preparation of Total RNA of D13-Producing Hybridoma To amplify the cDNA encoding the D13 variable region, a total RNA was prepared from a D13-producing hybridoma using TRIzol Reagent (Ambion).

3)-1-2 Nucleotide Sequence Analysis of cDNA of D13 Light Chain Variable Region by 5'-RACE PCR and Determination of Amino Acid Sequence Thereof The cDNA encoding the light chain variable region was amplified using approximately 1 µg of the total RNA prepared in Example 3)-1-1 and SMARTer RACE 5'/3' Kit (Clontech Laboratories Inc.). As primers to amplify the cDNA encoding the variable region of the D13 light chain gene by PCR, Universal Primer A Mix (UPM: provided in SMARTer RACE 5'/3' Kit) and primers designed from a known rat light chain constant region sequence were used.

The cDNA encoding the light chain variable region amplified by 5'-RACE PCR was cloned in a plasmid, and subsequently a sequence analysis was performed for the nucleotide sequence of the cDNA encoding the light chain variable region.

The amino acid sequence of the D13 light chain variable region encoded by the determined cDNA nucleotide sequence corresponds to an amino acid sequence consisting of amino acid residues 21 to 126 in SEQ ID NO: 23 in the sequence listing. The amino acid sequences of CDRL1, CDRL2, and CDRL3 of D13 are set forth in SEQ ID NOS: 1 to 3 in the sequence listing. The amino acids of these CDRs are also shown in FIG. 28.

The amino chain sequence of each CDR is based on the definition of AbM (Martin, A. C. R., Cheetham, J. C., and Rees, A. R. Proc. Natl. Acad. Sci. USA. 1989; 86, 9268-9272).

3)-1-3 Nucleotide Sequence Analysis of cDNA of D13 Heavy Chain Variable Region by 5'-RACE PCR and Determination of Amino Acid Sequence Thereof The cDNA encoding the heavy chain variable region was amplified using approximately 1 µg of the total RNA prepared in Example 3)-1-1 and SMARTer RACE 5'/3' Kit (Clontech Laboratories Inc.). As primers to amplify the cDNA encoding the variable region of the D13 heavy chain gene by PCR, Universal Primer A Mix (UPM: provided in SMARTer RACE 5'/3' Kit) and primers designed from a known rat heavy chain constant region sequence were used.

The cDNA encoding the heavy chain variable region amplified by 5'-RACE PCR was cloned in a plasmid, and subsequently a sequence analysis was performed for the nucleotide sequence of the cDNA encoding heavy chain variable region.

The amino acid sequence of the D13 heavy chain variable region encoded by the determined cDNA nucleotide sequence corresponds to an amino acid sequence consisting of amino acid residues 20 to 139 in SEQ ID NO: 25 in the sequence listing. The amino acid sequences of CDRH1, CDRH2, and CDRH3 of D13 are set forth in SEQ ID NOS: 4 to 6 in the sequence listing. The amino acid sequences of these CDRs are also shown in FIG. 28.

3)-2 Nucleotide Sequence Analysis of cDNA of F44 Variable Region and Determination of Amino Acid Sequence Thereof The analysis was performed in the same manner as in Example 3)-1. The amino acid sequence of the F44 light chain variable region encoded by the determined cDNA nucleotide sequence corresponds to an amino acid sequence consisting of amino acid residues 21 to 127 in SEQ ID NO: 27 in the sequence listing. The amino acid sequence of the F44 heavy chain variable region encoded by the determined cDNA nucleotide sequence corresponds to an amino acid sequence consisting of amino acid residues 20 to 138 in SEQ ID NO: 29 in the sequence listing. The amino acid sequences of CDRL1, CDRL2, CDRL3, CDRH1, CDRH2, and CDRH3 of F44 are set forth in SEQ ID NOS: 7 to 12 in the sequence listing. The amino acid sequences of these CDRs are also shown in FIG. 29.

3)-3 Nucleotide Sequence Analysis of cDNA of F63 Variable Region and Determination of Amino Acid Sequence Thereof The analysis was performed in the same manner as in Example 3)-1. The amino acid sequence of the F63 light chain variable region encoded by the determined cDNA nucleotide sequence corresponds to an amino acid sequence consisting of amino acid residues 21 to 130 in SEQ ID NO: 31 in the sequence listing. Further, the amino acid sequence of the F63 heavy chain variable region encoded by the determined cDNA nucleotide sequence corresponds to an amino acid sequence consisting of amino acid residues 20 to 143 in SEQ ID NO: 33. The amino acid sequences of CDRL1, CDRL2, CDRL3, CDRH1, CDRH2, and CDRH3 of F63 are set forth in SEQ ID NOS: 13 to 18 in the sequence listing. The amino acid sequences of these CDRs are also shown in FIG. 30.

Example 4. Preparation of Human Chimeric Anti-SIRPA Antibodies (cD13, cF44, and cF63)

4)-1 Construction of Human Chimeric and Humanized κ Type Light Chain Expression Vector pCMA-LK Approximately 5.4 kb fragment obtained by digesting plasmid pcDNA3.3-TOPO/LacZ (Invitrogen) with restriction enzymes XbaI and PmeI was bound to a DNA fragment set forth in SEQ ID NO: 19 containing a human light chain signal sequence and a DNA sequence encoding a human κ chain constant region using In-Fusion HD PCR Cloning Kit (Clontech Laboratories Inc.) to prepare pcDNA3.3/LK.

pCMA-LK was constructed by removing a neomycin expressing unit from pcDNA3.3/LK.

4)-2 Construction of Human Chimeric and Humanized λ Type Light Chain Expression Vector pCMA-LL A DNA fragment from which the light chain signal sequence and human κ chain constant region were removed by digesting pCMA-LK with XbaI and PmeI was bound to a DNA fragment set forth in SEQ ID NO: 20 containing a DNA sequence encoding a human light chain signal sequence and a human λ chain constant region using In-Fusion HD PCR Cloning Kit (Clontech Laboratories Inc.) to construct pCMA-LL.

4)-3 Construction of Human Chimeric and Humanized IgG4ProFALA Type Heavy Chain Expression Vector pCMA-G4PFALA pCMA-G4proFALA was constructed in the same manner as in Example 4)-2 using a DNA fragment set forth in SEQ ID NO: 21 containing a human heavy chain signal sequence and a DNA sequence encoding the amino acids of a human IgG4PFALA constant region.

4)-4 Construction of cD13 Expression Vector

4)-4-1 Construction of cD13 IgG4proFALA Type Heavy Chain Expression Vector

A DNA fragment containing a cDNA encoding a heavy chain variable region was amplified by performing PCR using the cDNA encoding the D13 heavy chain variable region obtained in Example 3)-1 as a template and primers designed for in-fusion cloning. A cD13 heavy chain expression vector was constructed by inserting the amplified DNA fragment at the site where pCMA-G4proFALA was cleaved with a restriction enzyme BlpI using In-Fusion HD PCR Cloning Kit (Clontech Laboratories Inc.). The nucleotide sequence encoding the cD13 heavy chain is set forth in SEQ ID NO: 24 in the sequence listing. A nucleotide sequence consisting of nucleotides 1 to 57 encodes the signal sequence, a nucleotide sequence consisting of nucleotides 58 to 417 encodes the variable region, and a nucleotide sequence consisting of nucleotides 418 to 1398 encodes the constant region. The amino acid sequence of the cD13 heavy chain is set forth in SEQ ID NO: 25 in the sequence listing. An amino acid sequence consisting of amino acid residues 1 to 19 corresponds to the signal sequence, an amino acid sequence consisting of amino acid residues 20 to 139 corresponds to the variable region, and an amino acid sequence consisting of amino acid residues 140 to 466 corresponds to the constant region. The sequences of SEQ ID NOS: 24 and 25 are also shown in FIG. 18.

4)-4-2 Construction of cD13 Light Chain Expression Vector

A DNA fragment containing a cDNA encoding a light chain variable region was amplified by performing PCR using the cDNA encoding the D13 light chain variable region obtained in Example 3)-1 as a template and primers designed for in-fusion cloning. The cD13 light chain expression vector was constructed by inserting the amplified DNA fragment at the site where pCMA-LK was cleaved with a restriction enzyme BsiWI using In-Fusion HD PCR Cloning Kit (Clontech Laboratories Inc.). The nucleotide sequence encoding the cD13 light chain is set forth in SEQ ID NO: 22 in the sequence listing. A nucleotide sequence consisting of nucleotides 1 to 60 encodes the signal sequence, a nucleotide sequence consisting of nucleotides 61 to 378 encodes the variable region, and a nucleotide sequence consisting of nucleotides 379 to 699 encodes the constant region. The amino acid sequence of the cD13 light chain is set forth in SEQ ID NO: 23 in the sequence listing. An amino acid sequence consisting of amino acid residues 1 to 20 corresponds to the signal sequence, an amino acid sequence consisting of amino acid residues 21 to 126 corresponds to the variable region, and an amino acid sequence consisting of amino acid residues 127 to 233 corresponds to the constant region. The sequences of SEQ ID NOS: 22 and 23 are also shown in FIG. 17.

4)-5 Construction of cF44 Expression Vector

4)-5-1 Construction of cF44 IgG4ProFALA Type Heavy Chain Expression Vector

A cF44 heavy chain expression vector was constructed in the same manner as in Example 4)-4-1 using the cDNA encoding the F44 heavy chain variable region obtained in Example 3)-2 as a template. The nucleotide sequence encoding the cF44 heavy chain is set forth in SEQ ID NO: 28 in the sequence listing. A nucleotide sequence consisting of nucleotides 1 to 57 encodes the signal sequence, a nucleotide sequence consisting of nucleotides 58 to 414 encodes the variable region, and a nucleotide sequence consisting of nucleotides 415 to 1395 encodes the constant region. The amino acid sequence of the cF44 heavy chain is set forth in SEQ ID NO: 29 in the sequence listing. An amino acid sequence consisting of amino acid residues 1 to 19 corresponds to the signal sequence, an amino acid sequence consisting of amino acid residues 20 to 138 corresponds to the variable region, and an amino acid sequence consisting of amino acid residues 139 to 465 corresponds to the constant region. The sequences of SEQ ID NOS: 28 and 29 are also shown in FIG. 20.

4)-5-2 Construction of cF44 Light Chain Expression Vector

A cF44 light chain expression vector was constructed in the same manner as in Example 4)-4-2 using the cDNA encoding the F44 light chain variable region obtained in Example 3)-2 as a template. The nucleotide sequence encoding the cF44 light chain is set forth in SEQ ID NO: 26 in the sequence listing. A nucleotide sequence consisting of nucleotides 1 to 60 encodes the signal sequence, a nucleotide sequence consisting of nucleotides 61 to 381 encodes the variable region, and a nucleotide sequence consisting of nucleotides 382 to 702 encodes the constant region. The amino acid sequence of the cF44 light chain is set forth in SEQ ID NO: 27 in the sequence listing. An amino acid sequence consisting of amino acid residues 1 to 20 corresponds to the signal sequence, an amino acid sequence consisting of amino acid residues 21 to 127 corresponds to the variable region, and an amino acid sequence consisting of amino acid residues 128 to 234 corresponds to the constant region. The sequences of SEQ ID NOS: 26 and 27 are also shown in FIG. 19.

4)-6 Construction of cF63 Expression Vector

4)-6-1 Construction of cF63 IgG4ProFALA Type Heavy Chain Expression Vector

A cF63 heavy chain expression vector was constructed in the same manner as in Example 4)-4-1 using the cDNA encoding the F63 heavy chain variable region obtained in Example 3)-3 as a template. The nucleotide sequence encoding the cF63 heavy chain is set forth in SEQ ID NO: 32 in the sequence listing. A nucleotide sequence consisting of nucleotides 1 to 57 encodes the signal sequence, a nucleotide sequence consisting of nucleotides 58 to 429 encodes the variable region, and a nucleotide sequence consisting of nucleotides 430 to 1410 encodes the constant region. The amino acid sequence of the cF63 heavy chain is set forth in SEQ ID NO: 33 in the sequence listing. An amino acid sequence consisting of amino acid residues 1 to 19 corresponds to the signal sequence, an amino acid sequence consisting of amino acid residues 20 to 143 corresponds to the variable region, and an amino acid sequence consisting of amino acid residues 144 to 470 corresponds to the constant region. The sequences of SEQ ID NOS: 32 and 33 are also shown in FIG. 22.

4)-6-2 Construction of cF63 Light Chain Expression Vector

A DNA fragment containing a cDNA encoding a light chain variable region was amplified by performing PCR using the cDNA encoding the F63 light chain variable region obtained in Example 3)-3 as a template and primers designed for in-fusion cloning. The cF63 light chain expression vector was constructed by inserting the amplified DNA fragment at the site where pCMA-LL was cleaved with restriction enzymes BsiWI and HpaI using In-Fusion HD PCR Cloning Kit (Clontech Laboratories Inc.). The nucleotide sequence encoding the cF63 light chain is set forth in SEQ ID NO: 30 in the sequence listing. A nucleotide sequence consisting of nucleotides 1 to 60 encodes the signal sequence, a nucleotide sequence consisting of nucleotides 61 to 390 encodes the variable region, and a nucleotide sequence consisting of nucleotides 391 to 708 encodes the constant region. The amino acid sequence of the cF63 light chain is set forth in SEQ ID NO: 31 in the sequence listing. An amino acid sequence consisting of amino acid residues 1 to 20 corresponds to the signal sequence, an amino acid sequence consisting of amino acid residues 21 to 130 corresponds to the variable region, and an amino acid sequence consisting of amino acid residues 131 to 236 corresponds to the constant region. The sequences of SEQ ID NOS: 30 and 31 are also shown in FIG. 21.

4)-7 Preparation of cD13, cF44, and cF63

4)-7-1 Production of cD13, cF44, and cF63

FreeStyle 293F Cells (Invitrogen) were cultured according to the manual. In an amount of $1.2 \times 10^9$, FreeStyle 293F Cells (Invitrogen) in a logarithmic growth phase were seeded in a 3-L Fernbach Erlenmeyer Flask (Corning Incorporated) and diluted with FreeStyle 293 Expression Medium (Invitrogen) to $2.0 \times 10^6$ cells/mL. In an amount of 0.24 mg, a heavy chain expression vector, 0.36 mg of a light chain expression vector, and 1.8 mg of Polyethyleneimine (PolyScience #24765) were added to 40 mL of Opti-Pro SFM Medium (Invitrogen), the mixture was stirred gently, further allowed to stand for five minutes, and added to FreeStyle 293F Cells. After cells were cultured with shaking at 90 rpm in an incubator at 37° C. and 8% $CO_2$ for four hours, 600 mL of EX-CELL VPRO Medium (SAFC Bioscience), 18 mL of GlutaMAX I (Gibco), and 30 mL of Yeastolate Ultrafiltrate (Gibco) were added, cells were cultured with shaking at 90 rpm in an incubator at 37° C. and 8% $CO_2$ for 7 days, and the obtained culture supernatant was filtered using Disposable Capsule Filter (Advantec #CCS-045-E1H).

4)-7-2 Purification of cD13, cF44, and cF63

The antibodies were purified from the culture supernatant obtained in Example 4)-7-1 in one step process of rProtein A affinity chromatography. After the culture supernatant was applied to a column filled with MabSelect SuRe equilibrated with PBS (GE Healthcare Bioscience Corp.), the column was washed with PBS in a volume at least 2-fold of the column capacity. Subsequently, the column was eluted with a 2 M arginine hydrochloride solution (pH 4.0) to collect fractions containing the antibodies. The buffer containing the fractions was replaced with PBS (−) by dialysis (Thermo Scientific, Slide-A-Lyzer Dialysis Cassette). The antibodies were concentrated with Centrifugal UF Filter Device VIVASPIN20 (molecular weight cutoff for ultrafiltration, 10 kDa: Sartorius) to an IgG concentration of at least 10 mg/mL. Finally, the solutions were filtered with Minisart-Plus Filter (Sartorius) to obtain purified samples.

Example 5. In Vitro Evaluation of Human Chimeric Anti-SIRPA Antibodies (cD13, cF44, and cF63)

5)-1 Evaluation of Binding to Human SIRPA
5)-1-1 Evaluation of Binding to Human SIRPA (Cell-Based ELISA)

The 293α cells [described in Example 1)-6] were prepared in a 10% FBS-containing DMEM medium to $5 \times 10^5$ cells/mL. pFLAG V5-DEST-SIRPA_V1, pFLAG V5-DEST-SIRPA_V2, or pFLAG V5-DEST was introduced into the cells using Lipofectamine LTX (Invitrogen), followed by addition of 100 μL per well to a 96-well plate (Corning Incorporated), and cells were cultured overnight in the 10% FBS-containing DMEM medium at 37° C. under a 5% $CO_2$ condition. The obtained introduced cells were used for cell-based ELISA in a state that they adhered to each other. After the culture supernatant was removed, 50 μL per well of the cD13 (IgG2 and IgG4pf), cF44 (IgG1, IgG2, IgG4p, and IgG4pf), and cF63 (IgG2 and IgG4pf) antibodies prepared in Examples 3 and 4 were added to each of pFLAG V5-DEST-SIRPA_V1, pFLAG V5-DEST-SIRPA_V2, or pFLAG V5-DEST-introduced cells at final concentrations of 0 to 10,000 ng/mL, and the mixture was allowed to stand at 4° C. for one hour. Further, 50 μL per well of anti-FLAG M2 antibody (SIGMA) diluted with 5% FBS-containing PBS to a final concentration of 10,000 ng/mL was added to a well for detecting expression of each SIRPA construct, and the mixture was allowed to stand at 4° C. for one hour. The cells in the well were washed once with 5% FBS-containing PBS, followed by addition of Peroxidase AffiniPure F(ab')$_2$ Fragment Goat Anti-Human IgG, Fcγ Fragment Specific (Jackson ImmunoResearch) diluted 1000-fold with 5% FBS-containing PBS, and the mixture was allowed to stand at 4° C. for one hour. The cells in the well were washed five times with 5% FBS-containing PBS, followed by addition of 100 μL per well of an OPD coloration solution [o-phenylenediamine dihydrochloride (Wako Pure Chemical Industries, Ltd.) and $H_2O_2$ were dissolved in an OPD solution (0.05 M trisodium citrate, 0.1 M disodium hydrogen phosphate dodecahydrate, pH 4.5) at 0.4 mg/mL and 0.6% (v/v), respectively]. A coloration reaction was performed with stirring occasionally, 100 μL per well of 1 M HCl was added to terminate the coloration reaction, and then absorbance at 490 nm was measured with a plate reader ARVO (PerkinElmer Inc.). Binding of the human chimeric anti-human SIRPA antibodies to each construct was standardized by expression of the FLAG tag.

Figure 6:
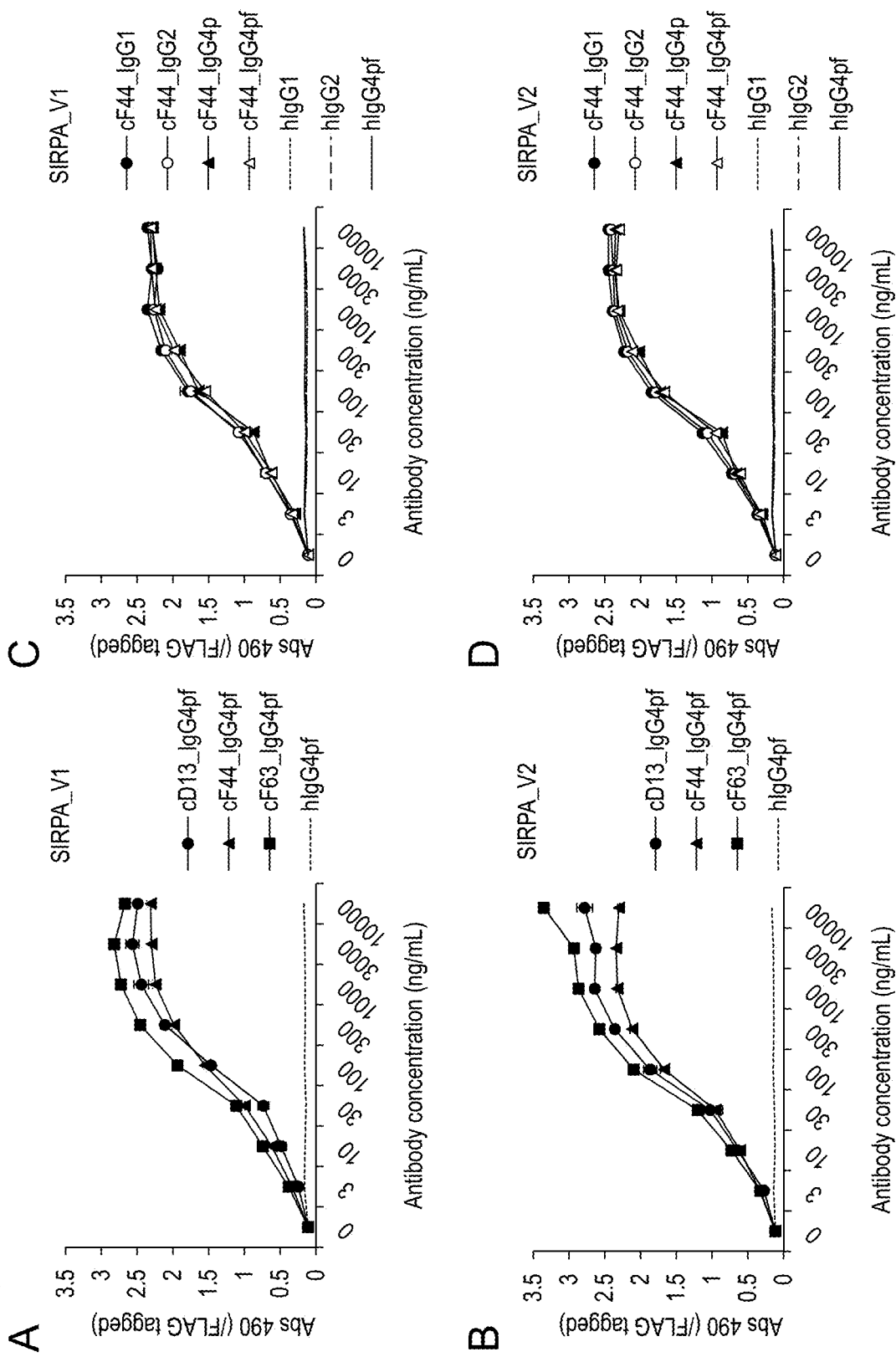
FIG. 6 shows the binding of human chimeric anti-SIRPA antibodies (cD13, cF44, and cF63) to human SIRPA.

As shown in FIG. 6, the cD13, cF44, and cF63 antibodies bound to both SIRPA_V1 and SIRPA_V2 (FIGS. 6A and B), and binding between the isotypes thereof was virtually equivalent (FIGS. 6C and D).

5)-1-2 Evaluation of Binding of Human Chimeric Antibodies to Human SIRPA

The dissociation constants of the cD13, cF44, and cF63 prepared in Example 4 against the human SIRPA_V1_IgV prepared in Example 1 were determined by a capture method comprising capturing a human chimeric antibody as a ligand and measuring an antigen as an analyte, using Biacore T200 (GE Healthcare Bioscience Corp.). HBS-EP+ (GE Healthcare Bioscience Corp.) was used as a running buffer, and CM5 (GE Healthcare Bioscience Corp.) was used as a sensor chip. In an amount of 1 μg/mL human chimeric antibody was added onto a chip at a rate of 10 μL/min for 60 seconds, a serially diluted solution of human SIRPA protein as an antigen (0.5 to 8 μg/mL) was added at a flow rate of 30 μL/min for 120 seconds, and the dissociation phase continued to be monitored for 600 seconds. As a regenerant, 3 M magnesium chloride (GE Healthcare Bioscience Corp.) was added at a flow rate of 20 μL/min for 30 seconds. For data analysis, the binding rate constant (ka), dissociation rate constant (kd), and dissociation constant (KD; KD=kd/ka) were calculated using a 1:1 binding model. The results are shown in Table 4.

TABLE 4

Dissociation constant of human chimerized antibodies from human SIRPA

| Human chimerized antibody | KD (nM) |
|---|---|
| cD13 | 0.0811 |
| cF44 | 1.72 |
| cF63 | 0.166 |

5)-2 Analysis of Species Cross-Reactivity with Monkey SIRPA

293α cells were prepared in a 10% FBS-containing DMEM medium at $5 \times 10^5$ cells/mL. pFLAG V5-DEST-monkey SIRPA or pFLAG V5-DEST was introduced into the cells using Lipofectamine LTX (Invitrogen), 100 μL per well was added to a 96-well plate (Corning Incorporated), and cells were cultured overnight in a 10% FBS-containing DMEM medium at 37° C. under a 5% $CO_2$ condition. The obtained introduced cells were used for cell-based ELISA in a state that they adhered to each other. After the culture supernatant was removed, the binding activity against monkey SIRPA was evaluated in the same manner as for the binding activity against human SIRPA.

Figure 7:
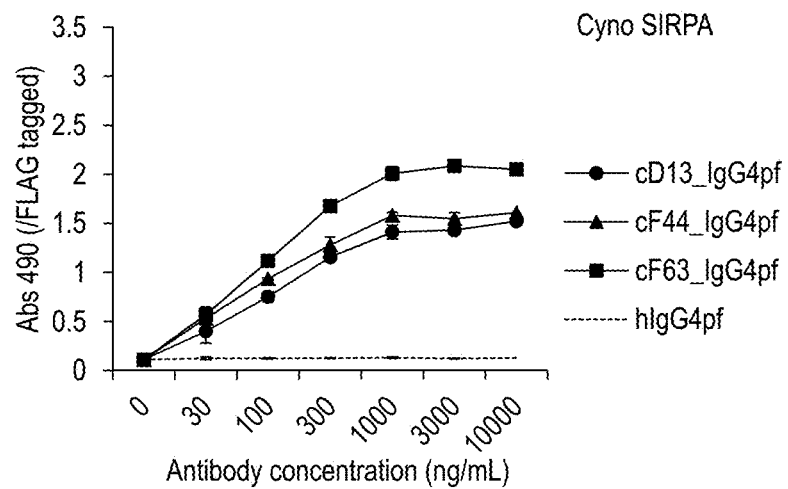
FIG. 7 shows the binding of human chimeric anti-SIRPA antibodies (cD13, cF44, and cF63) to monkey SIRPA.

As shown in FIG. 7, the cD13, cF44, and cF63 antibodies exhibited binding to monkey SIRPA.

5)-3 Evaluation of Human and Monkey SIRPA-CD47 Binding Inhibitory Activity

After the culture supernatant of the human SIRPA and monkey SIRPA expression vector-introduced 293α cells prepared in Examples 5)-1 and 5)-2, respectively, was removed, 50 μL per well of cD13 (IgG2 and IgG4pf), cF44 (four different constant regions IgG1, IgG2, IgG4p, and IgG4pf), and cF63 (IgG2 and IgG4pf) diluted with 5% FBS-containing PBS to final concentrations of 0 to 10,000 ng/mL were added to each of pcDNA3.2 V5-DEST-SIRPA_V1, pcDNA3.2 V5-DEST-monkey SIRPA, and pcDNA3.2 V5-DEST-introduced 293α cells, immediately followed by addition of 50 μL per well of peroxidase-labeled CD47-Fc prepared in 5% FBS-containing PBS at a final concentration of 10,000 ng/mL, and the mixture was allowed to stand at 4° C. for one hour. Thereafter, the SIRPA-CD47 binding inhibitory activity was evaluated in the same manner as in 1)-6-3.

Figure 8A:
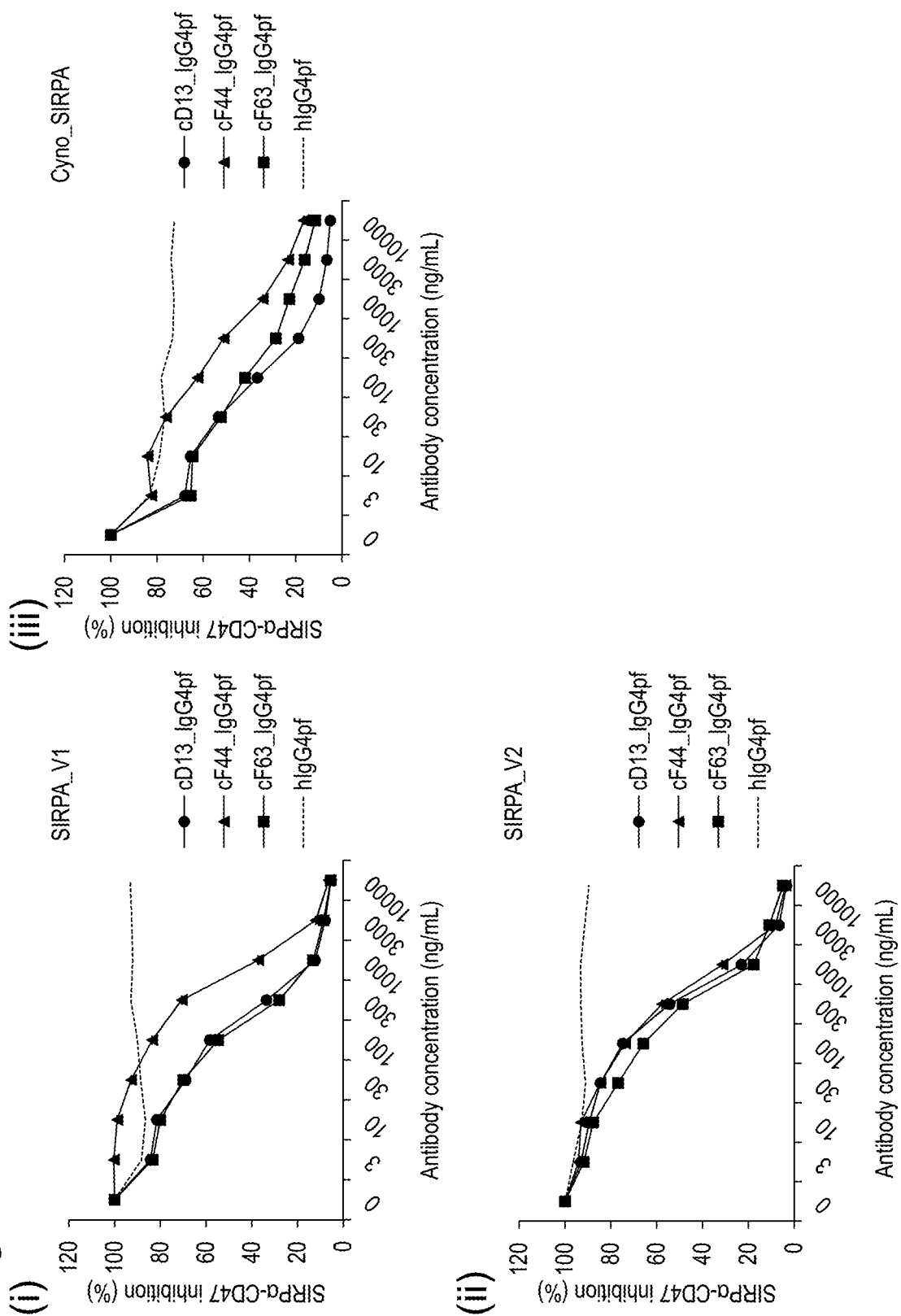
FIG. 8A shows the inhibitory activity of human chimeric anti-SIRPA antibodies (cD13, cF44, and cF63) against binding of human or monkey SIRPA and CD47 [(i) SIRPA_V1, (ii) SIRPA_V2, (iii) monkey SIRPA].
Figure 8B:
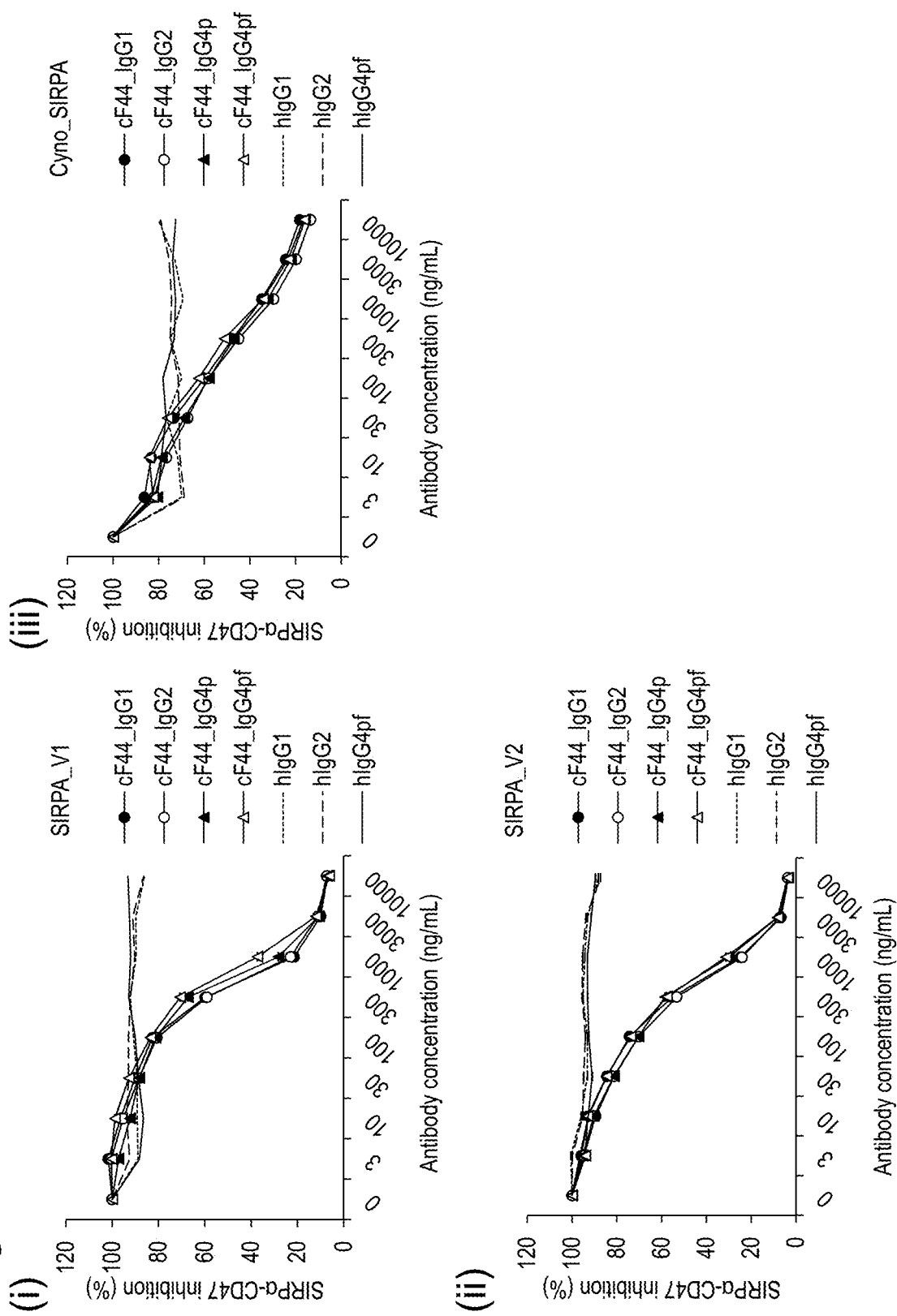
FIG. 8B shows the inhibitory activity of human chimeric anti-SIRPA antibodies (isotypes of cF44) against binding of human or monkey SIRPA and CD47 [(i) SIRPA_V1, (ii) SIRPA_V2, (iii) monkey SIRPA].

As shown in FIG. 8, cF44, cF63, and cD13 exhibited the inhibitory activity against the binding of human and monkey SIRPA and CD47 [FIGS. 8A (i), (ii), and (iii)], and the activity was virtually equivalent between the isotypes thereof [FIGS. 8B (i), (ii), and (iii)].

5)-4 ADCP Activity of Human Chimeric Anti-Human SIRPA Antibody Against Cancer Cell Line
5)-4-1 Preparation of Target Cells CD47-positive human Burkitt's lymphoma cell line Raji cells were collected and washed twice with PBS, and then the viable cell count was measured by a trypan blue dye exclusion test. Thereafter, target cells were prepared in the same manner as in 2-6-1.

5)-4-2 Preparation of PBMCs

PBMCs were prepared in the same manner as in 2)-6-2.

5)-4-3 Preparation of Effector Cells

Effector cells were prepared in the same manner as in 2)-6-3.

5)-4-4 Evaluation of ADCP Activity

A volume of 50 µL per well of the target cells prepared by the method of Example 5)-4-1 were added to Ultra-Low Attachment 96-Well U-Shaped Bottom Microplate (Sumitomo Bakelite). A volume of 50 µL per well of cD13, cF44, cF63, Hu5F9G4, TTI-621 and various control Human IgG diluted with a 10% FBS-containing RPMI 1640 medium (Life Technology) to final concentrations of 0 to 10,000 ng/mL were added to the wells. A volume of 50 µL per well of a 10% FBS-containing RPMI 1640 medium (Life Technology) was added for the single agent group, and 50 µL per well of rituximab (Zenyaku Kogyo) diluted with a 10% FBS-containing RPMI 1640 medium (Life Technology) to a final concentration of 400 ng/ml was added for the combination use group. Thereafter, the ADCP activity was evaluated in the same manner as in 2)-6-4.

As shown in FIG. 9, cD13, cF44, and cF63 did not exhibit the ADCP activity against the CD47-positive human Burkitt's lymphoma cell line Raji cells when used as a single agent (FIG. 9A), but exhibited the ADCP activity similar to those of Hu5F9G4 and TTI-621 when used in combination with rituximab (FIG. 9B).

5)-5 Evaluation of Toxicity of Human Chimeric Anti-Human SIRPA Antibody Against PBMCs and Macrophages 5)-5-1 Preparation of PBMCs and Macrophages as Target Cells Target cells were prepared in the same manner as in 2)-6-2 (PBMCs) and 2)-6-3 (macrophages). The collected cells were fluorescence-labeled in the same manner as in 2)-6-1 and used as target cells.

5)-5-2 Preparation of Effector Cells

Effector cells were prepared in the same manner as in 2)-6-3.

5)-5-3 Evaluation of ADCP Activity

A volume of 50 µL per well of PBMCs prepared by the method of Example 5)-4-2 or macrophages were added to Ultra-Low Adhesion Surface 96-Well U-Shaped Bottom Microplate (Sumitomo Bakelite). A volume of 50 µL per well of cD13 (IgG4 pf), cF44 (four different constant regions IgG1, IgG2, IgG4p, and IgG4pf), cF63 (IgG4pf), Hu5F9G4, TTI-621, and various control human IgG diluted with a 10% FBS-containing RPMI 1640 medium (Life Technology) to final concentrations of 0.64 to 10,000 ng/mL were added to the wells. A volume of 50 µL per well of a 10% FBS-containing RPMI 1640 medium (Life Technology) was added. Thereafter, the ADCP activity was evaluated in the same manner as in 2)-6-4. The ratio of the ADCP activity against macrophages was calculated by dividing the cell count upon addition of each antibody by the cell count of macrophages upon addition of the control antibody.

Figure 10:
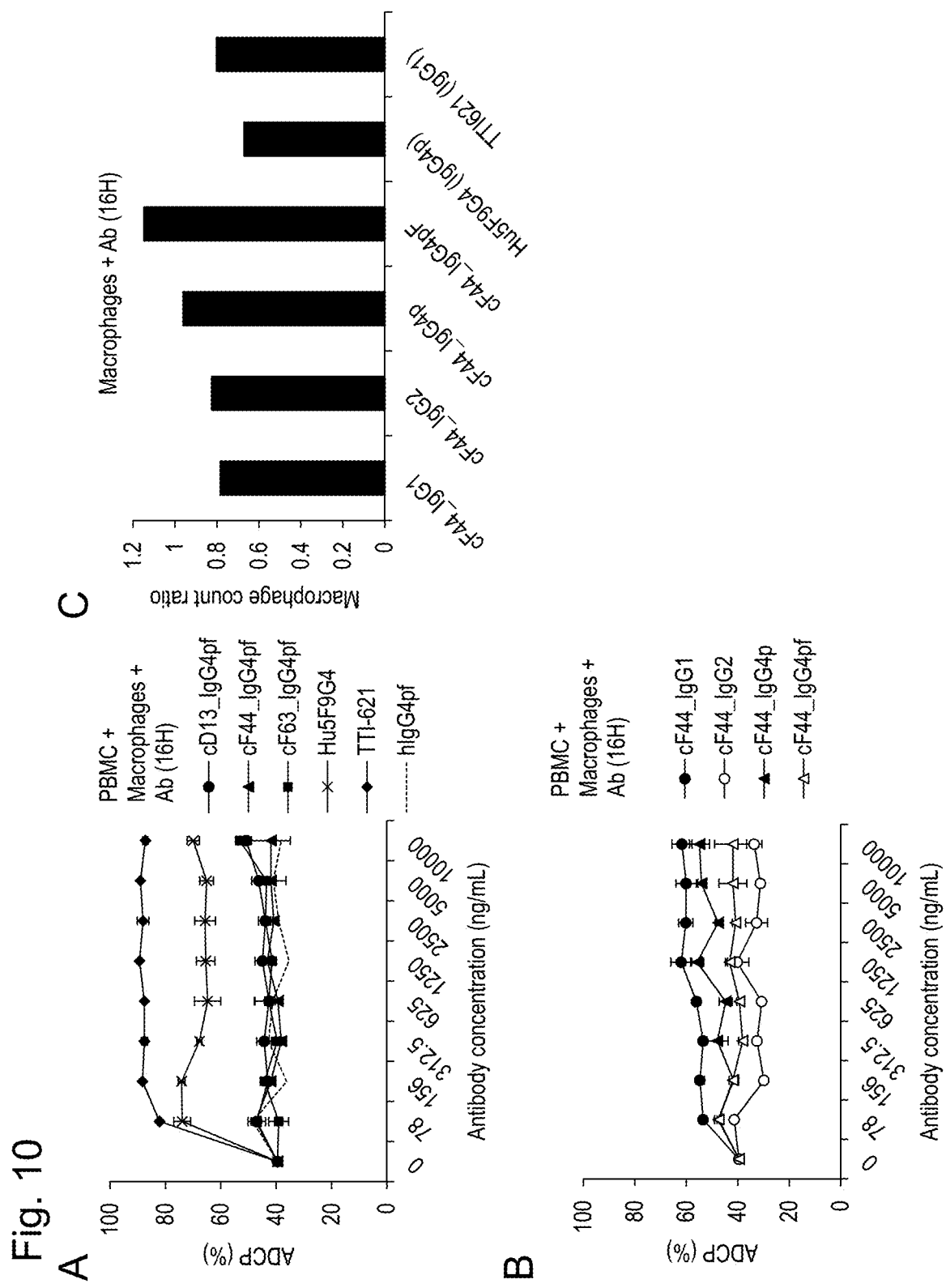
FIG. 10 shows the toxicity of human chimeric anti-human SIRPA antibodies against PBMCs and macrophages. Graph A shows an ADCP activity of cD13, cF44 and cF63 against PBMCs, Graph B shows the ADCP activity of cF44 antibodies with a different constant region, and Graph C shows ratios of macrophages present.

As shown in FIG. 10, the ADCP activity of cD13, cF44, and cF63 against PBMCs was virtually equivalent to that of the control IgG (FIG. 10A). Further, a comparison of cF44 antibodies with a different constant region showed that the IgG1 type and the IgG4p type exhibited the ADCP activity dependently on the concentration of the added antibody, but the IgG2 type and the IgG4pf type did not exhibit the ADCP activity (FIG. 10B).

Meanwhile, when cF44 antibodies with a different constant region were compared for the ratio of macrophages present at 16 hours after adding antibodies, the IgG4pf type showed the lowest percent macrophage reduction, indicating a possibility of the lowest toxicity against SIRPA positive cells induced by adding the antibody (FIG. 10C).

Example 6. Designing Humanized Anti-SIRPA Antibodies

6)-1 Molecular Modeling of Variable Region of Chimeric Antibody cD13

For a molecular modeling of the cD13 variable region, a known method (Methods in Enzymology. 1991; 203, 121-153) was used as a homology modeling. An analysis was performed using the structure (PDB ID: 3CSY) having a high sequence identity with the cD13 heavy chain and light chain variable regions, which is registered in Protein Data Bank (Nuc. Acid. Res. 2007; 35, D301-D303), as a template and a commercially available protein three-dimensional structural analysis program BioLuminate (Schrodinger).

6)-2 Designing Humanized Amino Acid Sequences cD13 was humanized by CDR grafting (Proc. Natl. Acad. Sci. USA. 1989; 86, 10029-10033). IGHV3-30*13 and IGHJ3*01, and IGKV1-6*01 and IGKJ2*01, which are human germline sequences registered in the international ImMunoGeneTics information system (IMGT, http://www.imgt.org), as well as the consensus sequences of human κ chain subgroup 4 established in Kabat et al. [Sequences of Proteins of Immunological Interest, 5th Ed. Public Health Service National Institutes of Health, Bethesda, MD. (1991)], were selected as acceptors because they have a high identity to the framework region of cD13. Donor residues transferred onto an acceptor were selected by analyzing a three-dimensional model with reference to the criteria provided by Queen et al. (Proc. Natl. Acad. Sci. USA. 1989; 86, 10029-10033) and the like.

6)-3 Humanization of cD13 Heavy Chains

Two different heavy chains designed were designated as hH1 and hH2. The amino acid sequence of the full-length hH1 heavy chain is set forth in SEQ ID NO: 41 in the sequence listing. The nucleotide sequence encoding the amino acid sequence of SEQ ID NO: 41 is set forth in SEQ ID NO: 40 in the sequence listing. The amino acid sequence of the full-length hH2 heavy chain is set forth in SEQ ID NO: 43 in the sequence listing. The nucleotide sequence encoding the amino acid sequence of SEQ ID NO: 43 is set forth in SEQ ID NO: 42 in the sequence listing. In SEQ ID NOS: 41 and 43, an amino acid sequence consisting of amino acid residues 1 to 19 corresponds to the signal sequence, an amino acid sequence consisting of amino acid residues 20 to 139 corresponds to the variable region, and an amino acid sequence consisting of amino acid residues 140 to 466 corresponds to the constant region. Further, in SEQ ID NOS: 40 and 42, a nucleotide sequence consisting of nucleotides 1 to 57 encodes the signal sequence, a nucleotide sequence consisting of nucleotides 58 to 417 encodes the variable region, and a nucleotide sequence consisting of nucleotides 418 to 1398 encodes the constant region. The sequences of SEQ ID NOS: 40 and 41 are also shown in FIG. 26, and the sequences of SEQ ID NOS: 42 and 43 are also shown in FIG. 27.

A comparison of the amino acid sequences of cD13_H, which is the heavy chain of the human chimeric anti-SIRPA antibody cD13, and hH1 and hH2, which are the heavy chains of the humanized antibody, is shown in FIG. 11. In the sequences of hH1 and hH2, "•" indicates that the amino acid residue is identical to the one in the sequence of c013_H, and the site with an amino acid residue indicates an amino acid residue by which the residue was substituted.

6)-4 Humanization of cD13 Light Chains

Three different light chains designed were designated as hL2, hL3, and hL4. The amino acid sequence of the full-length light chain of hL2 is set forth in SEQ ID NO: 35 in the sequence listing. The nucleotide sequence encoding the amino acid sequence of SEQ ID NO: 35 is set forth in SEQ ID NO: 34 in the sequence listing. The full-length amino acid sequence of the light chain of hL3 is set forth in SEQ ID NO: 37 in the sequence listing. The nucleotide sequence encoding the amino acid sequence of SEQ ID NO: 37 is set forth in SEQ ID NO: 36. The full-length amino acid sequence of the light chain of hL4 is set forth in SEQ ID NO: 39 in the sequence listing. The nucleotide sequence encoding the amino acid sequence of SEQ ID NO: 39 is set forth in SEQ ID NO: 38. In SEQ ID NOS: 35, 37, and 39, an amino acid sequence consisting of amino acid residues 1 to 20 corresponds to the signal sequence, an amino acid sequence consisting of amino acid residues 21 to 127 corresponds to the variable region, and an amino acid sequence consisting of amino acid residues 128 to 234 corresponds to the constant region. Further, in SEQ ID NOS: 34, 36, and 38, a nucleotide sequence consisting of nucleotides 1 to 60 encodes the signal sequence, a nucleotide sequence consisting of nucleotides 61 to 381 encodes the variable region, and a nucleotide sequence consisting of nucleotides 382 to 702 corresponds to the constant region. The sequences of SEQ ID NOS: 34 and 35 are also shown in FIG. 23, and the sequences of SEQ ID NOS: 36 and 37 are also shown in FIG. 24, and the sequences of SEQ ID NOS: 38 and 39 are also shown in FIG. 25.

A comparison of the amino acid sequence of cD13_L, which is the light chain of the human chimeric anti-SIRPA antibody cD13, and those of hL2, hL3, and hL4, which are the light chains of the humanized antibodies, is shown in FIG. 12. In the sequences of hL2, hL3, and hL4, "•" indicates that the amino acid residue is identical to the one in the sequence of cD13_L, and a site with an amino acid residue indicates an amino acid residue by which the residue was substituted.

6)-5 Designing Humanized Antibodies by Combinations of Heavy Chains and Light Chains An antibody comprising hH1 and hL3 is referred to as "H1L3 antibody" or "H1L3." An antibody comprising hH1 and hL4 is referred to as "H1L4 antibody" or "H1L4." An antibody comprising hH2 and hL2 is referred to as "H2L2 antibody" or "H2L2." An antibody comprising hH2 and hL3 is referred to as "H2L3 antibody" or "H2L3."

Example 7. Preparation of Humanized Anti-SIRPA Antibodies

7)-1 Construction of Humanized Antibody Heavy Chain Expression Vectors

7)-1-1 Construction of hH1 Expression Vector

A DNA fragment consisting of nucleotides at positions 36 to 434 of the nucleotide sequence of hH1 set forth in SEQ ID NO: 40 in the sequence listing was synthesized (GeneArt). The hH1 expression vector was constructed by inserting the synthesized DNA fragment at a site where pCMA-G4proFALA was cleaved with a restriction enzyme BlpI using In-Fusion HD PCR Cloning Kit (Clontech Laboratories Inc.).

7)-1-2 Construction of hH2 Expression Vector

A DNA fragment consisting of nucleotides at positions 36 to 434 in the nucleotide sequence of hH2 set forth in SEQ ID NO: 42 in the sequence listing was synthesized (GeneArt). The hH2 expression vector was constructed in the same manner as in Example 7)-1-1.

7)-2 Construction of Humanized Antibody Light Chain Expression Vectors

7)-2-1 Construction of hL2 Expression Vector

A DNA fragment consisting of nucleotides at positions 37 to 402 in the nucleotide sequence of hL2 of SEQ ID NO: 34 in the sequence listing was synthesized (GeneArt). The hL2 expression vector was constructed by inserting the synthesized DNA fragment at a site where pCMA-LK was cleaved with a restriction enzyme BsiWI using In-Fusion HD PCR Cloning Kit (Clontech Laboratories Inc.).

7)-2-2 Construction of hL3 Expression Vector

A DNA fragment consisting of nucleotides at positions 37 to 402 in the nucleotide sequence of hL3 set forth in SEQ ID NO: 36 in the sequence listing was synthesized (GeneArt). The hL3 expression vector was constructed in the same manner as in Example 7)-2-1.

7)-2-3 Construction of hL4 Expression Vector

A DNA fragment consisting of nucleotides at positions 37 to 402 in the nucleotide sequence of hL4 set forth in SEQ ID NO: 38 in the sequence listing was synthesized (GeneArt). The hL4 expression vector was constructed in the same manner as in Example 7)-2-1.

7)-3 Preparation of Humanized Antibodies

7)-3-1 Production of Humanized Antibodies

Humanized antibodies were produced in the same manner as in Example 4)-7-1. Various humanized antibodies were obtained using combinations of the H chain expression vectors and the L chain expression vectors corresponding to the combinations of the H chains and the L chains shown in Example 6)-5.

7)-3-2 Preparation of Humanized Antibodies

The culture supernatant obtained in Example 7)-3-1 was purified by a two-step process of rProtein A affinity chromatography and ceramic hydroxyapatite. After the culture supernatant was applied to a column filled with MabSelect SuRe (GE Healthcare Bioscience Corp.) equilibrated with PBS, the column was washed with PBS in a volume more than two-fold of the column capacity. Subsequently, an antibody was eluted with 2 M arginine hydrochloride solution (pH 4.0). The buffer was replaced with PBS by dialysis of fractions containing the antibody (Thermo Scientific, Slide-A-Lyzer Dialysis Cassette), and the fractions were diluted five-fold with a buffer of 5 mM sodium phosphate/50 mM MES/pH 7.0 and applied to a ceramic hydroxyapatite column (Japan Bio-Rad, Bio-Scale CHT Type-1 Hydroxyapatite Column) equilibrated with a buffer 5 mM NaPi/50 mM MES/30 mM NaCl/pH 7.0. Elution by sodium chloride was performed with a linear concentration gradient to collect fractions containing the antibody. The buffer was replaced with HBSor (25 mM histidine/5% sorbitol, pH 6.0) by dialysis of fractions (Thermo Scientific, Slide-A-Lyzer Dialysis Cassette). The antibody was concentrated with Centrifugal UF Filter Device VIVASPIN20 (molecular weight cutoff for ultrafiltration, 10 kDa: Sartorius AG) and adjusted to an IgG concentration of 50 mg/mL. Finally, the solution was filtered with Minisart-Plus Filter (Sartorius AG) to obtain a purified sample.

Example 8. In Vitro Evaluation of Humanized Anti-SIRPA Antibodies (hD13_H1L3, hD13_H1L4h, hD13_H2L2, and hD13_H2L3)

8)-1 Binding Activity of Humanized Anti-SIRPA Antibodies to Human, Monkey, and Mouse SIRPA
8)-1-1 Binding Activity of Humanized Anti-SIRPA Antibodies to Human, Monkey, and Mouse SIRPA (Cell-Based ELISA)

The 293α cells, described in Example 1)-6, were prepared at $5 \times 10^5$ cells/mL in a 10% FBS-containing DMEM medium. pFLAG V5-DEST-SIRPA_V1-V10, pFLAG V5-DEST-monkey SIRPA, pFLAG V5-DEST-mouse SIRPA, or pFLAG V5-DEST was introduced into the cells using Lipofectamine LTX (Invitrogen), and 100 µL each was aliquoted to a 96-well plate (Corning Incorporated) and cultured overnight in a 10% FBS-containing DMEM medium at 37° C. under a 5% $CO_2$ condition. The obtained introduced cells were used for cell-based ELISA in a state that they adhered. After the culture supernatant was removed, 50 µL per well of hD13_H1L3, hD13_H1L4h, hD13_H2L2, hD13_H2L3, or cD13 prepared in Examples 6 and 7 or a control antibody was added to each of various SIRPA genes-introduced cells at a final concentration of 0 to 10,000 ng/mL, and the mixture was allowed to stand at 4° C. for one hour. Thereafter, binding to human SIRPA was evaluated in the same manner as in Example 5-1.

Figure 13A:
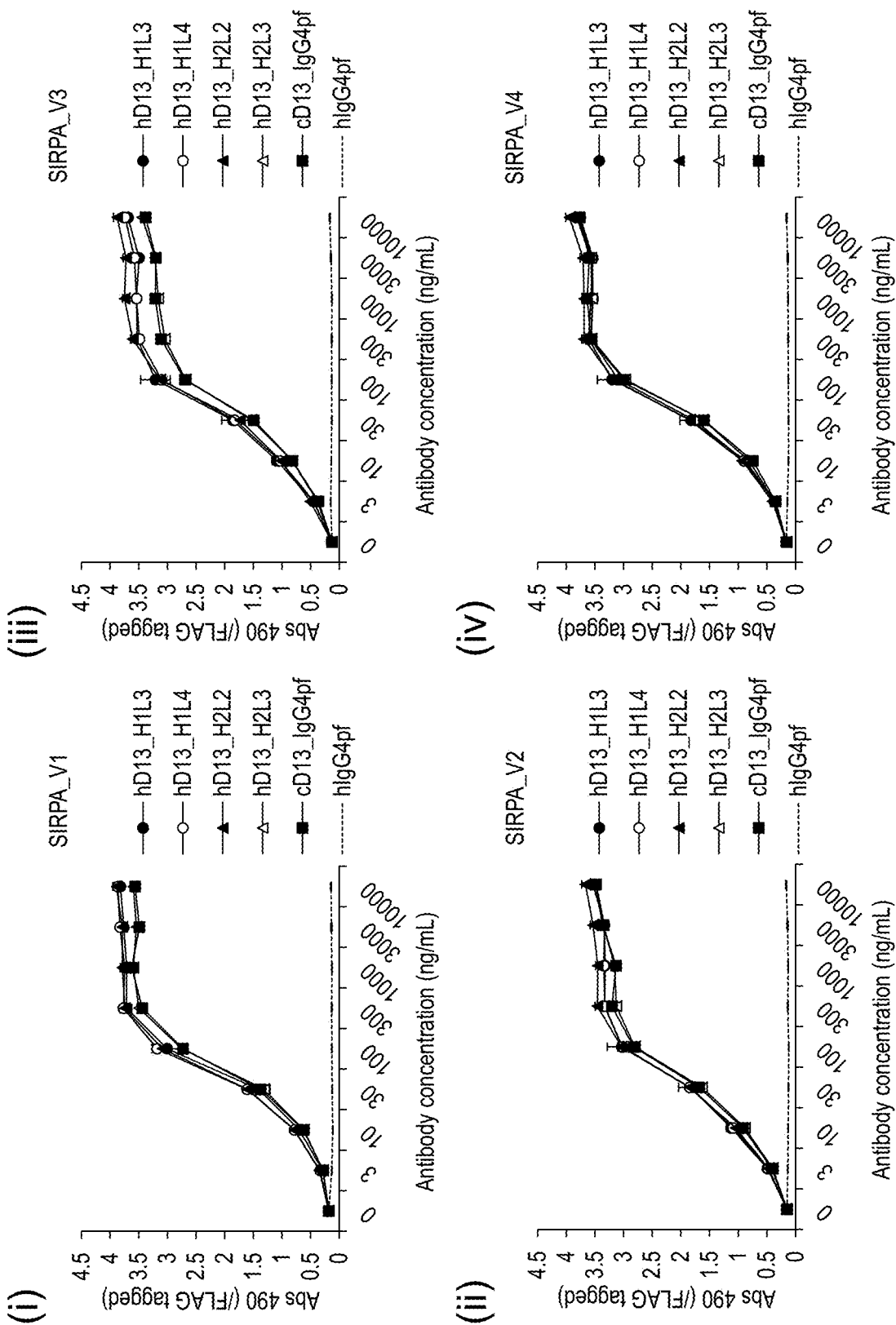
FIG. 13A is graphs showing a binding activity of a humanized anti-SIRPA antibody to human SIRPA variants [(i) V1, (ii) V2, (iii) V3, and (iv) V4].
Figure 13B:
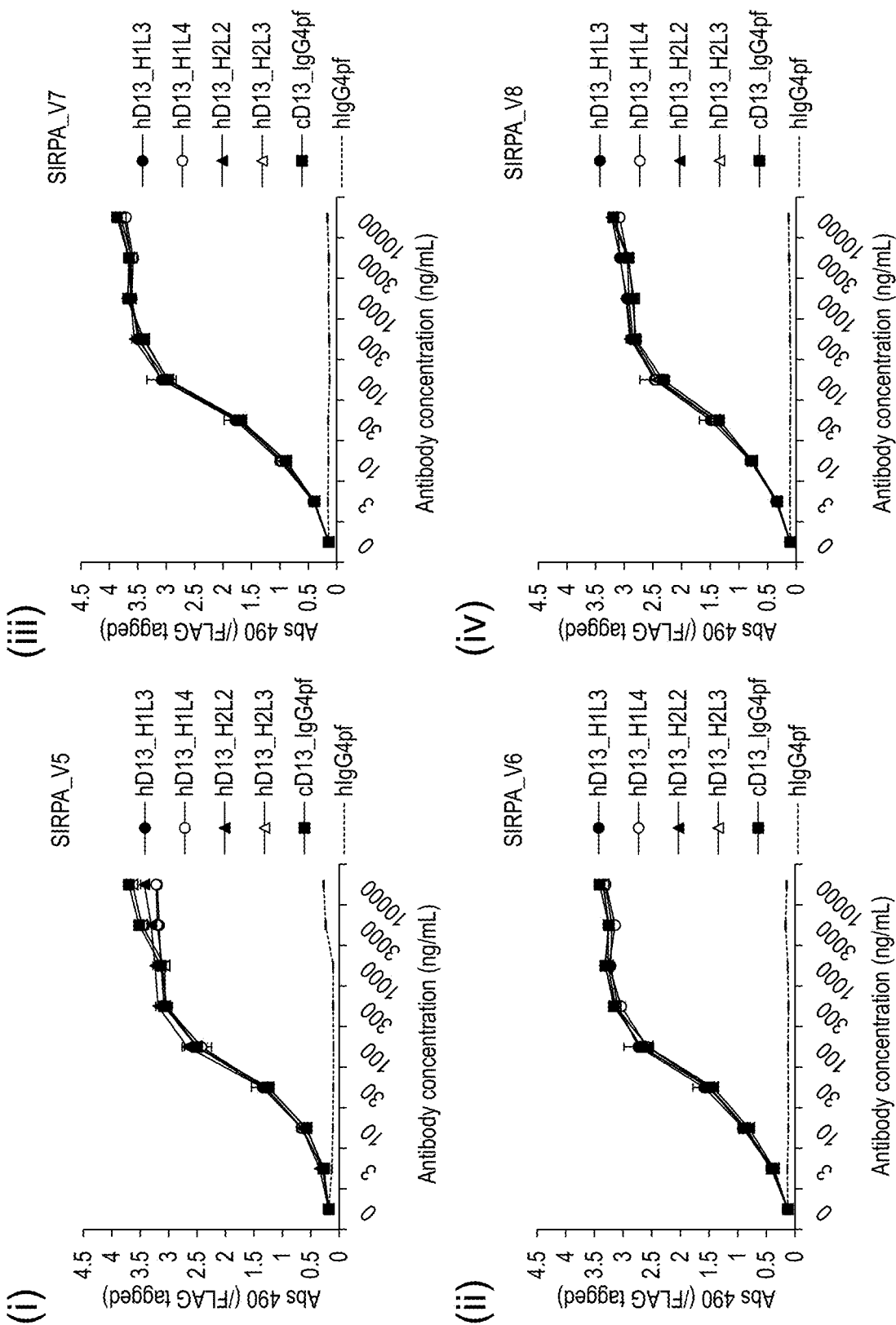
FIG. 13B is graphs showing a binding activity of a humanized anti-SIRPA antibody to human SIRPA variants [(i) V5, (ii) V6, (iii) V7, and (iv) V8].
Figure 14B:
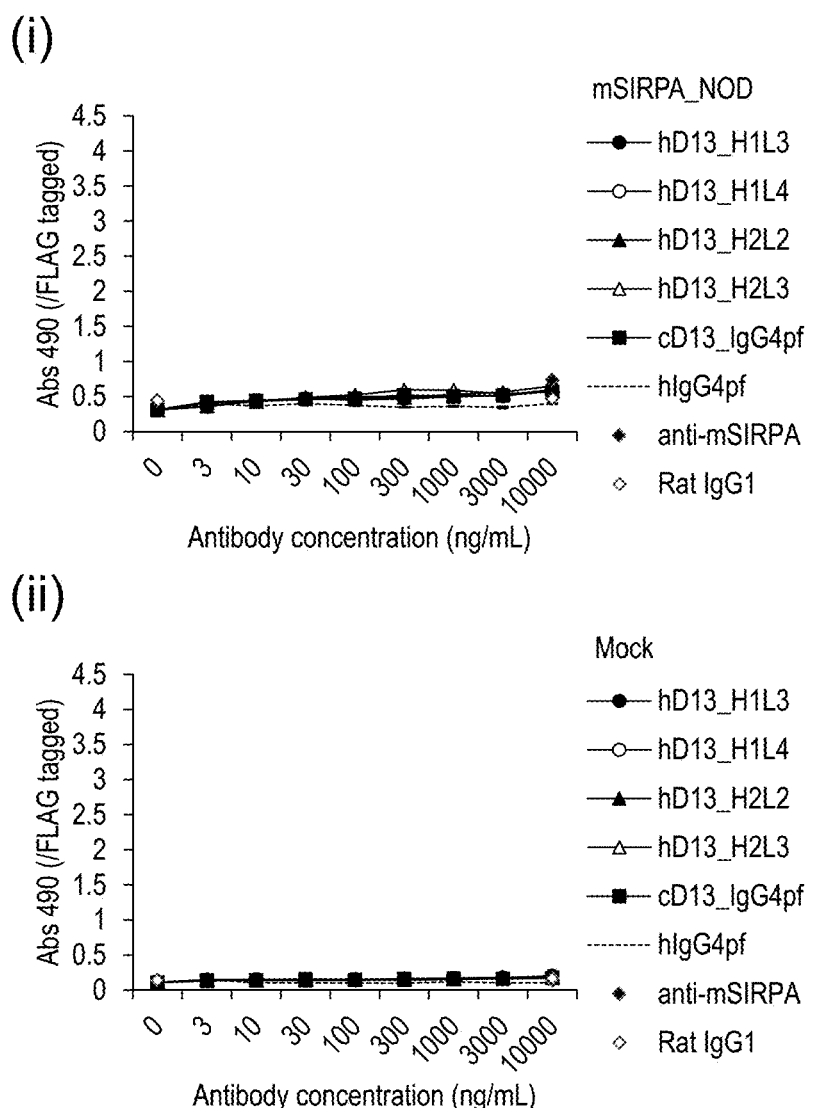
FIG. 14B is graphs showing a binding activity of a humanized anti-SIRPA antibody to mouse SIRPA [(i) NOD, and (ii) mock].

As shown in FIGS. 13A to 13C, the hD13_H1L3, hD13_H1L4h, hD13_H2L2, and hD13_H2L3 antibodies exhibited binding to SIRPA variants V1 to V10 and monkey SIRPA which was equivalent to or higher than that of the cD13 antibody. In contrast, as shown in FIGS. 14A and 14B, neither humanized antibodies nor human chimeric antibody exhibited binding to mouse SIRPA.

8)-1-2 Evaluation of Binding of Humanized Antibodies to SIRPA

The dissociation constants of hD13_H1L3, hD13_H1L4, hD13_H2L2, and hD13_H2L3 prepared in Example 7 against human SIRPA_V1_IgV and monkey SIRPA_ECD prepared in Example 1 were measured by a capture method of capturing a humanized antibody as a ligand to an Anti-Human IgG (Fc) antibody immobilized using Human Antibody Capture Kit (GE Healthcare Bioscience Corp.) and measuring an antigen as an analyte, using Biacore T200 (GE Healthcare Bioscience Corp.). HBS-EP+ (GE Healthcare Bioscience Corp.) was used as a running buffer, and CM5 (GE Healthcare Bioscience Corp.) was used as a sensor chip. Onto the chip, 1 µg/mL humanized antibody was added at 10 µL/min for 60 seconds, and then a serially diluted solution (0.5 to 8 µg/mL) of human SIRPA protein or a serially diluted solution (1 to 16 µg/mL) of monkey SIRPA protein was added as an antigen at a flow rate of 30 L/min for 120 seconds, and subsequently the dissociation phase for 600 seconds was monitored. As a regenerant, 3 M magnesium chloride (GE Healthcare Bioscience Corp.) was added at a flow rate of 20 µL/min for 30 seconds. For data analysis, a binding rate constant (ka), a dissociation rate constant (kd), and a dissociation constant (KD; KD=kd/ka) were calculated using a 1:1 binding model. The results are shown in Table 5.

TABLE 5

Dissociation constants of humanized antibodies against SIRPA

| Humanized antibody | KD (nM) Human SIRPA | KD (nM) Monkey SIRPA |
|---|---|---|
| hD13_H1L3 | 0.0785 | 38.6 |
| hD13_H1L4 | 0.107 | 83.9 |
| hD13_H2L2 | 0.131 | 162 |
| hD13_H2L3 | 0.0859 | 54.2 |

8)-2 Evaluation of Inhibitory Activity of Humanized Anti-SIRPA Antibodies Against Binding to Human or Monkey SIRPA-CD47

After the culture supernatant of human SIRPA or monkey SIRPA expression vector-introduced 293α cells prepared in Example 8)-1 was removed, 50 µL per well of hD13_H1L3, hD13_H1L4h, hD13_H2L2, or hD13_H2L3 diluted with 5% FBS-containing PBS to a final concentration of 0 to 10,000 ng/mL was added to each of pcDNA3.2 V5-DEST-SIRPA_V1, pcDNA3.2 V5-DEST-SIRPA_V2, pcDNA3.2 V5-DEST-monkey SIRPA, and pcDNA3.2 V5-DEST-introduced 293α cells, immediately followed by addition of peroxidase-labeled CD47-Fc prepared with 5% FBS-containing PBS at 1 µg/mL, and the mixture was allowed to stand at 4° C. for one hour. Thereafter, the SIRPA-CD47 binding inhibitory activity was evaluated in the same manner as in 1)-6-3.

As shown in FIG. 15, the hD13_H1L3, hD13_H1L4h, hD13_H2L2, and hD13_H2L3 antibodies exhibited a binding inhibitory activity equivalent to or higher than that of the cD13 antibody against SIRPA_V1 (FIG. 15A), SIRPA_V2 (FIG. 15B), and monkey SIRPA (FIG. 15C).

8)-3 ADCP Activity of Humanized Anti-Human SIRPA Antibodies Against Cancer Cell Line
8)-3-1 Preparation of Target Cells CD47-positive human Burkitt's lymphoma cell line Raji cells or Ramos cells were collected and washed twice with PBS, and the viable cell count was measured by a trypan blue dye exclusion test. Then, $4 \times 10^7$ cells were aliquoted, centrifuged, and suspended in 2 mL of Diluent C included in CellVue Claret Far Red Fluorescent Cell Linker Kit (Sigma). As a labeling solution, 1 mM CellVue Claret Dye was diluted with Diluent C to 10 µM, immediately followed by mixing the cell suspension and an equal volume of the CellVue Claret Dye solution, and the mixture was allowed to stand at room temperature for 15 minutes. A volume of 25 mL of a 10% FBS-containing RPMI 1640 medium (Life Technology) was added, and cells were washed twice and re-suspended at $2 \times 10^6$ cells/mL and used as target cells. Thereafter, the target cells were prepared in the same manner as in 2)-6-1.

8)-3-2 Preparation of PBMCs
PBMCs were prepared in the same manner as in 2)-6-2.

8)-3-3 Preparation of Effector Cells
Effector cells were prepared in the same manner as in 2)-6-3, washed twice with PBS, and re-suspended in PBS to $1 \times 10^6$ cells/mL. Then, 1 µL of a $10^6$ cells/mL CFSE solution (Thermo Fisher) was added as a labeling solution, and the mixture was allowed to stand at room temperature for 10 minutes. A volume of 20 mL of a 10% FBS-containing RPMI 1640 medium (Life Technology) was added, and cells were washed twice, re-suspended to $1 \times 10^6$ cells/mL, and used as effector cells.

8)-3-4 Evaluation of ADCP Activity

A volume of 50 µL per well of the target cells prepared by the method of Example 8)-3-1 were added to Ultra-Low Attachment 96-Well U-Shaped Bottom Microplate (Sumitomo Bakelite). To the wells, 50 µL per well of the hD13_H1L3, hD13_H1L4h, hD13_H2L2, hD13_H2L3, or cD13 antibody, Hu5F9G4, TTI-621, or various control Human IgG diluted with a 10% FBS-containing RPMI 1640 medium (Life Technology) to a final concentration of 0 to 10,000 ng/mL was added. A volume of 50 µL per well of a 10% FBS-containing RPMI 1640 medium (Life Technology) was added for the single agent group, and 50 µL per well of rituximab (Zenyaku Kogyo) diluted with a 10% FBS-containing RPMI 1640 medium (Life Technology) to a final concentration of 400 ng/mL was added for the combination use group. A volume of 50 µL per well of effector cells prepared at 1×10$^6$ cells/mL in Example 8-3-3 was added, the mixture was allowed to stand at 37° C. under a 5% $CO_2$ condition for 16 hours. After the mixture was centrifuged at 1200 rpm at 4° C. for five minutes, and the supernatant was removed, cells were washed with 200 µL per well of 5% FBS-containing PBS. The cells were suspended in 100 µL per well of 1×BD Stabilizing Fixative (Becton Dickinson), and the suspension was allowed to stand overnight at 4° C. On the following day, the cell count was measured by flow cytometry (FACS Canto II: Becton Dickinson). For data analysis, FlowJo (TreeStar) was used. Cells were characterized by detecting forward scattered (FSC) light and side-scattered (SSC) light, and then the numbers of cells positive for APC (A) and cells positive for both APC and FITC (B) were obtained. Cells positive for both APC and FITC (B) were deemed to be target cells that had been phagocytized by macrophages. The percent cellular phagocytosis by the ADCP activity was calculated by the following equation:

$$\text{Percent cellular phagocytosis (\%)} = B/(A + B) \times 100$$

Figure 16:
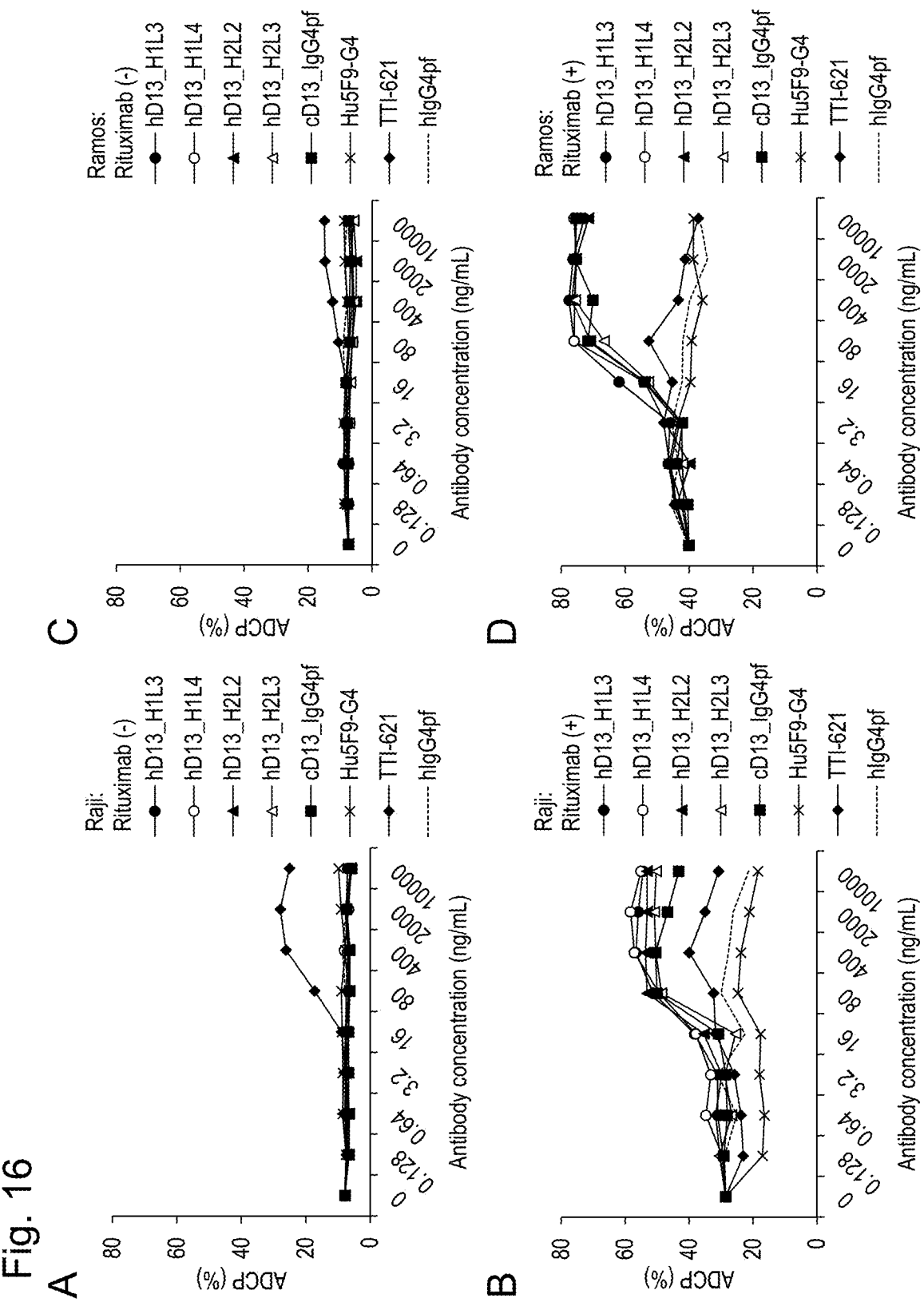
FIG. 16 is graphs showing the ADCP activity against cancer cell lines (A and B, Raji cell line; C and D, Ramos cell line) when a humanized anti-human SIRPA antibody is used as a single agent (A and C) and when the humanized anti-human SIRPA antibody is used in combination with rituximab (B and D).

As shown in FIG. 16, the hD13_H1L3, hD13_H1L4h, hD13_H2L2, hD13_H2L3, and cD13 antibodies did not exhibit the ADCP activity against CD47-positive human Burkitt's lymphoma cell line Raji or Ramos cells when they were used alone (FIGS. 16A and C), and exhibited the ADCP activity dependent on the concentration of the added antibodies when they were used in combination with rituximab (FIGS. 16B and D). The humanized antibody clones exhibited the ADCP activity equivalent to or higher than that of the human chimeric antibody clone.

Example 9. In Vitro Evaluation of Various Anti-SIRPA Antibodies

9)-1 Evaluation of Binding of Various Anti-SIRPA Antibodies to SIRPA

The dissociation constants of the hD13_H1L3 antibody prepared in Example 7, OSE-172 (prepared with reference to International Publication WO 17/178653), KWAR23 (prepared with reference to International Publication WO 18/026600), and ADU-1805 (prepared with reference to International Publication WO 18/190719) were measured against human SIRPA_V1_IgV and human SIRPA_V2_IgV prepared in Example 1. The amino acid sequence of the heavy chain of OSE-172 is set forth in SEQ ID NO: 81, the amino acid sequence of the light chain of OSE-172 is set forth in SEQ ID NO: 82, the amino acid sequence of the heavy chain of KWAR23 is set forth in SEQ ID NO: 83, the amino acid sequence of the light chain of KWAR23 is set forth in SEQ ID NO: 84, the amino acid sequence of the heavy chain of ADU-1805 is set forth in SEQ ID NO: 85, and the amino acid sequence of the light chain of ADU-1805 is set forth in SEQ ID NO: 86 in the sequence listing. The dissociation constants were measured by a capture method comprising capturing each antibody as a ligand to an Anti-Human IgG (Fc) antibody immobilized using Human Antibody Capture Kit (GE Healthcare Bioscience Corp.) and measuring an antigen as an analyte, using Biacore T200 (GE Healthcare Bioscience Corp.). HBS-EP+(GE Healthcare Bioscience Corp.) was used as a running buffer, and CM5 (GE Healthcare Bioscience Corp.) was used as a sensor chip. Onto the chip, 2 µg/mL of various antibodies were added at 10 µL/min for 30 seconds, then a serially diluted solution (0.25 to 16 nM) of the human SIRPA protein as an antigen was added at a flow rate of 30 µL/min for 120 seconds, and subsequently the dissociation phase for 600 seconds was monitored. As a regenerant, 3 M magnesium chloride (GE Healthcare Bioscience Corp.) was added at a flow rate of 20 µL/min for 30 seconds. For data analysis, a binding rate constant (ka), a dissociation rate constant (kd), and a dissociation constant (KD; KD=kd/ka) were calculated using a 1:1 binding model. The results are shown in Table 6.

TABLE 6

Dissociation constants of various anti-SIRPA antibodies against SIRPA_V1 and V2

| Anti-SIRPAα antibody | KD (nM) | |
|---|---|---|
| | Human SIRPA_V1 | Human SIRPA_V2 |
| hD13_H1L3 | 0.252 | 1.17 |
| OSE-172 | 11.7 | Above quantitation limit |
| KWAR23 | 2.55 | 4.46 |
| ADU-1805 | 4.39 | 6.32 |

9)-2 Evaluation of Inhibitory Activity of Various Anti-Human SIRPA Antibodies Against Human SIRPA-CD47 Binding After the culture supernatant of the human SIRPA_V1 or V2 expression vector-introduced 293α cells prepared in Example 9)-1 was removed, 50 µL per well of various anti-SIRPA antibodies or various control Human IgG diluted with 5% FBS-containing PBS to a final concentration of 0 to 10,000 ng/mL was added to each of pcDNA3.2 V5-DEST-SIRPA_V1 or V2-introduced 293α cells, immediately followed by addition of 50 µL per well of peroxidase-labeled CD47-Fc prepared with 5% FBS-containing PBS at 1 µg/mL, and the mixture was allowed to stand at 4° C. for one hour. Thereafter, the SIRPA-CD47 binding inhibitory activity was evaluated in the same manner as in 1)-6-3.

Figure 31:
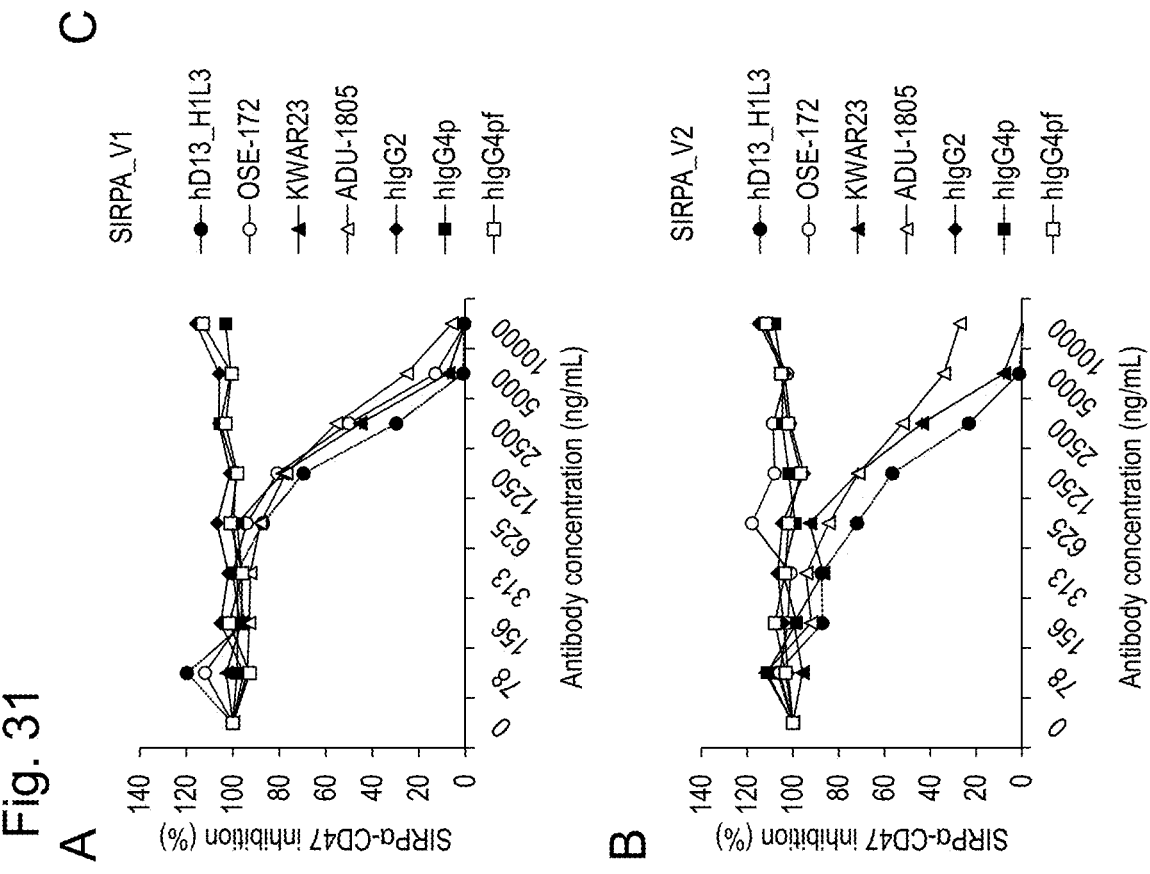
FIG. 31 shows the results of an evaluation of a human SIRPA_V1/CD47 binding inhibitory activity of various anti-human SIRPA antibodies (A), the results of an evaluation of a human SIRPA_V2/CD47 binding inhibitory activity of various anti-human SIRPA antibodies (B), and IC50 values for inhibition of human SIRPA_V1/CD47 or SIRPA_V2/CD47 binding activity by various anti-human SIRPA antibodies (C).

As shown in FIG. 31A, the hD13_H1L3, OSE-172, KWAR23, and ADU-1805 antibodies exhibited the inhibitory activity against SIRPA_V1-CD47 binding. As shown in FIG. 31B, hD13_H1L3, KWAR23, and ADU-1805 showed binding to human SIRPA_V2-CD47, but OSE-172 did not show the binding inhibitory activity. Further, as shown in FIG. 31C, hD13_H1L3 inhibited binding at the lowest concentration.

9)-3 Evaluation of Binding Activity of Various Anti-Human SIRPA Antibodies to Human SIRPB and Human SIRPG SIRPβ1 (signal regulatory protein β1: the amino acid sequence thereof is published as RefSeq accession number NP_006056) and SIRPγ (signal regulatory protein γ: the amino acid sequence thereof is published as RefSeq accession number NP_061026) are molecules belonging to the SIRPA family. In the present invention, "SIRPα" may be referred to as "SIRPA," "SIRPβ1" may be referred to as "SIRPB1," and "SIRPγ" may be referred to as "SIRPG." CHO-K1 cells were prepared in a 10% FBS-containing Ham's F-12K medium at $3.3 \times 10^5$ cells/mL and cultured overnight at 37° C. under a 5% $CO_2$ condition. pFLAG V5-DEST-human SIRPB, pFLAG V5-DEST-human SIRPG, or pFLAG V5-DEST was introduced into the cells using Lipofectamine LTX (Invitrogen), and cells were cultured in a 10% FBS-containing Ham's F-12K medium at 37° C. under a 5% $CO_2$ condition for 24 hours. The obtained introduced cells were collected and seeded on a 96-well plate. After the culture supernatant was removed, 100 μL per well of various anti-human SIRPA antibodies or various control human IgG was added to each of various gene introduced cells at a final concentration of 0 to 10,000 ng/mL, and the mixture was allowed to stand at 4° C. for 25 minutes. After the mixture was centrifuged, the supernatant was removed, and cells were washed twice with 5% FBS-containing PBS. After the mixture was centrifuged, the supernatant was removed, 50 μL per well of a 1/400 diluted solution of PE Mouse anti-Human IgG antibody (BioLegend) was added, and the mixture was allowed to stand at 4° C. for 25 minutes. After the mixture was centrifuged, the supernatant was removed, and cells were washed twice with 5% FBS-containing PBS.

After the mixture was centrifuged, and the supernatant was removed, cells were suspended in 100 μL per well of 1×BD Stabilizing Fixative (Becton Dickinson), and the cell count was measured by flow cytometry (FACS Canto II: Becton Dickinson). For data analysis, FlowJo (TreeStar) was used. Cells were characterized by detecting forward scattered (FSC) light and side-scattered (SSC) light, and then the mean fluorescence intensity of PE was calculated. Binding of various antibodies to the family molecules was calculated by standardizing the fluorescence intensity using the mean fluorescence intensity of a sample in which the secondary antibody alone was allowed to react.

Figure 32:
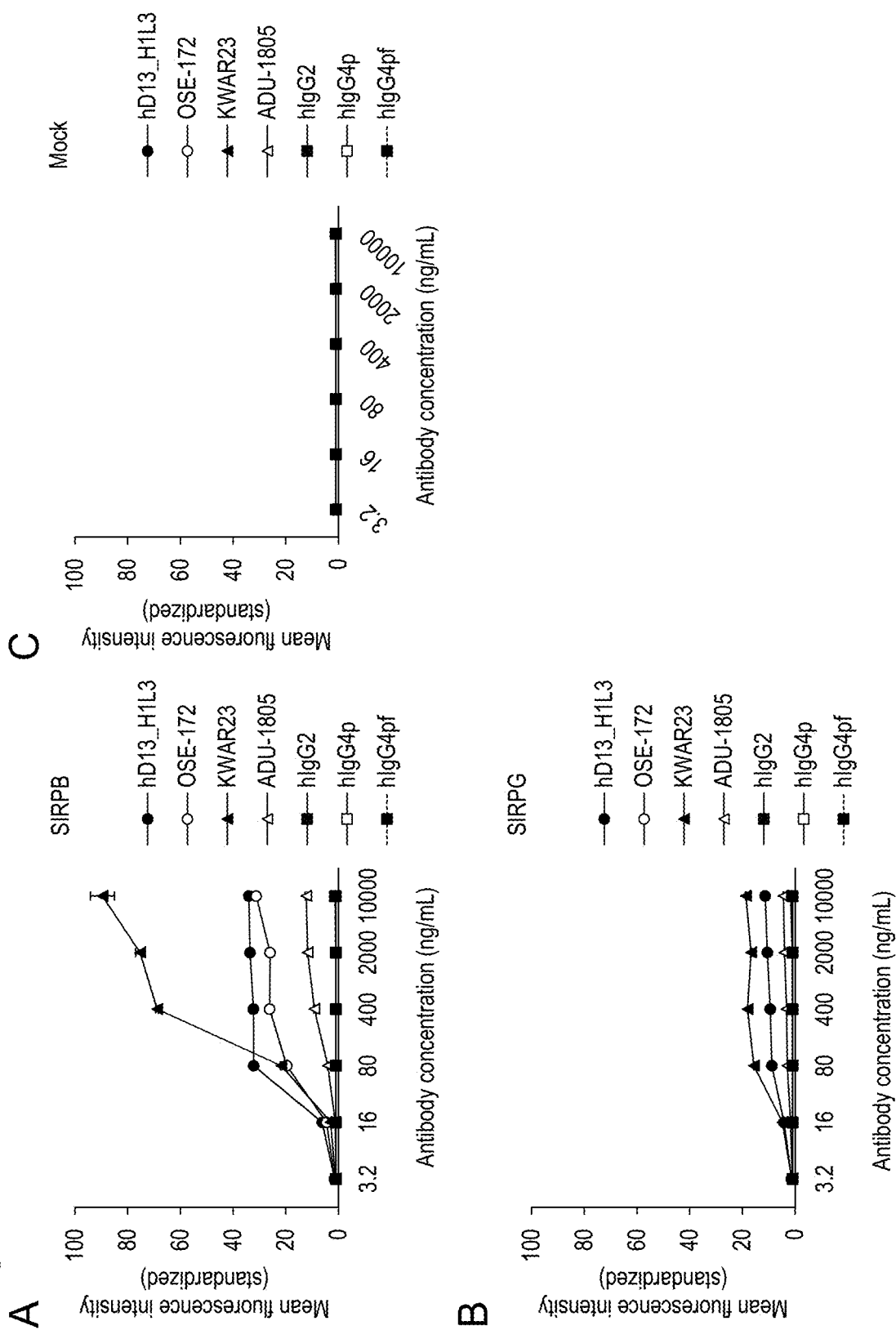
FIG. 32 is graphs showing the results of an evaluation of binding of various anti-human SIRPA antibodies to human SIRPB (A) and human SIRPG (B), and the results of a negative control for A and B (C).

As shown in FIGS. 32A and B, various anti-human SIRPA antibodies exhibited the concentration-dependent binding to human SIRPB and human SIRPG but OSE-172 did not exhibit binding to human SIRPG.

9)-4 ADCP Activity of Various Anti-Human SIRPA Antibodies Against Cancer Cell Line 9)-4-1 Preparation of Target Cells CD47-positive human Burkitt's lymphoma cell line Raji cells were collected and washed twice with PBS, and then the viable cell count was measured by a trypan blue dye exclusion test. Cells were re-suspended in PBS to $1 \times 10^6$ cells/mL. As a labeling solution, 1 μL/$10^6$ cells/mL of a Cell Trace Far Red solution (Thermo Fisher) was added, and the mixture was allowed to stand at room temperature for 10 minutes. A volume of 25 mL of a 10% FBS-containing RPMI 1640 medium (Life Technology) was added, and cells were washed twice, then re-suspended to $2 \times 10^6$ cells/mL, and used as target cells. Thereafter, the target cells were prepared in the same manner as in 2)-6-1.

9)-4-2 Preparation of PBMCs

PBMCs were prepared in the same manner as in 2)-6-2.

9)-4-3 Preparation of Effector Cells

Effector cells were prepared in the same manner as in 2)-6-3, washed twice with PBS, and re-suspended in PBS to $1 \times 10^6$ cells/mL. As a labeling solution, 1 μL/$10^6$ cells/mL CFSE solution (Thermo Fisher) was added, and the mixture was allowed to stand at room temperature for 10 minutes. A volume of 20 mL of a 10% FBS-containing RPMI 1640 medium (Life Technology) was added, and cells were washed twice, then re-suspended to $1 \times 10^6$ cells/mL, and used as effector cells.

9)-4-4 Evaluation of ADCP Activity

A volume of 50 μL per well of the target cells prepared by the method of Example 8-3-1 was added to Ultra-Low Attachment 96-Well U-Shaped Bottom Microplate (Sumitomo Bakelite). To the wells, 50 μL per well of various anti-SIRPA antibodies or various control Human IgG diluted with a 10% FBS-containing RPMI 1640 medium (Life Technology) to a final concentration of 0 to 10,000 ng/mL was added. For the combination use group, 50 μL per well of rituximab (Zenyaku Kogyo) diluted with a 10% FBS-containing RPMI 1640 medium (Life Technology) to a final concentration of 1000 ng/mL was added. A volume of 50 μL per well of effector cells prepared in Example 8-3-3 were added at $1 \times 10^6$ cells/mL, and the mixture was allowed to stand at 37° C. under a 5% $CO_2$ condition for two to 16 hours. After the mixture was centrifuged at 1200 rpm at 4° C. for 5 minutes, and the supernatant was removed, cells were washed with 200 μL per well of 5% FBS-containing PBS. Cells were suspended in 50 μL per well of 1×BD Stabilizing Fixative (Becton Dickinson), and the cell count was measured by flow cytometry (FACS Canto II: Becton Dickinson). For data analysis, FlowJo (TreeStar) was used. Cells were characterized by detecting forward scattered (FSC) light and side-scattered (SSC) light, and then the numbers of cells positive for APC (A) and cells positive for both APC and FITC (B) were obtained. Cells positive for both APC and FITC (B) were deemed to be target cells that had been phagocytized by macrophages. The percent cellular phagocytosis by the ADCP activity was calculated by the following equation:

$$\text{Percent cellular phagocytosis (\%)} = B/(A + B) \times 100$$

Figure 33:
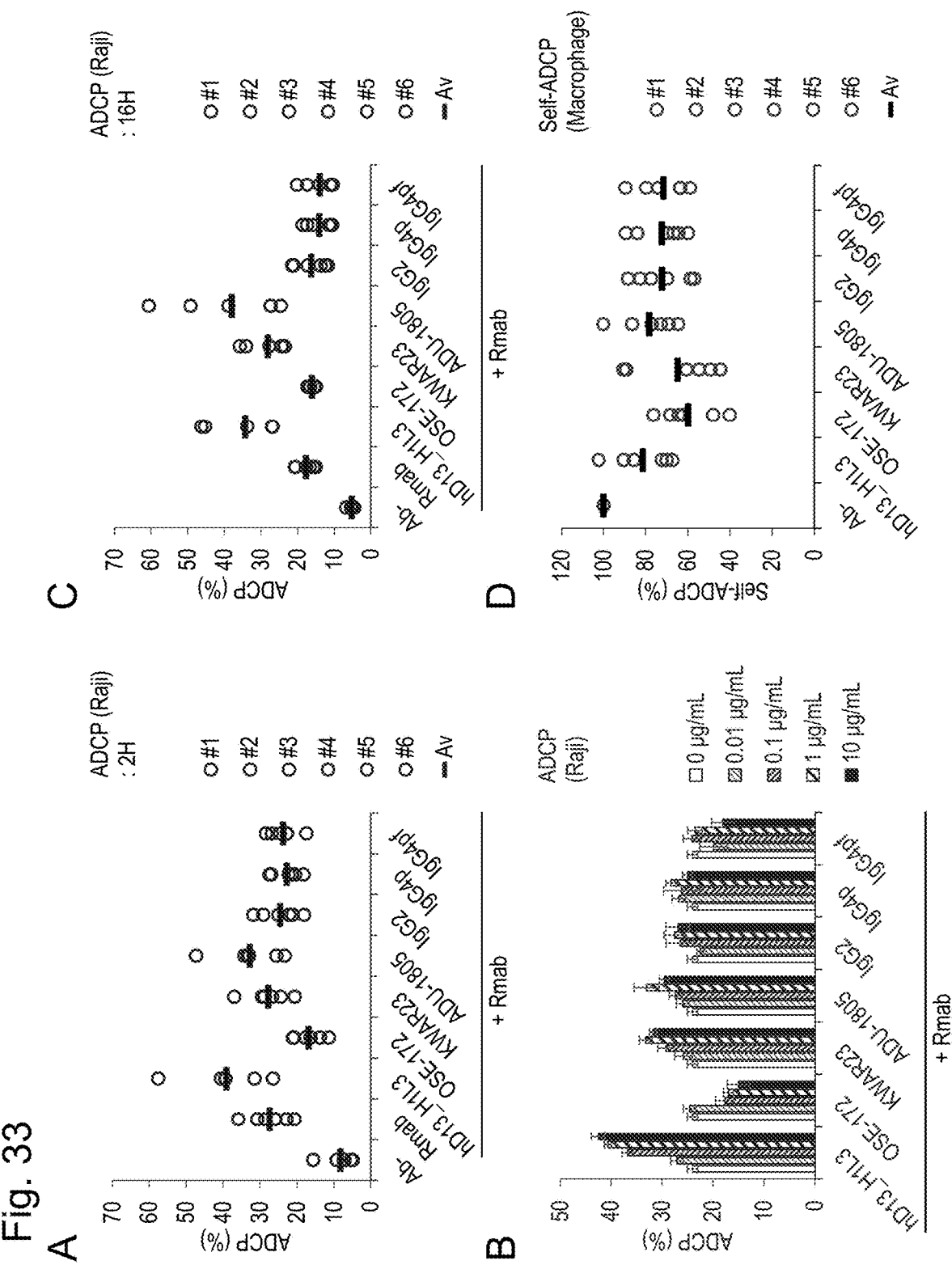
FIG. 33 is graphs showing the ADCP activity against the Burkitt's lymphoma cell line (Raji) when various anti-human SIRPA antibodies were used in combination with rituximab: the reactivity at 10 µg/mL with a reaction time of 2 hours (A) and with a reaction time of 16 hours (B), concentration dependence with a reaction time of 2 hours (C), and a self-ADCP activity, which means phagocytosis between macrophages, of various anti-human SIRPA antibodies (D). In each graph, "Ab-" indicates a negative control to which an antibody was not added, and "+Rmab" indicates that rituximab was simultaneously added.

As shown in FIGS. 33A to C, the hD13_H1L3, OSE-172, KWAR23, and ADU-1805 antibodies in combination with rituximab exhibited the ADCP activity against CD47-positive human Burkitt's lymphoma cell line Raji cells. The ADCP enhancing activity was higher in the order of hD13_H1L3, ADU-1805, KWAR23, and OSE-172 after two hours of reactions (A), and in the order of ADU-1805, hD13_H1L3, KWAR23, and OSE-172 after 16 hours of reactions (B). The reactivity at 16 hours suggests that the phagocytized activity is in a saturated state. A comparison of the concentration-dependent ADCP activity after two hours of reactions showed that hD13_H1L3 exhibited the highest activity from the lowest concentration, followed by ADU-1805 and KWAR23, which exhibited virtually equivalent activities, and OSE-172. The above results indicated that hD13_H1L3 enhanced the ADCP activity in a short time from the lowest concentration.

9)-4-5 Evaluation of Phagocytic Activity Between Macrophages by Various Anti-Human SIRPA Antibodies (Self-ADCP Activity)

A volume of 50 μL per well of effector cells prepared by the method of Example 8-3-3 was added to the Ultra-Low Attachment 96-Well U-Shaped Bottom Microplate (Sumitomo Bakelite). To the wells, 50 μL per well of various anti-SIRPA antibodies or various control Human IgG diluted with a 10% FBS-containing RPMI 1640 medium (Life Technology) to a final concentration of 0 to 5,000 ng/mL was added. A volume of 100 μL per well of a 10% FBS-containing RPMI 1640 medium (Life Technology) was added. The mixture was allowed to stand at 37° C. under a 5% $CO_2$ condition for 16 to 20 hours. The mixture was centrifuged at 1200 rpm at 4° C. for 5 minutes, the supernatant was removed, and cells were washed with 200 μL per well of 5% FBS-containing PBS. Cells were suspended in 100 μL per well of 1×BD Stabilizing Fixative (Becton Dickinson), and the cell count was measured by flow cytometry (FACS Canto II: Becton Dickinson). For data analysis, FlowJo (TreeStar) was used. Cells were characterized by detecting forward scattered (FSC) light and side-scattered (SSC) light, and then the number of FITC positive cells in each well was obtained (A). The extent of reduction in each sample was considered the extent of phagocytosis between macrophages when standardized using the count of FITC positive cells in a well not containing an antibody (B). The self-ADCP activity was calculated by the following equation:

$$\text{Self-}ADCP\,(\%) = (A/B) \times 100$$

As shown in FIG. 33B, macrophages, which are effector cells, exhibited the self-ADCP activity when hD13_H1L3, OSE-172, KWAR23, and ADU-1805 antibodies were added. The percent reduction was higher in the order of OSE-172, KWAR23, ADU-1805, and hD13_H1L3. The high percent reduction indicates a high self-ADCP activity due to the anti-SIRPA antibody. This phenomenon suggests a possibility that SIRPA-positive cells such as macrophages and dendritic cells may be reduced or depleted by administering each of the anti-SIRPA antibodies, thus serving as an indicator of adverse drug reactions to the immune system.

Example 10. In Vivo Evaluation of Various Anti-SIRPA Antibodies

Because SIRPA is a target expressed in immune cells of the host, the anti-tumor effects of human SIRPA antibodies need to be evaluated in mice which express human SIRPA [Ring et al. PNAS. 2017; 114, 49, E10578-E10585]. Meanwhile, to evaluate contribution of the immune system to anti-tumor effects, it is important to use immuno-competent mice, not immuno-compromised mice [Yanagita et al. JCI. 2017; (2)1, 1-15]. A mouse cancer cell line transfected with human CD47 was transplanted to genetically modified mice obtained by introducing human SIRPA alone or both human SIRPA and human CD47 to immuno-competent mice, and the mice are divided into groups when a tumor volume of approximately 100 $mm^3$ is reached. Anti-CD47 biologics, such as various anti-SIRPA antibodies, anti-CD47 antibodies, or SIRPA-Fc fusion proteins, or negative controls such as PBS are administered to these mice groups about once to three times a week for one to three weeks. To evaluate the add-on anti-tumor effects of a combination drug, a chemotherapeutic agent, an antibody drug, a molecular targeted drug, or the like is administered in combination to each of these groups. The tumor size (major diameter/minor diameter) in each treatment group is measured with an electronic caliper or the like every two to three days to calculate the tumor volume. Drug efficacy of each drug can be compared in vivo by calculating the tumor growth inhibition rate from tumor volumes in various antibody treatment groups and the negative control group. The tumor volume and the tumor growth inhibition rate are represented by the following formula:

Tumor volume $(mm^3) =$ (major diameter × minor diameter × minor diameter)/2

Tumor growth inhibition rate (%) =

(1 − tumor volume in each treatment group/tumor volume in the negative control group) × 100

INDUSTRIAL APPLICABILITY

The anti-SIRPα antibody of the present invention can be used as an antibody drug that is used in combination with other antibody drugs having other effector functions or other antibody drugs having an immune checkpoint inhibitory action.

SEQUENCE LISTING FREE TEXT

SEQ ID NO: 1: Amino acid sequence of D13 CDR-L1
SEQ ID NO: 2: Amino acid sequence of D13 CDR-L2
SEQ ID NO: 3: Amino acid sequence of D13 CDR-L3
SEQ ID NO: 4: Amino acid sequence of D13 CDR-H1
SEQ ID NO: 5: Amino acid sequence of D13 CDR-H2
SEQ ID NO: 6: Amino acid sequence of D13 CDR-H3
SEQ ID NO: 7: Amino acid sequence of F44 CDR-L1
SEQ ID NO: 8: Amino acid sequence of F44 CDR-L2
SEQ ID NO: 9: Amino acid sequence of F44 CDR-L3
SEQ ID NO: 10: Amino acid sequence of F44 CDR-H1
SEQ ID NO: 11: Amino acid sequence of F44 CDR-H2
SEQ ID NO: 12: Amino acid sequence of F44 CDR-H3
SEQ ID NO: 13: Amino acid sequence of F63 CDR-L1
SEQ ID NO: 14: Amino acid sequence of F63 CDR-L2
SEQ ID NO: 15: Amino acid sequence of F63 CDR-L3
SEQ ID NO: 16: Amino acid sequence of F63 CDR-H1
SEQ ID NO: 17: Amino acid sequence of F63 CDR-H2
SEQ ID NO: 18: Amino acid sequence of F63 CDR-H3
SEQ ID NO: 19: DNA fragment comprising of a human light chain signal sequence and a nucleotide sequence encoding a human κ light chain constant region
SEQ ID NO: 20: DNA fragment comprising of a human light chain signal sequence and a nucleotide sequence encoding a human λ light chain constant region
SEQ ID NO: 21: DNA fragment comprising of a human heavy chain signal sequence and a nucleotide sequence encoding a human IgG4ProFALA heavy chain constant region
SEQ ID NO: 22: Nucleotide sequence encoding a human chimeric antibody D13 light chain
SEQ ID NO: 23: Amino acid sequence of a human chimeric antibody D13 light chain
SEQ ID NO: 24: Nucleotide sequence encoding a human chimeric antibody D13 heavy chain SEQ ID NO: 25: Amino acid sequence of a human chimeric antibody D13 heavy chain
SEQ ID NO: 26: Nucleotide sequence encoding a human chimeric antibody F44 light chain
SEQ ID NO: 27: Amino acid sequence of a human chimeric antibody F44 light chain
SEQ ID NO: 28: Nucleotide sequence encoding a human chimeric antibody F44 heavy chain
SEQ ID NO: 29: Amino acid sequence of a human chimeric antibody F44 heavy chain
SEQ ID NO: 30: Nucleotide sequence encoding a human chimeric antibody F63 light chain
SEQ ID NO: 31: Amino acid sequence of a human chimeric antibody F63 light chain
SEQ ID NO: 32: Nucleotide sequence encoding a human chimeric antibody F63 heavy chain
SEQ ID NO: 33: Amino acid sequence of a human chimeric antibody F63 heavy chain
SEQ ID NO: 34: Nucleotide sequence encoding the hL2 light chain of humanized D13
SEQ ID NO: 35: Amino acid sequence of the hL2 light chain of humanized D13
SEQ ID NO: 36: Nucleotide sequence encoding the hL3 light chain of humanized D13
SEQ ID NO: 37: Amino acid sequence of the hL3 light chain of humanized D13
SEQ ID NO: 38: Nucleotide sequence encoding the hL4 light chain of humanized D13
SEQ ID NO: 39: Amino acid sequence of the hL4 light chain of humanized D13
SEQ ID NO: 40: Nucleotide sequence encoding the hH1 heavy chain of humanized D13
SEQ ID NO: 41: Amino acid sequence of the hH1 heavy chain of humanized D13
SEQ ID NO: 42: Nucleotide sequence encoding the hH2 heavy chain of humanized D13
SEQ ID NO: 43: Amino acid sequence of the hH2 heavy chain of humanized D13
SEQ ID NO: 44: Nucleotide sequence encoding the ECD of human SIRPA Variant 1
SEQ ID NO: 45: Amino acid sequence of the ECD of human SIRPA Variant 1
SEQ ID NO: 46: Nucleotide sequence encoding the IgV of human SIRPA Variant 1
SEQ ID NO: 47: Amino acid sequence of the IgV of human SIRPA Variant 1
SEQ ID NO: 48: Nucleotide sequence encoding the ECD of human SIRPA Variant 2
SEQ ID NO: 49: Amino acid sequence of the ECD of human SIRPA Variant 2
SEQ ID NO: 50: Nucleotide sequence encoding the IgV of human SIRPA Variant 2
SEQ ID NO: 51: Amino acid sequence of the IgV of human SIRPA Variant 2
SEQ ID NO: 52: Nucleotide sequence encoding the ECD of monkey SIRPA
SEQ ID NO: 53: Amino acid sequence of the ECD of monkey SIRPA
SEQ ID NO: 54: Nucleotide sequence encoding human CD47-Fc
SEQ ID NO: 55: Amino acid sequence of the IgV of human CD47-Fc
SEQ ID NO: 56: Amino acid sequence of human SIRPA Variant 1
SEQ ID NO: 57: Amino acid sequence of human SIRPA Variant 2
SEQ ID NO: 58: Amino acid sequence of monkey SIRPA
SEQ ID NO: 59: Amino acid sequence of C57BL/6 mouse SIRPA
SEQ ID NO: 60: Amino acid sequence of BALB/C mouse SIRPA
SEQ ID NO: 61: Amino acid sequence of 129 mouse SIRPA
SEQ ID NO: 62: Amino acid sequence of NOD mouse SIRPA
SEQ ID NO: 63: Amino acid sequence of human SIRPA Variant 3
SEQ ID NO: 64: Amino acid sequence of human SIRPA Variant 4
SEQ ID NO: 65: Amino acid sequence of human SIRPA Variant 5
SEQ ID NO: 66: Amino acid sequence of human SIRPA Variant 6
SEQ ID NO: 67: Amino acid sequence of human SIRPA Variant 7
SEQ ID NO: 68: Amino acid sequence of human SIRPA Variant 8
SEQ ID NO: 69: Amino acid sequence of human SIRPA Variant 9
SEQ ID NO: 70: Amino acid sequence of human SIRPA Variant 10
SEQ ID NO: 71: Amino acid sequence of human SIRPA_V2_IgV variant
SEQ ID NO: 72: Amino acid sequence of human SIRPA_V2_IgV_IgC1 variant
SEQ ID NO: 73: Amino acid sequence of mouse SIRPA variant hmSIRPA_Δ0
SEQ ID NO: 74: Amino acid sequence of mouse SIRPA variant hmSIRPA_Δ1
SEQ ID NO: 75: Amino acid sequence of mouse SIRPA variant hmSIRPA_Δ2
SEQ ID NO: 76: Sequence consisting of amino acids 81 to 85 in the amino acid sequence of mouse SIRPA variant hmSIRPA_Δ0
SEQ ID NO: 77: Sequence consisting of amino acids 81 to 85 in the amino acid sequence of mouse SIRPA variant hmSIRPA_Δ1
SEQ ID NO: 78: Sequence consisting of amino acids 81 to 85 in the amino acid sequence of BALB/C mouse SIRPA
SEQ ID NO: 79: Sequence consisting of amino acids 126 to 130 in the amino acid sequence of BALB/C mouse SIRPA
SEQ ID NO: 80: Sequence consisting of amino acids 81 to 85 in the amino acid sequence of mouse SIRPA variant hmSIRPA_Δ2
SEQ ID NO: 81: Amino acid sequence of OSE-172 antibody heavy chain (OSE-172_hG4Pro)
SEQ ID NO: 82: Amino acid sequence of OSE-172 antibody light chain (OSE-172_hK)
SEQ ID NO: 83: Amino acid sequence of KWAR23 antibody heavy chain (KWAR23_hG4Pro)
SEQ ID NO: 84: Amino acid sequence of KWAR23 antibody light chain (KWAR23_hK)
SEQ ID NO: 85: Amino acid sequence of ADU-1805 antibody heavy chain (ADU-1805_hG2)
SEQ ID NO: 86: Amino acid sequence of ADU-1805 antibody light chain (ADU-1805_hK)
SEQ ID NO: 87: Partial amino acid sequence of mouse SIRPA mutant hmSIRPA_delta 0
SEQ ID NO: 88: Partial amino acid sequence of mouse SIRPA mutant hmSIRPA_delta 1
SEQ ID NO: 89: Partial amino acid sequence of mouse SIRPA mutant hmSIRPA_delta 2

All publications, patents, and patent applications cited in the present specification are incorporated in the present specification in their entirety by reference.

The invention claimed is:

1. An antibody that binds specifically to human SIRPα to inhibit binding of human SIRPα to CD47, the antibody comprising:
    (a) a light chain CDRL1 consisting of the amino acid sequence SEQ ID NO: 7;
    (b) a light chain CDRL2 consisting of the amino acid sequence SEQ ID NO: 8;
    (c) a light chain CDRL3 consisting of the amino acid sequence SEQ ID NO: 9;
    (d) a heavy chain CDRH1 consisting of the amino acid sequence SEQ ID NO: 10;
    (e) a heavy chain CDRH2 consisting of the amino acid sequence SEQ ID NO: 11; and
    (f) a heavy chain CDRH3 consisting of the amino acid sequence SEQ ID NO: 12.

2. The antibody according to claim 1, wherein the antibody comprises a heavy chain constant region of human IgG4, and has a mutation that reduces ADCC and/or ADCP activity.

3. The antibody according to claim 1, wherein the antibody comprises a heavy chain constant region of human IgG4, and phenylalanine at position 234, as numbered according to the EU index as in Kabat et al., is substituted by alanine, leucine at position 235 is substituted by alanine, and serine at position 228 is substituted by proline.

4. The antibody according to claim 3, wherein the heavy chain constant region comprises residues 139 to 465 in SEQ ID NO: 29.

5. The antibody according to claim 1 comprising:
    (ai) a light chain variable region consisting of amino acid sequence consisting of amino acid residues 21 to 127 in SEQ ID NO: 27; or
    (aii) a light chain variable region consisting of amino acid sequence having at least 95% sequence identity with the amino acid sequence consisting of amino acid residues 21 to 127 in SEQ ID NO: 27 and having a binding activity to human SIRPα; and (bi) a heavy chain variable region consisting of amino acid sequence consisting of amino acid residues 20 to 138 in SEQ ID NO: 29; or (bii) a heavy chain variable region consisting of amino acid sequence having at least 95% sequence identity with the amino acid sequence consisting of amino acid residues 20 to 138 in SEQ ID NO: 29 and having a binding activity to human SIRPα, wherein the antibody comprises a heavy chain constant region of human IgG4, and has a mutation that reduces ADCC and/or ADCP activity.

6. The antibody according to claim 5, wherein the antibody comprises a heavy chain constant region of human IgG4, and phenylalanine at position 234, as numbered according to the EU index as in Kabat et al., is substituted by alanine, leucine at position 235 is substituted by alanine, and serine at position 228 is substituted by proline.

7. The antibody according to claim 6, wherein the heavy chain constant region comprises residues 139 to 465 in SEQ ID NO: 29.

8. The antibody according to claim 1, wherein a lysine residue at the carboxyl terminus of the heavy chain is deleted.

9. An antigen-binding fragment of the antibody according to claim 1.

10. The antigen-binding fragment of the antibody according to claim 9, wherein the antigen-binding fragment is selected from the group consisting of Fab, F(ab')2, Fab', and scFv.

11. A pharmaceutical composition comprising the antibody according to claim 1 as an active ingredient.

12. The pharmaceutical composition according to claim 11, further comprising
an immune checkpoint inhibitor; and/or
an antibody drug that specifically responds to a cancer antigen to have ADCC and/or ADCP activity
as an active ingredient.

13. The pharmaceutical composition according to claim 12, wherein the immune checkpoint inhibitor inhibits PD-L1 binding to PD-1 or is a CTLA4 inhibitor.

14. The pharmaceutical composition according to claim 12, wherein the antibody drug that specifically responds to a cancer antigen to have ADCC and/or ADCP activity is selected from the group consisting of an anti-CD20 antibody, an anti-HER2 antibody, and an anti-EGFR antibody.

15. A polynucleotide consisting of nucleotide sequences encoding a heavy chain and light chain of the antibody according to claim 1.

16. A vector comprising the polynucleotide according to claim 15.

17. A host cell comprising the polynucleotide according to claim 15.

18. A method for producing the antibody according to claim 1, comprising culturing a host cell comprising a polynucleotide encoding a heavy chain and light chain of the antibody according to claim 1 and purifying an antibody from the culture.

19. An antibody produced by the method according to claim 18.

20. A pharmaceutical composition comprising the antigen-binding fragment of claim 9 as an active ingredient.

21. A host cell comprising the vector according to claim 16.

* * * * *

SEQUENCE LISTING

```
Sequence total quantity: 89
SEQ ID NO: 1              moltype = AA  length = 11
FEATURE                   Location/Qualifiers
REGION                    1..11
                          note = amino acid sequence of D13 CDR-L1
source                    1..11
                          mol_type = protein
                          organism = synthetic construct
SEQUENCE: 1
GASKSVRTYM H                                                             11

SEQ ID NO: 2              moltype = AA  length = 7
FEATURE                   Location/Qualifiers
REGION                    1..7
                          note = amino acid sequence of D13 CDR-L2
source                    1..7
                          mol_type = protein
                          organism = synthetic construct
SEQUENCE: 2
SASNLEA                                                                   7

SEQ ID NO: 3              moltype = AA  length = 9
FEATURE                   Location/Qualifiers
REGION                    1..9
                          note = amino acid sequence of D13 CDR-L3
source                    1..9
                          mol_type = protein
                          organism = synthetic construct
SEQUENCE: 3
QQSNEPPYT                                                                 9

SEQ ID NO: 4              moltype = AA  length = 10
FEATURE                   Location/Qualifiers
REGION                    1..10
                          note = amino acid sequence of D13 CDR-H1
source                    1..10
                          mol_type = protein
                          organism = synthetic construct
SEQUENCE: 4
GFTFSDYGMI                                                               10

SEQ ID NO: 5              moltype = AA  length = 10
FEATURE                   Location/Qualifiers
REGION                    1..10
                          note = amino acid sequence of D13 CDR-H2
source                    1..10
                          mol_type = protein
                          organism = synthetic construct
SEQUENCE: 5
SISSSSSYIY                                                               10

SEQ ID NO: 6              moltype = AA  length = 11
FEATURE                   Location/Qualifiers
REGION                    1..11
                          note = amino acid sequence of D13 CDR-H3
source                    1..11
                          mol_type = protein
                          organism = synthetic construct
SEQUENCE: 6
RYYGFNYPFD Y                                                             11

SEQ ID NO: 7              moltype = AA  length = 11
FEATURE                   Location/Qualifiers
REGION                    1..11
                          note = amino acid sequence of F44 CDR-L1
source                    1..11
                          mol_type = protein
                          organism = synthetic construct
SEQUENCE: 7
KASKSISKYL A                                                             11

SEQ ID NO: 8              moltype = AA  length = 7
FEATURE                   Location/Qualifiers
REGION                    1..7
                          note = amino acid sequence of F44 CDR-L2
source                    1..7
                          mol_type = protein
                          organism = synthetic construct
```

```
SEQUENCE: 8
SGSTLQS                                                                                 7

SEQ ID NO: 9           moltype = AA  length = 9
FEATURE                Location/Qualifiers
REGION                 1..9
                       note = amino acid sequence of F44 CDR-L3
source                 1..9
                       mol_type = protein
                       organism = synthetic construct
SEQUENCE: 9
QQHNEYPPT                                                                               9

SEQ ID NO: 10          moltype = AA  length = 10
FEATURE                Location/Qualifiers
REGION                 1..10
                       note = amino acid sequence of F44 CDR-H1
source                 1..10
                       mol_type = protein
                       organism = synthetic construct
SEQUENCE: 10
GFTFSNYYMA                                                                              10

SEQ ID NO: 11          moltype = AA  length = 10
FEATURE                Location/Qualifiers
REGION                 1..10
                       note = amino acid sequence of F44 CDR-H2
source                 1..10
                       mol_type = protein
                       organism = synthetic construct
SEQUENCE: 11
YITTGGGSTY                                                                              10

SEQ ID NO: 12          moltype = AA  length = 10
FEATURE                Location/Qualifiers
REGION                 1..10
                       note = amino acid sequence of F44 CDR-H3
source                 1..10
                       mol_type = protein
                       organism = synthetic construct
SEQUENCE: 12
ANYGGSYFDY                                                                              10

SEQ ID NO: 13          moltype = AA  length = 13
FEATURE                Location/Qualifiers
REGION                 1..13
                       note = amino acid sequence of F63 CDR-L1
source                 1..13
                       mol_type = protein
                       organism = synthetic construct
SEQUENCE: 13
ERSSGDIGDS YVS                                                                          13

SEQ ID NO: 14          moltype = AA  length = 7
FEATURE                Location/Qualifiers
REGION                 1..7
                       note = amino acid sequence of F63 CDR-L2
source                 1..7
                       mol_type = protein
                       organism = synthetic construct
SEQUENCE: 14
ADDQRPS                                                                                 7

SEQ ID NO: 15          moltype = AA  length = 9
FEATURE                Location/Qualifiers
REGION                 1..9
                       note = amino acid sequence of F63 CDR-L3
source                 1..9
                       mol_type = protein
                       organism = synthetic construct
SEQUENCE: 15
QSYDSKIDI                                                                               9

SEQ ID NO: 16          moltype = AA  length = 10
FEATURE                Location/Qualifiers
REGION                 1..10
                       note = amino acid sequence of F63 CDR-H1
source                 1..10
                       mol_type = protein
```

```
                        organism = synthetic construct
SEQUENCE: 16
GFSLASYSLS                                                            10

SEQ ID NO: 17           moltype = AA   length = 9
FEATURE                 Location/Qualifiers
REGION                  1..9
                        note = amino acid sequence of F63 CDR-H2
source                  1..9
                        mol_type = protein
                        organism = synthetic construct
SEQUENCE: 17
RMYYDGDTA                                                              9

SEQ ID NO: 18           moltype = AA   length = 16
FEATURE                 Location/Qualifiers
REGION                  1..16
                        note = amino acid sequence of F63 CDR-H3
source                  1..16
                        mol_type = protein
                        organism = synthetic construct
SEQUENCE: 18
DRSMFGTDYP HWYFDF                                                     16

SEQ ID NO: 19           moltype = DNA   length = 449
FEATURE                 Location/Qualifiers
misc_feature            1..449
                        note = DNA fragment comprising nucleotide sequences coding
                         human light chain signal sequence and human kappa light
                         chain constant region
source                  1..449
                        mol_type = other DNA
                        organism = synthetic construct
SEQUENCE: 19
gcctccggac tctagagcca ccatggtgct gcagacccag gtgttcatct ccctgctgct      60
gtggatctcc ggcgcgtacg gcgatatcgt gatgattaaa cgtacggtgg ccgcccctc     120
cgtgttcatc ttcccccct ccgacgagca gctgaagtcc ggcaccgcct ccgtggtgtg     180
cctgctgaat aacttctacc cagagaggc caaggtgcag tggaaggtgg acaacgccct     240
gcagtccggg aactcccagg agagcgtgac cgagcaggac agcaaggaca gcacctacag     300
cctgagcagc accctgaccc tgagcaaagc cgactacgag aagcacaagg tgtacgcctg     360
cgaggtgacc caccagggcc tgagctcccc cgtcaccaag agcttcaaca ggggggagtg     420
ttaggggccc gtttaaacgg gggaggcta                                       449

SEQ ID NO: 20           moltype = DNA   length = 462
FEATURE                 Location/Qualifiers
misc_feature            1..462
                        note = DNA fragment comprising nucleotide sequences coding
                         human light chain signal sequence and human lambda light
                         chain constant region
source                  1..462
                        mol_type = other DNA
                        organism = synthetic construct
SEQUENCE: 20
cagcctccgg actctagagc caccatggtg ctgcagaccc aggtgttcat ctccctgctg      60
ctgtggatct ccggcgcgta cggctagagc ggcggaacca agttaactgt gcttggccag     120
cctaaggctg cccctagcgt gaccctgttc cctccttcca gcgaggagct tcaagctaac     180
aaggccaccc tggtgtgtct tatctctgac ttctaccctg gcgctgtgac cgtggcctgg     240
aaggctgaca gctcccctgt gaaggccgga gtggagacca ccacacctag caagcagtct     300
aacaacaagt acgctgccag ctcctacctg agccttaccc ctgagcagtg gaagtctcac     360
agaagctact cctgtcaagt gacccacgag ggcagcaccg tggagaagac cgtggctcct     420
accgagtgtt cctaggggcc cgtttaaacg ggggaggcta ac                        462

SEQ ID NO: 21           moltype = DNA   length = 1117
FEATURE                 Location/Qualifiers
misc_feature            1..1117
                        note = DNA fragment comprising nucleotide sequences coding
                         human heavy chain signal sequence and human IgG4 Pro FALA
                         heavy chain constant region
source                  1..1117
                        mol_type = other DNA
                        organism = synthetic construct
SEQUENCE: 21
ccagcctccg gactctagag ccaccatgaa acacctgtgg ttcttcctcc tgctggtggc      60
agctcccaga tgggtgctga attgtgcagg cggttagctc agcctccacc                120
aagggcccta gcgtgttccc tctgcccct tgtagcagaa gcaccagcga gtctacagcc     180
gccctgggct gcctcgtgaa ggactacttt cccgagcccg tgaccgtgtc ctggaactct     240
ggcgctctga caagcggcgt gcacaccttt ccagccgtgc tgcagagcag cggcctgtac     300
tctctgtcca gcgtcgtgac tgtgcccagc agctctctgg caccaagac ctacacctgt     360
aacgtggacc acaagcccag caacaccaag gtggacaagc gggtggaatc taagtacggc     420
```

```
cctccctgcc ctccttgccc agccctgaa gccgcgggcg gaccctccgt gttcctgttc    480
ccccaaagc ccaaggacac cctgatgatc agccggaccc ccgaagtgac ctgcgtggtg    540
gtggatgtgt cccaggaaga tcccgaggtg cagttcaatt ggtacgtgga cggcgtggaa    600
gtgcacaacg ccaagaccaa gcctagagag gaacagttca acagcaccta ccgggtggtg    660
tccgtgctga cagtgctgca ccaggactgg ctgaacggca agagtacaa gtgcaaggtg    720
tccaacaagg gcctgcccag ctccatcgag aaaaccatca gcaaggccaa gggccagccc    780
cgcgaacccc aggtgtacac actgcctcca agccaggaag agatgaccaa gaatcaggtg    840
tccctgacct gtctcgtgaa aggcttctac ccctccgata tcgccgtgga atgggagagc    900
aacggccagc ccgagaacaa ctacaagacc ccccccctg tgctggactc cgatggctca    960
ttcttcctgt acagcagact gaccgtggac aagagccgga gccaggaagg caacgtgttc   1020
agctgctccg tgatgcacga ggccctgcac aaccactaca cccagaagtc cctgtctctg   1080
agcctgggca aatgagttta aacgggggag gctaact                            1117

SEQ ID NO: 22              moltype = DNA   length = 699
FEATURE                    Location/Qualifiers
misc_feature               1..699
                           note = nucleotide sequence coding human chimeric antibody
                           D13 light chain
source                     1..699
                           mol_type = other DNA
                           organism = synthetic construct
SEQUENCE: 22
atggtgctgc agacccaggt gttcatctcc ctgctgctgt ggatctccgg cgcgtacggc    60
gacactgtgc tgacccagtc tcctgctttg gctgtgtctc tagggcagag ggtcaccatc   120
tcttgtgggg ccagcaaaag tgtccgtaca tatatgcact ggtaccaaca aaaatcggga   180
cagcaaccca aactcctgat ctatagtgca tccaacctag aggctggagt cccttccagg   240
ttcagtggga gtgggtctgg acagagcttt accctcacca tagatcctgt ggaggctgat   300
gacattgcaa actattactg tcagcagagt aatgaacctc cgtacacgtt tggagctggg   360
accaagctgg aactgaaacg gacggtggcc gccccctccg tgttcatctt cccccctcc    420
gacgagcagc tgaagtccgg caccgcctcc gtggtgtgcc tgctgaataa cttctacccc   480
agagaggcca aggtgcagtg gaaggtggac aacgccctgc agtccgggaa ctcccaggaa   540
agcgtgaccg agcaggacag caaggacagc acctacagcc tgagcagcac cctgaccctg   600
agcaaagccg actacgagaa gcacaaggtg tacgcctgcg aggtgaccca ccagggcctg   660
agctccccg tcaccaagag cttcaacagg ggggagtgt                           699

SEQ ID NO: 23              moltype = AA   length = 233
FEATURE                    Location/Qualifiers
REGION                     1..233
                           note = amino acid sequence of human chimeric antibody D13
                           light chain
source                     1..233
                           mol_type = protein
                           organism = synthetic construct
SEQUENCE: 23
MVLQTQVFIS LLLWISGAYG DTVLTQSPAL AVSLGQRVTI SCGASKSVRT YMHWYQQKSG     60
QQPKLLIYSA SNLEAGVPSR FSGSGSGTDF TLTIDPVEAD DIANYYCQQS NEPPYTFGAG    120
TKLELKRTVA APSVFIFPPS DEQLKSGTAS VVCLLNNFYP REAKVQWKVD NALQSGNSQE    180
SVTEQDSKDS TYSLSSTLTL SKADYEKHKV YACEVTHQGL SSPVTKSFNR GEC           233

SEQ ID NO: 24              moltype = DNA   length = 1398
FEATURE                    Location/Qualifiers
misc_feature               1..1398
                           note = nucleotide sequence coding human chimeric antibody
                           D13 heavy chain
source                     1..1398
                           mol_type = other DNA
                           organism = synthetic construct
SEQUENCE: 24
atgaaacacc tgtggttctt cctcctgctg gtggcagctc ccagatgggg gctgagcgag     60
gtacagctgg tggagtctgg aggaggctta gtgcagcctg aaggtccct gaaactctcc    120
tgtttagcct ctggattcac tttcagtgac tatggaatga tctgggttcg ccaggctcca    180
gggaaggggc tggagtgggt tgcatctatt agtagtagta gcagttacat ctactatgca    240
gacacagtga agggccgatt caccatctcc agagaaaatg ccaagaacac cctgttcctg    300
cacatgacca gtctgaggtc tgaagacact gccttgtact actgtgcaag aagatactat    360
gggtttaact accctttga ttactgggc caaggagtca tggtcacagt cagctcagcc    420
tccaccaagg gcctagcgt gttccctctg gccccttgta gcagaagcac cagcgagtct    480
acagccgccc tgggctgcct cgtgaaggac tactttcccg agcccgtgac cgtgtcctgg    540
aactctggcg ctctgacaag cggcgtgcac accttccag ccgtgctgca gagcagcggc    600
ctgtactctc tgtccagcgt cgtgactgtg cccagcagc tctgggcac caagacctac    660
acctgtaacg tggaccacaa gcccagcaac accaaggtgg acaagcgggt ggaatctaag   720
tacggcctc cctgcctcc ttgcccagcc cctgaagccg cggcggacc ctccgtgttc    780
ctgttcccc caaagcccaa ggacaccctg atgatcagcc ggaccccga gtgacctgc    840
gtggtggtgg atgtgtccca ggaagatccc gaggtgcagt tcaattggta cgtggacggc    900
gtggaagtgc acaacgccaa gaccaagcct agagaggag gttcaacac cctaccggg    960
gtggtgtccg tgctgacagt gctgcaccag gactggctga acggcaaaga gtacaagtgc   1020
aaggtgtccaacaagggcct gcccagctcc atcgagaaaa ccatcagcaa ggccaaggc   1080
cagccccgcg aacccaggt gtacacactg cctccaagcc aggaagagat gaccaagaat   1140
caggtgtccc tgacctgtct cgtgaaaggc ttctaccct ccgatatcgc cgtggaatgg   1200
gagagcaacg ccagcccga gaacaactac aagaccacc cccctgtgct ggactccgat   1260
```

```
ggctcattct tcctgtacag cagactgacc gtggacaaga gccgtggca ggaaggcaac  1320
gtgttcagct gctccgtgat gcacgaggcc ctgcacaacc actacaccca gaagtccctg  1380
tctctgagcc tgggcaaa                                                1398

SEQ ID NO: 25           moltype = AA  length = 466
FEATURE                 Location/Qualifiers
REGION                  1..466
                        note = amino acid sequence of human chimeric antibody D13
                         heavy chain
source                  1..466
                        mol_type = protein
                        organism = synthetic construct
SEQUENCE: 25
MKHLWFFLLL VAAPRWVLSE VQLVESGGGL VQPGRSLKLS CLASGFTFSD YGMIWVRQAP   60
GKGLEWVASI SSSSSYIYYA DTVKGRFTIS RENAKNTLFL HMTSLRSEDT ALYYCARRYY  120
GFNYPFDYWG QGVMVTVSSA STKGPSVFPL APCSRSTSES TAALGCLVKD YFPEPVTVSW  180
NSGALTSGVH TFPAVLQSSG LYSLSSVVTV PSSSLGTKTY TCNVDHKPSN TKVDKRVESK  240
YGPPCPPCPA PEAAGGPSVF LFPPKPKDTL MISRTPEVTC VVVDVSQEDP EVQFNWYVDG  300
VEVHNAKTKP REEQFNSTYR VVSVLTVLHQ DWLNGKEYKC KVSNKGLPSS IEKTISKAKG  360
QPREPQVYTL PPSQEEMTKN QVSLTCLVKG FYPSDIAVEW ESNGQPENNY KTTPPVLDSD  420
GSFFLYSRLT VDKSRWQEGN VFSCSVMHEA LHNHYTQKSL SLSLGK                 466

SEQ ID NO: 26           moltype = DNA  length = 702
FEATURE                 Location/Qualifiers
misc_feature            1..702
                        note = nucleotide sequence coding human chimeric antibody
                         F44 light chain
source                  1..702
                        mol_type = other DNA
                        organism = synthetic construct
SEQUENCE: 26
atggtgctgc agacccaggt gttcatctcc ctgctgctgt ggatctccgg cgcgtacggc   60
gatgtccaga tgacccagtc tccatctaat cttgctgcct ctcctggaga aagtgtttcc  120
atcaattgca aggcaagtaa gagcattagc aagtatttag tctggtatca acagaaacct  180
gggaaagcaa ataagcttct tatctactct gggtcaactt tgcaatctgg aactccatcg  240
aggttcagtg gcagtggatc tggtacagat ttcactctca ccatcagaaa cctggagcct  300
gaagattttg gactctatta ctgtcaacag cataatgaat acccacccac gtttggagct  360
gggaccaagt tggaactgaa acggacggtg gccgccccct ccgtgttcat cttccccccc  420
tccgacgagc agctgaagtc cggcaccgcc tccgtgtgt gctgctgaa taacttctac  480
cccagagagg ccaaggtgca gtggaaggtg gacaacgccc tgcagtccgg gaactcccag  540
gagagcgtga ccgagcagga cagcaaggac agcacctaca gcctgagcag caccctgacc  600
ctgagcaaag ccgactacga gaagcacaag gtgtacgcct gcgaggtgac ccaccagggc  660
ctgagctccc ccgtcaccaa gagcttcaac agggggagt gt                      702

SEQ ID NO: 27           moltype = AA  length = 234
FEATURE                 Location/Qualifiers
REGION                  1..234
                        note = amino acid sequence of human chimeric antibody F44
                         light chain
source                  1..234
                        mol_type = protein
                        organism = synthetic construct
SEQUENCE: 27
MVLQTQVFIS LLLWISGAYG DVQMTQSPSN LAASPGESVS INCKASKSIS KYLAWYQQKP   60
GKANKLLIYS GSTLQSGTPS RFSGSGSGTD FTLTIRNLEP EDFGLYYCQQ HNEYPPTFGA  120
GTKLELKRTV AAPSVFIFPP SDEQLKSGTA SVVCLLNNFY PREAKVQWKV DNALQSGNSQ  180
ESVTEQDSKD STYSLSSTLT LSKADYEKHK VYACEVTHQG LSSPVTKSFN RGEC        234

SEQ ID NO: 28           moltype = DNA  length = 1395
FEATURE                 Location/Qualifiers
misc_feature            1..1395
                        note = nucleotide sequence coding human chimeric antibody
                         F44 heavy chain
source                  1..1395
                        mol_type = other DNA
                        organism = synthetic construct
SEQUENCE: 28
atgaaacacc tgtggttctt cctcctgctg gtggcagctc ccagatgggt gctgagcgag   60
gtgcagctgg tggaatctgg gggaggctta gtgcagcctg gaaggtccct gaaactctcc  120
tgtgcagcct caggattcac tttcagtaac tattacatgg cctgggtccg ccaggctcca  180
acgaagggtc tggagtgggt cacatacatt actactggtg gtggtagcac ttactttcga  240
gactccgtga agggccgatt cactatctcc agagataatg cagaaagcac cctataccfg  300
caaatggaca gtctgaggtc tgaggacacg gccacttatt actgtacagc agctaactac  360
gggaggtcct actttgatta ctggggccaa ggactcgtga cagtctcagc ctcc         420
accaaggggc ctagcgtgtt ccctctggcc ccttgtagca gaagcaccag cgagtctaca  480
gccgccctgg gctgcctcgt gaaggactac tttcccgagc cgtgaccgt gtcctggaac  540
tctggcgctc tgacaagcgg cgtgcacacc tttccagccg tgctgcagag cagcggcctg  600
tactctctgt ccagcgtcgt gactgtgccc agcagctctc tgggcaccaa gacctacacc  660
tgtaacgtgg accacaagcc cagcaacacc aaggtggaca gcggggtgga atctaagtac  720
```

```
ggccctccct gccctccttg cccagcccct gaagccgcgg gcggaccсctc cgtgttcctg    780
ttccccccaa agcccaagga caccctgatg atcagccgga cccccgaagt gacctgcgtg    840
gtggtggatg tgtcccagga agatcccgag gtgcagttca attggtacgt ggacggcgtg    900
gaagtgcaca acgccaagac caagcctaga gaggaacagt tcaacagcac ctaccgggtg    960
gtgtccgtgc tgacagtgct gcaccaggac tggctgaacg gcaaagagta caagtgcaag   1020
gtgtccaaca agggcctgcc cagctccatc gagaaaacca tcagcaaggc caagggccag   1080
ccccgcgaac ccaggtgta cacactgcct ccaagccagg aagagatgac caagaatcag   1140
gtgtccctga cctgtctcgt gaaaggcttc taccctcccg atatcgccgt ggaatgggag   1200
agcaacggcc agcccgagaa caactacaag accaccccc ctgtgctgga ctccgatggc   1260
tcattcttcc tgtacagcag actgaccgtg gacaagagcc ggtggcagga aggcaacgtg   1320
ttcagctgct ccgtgatgca cgaggccctg cacaaccact acacccagaa gtccctgtct   1380
ctgagcctgg gcaaa                                                    1395

SEQ ID NO: 29        moltype = AA  length = 465
FEATURE              Location/Qualifiers
REGION               1..465
                     note = amino acid sequence of human chimeric antibody F44
                      heavy chain
source               1..465
                     mol_type = protein
                     organism = synthetic construct
SEQUENCE: 29
MKHLWFFLLL VAAPRWVLSE VQLVESGGGL VQPGRSLKLS CAASGFTFSN YYMAWVRQAP    60
TKGLEWVTYI TTGGGSTYFR DSVKGRFTIS RDNAESTLYL QMDSLRSEDT ATYYCTAANY   120
GGSYFDYWGQ GVMVTVSSAS TKGPSVFPLA PCSRSTSEST AALGCLVKDY FPEPVTVSWN   180
SGALTSGVHT FPAVLQSSGL YSLSSVVTVP SSSLGTKTYT CNVDHKPSNT KVDKRVESKY   240
GPPCPPCPAP EAAGGPSVFL FPPKPKDTLM ISRTPEVTCV VVDVSQEDPE VQFNWYVDGV   300
EVHNAKTKPR EEQFNSTYRV VSVLTVLHQD WLNGKEYKCK VSNKGLPSSI EKTISKAKGQ   360
PREPQVYTLP PSQEEMTKNQ VSLTCLVKGF YPSDIAVEWE SNGQPENNYK TTPPVLDSDG   420
SFFLYSRLTV DKSRWQEGNV FSCSVMHEAL HNHYTQKSLS LSLGK                   465

SEQ ID NO: 30        moltype = DNA  length = 708
FEATURE              Location/Qualifiers
misc_feature         1..708
                     note = nucleotide sequence coding human chimeric antibody
                      F63 light chain
source               1..708
                     mol_type = other DNA
                     organism = synthetic construct
SEQUENCE: 30
atggtgctgc agacccaggt gttcatctcc ctgctgctgt ggatctccgg cgcgtacggc    60
cagttcacgc tgactcaacc aaagtccgtg tcaggagctc taagaagcac tatcaccatt   120
ccctgtgagc gcagcagtgg tgacattgga gatagcgtta gcagcgacac                180
ttgggaagac ccccatcaa tgtgatctat gctgatgatc aaagaccatc tgaagtgtct   240
gatcggttct cgggctccat cgacagctcc tctaactcag cctcactgac catcactaat   300
ctgcagatgg atgatgaggc cgactacttc tgtcagtctt acgatagtaa gattgacatt   360
ttcggcggtg gaaccaagct cactgtccta ggccagccta aggctgcccc tagcgtgacc   420
ctgttccctc cttccagcga ggagcttcaa gctaacaagg ccaccctggt gtgtctatc   480
tctgacttct acctggcgc tgtgaccgtg gcctggaagg ctgacagctc ccctgtgaag   540
gccggagtgg agaccaccac acctagcaag cagtctaaca acaagtacgc tgccagctcc   600
tacctgagcc ttaccctga gcagtggaag tctcacagaa gctactcctg tcaagtgacc   660
cacgagggca gcaccgtgga aaagaccgtg gctcctaccg agtgttcc                708

SEQ ID NO: 31        moltype = AA  length = 236
FEATURE              Location/Qualifiers
REGION               1..236
                     note = amino acid sequence of human chimeric antibody F63
                      light chain
source               1..236
                     mol_type = protein
                     organism = synthetic construct
SEQUENCE: 31
MVLQTQVFIS LLLWISGAYG QFTLTQPKSV SGALRSTITI PCERSSGDIG DSYVSWYQRH    60
LGRPPINVIY ADDQRPSEVS DRFSGSIDSS SNSASLTITN LQMDDEADYF CQSYDSKIDI   120
FGGGTKLTVL GQPKAAPSVT LFPPSSEELQ ANKATLVCLI SDFYPGAVTV AWKADSSPVK   180
AGVETTTPSK QSNNKYAASS YLSLTPEQWK SHRSYSCQVT HEGSTVEKTV APTECS       236

SEQ ID NO: 32        moltype = DNA  length = 1410
FEATURE              Location/Qualifiers
misc_feature         1..1410
                     note = nucleotide sequence coding human chimeric antibody
                      F63 heavy chain
source               1..1410
                     mol_type = other DNA
                     organism = synthetic construct
SEQUENCE: 32
atgaaacacc tgtggttctt cctcctgctg gtggcagctc ccagatgggt gctgagccag    60
gtgcagctga aggagtcagg acctggtctg gtgcagccct cagagaccct gtccctcacc   120
tgcactgtct ctgggttctc actagccagc tatagtttaa gttgggttcg ccagcctcca   180
```

```
ggaaaaggtc ctgagtggat gggaagaatg tactatgatg gagacacagc atataattca  240
gctctcaaat cccgactgag catcagcagg gacacctcca agaaccaagt tttcttaaaa  300
atgaacagtc tgcaaactga tgacacaggc acttactact gtaccagaga taggagtatg  360
tttggtacgg attatcccca ctggtacttt gacttctggg gcccaggaac catggtcacc  420
gtgtcgtcag cctccaccaa gggcccagc gtgttccctc tggccccttg tagcagaagc  480
accagcgagt ctacagccgc cctgggctgc ctcgtgaagg actactttcc cgagcccgtg  540
accgtgtcct ggaactctgg cgctctgaca agcggcgtgc acacctttcc agccgtgctg  600
cagagcagcg gcctgtactc tctgtccagc gtcgtgactg tgcccagcag ctctctgggc  660
accaagacct acacctgtaa cgtggaccac aagcccagca acaccaaggt ggacaagcgt  720
gtggaatcta agtacggccc tcctgccct ccttgcccag cccctgaagc cgcgggcgga  780
ccctccgtgt tcctgttccc cccaaagccc aaggacaccc tgatgatcag ccggacccc  840
gaagtgacct gcgtggtggt ggatgtgtcc aggaagatc ccgaggtgca gttcaattgg  900
tacgtggacg gcgtggaagt gcacaacgcc aagaccaagc ctagagagga cagttcaac  960
agcacctacc gggtggtgtc cgtgctgaca gtgctgcacc aggactggct gaacggcaaa 1020
gagtacaagt gcaaggtgtc caacaagggc ctgcccagct ccatcgagaa aaccatcagc 1080
aaggccaagg gccagccccg gaacccag gtgtacacac tgcctccaag ccaggaagag 1140
atgaccaaga atcaggtgtc cctgacctgt ctcgtgaaag gcttctaccc ctccgatatc 1200
gccgtggaat gggagagcaa cggccagccc gagaacaccac cccccctgtg 1260
ctggactccg atggctcatt cttcctgtac agcagactga ccgtggacaa gagccggtgg 1320
caggaaggca acgtgttcag ctgctccgtg atgcacgagg ccctgcacaa ccactacacc 1380
cagaagtccc tgtctctgag cctgggcaaa                                 1410

SEQ ID NO: 33           moltype = AA  length = 470
FEATURE                 Location/Qualifiers
REGION                  1..470
                        note = amino acid sequence of human chimeric antibody F63
                         heavy chain
source                  1..470
                        mol_type = protein
                        organism = synthetic construct
SEQUENCE: 33
MKHLWFFLLL VAAPRWVLSQ VQLKESGPGL VQPSETLSLT CTVSGFSLAS YSLSWVRQPS   60
GKGPEWMGRM YYDGDTAYNS ALKSRLSISR DTSKNQVFLK MNSLQTDDTG TYYCTRDRSM  120
FGTDYPHWYF DFWGPGTMVT VSSASTKGPS VFPLAPCSRS TSESTAALGC LVKDYFPEPV  180
TVSWNSGALT SGVHTFPAVL QSSGLYSLSS VVTVPSSSLG TKTYTCNVDH KPSNTKVDKR  240
VESKYGPPCP PCPAPEAAGG PSVFLFPPKP KDTLMISRTP EVTCVVVDVS QEDPEVQFNW  300
YVDGVEVHNA KTKPREEQFN STYRVVSVLT VLHQDWLNGK EYKCKVSNKG LPSSIEKTIS  360
KAKGQPREPQ VYTLPPSQEE MTKNQVSLTC LVKGFYPSDI AVEWESNGQP ENNYKTTPPV  420
LDSDGSFFLY SRLTVDKSRW QEGNVFSCSV MHEALHNHYT QKSLSLSLGK            470

SEQ ID NO: 34           moltype = DNA  length = 702
FEATURE                 Location/Qualifiers
misc_feature            1..702
                        note = nucleotide sequence coding hL2 light chain of
                         humanized D13
source                  1..702
                        mol_type = other DNA
                        organism = synthetic construct
SEQUENCE: 34
atggtgctgc agacccaggt gttcatctcc ctgctgctgt ggatctccgg cgcgtacggc   60
gccattcagc tgacacagag ccctagcagc ctgagcgcct ctgtgggcca gagagtgaca  120
attacctgcg gcgccagcaa gagcgtgcgc acctacatgc actggtatca gcagaagccc  180
ggcaaggccc ccaagctgct gatctacagc gcctccaatc tggaagcggg cgtgcccagc  240
agattttccg gctctggcag cggcaccgac ttcaccctga caatcagcag cctgcagccc  300
gaggacttcg ccacctacta ctgccagcag agcaacgagc cccctacac ctttggccag  360
ggcaccaagc tggaaatcaa gcgtacggtg gccgcccct ccgtgttcat cttccccccc  420
tccgacgagc agctgaagtc cggcaccgcc tccgtggtgt gcctgctgaa taacttctac  480
cccagagagg ccaaggtgca gtggaaggtg gacaacgccc tgcagtccgg gaactcccag  540
gagagcgtga ccgagcagga cagcaaggac agcacctaca gcctgagcag caccctgacc  600
ctgagcaaag ccgactacga gaagcacaag gtgtacgcct gcgaggtgac ccaccagggc  660
ctgagctccc ccgtcaccaa gagcttcaac aggggggagt gt                    702

SEQ ID NO: 35           moltype = AA  length = 234
FEATURE                 Location/Qualifiers
REGION                  1..234
                        note = amino acid sequence of hL2 light chain of humanized
                         D13
source                  1..234
                        mol_type = protein
                        organism = synthetic construct
SEQUENCE: 35
MVLQTQVFIS LLLWISGAYG AIQLTQSPSS LSASVGQRVT ITCGASKSVR TYMHWYQQKP   60
GKAPKLLIYS ASNLEAGVPS RFSGSGSGTD FTLTISSLQP EDFATYYCQQ SNEPPYTFGQ  120
GTKLEIKRTV AAPSVFIFPP SDEQLKSGTA SVVCLLNNFY PREAKVQWKV DNALQSGNSQ  180
ESVTEQDSKD STYSLSSTLT LSKADYEKHK VYACEVTHQG LSSPVTKSFN RGEC        234

SEQ ID NO: 36           moltype = DNA  length = 702
FEATURE                 Location/Qualifiers
misc_feature            1..702
```

```
                           note = nucleotide sequence coding hL3 light chain of
                              humanized D13
source                     1..702
                           mol_type = other DNA
                           organism = synthetic construct
SEQUENCE: 36
atggtgctgc agacccaggt gttcatctcc ctgctgctgt ggatctccgg cgcgtacggc    60
gatacccagc tgacacagag ccctagcagc ctgtctgcca gcgtgggcca gagagtgacc   120
attacctgcg gcgccagcaa gagcgtgcgg acctacatgc actggtatca gcagaagccc   180
ggcaagcagc ccaagctgct gatctacagc gcctccaacc tggaagccgg cgtgcccagc   240
agatttctg gcagcggctc cggcaccgac ttcaccctga caatcagcag cctgcagccc   300
gaggacttcg ccacctacta ctgccagcag agcaacgagc cccctacac ctttggccag    360
ggcaccaagc tggaaatcaa gcgtacggtg gccgccccct ccgtgttcat cttcccccc    420
tccgacgagc agctgaagtc cggcaccgcc tccgtggtgt gcctgctgaa taacttctac   480
cccagagagc caaggtgca gtggaaggtg gacaacgcc tgcagtccgg gaactcccag     540
gagagcgtga ccgagcagga cagcaaggac agcacctaca gcctgagcag caccctgacc   600
ctgagcaaag ccgactacga aagcacaag gtgtacgcct gcgaggtgac ccaccagggc    660
ctgagctccc ccgtcaccaa gagcttcaac agggggagt gt                       702

SEQ ID NO: 37              moltype = AA   length = 234
FEATURE                    Location/Qualifiers
REGION                     1..234
                           note = amino acid sequence of hL3 light chain of humanized
                              D13
source                     1..234
                           mol_type = protein
                           organism = synthetic construct
SEQUENCE: 37
MVLQTQVFIS LLLWISGAYG DTQLTQSPSS LSASVGQRVT ITCGASKSVR TYMHWYQQKP    60
GKQPKLLIYS ASNLEAGVPS RFSGSGSGTD FTLTISSLQP EDFATYYCQQ SNEPPYTFGQ   120
GTKLEIKRTV AAPSVFIFPP SDEQLKSGTA SVVCLLNNFY PREAKVQWKV DNALQSGNSQ   180
ESVTEQDSKD STYSLSSTLT LSKADYEKHK VYACEVTHQG LSSPVTKSFN RGEC         234

SEQ ID NO: 38              moltype = DNA   length = 702
FEATURE                    Location/Qualifiers
misc_feature               1..702
                           note = nucleotide sequence coding hL4 light chain of
                              humanized D13
source                     1..702
                           mol_type = other DNA
                           organism = synthetic construct
SEQUENCE: 38
atggtgctgc agacccaggt gttcatctcc ctgctgctgt ggatctccgg cgcgtacggc    60
gataccgtgc tgacccagag ccctgatagc ctggccgtgt ccctgggaca gagagccacc   120
atcaattgcg gcgccagcaa gagcgtgcgg acctacatgc actggtatca gcagaagccc   180
ggccagcagc ccaagctgct gatctacagc gcctccaacc tggaagccgg cgtgcccagc   240
agatttctg gcagcggctc cggcaccgac ttcaccctga caatcagctc cctgcaggcc   300
gaggacgtgg ccgtgtacta ctgccagcag agcaacgagc cccctacac ctttggccag    360
ggcaccaagg tggaaatcaa gcgtacggtg gccgccccct ccgtgttcat cttcccccc    420
tccgacgagc agctgaagtc cggcaccgcc tccgtggtgt gcctgctgaa taacttctac   480
cccagagagc caaggtgca gtggaaggtg gacaacgcc tgcagtccgg gaactcccag     540
gagagcgtga ccgagcagga cagcaaggac agcacctaca gcctgagcag caccctgacc   600
ctgagcaaag ccgactacga aagcacaag gtgtacgcct gcgaggtgac ccaccagggc    660
ctgagctccc ccgtcaccaa gagcttcaac agggggagt gt                       702

SEQ ID NO: 39              moltype = AA   length = 234
FEATURE                    Location/Qualifiers
REGION                     1..234
                           note = amino acid sequence of hL4 light chain of humanized
                              D13
source                     1..234
                           mol_type = protein
                           organism = synthetic construct
SEQUENCE: 39
MVLQTQVFIS LLLWISGAYG DTVLTQSPDS LAVSLGQRAT INCGASKSVR TYMHWYQQKP    60
GQQPKLLIYS ASNLEAGVPS RFSGSGSGTD FTLTISSLQA EDVAVYYCQQ SNEPPYTFGQ   120
GTKVEIKRTV AAPSVFIFPP SDEQLKSGTA SVVCLLNNFY PREAKVQWKV DNALQSGNSQ   180
ESVTEQDSKD STYSLSSTLT LSKADYEKHK VYACEVTHQG LSSPVTKSFN RGEC         234

SEQ ID NO: 40              moltype = DNA   length = 1398
FEATURE                    Location/Qualifiers
misc_feature               1..1398
                           note = nucleotide sequence coding hH1 heavy chain of
                              humanized D13
source                     1..1398
                           mol_type = other DNA
                           organism = synthetic construct
SEQUENCE: 40
atgaaacacc tgtggttctt cctcctgctg gtggcagctc ccagatgggt gctgagccag    60
```

```
gtgcagctgg tggaatctgg cggcggagtg gtgcagcctg gcagaagcct gagactgagc   120
tgtgccgcca gcggcttcac cttcagcgac tacggcatga tctgggtgcg ccaggcccct   180
ggcaaaggcc tggaatgggt ggccagcatc agcagcagct ccagctacat ctactacgcc   240
gacagcgtga agggccggtt caccatcagc cgggacaaca gcaagaaccg gctgtacctg   300
cagatgaaca gcctgcgggc cgaggacacc gccgtgtact attgcgccag acggtactac   360
ggcttcaact acccccttcga ctactggggc cagggcacaa tggtcaccgt cagctcagcc   420
tccaccaagg gcccttagcgt gttccctctg gccccttgta gcagaagcac cagcgagtct   480
acagccgccc tgggctgcct cgtgaaggac tactttcccg agcccgtgac cgtgtcctgg   540
aactctggcg ctctgacaag cggcgtgcac acctttccag ccgtgctgca gagcagcggc   600
ctgtactctc tgtccagcgt cgtgactgtg cccagcagct ctctgggcac caagacctac   660
acctgtaacg tggaccacaa gcccagcaac accaaggtgg acaagcgggt ggaatctaag   720
tacggccctc cctgccctcc ttgcccagcc cctgaagccg cgggcggacc ctccgtgttc   780
ctgttccccc caaagcccaa ggacaccctg atgatcagcc gaccccga agtgacctgc   840
gtggtggtgg atgtgtccca ggaagatccc gaggtgcagt tcaattggta cgtggacggc   900
gtggaagtgc acaacgccaa gaccaagcct agagaggaac agttcaacag cacctaccgg   960
gtggtgtccg tgctgacagt gctgcaccag gactggctga acggcaaaga gtacaagtgc  1020
aaggtgtcca acaagggcct gcccagctcc atcgagaaaa ccatcagcaa ggccaagggc  1080
cagccccgcg aaccccaggt gtacacactg cctccaagcc aggaagagat gaccaagaat  1140
caggtgtccc tgacctgtct cgtgaaaggc ttctacccct ccgatatcgc cgtggaatgg  1200
gagagcaacg gccagcccga gaacaactac aagaccaccc ccctgtgct ggactccgat  1260
ggctcattct tcctgtacag cagactgacc gtggacaaga gccgtggca ggaaggcaac  1320
gtgttcagct gctccgtgat gcacgaggcc ctgcacaacc actacaccca gaagtccctg  1380
tctctgagcc tgggcaaa                                                1398

SEQ ID NO: 41             moltype = AA   length = 466
FEATURE                   Location/Qualifiers
REGION                    1..466
                          note = amino acid sequence of hH1 heavy chain of humanized
                          D13
source                    1..466
                          mol_type = protein
                          organism = synthetic construct
SEQUENCE: 41
MKHLWFFLLL VAAPRWVLSQ VQLVESGGGV VQPGRSLRLS CAASGFTFSD YGMIWVRQAP    60
GKGLEWVASI SSSSYIYYA DSVKGRFTIS RDNSKNRLYL QMNSLRAEDT AVYYCARRYY   120
GFNYPFDYWG QGTMVTVSSA STKGPSVFPL APCSRSTSES TAALGCLVKD YFPEPVTVSW   180
NSGALTSGVH TFPAVLQSSG LYSLSSVVTV PSSSLGTKTY TCNVDHKPSN TKVDKRVESK   240
YGPPCPPCPA PEAAGGPSVF LFPPKPKDTL MISRTPEVTC VVVDVSQEDP EVQFNWYVDG   300
VEVHNAKTKP REEQFNSTYR VVSVLTVLHQ DWLNGKEYKC KVSNKGLPSS IEKTISKAKG   360
QPREPQVYTL PPSQEEMTKN QVSLTCLVKG FYPSDIAVEW ESNGQPENNY KTTPPVLDSD   420
GSFFLYSRLT VDKSRWQEGN VFSCSVMHEA LHNHYTQKSL SLSLGK                  466

SEQ ID NO: 42             moltype = DNA   length = 1398
FEATURE                   Location/Qualifiers
misc_feature              1..1398
                          note = nucleotide sequence coding hH2 heavy chain of
                          humanized D13
source                    1..1398
                          mol_type = other DNA
                          organism = synthetic construct
SEQUENCE: 42
atgaaacacc tgtggttctt cctcctgctg gtggcagctc ccagatgggg gctgagcgaa    60
gtgcagctgg tggaatctgg cggcggagtg gtgcagcctg gcagaagcct gagactgagc   120
tgtgccgcca gcggcttcac cttcagcgac tacggcatga tctgggtgcg ccaggcccct   180
ggcaaaggcc tggaatgggt ggccagcatc agcagcagct ccagctacat ctactacgcc   240
gacagcgtga agggccggtt caccatcagc cgggacaaca gcaagaacac cctgtacctg   300
cagatgaaca gcctgcgggc cgaggacacc gccgtgtact attgcgccag acggtactac   360
ggcttcaact acccccttcga ctactggggc cagggcacaa tggtcaccgt cagctcagcc   420
tccaccaagg gcccttagcgt gttccctctg gccccttgta gcagaagcac cagcgagtct   480
acagccgccc tgggctgcct cgtgaaggac tactttcccg agcccgtgac cgtgtcctgg   540
aactctggcg ctctgacaag cggcgtgcac acctttccag ccgtgctgca gagcagcggc   600
ctgtactctc tgtccagcgt cgtgactgtg cccagcagct ctctgggcac caagacctac   660
acctgtaacg tggaccacaa gcccagcaac accaaggtgg acaagcgggt ggaatctaag   720
tacggccctc cctgccctcc ttgcccagcc cctgaagccg cgggcggacc ctccgtgttc   780
ctgttccccc caaagcccaa ggacaccctg atgatcagcc gaccccga agtgacctgc   840
gtggtggtgg atgtgtccca ggaagatccc gaggtgcagt tcaattggta cgtggacggc   900
gtggaagtgc acaacgccaa gaccaagcct agagaggaac agttcaacag cacctaccgg   960
gtggtgtccg tgctgacagt gctgcaccag gactggctga acggcaaaga gtacaagtgc  1020
aaggtgtcca acaagggcct gcccagctcc atcgagaaaa ccatcagcaa ggccaagggc  1080
cagccccgcg aaccccaggt gtacacactg cctccaagcc aggaagagat gaccaagaat  1140
caggtgtccc tgacctgtct cgtgaaaggc ttctacccct ccgatatcgc cgtggaatgg  1200
gagagcaacg gccagcccga gaacaactac aagaccaccc ccctgtgct ggactccgat  1260
ggctcattct tcctgtacag cagactgacc gtggacaaga gccgtggca ggaaggcaac  1320
gtgttcagct gctccgtgat gcacgaggcc ctgcacaacc actacaccca gaagtccctg  1380
tctctgagcc tgggcaaa                                                1398

SEQ ID NO: 43             moltype = AA   length = 466
FEATURE                   Location/Qualifiers
REGION                    1..466
```

```
                                note = amino acid sequence of hH2 heavy chain of humanized
                                      D13
                        source  1..466
                                mol_type = protein
                                organism = synthetic construct
SEQUENCE: 43
MKHLWFFLLL VAAPRWVLSE VQLVESGGGV VQPGRSLRLS CAASGFTFSD YGMIWVRQAP    60
GKGLEWVASI SSSSSYIYYA DSVKGRFTIS RDNSKNTLYL QMNSLRAEDT AVYYCARRYY   120
GFNYPFDYWG QGTMVTVSSA STKGPSVFPL APCSRSTSES TAALGCLVKD YFPEPVTVSW   180
NSGALTSGVH TFPAVLQSSG LYSLSSVVTV PSSSLGTKTY TCNVDHKPSN TKVDKRVESK   240
YGPPCPPCPA PEAAGGPSVF LFPPKPKDTL MISRTPEVTC VVVDVSQEDP EVQFNWYVDG   300
VEVHNAKTKP REEQFNSTYR VVSVLTVLHQ DWLNGKEYKC KVSNKGLPSS IEKTISKAKG   360
QPREPQVYTL PPSQEEMTKN QVSLTCLVKG FYPSDIAVEW ESNGQPENNY KTTPPVLDSD   420
GSFFLYSRLT VDKSRWQEGN VFSCSVMHEA LHNHYTQKSL SLSLGK                  466

SEQ ID NO: 44           moltype = DNA   length = 1140
FEATURE                 Location/Qualifiers
misc_feature            1..1140
                        note = nucleotide sequence coding human SIRPA variant 1 ECD
source                  1..1140
                        mol_type = other DNA
                        organism = synthetic construct
SEQUENCE: 44
atggaacctg ccggacctgc ccctggcaga ctgggacctc tgctgtgtct gctgctggcc    60
gcctcttgtg cttggagcgg agtggctggc gaagaggaac tgcaagtgat ccagcccgac   120
aagagcgtgc tggtggccgc tggcgaaacc gccaccctga gatgtacagc caccagcctg   180
atccccgtgg gccccatcca gtggtttaga ggcgctggcc ctggccgcga gctgatctac   240
aatcagaaag agggccactt ccccagagtg accaccgtgt ccgacctgac caagcggaac   300
aacatggact tcagcatccg gatcggcaac atcacccctg ccgatgccgg cacctactac   360
tgcgtgaagt tccggaaggg cagccccgac gacgtggaat tcaaaagcgg agccggcacc   420
gagctgagcg tgcgggctaa accttctgcc cctgtggtgt ctggacctgc cgccagagct   480
acacctcagc acaccgtgtc ttttacctgc gagagccacg gcttcagccc cagagacatc   540
accctgaagt ggttcaagaa cggcaacgag ctgtccgact ccagaccaa cgtggaccct    600
gtgggcgaga gcgtgtccta cagcatccac agcaccgtcc aggtggtgct gaccgcgaa    660
gatgtgcaca gccaagtgat ctgcgaggtg gcccacgtga cactgcaggg cgatcctctg   720
agaggaaccg ccaacctgtc cgagacaatc agagtgcccc caccctggga gtgacccag    780
cagcctgtgc gggccgagaa ccaagtgaac gtgacctgcc aagtgcggaa gttctacccc   840
cagcggctgc agctgacctg gctggaaaac ggcaatgtgt cccggaccga cagccagc    900
accgtgaccg agaacaagga tggcacctac aattggatga gctgcgtgct cgtgaacgtg   960
tccgcccacc gggacgatgt gaagctgaca tgccaggtgg aacacgacgg ccagcctgcc  1020
gtgtccaaga gccacgatct gaaggtgtca gcccatccca aagagcaggg ctccaacaca  1080
gccgccgaga caccggcag caacgagcgg aacatctacc accaccatca ccaccactga  1140

SEQ ID NO: 45           moltype = AA   length = 379
FEATURE                 Location/Qualifiers
REGION                  1..379
                        note = amino acid sequencde of human SIRPA variant 1 ECD
source                  1..379
                        mol_type = protein
                        organism = synthetic construct
SEQUENCE: 45
MEPAGPAPGR LGPLLCLLLA ASCAWSGVAG EELQVIQPD KSVLVAAGET ATLRCTATSL     60
IPVGPIQWFR GAGPGRELIY NQKEGHFPRV TTVSDLTKRN NMDFSIRIGN ITPADAGTYY   120
CVKFRKGSPD DVEFKSGAGT ELSVRAKPSA PVVSGPAARA TPQHTVSFTC ESHGFSPRDI   180
TLKWFKNGNE LSDFQTNVDP VGESVSYSIH STAKVVLTRE DVHSQVICEV AHVTLQGDPL   240
RGTANLSETI RVPPTLEVTQ QPVRAENQVN VTCQVRKFYP QRLQLTWLEN GNVSRTETAS   300
TVTENKDGTY NWMSWLLVNV SAHRDDVKLT CQVEHDGQPA VSKSHDLKVS AHPKEQGSNT   360
AAENTGSNER NIYHHHHHH                                                379

SEQ ID NO: 46           moltype = DNA   length = 468
FEATURE                 Location/Qualifiers
misc_feature            1..468
                        note = nucleotide sequence coding human SIRPA variant 1 IgV
source                  1..468
                        mol_type = other DNA
                        organism = synthetic construct
SEQUENCE: 46
atggaacctg ccggacctgc ccctggcaga ctgggacctc tgctgtgtct gctgctggcc    60
gcctcttgtg cttggagcgg agtggctggc gaagaggaac tgcaagtgat ccagcccgac   120
aagagcgtgc tggtggccgc tggcgaaacc gccaccctga gatgtacagc caccagcctg   180
atccccgtgg gccccatcca gtggtttaga ggcgctggcc ctggccgcga gctgatctac   240
aatcagaaag agggccactt ccccagagtg accaccgtgt ccgacctgac caagcggaac   300
aacatggact tcagcatccg gatcggcaac atcacccctg ccgatgccgg cacctactac   360
tgcgtgaagt tccggaaggg cagccccgac gacgtggaat tcaaaagcgg agccggcacc   420
gagctgagcg tgcgggctaa acctagccac caccaccatc accactga                468

SEQ ID NO: 47           moltype = AA   length = 155
FEATURE                 Location/Qualifiers
REGION                  1..155
```

```
                            note = amino acid sequencde of human SIRPA variant 1 IgV
source                      1..155
                            mol_type = protein
                            organism = synthetic construct
SEQUENCE: 47
MEPAGPAPGR LGPLLCLLLA ASCAWSGVAG EEELQVIQPD KSVLVAAGET ATLRCTATSL    60
IPVGPIQWFR GAGPGRELIY NQKEGHFPRV TTVSDLTKRN NMDFSIRIGN ITPADAGTYY   120
CVKFRKGSPD DVEFKSGAGT ELSVRAKPSH HHHHH                              155

SEQ ID NO: 48               moltype = DNA   length = 1137
FEATURE                     Location/Qualifiers
misc_feature                1..1137
                            note = nucleotide sequence coding human SIRPA variant 2 ECD
source                      1..1137
                            mol_type = other DNA
                            organism = synthetic construct
SEQUENCE: 48
atggaacctg ccggacctgc ccctggcaga ctgggacctc tgctgtgtct gctgctggcc    60
gcctcttgtg cttggagcgg agtggctggc gaagaggaac tgcaagtgat ccagcccgac   120
aagagcgtgt cagtggccgc tggcgagtct gccatcctgc actgtaccgt gaccagcctg   180
atccccgtgg gccccatcca gtggtttaga ggcgctggac tgccagaga gctgatctac   240
aaccagaaag agggccactt ccccagagtg accaccgtg ccgagagcac caagcgcag   300
aacatggact tcagcatcag catctccaac atcaccctg ccgacgccgg cacctactac   360
tgcgtgaagt tcagaaaggg cagccccgac ccgagttca gagcggagc cggcacagag   420
ctgtctgtgc gggccaaacc ttctgcccct gtggtgtctg accagccgc cagagctaca   480
cctcagcaca ccgtgtcttt tacctcgag agccacggct cagccccag agacatcacc   540
ctgaagtggt tcaagaacgg caacgagctg agcgacttcc agaccaacgt ggaccctgtg   600
ggcgagtccg tgtcctacag catccacagc accgccaagg tggtgctgac ccgcgaagat   660
gtgcacagcc aagtgatctg cgaggtggcc acgtgacac tgcagggcga tcctctgaga   720
ggaaccgcca acctgagcga gacaatcaga gtgccccca cctgaagt gacccagcag   780
ccagtgcggg ccgagaacca gtgaacgtg acctgtcaag tgcggaagtt ctaccccag   840
cggctgcagc tgacctggct ggaaaacggc aatgtgtcc ggaccgagac agccagcac   900
gtgacagaga caaggatgg cacctacaat tggatgtctt ggctgctcgt gaacgtgtcc   960
gcccaccggg acgatgtgaa gctgacatgc caggtggaca acgacggcca gcctgccgtg  1020
tctaagagcc acgacctgaa ggtgtcagcc atcccaaag agcagggctc caacacagcc  1080
gccgagaaca ccggcagcaa cgagcggaac atctaccacc accatcacca ccactga     1137

SEQ ID NO: 49               moltype = AA   length = 378
FEATURE                     Location/Qualifiers
REGION                      1..378
                            note = amino acid sequencde of human SIRPA variant 2 ECD
source                      1..378
                            mol_type = protein
                            organism = synthetic construct
SEQUENCE: 49
MEPAGPAPGR LGPLLCLLLA ASCAWSGVAG EEELQVIQPD KSVSVAAGES AILHCTVTSL    60
IPVGPIQWFR GAGPARELIY NQKEGHFPRV TTVSESTKRE NMDFSISISN ITPADAGTYY   120
CVKFRKGSPD TEFKSGAGTE LSVRAKPSAP VVSGPAARAT PQHTVSFTCE SHGFSPRDIT   180
LKWFKNGNEL SDFQTNVDPV GESVSYSIHS TAKVVLTRED VHSQVICEVA HVTLQGDPLR   240
GTANLSETIR VPPTLEVTQQ PVRAENQVNV TCQVRKFYPQ RLQLTWLENG NVSRTETAST   300
VTENKDGTYN WMSWLLVNVS AHRDDVKLTC QVEHDGQPAV SKSHDLKVSA HPKEQGSNTA   360
AENTGSNERN IYHHHHHH                                                 378

SEQ ID NO: 50               moltype = DNA   length = 465
FEATURE                     Location/Qualifiers
misc_feature                1..465
                            note = nucleotide sequence coding human SIRPA variant 2 IgV
source                      1..465
                            mol_type = other DNA
                            organism = synthetic construct
SEQUENCE: 50
atggaacctg ccggacctgc ccctggcaga ctgggacctc tgctgtgtct gctgctggcc    60
gcctcttgtg cttggagcgg agtggctggc gaagaggaac tgcaagtgat ccagcccgac   120
aagagcgtgt cagtggccgc tggcgagtct gccatcctgc actgtaccgt gaccagcctg   180
atccccgtgg gccccatcca gtggtttaga ggcgctggac tgccagaga gctgatctac   240
aaccagaaag agggccactt ccccagagtg accaccgtgt ccgagagcac caagcgcgag   300
aacatggact tcagcatcag catctccaac atcaccctg ccgacgccgg cacctactac   360
tgcgtgaagt tcagaaaggg cagccccgac accgagttca gagcggagc cggcacagag   420
ctgtctgtgc gggccaagcc tagccaccac caccatcacc attga                   465

SEQ ID NO: 51               moltype = AA   length = 154
FEATURE                     Location/Qualifiers
REGION                      1..154
                            note = amino acid sequencde of human SIRPA variant 2 IgV
source                      1..154
                            mol_type = protein
                            organism = synthetic construct
SEQUENCE: 51
MEPAGPAPGR LGPLLCLLLA ASCAWSGVAG EEELQVIQPD KSVSVAAGES AILHCTVTSL    60
```

```
IPVGPIQWFR GAGPARELIY NQKEGHFPRV TTVSESTKRE NMDFSISISN ITPADAGTYY    120
CVKFRKGSPD TEFKSGAGTE LSVRAKPSHH HHHH                               154

SEQ ID NO: 52             moltype = DNA  length = 1137
FEATURE                   Location/Qualifiers
misc_feature              1..1137
                          note = nucleotide sequence coding monkey SIRPA ECD
source                    1..1137
                          mol_type = other DNA
                          organism = synthetic construct
SEQUENCE: 52
atggaacccg ccggacctgc tcctggcaga ctgggacctc tgctgtgtct gctgctgacc    60
gccagctgtg cttggagcgg agtgctgggc gaagaggaac tgcaagtgat ccagcccgag   120
aagtccgtgt ctgtggccgc tggcgatagc gccaccctga attgcaccgt gtccagcctg   180
atccccgtgg gccctatcca gtggtttaga ggcgctggcc ctggcagaga gctgatctac   240
aacctgaaag agggccactt ccccagagtg accgccgtgt ccgaccccac caagcggaac   300
aacatggact tcagcatccg gatcagcaac atcacccctg ccgacgccgg cacctactac   360
tgcgtgaagt tcagaaaggg cagccccgac gtggaactga gtctggccgc cggaacagag   420
ctgagcgtgc gggccaaacc ttctgcccct gtggtgtctg gacctgccgt gcgggctaca   480
gccgagcaca ccgtgtcttt tacctgcgag agccacggct tcagcccag agacatcacc   540
ctgaagtggt tcaagaacgg caacgagctg tccgacgtgc agaccaacgt ggaccctgcc   600
ggcaagacgg tgtcctacag catcagatcc accgccaagt gctgctgac aagacgggac   660
gtgcacagcc aagtgatctg cgaggtggcc cacgtgacac tgcagggcga tcctctgaga   720
ggcaccgcca atctgagcga ggctatccgg gtgcccccat tcctggaagt gacccagcag   780
agcatgcggg ccgacaacca agtgaacgtg acctgccaag tgaccaagtt ctaccccag   840
cggctgcagc tgacctggct ggaaaacggc aatgtgtccc ggaccgagat ggcctctgcc   900
ctgcccgaga acaaggatgg cacctacaat tggaccagct ggctgctcgt gaacgtgtcc    960
gccaccggg acgatgtgaa gctgacatgc caggtggaac gcgacggcca gcccgccgtg   1020
aacaagagct tcagcgtgaa agtgtctgct caccccaaag agcagggcag caacactgcc   1080
gccgagaaca ccggcaccaa cgagcggaac atctaccatc accaccatca tcactga     1137

SEQ ID NO: 53             moltype = AA  length = 378
FEATURE                   Location/Qualifiers
REGION                    1..378
                          note = amino acid sequencde of monkey SIRPA ECD
source                    1..378
                          mol_type = protein
                          organism = synthetic construct
SEQUENCE: 53
MEPAGPAPGR LGPLLCLLLT ASCAWSGVLG EELQVIQPE KSVSVAAGDS ATLNCTVSSL    60
IPVGPIQWFR GAGPGRELIY NLKEGHFPRV TAVSDPTKRN NMDFSIRISN ITPADAGTYY   120
CVKFRKGSPD VELKSGAGTE LSVRAKPSAP VVSGPAVRAT AEHTVSFTCE SHGFSPRDIT   180
LKWFKNGNEL SDVQTNVDPA GKSVSYSIRS TARVLLTRRD VHSQVICEVA HVTLQGDPLR   240
GTANLSEAIR VPPFLEVTQQ SMRADNQVNV TCQVTKFYPQ RLQLTWLENG NVSRTEMASA   300
LPENKDGTYN WTSWLLVNVS AHRDDVKLTC QVEHDGQPAV NKSFSVKVSA HPKEQGSNTA   360
AENTGTNERN IYHHHHHH                                                 378

SEQ ID NO: 54             moltype = DNA  length = 1107
FEATURE                   Location/Qualifiers
misc_feature              1..1107
                          note = nucleotide sequence coding human CD47-Fc
source                    1..1107
                          mol_type = other DNA
                          organism = synthetic construct
SEQUENCE: 54
atgtggcccc tggtagcggc gctgttgctg ggctcggcgt gctgcggatc agctcagcta    60
ctatttaata aaacaaaatc tgtagaattc acgttttgta atgacactgt cgtcattcca   120
tgctttgtta ctaatatgga ggcacaaaac actactgaag tatacgtaaa gtggaaattt   180
aaaggaagag atatttacac ctttgatgga gctctaaaca agtccactgt ccccactgac   240
tttagtagtg caaaaattga agtctcacaa ttactaaaag gagatgcctc tttgaagatg   300
gataagagtg atgctgtctc acacacagga actacacttt gtgaagtaac agaattaacc   360
agagaaggtg aaacgatcat cgagctaaaa tatcgtgttg tttcatggtt ttctccaaat   420
gaagacaaaa ctcacacatg cccaccctgc ccagcacctg aactcctggg gggacccctca   480
gtcttcctct tccccccaaa acccaaggac accctcatga tctcccggac ccctgaggtc   540
acatgcgtgg tggtggacgt gagccacgaa gaccctgagg tcaagttcaa ctggtacgtg   600
gacggcgtgg aggtgcataa tgccaagaca aagccccggg aggagcagta caacagcacg   660
taccgggtgg tcagcgtcct caccgtcctg caccaggact ggctgaatgg caaggagtac   720
aagtgcaagg tctccaacaa agccctccca gcccccatcg agaaaaccat ctccaaagcc   780
aaagggcagcc cccgggaacc acaggtgtac accctgcccc catcccggga ggagatgacc   840
aagaaccagg tcagcctgac ctgcctggtc aaaggcttct atcccagcga catcgccgtg   900
gagtgggaga gcaatggcca gcccgagaac aactacaaga ccaccctccc cgtgctggac   960
tccgacggct ccttcttcct ctacagcaag ctcaccgtgg acaagagcag gtggcagcag   1020
ggcaacgtct tctcatgctc cgtgatgcat gaggctctgc acaaccacta cacccagaag   1080
agcctctccc tgtctcccgg caaatga                                      1107

SEQ ID NO: 55             moltype = AA  length = 368
FEATURE                   Location/Qualifiers
REGION                    1..368
                          note = amino acid sequencde of human CD47-Fc
```

```
source                          1..368
                                mol_type = protein
                                organism = synthetic construct
SEQUENCE: 55
MWPLVAALLL GSACCGSAQL LFNKTKSVEF TFCNDTVVIP CFVTNMEAQN TTEVYVKWKF    60
KGRDIYTFDG ALNKSTVPTD FSSAKIEVSQ LLKGDASLKM DKSDAVSHTG NYTCEVTELT   120
REGETIIELK YRVVSWFSPN EDKTHTCPPC PAPELLGGPS VFLFPPKPKD TLMISRTPEV   180
TCVVVDVSHE DPEVKFNWYV DGVEVHNAKT KPREEQYNST YRVVSVLTVL HQDWLNGKEY   240
KCKVSNKALP APIEKTISKA KGQPREPQVY TLPPSREEMT KNQVSLTCLV KGFYPSDIAV   300
EWESNGQPEN NYKTTPPVLD SDGSFFLYSK LTVDKSRWQQ GNVFSCSVMH EALHNHYTQK   360
SLSLSPGK                                                            368

SEQ ID NO: 56                   moltype = AA  length = 504
FEATURE                         Location/Qualifiers
source                          1..504
                                mol_type = protein
                                organism = Homo sapiens
SEQUENCE: 56
MEPAGPAPGR LGPLLCLLLA ASCAWSGVAG EEELQVIQPD KSVLVAAGET ATLRCTATSL    60
IPVGPIQWFR GAGPGRELIY NQKEGHFPRV TTVSDLTKRN NMDFSIRIGN ITPADAGTYY   120
CVKFRKGSPD DVEFKSGAGT ELSVRAKPSA PVVSGPAARA TPQHTVSFTC ESHGFSPRDI   180
TLKWFKNGNE LSDFQTNVDP VGESVSYSIH STAKVVLTRE DVHSQVICEV AHVTLQGDPL   240
RGTANLSETI RVPPTLEVTQ QPVRAENQVN VTCQVRKFYP QRLQLTWLEN GNVSRTETAS   300
TVTENKDGTY NWMSWLLVNV SAHRDDVKLT CQVEHDGQPA VSKSHDLKVS AHPKEQGSNT   360
AAAENTGSNER NIYIVVGVVC TLLVALLMAA LYLVRIRQKK AQGSTSSTRL HEPEKNAREI   420
TQDTNDITYA DLNLPKGKKP APQAAEPNNH TEYASIQTSP QPASEDTLTY ADLDMVHLNR   480
TPKQPAPKPE PSFSEYASVQ VPRK                                          504

SEQ ID NO: 57                   moltype = AA  length = 503
FEATURE                         Location/Qualifiers
source                          1..503
                                mol_type = protein
                                organism = Homo sapiens
SEQUENCE: 57
MEPAGPAPGR LGPLLCLLLA ASCAWSGVAG EEELQVIQPD KSVSVAAGES AILHCTVTSL    60
IPVGPIQWFR GAGPARELIY NQKEGHFPRV TTVSESTKRE NMDFSISISN ITPADAGTYY   120
CVKFRKGSPD TEFKSGAGTE LSVRAKPSAP VVSGPAARAT PQHTVSFTCE SHGFSPRDIT   180
LKWFKNGNEL SDFQTNVDPV GESVSYSIHS TAKVVLTRED VHSQVICEVA HVTLQGDPLR   240
GTANLSETIR VPPTLEVTQQ PVRAENQVNV TCQVRKFYPQ RLQLTWLENG NVSRTETAST   300
VTENKDGTYN WMSWLLVNVS AHRDDVKLTC QVEHDGQPAV SKSHDLKVSA HPKEQGSNTA   360
AENTGSNERN IYIVVGVVCT LLVALLMAAL YLVRIRQKKA QGSTSSTRLH EPEKNAREIT   420
QDTNDITYAD LNLPKGKKPA PQAAEPNNHT EYASIQTSPQ PASEDTLTYA DLDMVHLNRT   480
PKQPAPKPEP SFSEYASVQV PRK                                           503

SEQ ID NO: 58                   moltype = AA  length = 503
FEATURE                         Location/Qualifiers
source                          1..503
                                mol_type = protein
                                organism = Macaca fascicularis
SEQUENCE: 58
MEPAGPAPGR LGPLLCLLLT ASCAWSGVLG EEELQVIQPE KSVSVAAGDS ATLNCTVSSL    60
IPVGPIQWFR GAGPGRELIY NLKEGHFPRV TAVSDPTKRN NMDFSIRISN ITPADAGTYY   120
CVKFRKGSPD VELKSGAGTE LSVRAKPSAP VVSGPAVRAT AEHTVSFTCE SHGFSPRDIT   180
LKWFKNGNEL SDVQTNVDPA GKSVSYSIRS TARVLLTRRD VHSQVICEVA HVTLQGDPLR   240
GTANLSEAIR VPPFLEVTQQ SMRADNQVNV TCQVTKFYPQ RLQLTWLENG NVSRTEMASA   300
LPENKDGTYN WTSWLLVNVS AHRDDVKLTC QVEHDGQPAV NKSFSVKVSA HPKEQGSNTA   360
AENTGTNERN IYIVVGVVCT LLVALLMAAL YLVRIRQKKA QGSTSSTRLH EPEKNAREIT   420
QDTNDITYAD LNLPKGKKPA PRAAEPNNHT EGASIQTSPQ PASEDTLTYA DLDMVHLNRT   480
PKQPAPKPEP SFSEYASVQV PRK                                           503

SEQ ID NO: 59                   moltype = AA  length = 509
FEATURE                         Location/Qualifiers
source                          1..509
                                mol_type = protein
                                organism = Mus musculus
SEQUENCE: 59
MEPAGPAPGR LGPLLLCLLL SASCFCTGAT GKELKVTQPE KSVSVAAGDS TVLNCTLTSL    60
LPVGPIRWYR GVGPSRLLIY SFAGEYVPRI RNVSDTTKRN NMDFSIRISN VTPADAGIYY   120
CVKFQKGSSE PDTEIQSGGG TEVYVLAKPS PPEVSGPADR GIPDQKVNFT CKSHGFSPRN   180
ITLKWFKDGQ ELHPLETTVN PSGKNVSYNI SSTRVVVLNS MDVNSKVICE VAHITLDRSP   240
LRGIANLSNF IRVSPTVKVT QQSPTSMNQV NLTCRAERFY PEDLQLIWLE NGNVSRNDTP   300
KNLTKNTDGT YNYTSLFLVN SSAHREDVVF TCQVKHDQQP AITRNHTVLG FAHSSDQGSM   360
QTFPDNNATH NWNVFIGVGV ACALLVVLLM AALYLLRIKQ KKAKGSTSST RLHEPEKNAR   420
EITQIQDTND INDITYADLN LPKEKKPAPR APEPNNHTEY ASIETGKVPR PEDTLTYADL   480
DMVHLSRAQP APKPEPSFSE YASVQVQRK                                     509

SEQ ID NO: 60                   moltype = AA  length = 509
FEATURE                         Location/Qualifiers
source                          1..509
```

```
                        mol_type = protein
                        organism = Mus musculus
SEQUENCE: 60
MEPAGPAPGR LGPLLLCLLL SASCFCTGAT GTEVKVTQPE KSVSVAAGDS TILNCTVTSL    60
LPVGPIRWYR GVGQSRLLIY SFTGEHFPRV RNVSDTTKRN NMDFSIRISN VTPEDAGTYY   120
CVKFQRGSSE PDTEIQSGGG TEVYVLAKPS PPEVSGPADR GIPDQKVNFT CKSHGFSPRN   180
ITLKWFKDGQ ELHPLETTVN PSGKNVSYNI SSTVRVVLNS MDVNSKVICE VAHITLDRSP   240
LRGIANLSNF IRVSPTVKVT QQSPTSMNQV NLTCRAERFY PEDLQLIWLE NGNVSRNDTP   300
KNLTKNTDGT YNYTSLFLVN SSAHREDVVF TCQVKHDQQP AITRNHTVLG FAHSSDQGSM   360
QTFPDNNATH NWNVFIGVGV ACALLVVLLM AALYLLRIKQ KKAKGSTSST RLHEPEKNAR   420
EITQIQDTND INDITYADLN LPKEKKPAPR APEPNNHTEY ASIETGKVPR PEDTLTYADL   480
DMVHLSRAQP APKPEPSFSE YASVQVQRK                                    509

SEQ ID NO: 61            moltype = AA   length = 513
FEATURE                  Location/Qualifiers
source                   1..513
                        mol_type = protein
                        organism = Mus musculus
SEQUENCE: 61
MEPAGPAPGR LGPLLLCLLL SASCFCTGVT GKELKVTQPE KSVSVAAGDS TVLNCTLTSL    60
LPVGPIKWYR GVGQSRLLIY SFTGEHFPRV TNVSDATKRN NMDFSIRISN VTPEDAGTYY   120
CVKFQKGPSE PDTEIQSGGG TEVYVLAKPS PPEVSGPADR GIPDQKVNFT CKSHGFSPRN   180
ITLKWFKDGQ ELHHLETTVN PSGKNVSYNI SSTVRVVLNS MDVHSKVICE VAHITLDRSP   240
LRGIANLSNF IRVSPTVKVT QQSPTSMNQV NLTCRAERFY PEDLQLIWLE NGNVSRNDTP   300
KNLTKNTDGT YNYTSLFLVN SSAHREDVVF TCQVKHDQQP AITRNHTVLG LAHSSDQGSM   360
QTFPGNNATH NWNVFIGVGV ACALLVVLLM AALYLLRIKQ KKAKGSTSST RLHEPEKNAR   420
EITQVQSLIQ DTNDINDITY ADLNLPKEKK PAPRAPEPNN HTEYASIETG KVPRPEDTLT   480
YADLDMVHLS RAQPAPKPEP SFSEYASVQV QRK                               513

SEQ ID NO: 62            moltype = AA   length = 507
FEATURE                  Location/Qualifiers
source                   1..507
                        mol_type = protein
                        organism = Mus musculus
SEQUENCE: 62
MEPAGPAPGR LGPLLLCLLL SASCFCTGAT RTEVKVIQPE KSVSVAAGDS TVLNCTLTSL    60
LPVGPIRWYR GVGQSRQLIY SFTTEHFPRV TNVSDATKRS NLDFSIRISN VTPEDAGTYY   120
CVKFQRGSPD TEIQSGGGTE VYVLAKPSPP EVSGPADRGI PDQKVNFTCK SHGFSPRNIT   180
LKWFKDGQEL HPLETTVNPS GKNVSYNISS TVRVVLNSMD VHSKVICEVA HITLDRSPLR   240
GIANLSNFIR VSPTVKVTQQ SPTSMSQVNL TCRAERFYPE DLQLIWLENG NVSRNDTPKN   300
LTKNTDGTYN YTSLFLVNSS AHREDVVFTC QVKHDQQPAI TRNHTVLGLA HSSDQGSMQT   360
FPGNNATHNW NVFIGVGVAC ALLVVLLMAA LYLLRIKQKK AKGSTSSTRL HEPEKNAREI   420
TQIQDTNDIN DITYADLNLP KEKKPAPRAP EPNNHTEYAS IETGKVPRPE DTLTYADLDM   480
VHLSRAQPAP KPEPSFSEYA SVQVQRK                                      507

SEQ ID NO: 63            moltype = AA   length = 503
FEATURE                  Location/Qualifiers
source                   1..503
                        mol_type = protein
                        organism = Homo sapiens
SEQUENCE: 63
MEPAGPAPGR LGPLLCLLLA ASCAWSGVAG EEELQVIQPD KSVSVAAGES AILLCTVTSL    60
IPVGPIQWFR GAGPARELIY NQKEGHFPRV TTVSESTKRE NMDFSISISN ITPADAGTYY   120
CVKFRKGSPD TEFKSGAGTE LSVRAKPSAP VVSGPAARAT PQHTVSFTCE SHGFSPRDIT   180
LKWFKNGNEL SDFQTNVDPV GESVSYSIHS TAKVVLTREL DVHSQVICEV HVTLQGDFLQ   240
GTANLSETIR VPPTLEVTQQ PVRAENQVNV TCQVRKFYPQ RLQLTWLENG NVSRTETAST   300
VTENKDGTYN WMSWLLVNVS AHRDDVKLTC QVEHDGQPAV SKSHDLKVSA HPKEQGSNTA   360
AENTGSNERN IYIVVGVVCT LLVALLMAAL YLVRIRQKKA QGSTSSTRLH EPEKNAREIT   420
QDTNDITYAD LNLPKGKKPA PQAAEPNNHT EYASIQTSPQ PASEDTLTYA DLDMVHLNRT   480
PKQPAPKPEP SFSEYASVQV PRK                                          503

SEQ ID NO: 64            moltype = AA   length = 504
FEATURE                  Location/Qualifiers
source                   1..504
                        mol_type = protein
                        organism = Homo sapiens
SEQUENCE: 64
MEPAGPAPGR LGPLLCLLLA ASCAWSGVAG EEGLQVIQPD KSVSVAAGES AILHCTATSL    60
IPVGPIQWFR GAGPGRELIY NQKEGHFPRV TTVSDLTKRN NMDFSIRIGN ITPADAGTYY   120
CVKFRKGSPD DVEFKSGAGT ELSVRAKPSA PVVSGPAARA TPQHTVSFTC ESHGFSPRDI   180
TLKWFKNGNE LSDFQTNVDP VGESVSYSIH STAKVVLTRE DVHSQVICEV AHVTLQGDPL   240
RGTANLSETI RVPPTLEVTQ QPVRAENQVN VTCQVRKFYP QRLQLTWLEN GNVSRTETAS   300
TVTENKDGTY NWMSWLLVNV SAHREDVKLT CQVEHDGQPA VSKSHDLKVS AHPKEQGSNT   360
AAENTGSNER NIYIVVGVVC TLLVALLMAA LYLVRIRQKK AQGSTSSTRL HEPEKNAREI   420
TQDTNDITYA DLNLPKGKKP APQAAEPNNH TEYASIQTSP QPASEDTLTY ADLDMVHLNR   480
TPKQPAPKPE PSFSEYASVQ VPRK                                         504

SEQ ID NO: 65            moltype = AA   length = 504
FEATURE                  Location/Qualifiers
```

```
source                        1..504
                              mol_type = protein
                              organism = Homo sapiens
SEQUENCE: 65
MEPAGPAPGR LGPLLCLLLA ASCAWSGVAG EEELQVIQPD KFVLVAAGET ATLRCTATSL    60
IPVGPIQWFR GAGPGRELIY NQKEGHFPRV TTVSDLTKRN NMDFSIRIGN ITPADAGTYY   120
CVKFRKGSPD DVEFKSGAGT ELSVRAKPSA PVVSGPAARA TPQHTVSFTC ESHGFSPRDI   180
TLKWFKNGNE LSDFQTNVDP VGESVSYSIH STAKVVLTRE DVHSQVICEV AHVTLQGDPL   240
RGTANLSETI RVPPTLEVTQ QPVRAENQVN VTCQVRKFYP QRLQLTWLEN GNVSRTETAS   300
TVTENKDGTY NWMSWLLVNV SAHRDDVKLT CQVEHDGQPA VSKSHDLKVS AHPKEQGSNT   360
AAENTGSNER NIYIVVGVVC TLLVALLMAA LYLVRIRQKK AQGSTSSTRL HEPEKNAREI   420
TQDTNDITYA DLNLPKGKKP APQAAEPNNH TEYASIQTSP QPASEDTLTY ADLDMVHLNR   480
TPKQPAPKPE PSFSEYASVQ VPRK                                          504

SEQ ID NO: 66                 moltype = AA  length = 504
FEATURE                       Location/Qualifiers
source                        1..504
                              mol_type = protein
                              organism = Homo sapiens
SEQUENCE: 66
MEPAGPAPGR LGPLLCLLLA ASCAWSGVAG EEELQVIQPD KSVLVAAGET ATLRCTATSL    60
IPVGPIQWFR GAGPGRELIY NQKEGHFPRV TTVSDLTKRN NMDFPIRIGN ITPADAGTYY   120
CVKFRKGSPD DVEFKSGAGT ELSVRAKPSA PVVSGPAARA TPQHTVSFTC ESHGFSPRDI   180
TLKWFKNGNE LSDFQTNVDP VGESVSYSIH STAKVVLTRE DVHSQVICEV AHVTLQGDPL   240
RGTANLSETI RVPPTLEVTQ QPVRAENQVN VTCQVRKFYP QRLQLTWLEN GNVSRTETAS   300
TVTENKDGTY NWMSWLLVNV SAHRDDVKLT CQVEHDGQPA VSKSHDLKVS AHPKEQGSNT   360
AAENTGSNER NIYIVVGVVC TLLVALLMAA LYLVRIRQKK AQGSTSSTRL HEPEKNAREI   420
TQDTNDITYA DLNLPKGKKP APQAAEPNNH TEYASIQTSP QPASEDTLTY ADLDMVHLNR   480
TPKQPAPKPE PSFSEYASVQ VPRK                                          504

SEQ ID NO: 67                 moltype = AA  length = 503
FEATURE                       Location/Qualifiers
source                        1..503
                              mol_type = protein
                              organism = Homo sapiens
SEQUENCE: 67
MEPAGPAPGR LGPLLCLLLA ASCAWSGVAG EEELQVIQPD KSVSVAAGES AILHCTVTSL    60
IPVGPIQWFR GAGPARELIY NQKEGHFPRV TTVSESTKRE NMDFSISISN ITPADAGTYY   120
CVKFRKGSPD TEFKSGAGTE LSVRGKPSAP VVSGPAARAT PQHTVSFTCE SHGFSPRDIT   180
LKWFKNGNEL SDFQTNVDPV GESVSYSIHS TAKVVLTRED VHSQVICEVA HVTLQGDPLR   240
GTANLSETIR VPPTLEVTQQ PVRAENQVNV TCQVRKFYPQ RLQLTWLENG NVSRTETAST   300
VTENKDGTYN WMSWLLVNVS AHRDDVKLTC QVEHDGQPAV SKSHDLKVSA HPKEQGSNTA   360
AENTGSNERN IYIVVGVVCT LLVALLMAAL YLVRIRQKKA QGSTSSTRLH EPEKNAREIT   420
QDTNDITYAD LNLPKGKKPA PQAAEPNNHT EYASIQTSPQ PASEDTLTYA DLDMVHLNRT   480
PKQPAPKPEP SFSEYASVQV PRK                                           503

SEQ ID NO: 68                 moltype = AA  length = 503
FEATURE                       Location/Qualifiers
source                        1..503
                              mol_type = protein
                              organism = Homo sapiens
SEQUENCE: 68
MEPAGPAPGR LGPLLCLLLA ASCAWSGVAG EEELQVIQPD KSVLVAAGET ATLRCTATSL    60
IPVGPIQWFR GAGPARELIY NQKEGHFPRV TTVSESTKRE NMDFSISISN ITPADAGTYY   120
CVKFRKGSPD TEFKSGAGTE LSVRAKPSAP VVSGPAARAT PQHTVSFTCE SHGFSPRDIT   180
LKWFKNGNEL SDFQTNVDPV GESVSYSIHS TAKVVLTRED VHSQVICEVA HVTLQGDPLR   240
GTANLSETIR VPPTLEVTQQ PVRAENQVNV TCQVRKFYPQ RLQLTWLENG NVSRTETAST   300
VTENKDGTYN WMSWLLVNVS AHRDDVKLTC QVEHDGQPAV SKSHDLKVSA HPKEQGSNTA   360
AENTGSNERN IYIVVGVVCT LLVALLMAAL YLVRIRQKKA QGSTSSTRLH EPEKNAREIT   420
QDTNDITYAD LNLPKGKKPA PQAAEPNNHT EYASIQTSPQ PASEDTLTYA DLDMVHLNRT   480
PKQPAPKPEP SFSEYASVQV PRK                                           503

SEQ ID NO: 69                 moltype = AA  length = 504
FEATURE                       Location/Qualifiers
source                        1..504
                              mol_type = protein
                              organism = Homo sapiens
SEQUENCE: 69
MEPAGPAPGR LGPLLCLLLA ASCAWSGVAG EEELQVIQPD KSVLVAAGET ATLRCTATSL    60
IPVGPIQWFR GAGPGRELIY NQKEGHFPRV TTVSDLTKRN NMDFSIRISN ITPADAGTYY   120
CVKFRKGSPD DVEFKSGAGT ELSVRAKPSA PVVSGPAARA TPQHTVSFTC ESHGFSPRDI   180
TLKWFKNGNE LSDFQTNVDP VGESVSYSIH STAKVVLTRE DVHSQVICEV AHVTLQGDPL   240
RGTANLSETI RVPPTLEVTQ QPVRAENQVN VTCQVRKFYP QRLQLTWLEN GNVSRTETAS   300
TVTENKDGTY NWMSWLLVNV SAHRDDVKLT CQVEHDGQPA VSKSHDLKVS AHPKEQGSNT   360
AAENTGSNER NIYIVVGVVC TLLVALLMAA LYLVRIRQKK AQGSTSSTRL HEPEKNAREI   420
TQDTNDITYA DLNLPKGKKP APQAAEPNNH TEYASIQTSP QPASEDTLTY ADLDMVHLNR   480
TPKQPAPKPE PSFSEYASVQ VPRK                                          504

SEQ ID NO: 70                 moltype = AA  length = 503
```

```
FEATURE               Location/Qualifiers
source                1..503
                      mol_type = protein
                      organism = Homo sapiens
SEQUENCE: 70
MEPAGPAPGR LGPLLCLLLA ASCAWSRVAG EEELQVIQPD KSVSVAAGES AILHCTVTSL    60
IPVGPIQWFR GAGPARELIY NQKEGHFPRV TTVSESTKRE NMDFSISISN ITPADAGTYY   120
CVKFRKGSPD TEFKSGAGTE LSVRAKPSAP VVSGPAARAT PQHTVSFTCE SHGFSPRDIT   180
LKWFKNGNEL SDFQTNVDPV GESVSYSIHS TAKVVLTRED VHSQVICEVA HVTLQGDPLR   240
GTANLSETIR VPPTLEVTQQ PVRAENQVNV TCQVRKFYPQ RLQLTWLENG NVSRTETAST   300
VTENKDGTYN WMSWLLVNVS AHRDDVKLTC QVEHDGQPAV SKSHDLKVSA HPKEQGSNTA   360
AENTGSNERN IYIVVGVVCT LLVALLMAAL YLVRIRQKKA QGSTSSTRLH EPEKNAREIT   420
QDTNDITYAD LNLPKGKKPA PQAAEPNNHT EYASIQTSPQ PASEDTLTYA DLDMVHLNRT   480
PKQPAPKPEP SFSEYASVQV PRK                                          503

SEQ ID NO: 71         moltype = AA  length = 296
FEATURE               Location/Qualifiers
REGION                1..296
                      note = amino acid sequencde of human SIRPA_V2_IgV form
source                1..296
                      mol_type = protein
                      organism = synthetic construct
SEQUENCE: 71
MEPAGPAPGR LGPLLCLLLA ASCAWSGVAG EEELQVIQPD KSVSVAAGES AILHCTVTSL    60
IPVGPIQWFR GAGPARELIY NQKEGHFPRV TTVSESTKRE NMDFSISISN ITPADAGTYY   120
CVKFRKGSPD TEFKSGAGTE LSVRAKPSAP VVSGPAARAT PQHIYIVVGV VCTLLVALLM   180
AALYLVRIRQ KKAQGSTSST RLHEPEKNAR EITQDTNDIT YADLNLPKGK KPAPQAAEPN   240
NHTEYASIQT SPQPASEDTL TYADLDMVHL NRTPKQPAPK PEPSFSEYAS VQVPRK       296

SEQ ID NO: 72         moltype = AA  length = 397
FEATURE               Location/Qualifiers
REGION                1..397
                      note = amino acid sequencde of human SIRPA_V2_IgV_IgC1 form
source                1..397
                      mol_type = protein
                      organism = synthetic construct
SEQUENCE: 72
MEPAGPAPGR LGPLLCLLLA ASCAWSGVAG EEELQVIQPD KSVSVAAGES AILHCTVTSL    60
IPVGPIQWFR GAGPARELIY NQKEGHFPRV TTVSESTKRE NMDFSISISN ITPADAGTYY   120
CVKFRKGSPD TEFKSGAGTE LSVRAKPSAP VVSGPAARAT PQHTVSFTCE SHGFSPRDIT   180
LKWFKNGNEL SDFQTNVDPV GESVSYSIHS TAKVVLTRED VHSQVICEVA HVTLQGDPLR   240
GTANLSETIR VPPTLEVTQQ PVRAIYIVVG VVCTLLVALL MAALYLVRIR QKKAQGSTSS   300
TRLHEPEKNA REITQDTNDI TYADLNLPKG KKPAPQAAEP NNHTEYASIQ TSPQPASEDT   360
LTYADLDMVH LNRTPKQPAP KPEPSFSEYA SVQVPRK                            397

SEQ ID NO: 73         moltype = AA  length = 507
FEATURE               Location/Qualifiers
REGION                1..507
                      note = amino acid sequence of mouse SIRPA mutant
                       hmSIRPA_delta 0
source                1..507
                      mol_type = protein
                      organism = synthetic construct
SEQUENCE: 73
MEPAGPAPGR LGPLLLCLLL SASCFCTGAT GTEVKVTQPE KSVSVAAGDS TILNCTVTSL    60
LPVGPIRWYR GVGQSRLLIY NQKEGHFPRV RNVSDTTKRN NMDFSIRISN VTPEDAGTYY   120
CVKFQKGSPD TEIQSGGGTE VYVLAKPSPP EVSGPADRGI PDQKVNFTCK SHGFSPRNIT   180
LKWFKDGQEL HPLETTVNPS GKNVSYNISS TVRVVLNSMD VNSKVICEVA HITLDRSPLR   240
GIANLSNFIR VSPTVKVTQQ SPTSMNQVNL TCRAERFYPE DLQLIWLENG NVSRNDTPKN   300
LTKNTDGTYN YTSLFLVNSS AHREDVVFTC QVKHDQQPAI TRNHTVLGFA HSSDQGSMQT   360
FPDNNATHNW NVFIGVGVAC ALLVVLLMAA LYLLRIKQKK AKGSTSSTRL HEPEKNAREI   420
TQIQDTNDIN DITYADLNLP KEKKPAPRAP EPNNHTEYAS IETGKVPRPE DTLTYADLDM   480
VHLSRAQPAP KPEPSFSEYA SVQVQRK                                      507

SEQ ID NO: 74         moltype = AA  length = 509
FEATURE               Location/Qualifiers
REGION                1..509
                      note = amino acid sequence of mouse SIRPA mutant
                       hmSIRPA_delta 1
source                1..509
                      mol_type = protein
                      organism = synthetic construct
SEQUENCE: 74
MEPAGPAPGR LGPLLLCLLL SASCFCTGAT GTEVKVTQPE KSVSVAAGDS TILNCTVTSL    60
LPVGPIRWYR GVGQSRLLIY NQKEEHFPRV RNVSDTTKRN NMDFSIRISN VTPEDAGTYY   120
CVKFQRGSSE PDTEIQSGGG TEVYVLAKPS PPEVSGPADR GIPDQKVNFT CKSHGFSPRN   180
ITLKWFKDGQ ELHPLETTVN PSGKNVSYNI SSTVRVVLNS MDVNSKVICE VAHITLDRSP   240
LRGIANLSNF IRVSPTVKVT QQSPTSMNQV NLTCRAERFY PEDLQLIWLE NGNVSRNDTP   300
KNLTKNTDGT YNYTSLFLVN SSAHREDVVF TCQVKHDQQP AITRNHTVLG FAHSSDQGSM   360
```

```
QTFPDNNATH NWNVFIGVGV ACALLVVLLM AALYLLRIKQ KKAKGSTSST RLHEPEKNAR    420
EITQIQDTND INDITYADLN LPKEKKPAPR APEPNNHTEY ASIETGKVPR PEDTLTYADL    480
DMVHLSRAQP APKPEPSFSE YASVQVQRK                                     509

SEQ ID NO: 75              moltype = AA  length = 509
FEATURE                    Location/Qualifiers
REGION                     1..509
                           note = amino acid sequence of mouse SIRPA mutant
                             hmSIRPA_delta 2
source                     1..509
                           mol_type = protein
                           organism = synthetic construct
SEQUENCE: 75
MEPAGPAPGR LGPLLLCLLL SASCFCTGAT GTEVKVTQPE KSVSVAAGDS TILNCTVTSL    60
LPVGPIRWYR GVGQSRLLIY SFTEGHFPRV RNVSDTTKRN NMDFSIRISN VTPEDAGTYY   120
CVKFQRGSSE PDTEIQSGGG TEVYVLAKPS PPEVSGPADR GIPDQKVNFT CKSHGFSPRN   180
ITLKWFKDGQ ELHPLETTVN PSGKNVSYNI SSTVRVVLNS MDVNSKVICE VAHITLDRSP   240
LRGIANLSNF IRVSPTVKVT QQSPTSMNQV NLTCRAERFY PEDLQLIWLE NGNVSRNDTP   300
KNLTKNTDGT YNYTSLFLVN SSAHREDVVF TCQVKHDQQP AITRNHTVLG FAHSSDQGSM   360
QTFPDNNATH NWNVFIGVGV ACALLVVLLM AALYLLRIKQ KKAKGSTSST RLHEPEKNAR   420
EITQIQDTND INDITYADLN LPKEKKPAPR APEPNNHTEY ASIETGKVPR PEDTLTYADL   480
DMVHLSRAQP APKPEPSFSE YASVQVQRK                                    509

SEQ ID NO: 76              moltype = AA  length = 5
FEATURE                    Location/Qualifiers
REGION                     1..5
                           note = amino acid sequence of 81st to 85th amino acids in
                             amino acid sequence of mouse SIRPA mutant hmSIRPA_delta 0
source                     1..5
                           mol_type = protein
                           organism = synthetic construct
SEQUENCE: 76
NQKEG                                                                5

SEQ ID NO: 77              moltype = AA  length = 5
FEATURE                    Location/Qualifiers
REGION                     1..5
                           note = amino acid sequence of 81st to 85th amino acids in
                             amino acid sequence of mouse SIRPA mutant hmSIRPA_delta 1
source                     1..5
                           mol_type = protein
                           organism = synthetic construct
SEQUENCE: 77
NQKEE                                                                5

SEQ ID NO: 78              moltype = AA  length = 5
FEATURE                    Location/Qualifiers
REGION                     1..5
                           note = amino acid sequence of 81st to 85th amino acids in
                             amino acid sequence of BALB/C mouse SIRPA
source                     1..5
                           mol_type = protein
                           organism = synthetic construct
SEQUENCE: 78
SFTGE                                                                5

SEQ ID NO: 79              moltype = AA  length = 5
FEATURE                    Location/Qualifiers
REGION                     1..5
                           note = amino acid sequence of 126th to 130th amino acids in
                             amino acid sequence of BALB/C mouse SIRPA
source                     1..5
                           mol_type = protein
                           organism = synthetic construct
SEQUENCE: 79
RGSSE                                                                5

SEQ ID NO: 80              moltype = AA  length = 5
FEATURE                    Location/Qualifiers
REGION                     1..5
                           note = amino acid sequence of 81st to 85th amino acids in
                             amino acid sequence of mouse SIRPA mutant hmSIRPA_delta 2
source                     1..5
                           mol_type = protein
                           organism = synthetic construct
SEQUENCE: 80
SFTEG                                                                5

SEQ ID NO: 81              moltype = AA  length = 466
```

```
FEATURE                 Location/Qualifiers
REGION                  1..466
                        note = amino acid sequence of OSE-172 antibody heavy chain
                           (OSE-172_hG4Pro)
source                  1..466
                        mol_type = protein
                        organism = synthetic construct
SEQUENCE: 81
MKHLWFFLLL VAAPRWVLSE VQLVQSGAEV KKPGESLRIS CKASGYSFTS YWVHWVRQMP    60
GKGLEWMGNI DPSDSDTHYS PSFQGHVTLS VDKSISTAYL QLSSLKASDT AMYYCVRGGT   120
GTLAYFAYWG QGTLVTVSSA STKGPSVFPL APCSRSTSES TAALGCLVKD YFPEPVTVSW   180
NSGALTSGVH TFPAVLQSSG LYSLSSVVTV PSSSLGTKTY TCNVDHKPSN TKVDKRVESK   240
YGPPCPPCPA PEFLGGPSVF LFPPKPKDTL MISRTPEVTC VVVDVSQEDP EVQFNWYVDG   300
VEVHNAKTKP REEQFNSTYR VVSVLTVLHQ DWLNGKEYKC KVSNKGLPSS IEKTISKAKG   360
QPREPQVYTL PPSQEEMTKN QVSLTCLVKG FYPSDIAVEW ESNGQPENNY KTTPPVLDSD   420
GSFFLYSRLT VDKSRWQEGN VFSCSVMHEA LHNHYTQKSL SLSPGK                  466

SEQ ID NO: 82           moltype = AA  length = 239
FEATURE                 Location/Qualifiers
REGION                  1..239
                        note = amino acid sequence of OSE-172 antibody light chain
                           (OSE-172_hK)
source                  1..239
                        mol_type = protein
                        organism = synthetic construct
SEQUENCE: 82
MVLQTQVFIS LLLWISGAYG DVVMTQSPLS LPVTLGQPAS ISCRSSQSLV HSYGNTYLYW    60
FQQRPGQSPR LLIYRVSNRF SGVPDRFSGS GSGTDFTLKI SRVEAEDVGV YYCFQGTHVP   120
YTFGGGTKVE IKRTVAAPSV FIFPPSDEQL KSGTASVVCL LNNFYPREAK VQWKVDNALQ   180
SGNSQESVTE QDSKDSTYSL SSTLTLSKAD YEKHKVYACE VTHQGLSSPV TKSFNRGEC    239

SEQ ID NO: 83           moltype = AA  length = 459
FEATURE                 Location/Qualifiers
REGION                  1..459
                        note = amino acid sequence of KWAR23 antibody heavy chain
                           (KWAR23_hG4Pro)
source                  1..459
                        mol_type = protein
                        organism = synthetic construct
SEQUENCE: 83
MKHLWFFLLL VAAPRWVLSE VQLQQSGAEL VKPGASVKLS CTASGFNIKD YYIHWVQQRT    60
EQGLEWIGRI DPEDGETKYA PKFQDKATIT ADTSSNTAYL HLSSLTSEDT AVYYCARWGA   120
YWGQGTLVTV SAASTKGPSV FPLAPCSRST SESTAALGCL VKDYFPEPVT VSWNSGALTS   180
GVHTFPAVLQ SSGLYSLSSV VTVPSSSLGT KTYTCNVDHK PSNTKVDKRV ESKYGPPCPP   240
CPAPEFLGGP SVFLFPPKPK DTLMISRTPE VTCVVVDVSQ EDPEVQFNWY VDGVEVHNAK   300
TKPREEQFNS TYRVVSVLTV LHQDWLNGKE YKCKVSNKGL PSSIEKTISK AKGQPREPQV   360
YTLPPSQEEM TKNQVSLTCL VKGFYPSDIA VEWESNGQPE NNYKTTPPVL DSDGSFFLYS   420
RLTVDKSRWQ EGNVFSCSVM HEALHNHYTQ KSLSLSLGK                          459

SEQ ID NO: 84           moltype = AA  length = 235
FEATURE                 Location/Qualifiers
REGION                  1..235
                        note = amino acid sequence of KWAR23 antibody light chain
                           (KWAR23_hK)
source                  1..235
                        mol_type = protein
                        organism = synthetic construct
SEQUENCE: 84
MVLQTQVFIS LLLWISGAYG QIVLTQSPAI MSASPGEKVT LTCSASSSVS SSYLWYQQK    60
PGSSPKLWIY STSNLASGVP ARFSGSGSGT SYSLTISSME AEDAASYFCH QWSSYPRTFG   120
AGTKLELKRT VAAPSVFIFP PSDEQLKSGT ASVVCLLNNF YPREAKVQWK VDNALQSGNS   180
QESVTEQDSK DSTYSLSSTL TLSKADYEKH KVYACEVTHQ GLSSPVTKSF NRGEC        235

SEQ ID NO: 85           moltype = AA  length = 467
FEATURE                 Location/Qualifiers
REGION                  1..467
                        note = amino acid sequence of ADU-1805 antibody heavy chain
                           (ADU-1805_hG2)
source                  1..467
                        mol_type = protein
                        organism = synthetic construct
SEQUENCE: 85
MKHLWFFLLL VAAPRWVLSE VQLVQSGAEV VKPGASVKLS CKASGSTFTS YWMHWVKQAP    60
GQGLEWIGAI YPVNSDTTYN QKFKGKATLT VDKSASTAYM ELSSLRSEDT AVYYCTRSFY   120
YSLDAAWFVY WGQGTLVTVS SASTKGPSVF PLAPCSRSTS ESTAALGCLV KDYFPEPVTV   180
SWNSGALTSG VHTFPAVLQS SGLYSLSSVV TVPSSNFGTQ TYTCNVDHKP SNTKVDKTVE   240
RKCCVECPPC PAPPVAGPSV FLFPPKPKDT LMISRTPEVT CVVVDVSHED PEVQFNWYVD   300
GVEVHNAKTK PREEQFNSTF RVVSVLTVVH QDWLNGKEYK CKVSNKGLPA PIEKTISKTK   360
GQPREPQVYT LPPSREEMTK NQVSLTCLVK GFYPSDIAVE WESNGQPENN YKTTPPMLDS   420
```

```
DGSFFLYSKL TVDKSRWQQG NVFSCSVMHE ALHNHYTQKS LSLSPGK            467

SEQ ID NO: 86           moltype = AA  length = 234
FEATURE                 Location/Qualifiers
REGION                  1..234
                        note = amino acid sequence of ADU-1805 antibody light chain
                         (ADU-1805_hK)
source                  1..234
                        mol_type = protein
                        organism = synthetic construct
SEQUENCE: 86
MVLQTQVFIS LLLWISGAYG DIQMTQSPSS LSASVGDRVT ITCRASQDIG SRLNWLQQKP  60
GKAPKRLIYA TSSLDSGVPS RFSGSGSGTE FTLTISSLQP EDFATYYCLQ YASSPFTFGG  120
GTKVEIKRTV AAPSVFIFPP SDEQLKSGTA SVVCLLNNFY PREAKVQWKV DNALQSGNSQ  180
ESVTEQDSKD STYSLSSTLT LSKADYEKHK VYACEVTHQG LSSPVTKSFN RGEC        234

SEQ ID NO: 87           moltype = AA  length = 68
FEATURE                 Location/Qualifiers
REGION                  1..68
                        note = Partial amino acid sequence of mouse SIRPA mutant
                         hmSIRPA_delta 0
source                  1..68
                        mol_type = protein
                        organism = synthetic construct
SEQUENCE: 87
GVGQSRLLIY NQKEGHFPRV RNVSDTTKRN NMDFSIRISN VTPEDAGTYY CVKFQKGSPD  60
TEIQSGGG                                                           68

SEQ ID NO: 88           moltype = AA  length = 70
FEATURE                 Location/Qualifiers
REGION                  1..70
                        note = Partial amino acid sequence of mouse SIRPA mutant
                         hmSIRPA_delta 1
source                  1..70
                        mol_type = protein
                        organism = synthetic construct
SEQUENCE: 88
GVGQSRLLIY NQKEEHFPRV RNVSDTTKRN NMDFSIRISN VTPEDAGTYY CVKFQRGSSE  60
PDTEIQSGGG                                                         70

SEQ ID NO: 89           moltype = AA  length = 70
FEATURE                 Location/Qualifiers
REGION                  1..70
                        note = Partial amino acid sequence of mouse SIRPA mutant
                         hmSIRPA_delta 2
source                  1..70
                        mol_type = protein
                        organism = synthetic construct
SEQUENCE: 89
GVGQSRLLIY SFTEGHFPRV RNVSDTTKRN NMDFSIRISN VTPEDAGTYY CVKFQRGSSE  60
PDTEIQSGGG                                                         70
```